(12) United States Patent
Aoki et al.

(10) Patent No.: US 7,677,816 B2
(45) Date of Patent: *Mar. 16, 2010

(54) CAMERA TERMINAL AND IMAGED AREA ADJUSTING DEVICE

(75) Inventors: Katsuji Aoki, Nara (JP); Atsushi Yoshida, Osaka (JP); Shoichi Araki, Osaka (JP)

(73) Assignee: Panasonic Corporation, Osaka (JP)

( * ) Notice: Subject to any disclaimer, the term of this patent is extended or adjusted under 35 U.S.C. 154(b) by 590 days.

This patent is subject to a terminal disclaimer.

(21) Appl. No.: 10/584,385

(22) PCT Filed: Dec. 16, 2005

(86) PCT No.: PCT/JP2005/023150

§ 371 (c)(1),
(2), (4) Date: Jun. 26, 2006

(87) PCT Pub. No.: WO2006/068049

PCT Pub. Date: Jun. 29, 2006

(65) Prior Publication Data

US 2007/0183770 A1  Aug. 9, 2007

(30) Foreign Application Priority Data

Dec. 21, 2004 (JP) ............................. 2004-369715
Jul. 27, 2005 (JP) ............................. 2005-216713

(51) Int. Cl.
*G03B 17/00* (2006.01)

(52) U.S. Cl. .................. 396/427; 348/153; 348/211.11; 348/211.13

(58) Field of Classification Search ................. 396/427, 396/428, 325; 348/36, 37, 39, 139, 143, 348/159, 211.6, 211.11, 211.13, 153; *H04N 5/225, H04N 5/232, 7/18*
See application file for complete search history.

(56) References Cited

U.S. PATENT DOCUMENTS

| | | | | |
|---|---|---|---|---|
| 6,597,393 | B2 * | 7/2003 | Kato et al. | 348/211.99 |
| 6,657,667 | B1 * | 12/2003 | Anderson | 348/333.12 |
| 6,950,120 | B1 * | 9/2005 | Endo et al. | 348/36 |
| 2005/0078184 | A1 | 4/2005 | Sakai et al. | |
| 2005/0206726 | A1 * | 9/2005 | Yoshida et al. | 348/143 |
| 2005/0219361 | A1 * | 10/2005 | Aoki et al. | 348/159 |

FOREIGN PATENT DOCUMENTS

JP  1-288696  11/1989

(Continued)

*Primary Examiner*—W. B. Perkey
*Assistant Examiner*—Linda B Smith
(74) *Attorney, Agent, or Firm*—Wenderoth, Lind & Ponack, L.L.P.

(57) ABSTRACT

A camera terminal including an imaging zone adjusting apparatus that adjusts an imaging zone using multiple camera terminals, a camera that images a hypothetical imaging zone obtained by changing the position of an imaging zone within a specific zone in a specific period of time, an adjusting unit that adjusts the position of a hypothetical imaging zone, and a communications unit that sends/receives hypothetical imaging zone information indicating the hypothetical imaging zone. The adjusting unit adjusts the position of the hypothetical imaging zone of one's own camera terminal based on the hypothetical imaging zone of one's own camera terminal and the hypothetical imaging zones of the other camera terminals indicated by the hypothetical imaging zone information received by the communications unit so that a combined zone of the hypothetical imaging zones of the multiple camera terminals completely covers a specific imaging target zone.

12 Claims, 50 Drawing Sheets

FOREIGN PATENT DOCUMENTS

| | | |
|---|---|---|
| JP | 9-179984 | 7/1997 |
| JP | 3043925 | 3/2000 |
| JP | 2001/094975 | 4/2001 |
| JP | 3180730 | 4/2001 |
| JP | 2004-072628 | 3/2004 |
| JP | 2005-117542 | 4/2005 |

* cited by examiner

● Detection camera
▲ Evaluation camera

Detection target

● Detection camera (a)

(b)

(a)

(b)

(a)

(b)

(a)

(b)

(a)

(b)

(a)

(b)

(a)

(b)

(c)

(a)

(b)

(a)

(b)

(a)

(b)

(a)

(b)

(c)

(a)

(b)

(a)

(b)

(c)

CAMERA TERMINAL AND IMAGED AREA ADJUSTING DEVICE

TECHNICAL FIELD

The present invention relates to a camera terminal of an imaging system for obtaining image information of real space using multiple camera terminals and an apparatus for adjusting an imaging zone with multiple camera terminals.

BACKGROUND ART

Recently, research and development efforts have been made on an apparatus using multiple cameras mainly used for surveillance. For usage purposes, the apparatus must meet two requirements for an imaging target zone comprising a surveillance target zone:

first, to provide constant surveillance of the imaging target zone with no blind spots and to detect a target within the zone, and second, the requirement is to obtain detailed information on the detection target present within the imaging target zone.

The conventional apparatus using multiple cameras self-adjusts the imaging zone of each camera to meet the two requirements. Such conventional apparatuses using multiple cameras are represented in Patent References 1 and 2.

First, the conventional apparatus referred to in Patent Reference 1 is described. FIG. 1 illustrates the apparatus of the first conventional art described in Patent Reference 1 that self-adjusts camera imaging zones. With the detection camera apparatus 10010 of FIG. 1, a camera 10011 and a reflection mirror 10012 capture a detection target image throughout an extensive imaging zone, a moving object extractor 10013 extracts the detection target in the captured image, and a positional information extractor 10014 extracts the positional information of the detection target. Thus, the detection camera apparatus 10010 obtains the positional information of the detection target throughout the extensive imaging zone. With evaluation camera apparatus 10020, a camera controller 10022 controls the rotation and depression angles and zoom rate of a camera 10021 based on the positional information of the detection target, and the evaluation camera apparatus 10020 captures an enlarged image of the detection target. Thus, the evaluation camera apparatus 10020 obtains detailed information of the detection target.

FIG. 2 is a drawing showing the imaging zones of the detection camera apparatus 10010 and evaluation camera apparatus 10020. In the figure, the black circles indicate the positions where the detection camera apparatuses 10110 comprising fixed cameras are installed, of which the circles or hexagons indicate the imaging zones. When, as shown in the figure, the detection camera apparatuses 10110 are artificially installed on a regular basis, the imaging target zone or surveillance target zone can be constantly detected with no blind spots.

A conventional apparatus referred to in Patent Reference 2 is described hereafter. FIG. 3 illustrates the second conventional apparatus described in Patent Reference 2 that self-adjusts the camera imaging zones. In FIG. 3, a moving object detection camera 10211 intended to capture an image of a detection target throughout an extensive imaging zone changes one's own imaging zone using an orientation control means 10212, and a surveillance camera 10221 intended to capture an enlarged image of the detection target changes one's own imaging zone using an orientation control means 10222. The imaging zone of each camera is determined based on information previously stored in a camera field angle memory means 10231 and a camera field angle memory means 10232 using the position of a detection target extracted in the image captured by the moving object detection camera 10211 and the imaging zone of each camera in an image processing apparatus 10240.

How the imaging zone of each camera is determined is further described next. FIGS. 4, 5, and 6 are illustrations explaining how the imaging zone of each camera is determined in the second conventional art, illustrating images captured by the moving object detection camera 10211 and dividing them into several block images. First, the imaging zone of the moving object detection camera 10211 is determined as follows. When a detection target is present in the shaded blocks of FIG. 4, the orientation of the moving object detection camera 10211 is changed in the direction of the arrows in each of the blocks of FIG. 54 corresponding to FIG. 4, respectively, thereby changing the imaging zone of the camera. The imaging zone of the moving object detection camera 10211 corresponding to each block position is manually pre-determined and the information is pre-set in the camera field angle memory means 10231. Then, the imaging zone of the surveillance camera 10221 is determined as follows. When a detection target is present in the block position shown in FIG. 6, the orientation of the surveillance camera 10221 is changed to have the imaging zone indicated by the broken lines, thereby changing the imaging zone of the camera. The imaging zone of the surveillance camera 10221 corresponding to each block position is manually pre-determined and the information is pre-set in the camera field angle memory means 10232.

Characteristics of the imaging zone self-adjustment of the conventional apparatus using multiple cameras are summarized hereafter. First, each camera has a fixed, pre-determined role. Namely, it is the detection camera apparatus 10010 in the conventional apparatus referred to in Patent Reference 1 and the moving object detection camera 10211 in the conventional apparatus referred to in Patent Reference 2 that plays the role of detecting a detection target throughout an extensive imaging zone and it is the evaluation camera apparatus 10020 in the conventional apparatus referred to in Patent Reference 1 and the surveillance camera 10211 in the conventional apparatus referred to in Patent Reference 2 that plays the role of obtaining detailed information of the detection target, such as an enlarged image of the detection target. Thus, a camera playing one role achieves the first requirement and a camera playing the other role achieves the second requirement (the first characteristic of the conventional art).

In the conventional apparatus referred to in Patent Reference 2, for example, the imaging zone of the moving object detection camera 10211 is changed to the detection zone shifted to the top left shown as the top left block of FIG. 54 according to the change in the situation, in that a detection target is present in the top left block of the FIG. 4. Thus, the imaging zone of each camera is determined and adjusted based on information in the form of a table containing situational changes predicted and manually created and imaging zones corresponding thereto on a one-to-one basis (the second characteristic of the conventional art).

The conventional apparatus referred to in Patent Reference 1 uses manually pre-placed fixed cameras on a regular basis in order to achieve the first requirement (the third characteristic of the conventional art).

The self-adjustment of the imaging zone of the conventional apparatus using multiple cameras is described above. Self-adjustment of the imaging zone of the conventional apparatus using a single camera is described hereafter. An apparatus using a single camera and self-adjustment the imaging zone of the camera is described in Patent Reference 3. Patent Reference 3 discloses two techniques, known as "auto-scanning" and "auto-panning" as a means for self-adjustment the imaging zone of a camera.

First, the "auto-scanning" technique is described. FIG. 8 is a drawing explaining the "auto-scanning" technique according to the third conventional art. The "auto-scanning" technique allows a camera 10701 to sequentially automatically image multiple imaging zones from a first imaging zone 10711 to an n-th imaging zone 1071N shown in the figure. Imaging zone information of the first imaging zone 10711 to the n-th imaging zone 1071N is pre-recorded in a recording means 10703. This technique is realized by an orientation control means 10702 controlling the orientation of the camera 10701 based on the information recoded in the recording means 10703 so as to sequentially change the imaging zone of the camera 10701 from the first imaging zone 10711 to the n-th imaging zone 1071N.

The "auto-panning" technique is described hereafter. FIG. 9 is a drawing explaining the "auto-panning" technique. The "auto-panning" technique allows a camera 10801 to automatically and repeatedly pan from side to side between a first panning angle 10811 and a second panning angle 10812 shown in the figure so as to self-adjust the imaging zone of the camera 10801. Though not shown in FIG. 9, the technique is realized by mechanical switches provided for the first panning angle 10811 and second panning angle 10812 and confirm that the camera 10801 is oriented at either panning angle so that an orientation control means 10802 controls the orientation of the camera.

Characteristics of the self-adjustment of the imaging zone of the conventional apparatus using a single camera are summarized hereafter. In the conventional apparatus referred to in Patent Reference 3, for example, the imaging zone of the camera 10701 is changed based on the imaging zone information of the first imaging zone 10711 to the n-th imaging zone 1071N recorded in the recoding means 10703. Similar to the self-adjustment of the imaging zone of the apparatus using multiple cameras, the imaging zone of the camera is determined and adjusted based on information in the form of a table containing imaging zones manually predicted and created although they do not correspond to situational changes on a one-to-one basis (the second characteristic of the conventional art).

Patent Reference 1: Japanese Patent Publication No. 3043925 (FIGS. 1 and 6)

Patent Reference 2: Japanese Patent Publication No. 3180730 (FIGS. 1 and 7 to 9)

Patent Reference 3: Japanese Laid-Open Patent Application No. H01-288696

However, in the conventional apparatuses described above, the imaging zone of each camera is determined and adjusted based on information in the form of a table containing situational changes manually predicted and set up and imaging zones corresponding thereto on a one-to-one basis (the above second characteristic of the conventional art). Therefore, information in the form of a table containing situational changes and imaging zones corresponding thereto on a one-to-one basis should be manually predicted and created one by one for each camera.

The information depends on the position and size of the imaging zone, individually predicted situational changes, locations and the number of cameras. Each time a change occurs in the elements, the information should be individually recreated one by one. The work becomes complex as the number of cameras increase and its cost and workload becomes enormous. It is common that a building surveillance system will use over ten cameras.

The conventional apparatuses meet the first requirement by manually positioning fixed cameras on a regular basis (the above third characteristic of the conventional art). However, even if a single camera failure occurs, the apparatus fails to achieve the first requirement.

For example, as shown in FIG. 7, an increased number of detection camera apparatuses 10010 can be used to cover the detection target zone with no blind spots regardless of a single camera failure. However, this is no doubt inefficient.

It is an objective of the present invention to resolve the conventional art problems indicated above, and to provide an imaging zone adjusting apparatus that eliminates the necessity of manually predicting situational changes and creating a table and allows the imaging target zone to be imaged with no blind spots, even if some of the multiple cameras are unserviceable and a camera terminal constitutes the imaging zone adjusting apparatus.

SUMMARY OF THE INVENTION

In order to achieve the above purpose, the camera terminal according to the present invention is a camera terminal constituting an imaging zone adjusting apparatus that adjusts an imaging zone using multiple camera terminals, including: a camera that images a hypothetical imaging zone that is a hypothetical imaging zone obtained by changing the position of an imaging zone within a specific zone in a specific period of time; an adjusting unit that adjusts the position of the hypothetical imaging zone by controlling the camera; and a communication unit that sends/receives hypothetical imaging zone information indicating the hypothetical imaging zone, wherein the adjusting unit adjusts the position of the hypothetical imaging zone to which the camera terminal belongs based on the hypothetical imaging zone to which the camera terminal belongs provided with the adjusting unit and the hypothetical imaging zones of the other camera terminals indicated by the hypothetical imaging zone information received by the communication unit so that a combined zone of the hypothetical imaging zones of the multiple camera terminals completely covers a specific imaging target zone. Thus, multiple camera terminals cooperate to cover the imaging target zone with multiple hypothetical imaging zones with no blind spots. Compared with a method of covering an imaging target zone with real imaging zones, using hypothetical imaging zones allows any imaging zone to be assigned to a single camera terminal. Therefore, an imaging zone adjusting apparatus can be realized for imaging target zones of different sizes and shapes.

"The hypothetical imaging zone" in the Claims corresponds, for example, to a cycle $T_{CYCLE}$ imaging zone in the embodiments, which comprises a combined zone of imaging zones continuously imaged by a single camera terminal through a scanning operation such as panning and tilting in a specific period of $T_{CYCLE}$ time. Similarly, "the hypothetical detection zone" corresponds, for example, to a cycle $T_{CYCLE}$ detection zone in the embodiments, comprising a combined zone of detection zones (detection spaces) continuously detected by a single sensor terminal through a scanning operation such as orientation in detection directions in a specific period of time $T_{CYCLE}$.

Here, it is preferable that the camera comprises a unit that changes the cycle, the adjusting unit adjusts the position of the hypothetical imaging zone to which the camera terminal belongs based on the hypothetical imaging zone to which the camera terminal belongs and the hypothetical imaging zones of other camera terminals so that a combined zone of the hypothetical imaging zones of the multiple camera terminals completely covers the imaging target zone and adjusts the position and cycle of the hypothetical imaging zone to which the camera terminal belongs so that the cycle of the hypothetical imaging zone to which the camera terminal belongs and the cycle of a hypothetical imaging zone adjacent thereto are nearly equal, wherein the adjusting unit adjusts the position of the hypothetical imaging zone to which the camera terminal belongs based on the hypothetical imaging zone to which the camera terminal belongs and the hypothetical imaging zones of the other camera terminals so that a combined zone of the hypothetical imaging zones of the multiple camera terminals completely covers a specific imaging target zone and adjusts the position and cycle of the hypothetical imaging zone to which the camera terminal belongs so that the cycle of the hypothetical imaging zone to which the camera terminal belongs becomes smaller, the adjusting unit divides an imaging target zone into zones assigned to the multiple camera terminals and adjusts the position and field angles of the hypothetical imaging zone to which the camera terminal belongs so that the hypothetical imaging zones of the multiple camera terminals cover the divided zones, respectively, the adjusting unit adjusts the aspect ratio of the hypothetical imaging zone, the adjusting unit adjusts the position of the hypothetical imaging zone to which the camera terminal belongs based on the hypothetical imaging zone to which the camera terminal belongs and the hypothetical imaging zones of other camera terminals so that a combined zone of the hypothetical imaging zones of the multiple camera terminals completely covers a specific imaging target zone and adjusts the position and aspect ratio of the hypothetical imaging zone to which the camera terminal belongs so that the aspect ratio of the hypothetical imaging zone of one's own camera terminal is a specific target quantity.

Further, it is preferable that the target quantity of the aspect ratio is the aspect ratio of an imaging zone determined by the imaging zone position and camera installation position.

The present invention can be realized as an imaging zone adjusting apparatus (imaging system) that adjusts an imaging zone using the described multiple camera terminals, having not only a distributed control structure in which the camera terminals constituting the imaging zone adjusting apparatus each have an adjusting unit, but also a central control structure in which a common adjusting unit adjusts the detection zones of all common terminals, as an imaging zone adjustment method, and as a program to execute the method. Further, the present invention can be realized as a sensor terminal that adjusts the detection zone of a sensor that can detect physical quantities such as a micro-motion sensor in place of an imaging zone comprising a zone imaged by a camera or as a detection zone adjusting apparatus (detection system) that adjusts a detection zone using the described multiple sensor terminals. Needless to say, the program according to the present invention can be distributed by recording media such as computer readable CD-ROMs and transmission media such as the Internet.

Effects of the Invention

The camera terminal and imaging zone adjusting apparatus according to the present invention self-adjusts the cycle T imaging zones of the cameras of the camera terminals so that a combined zone of the cycle T imaging zones of the cameras of the camera terminals completely covers a specific imaging target zone, thereby eliminating the necessity of manually predicting and creating cycle T imaging zone information corresponding to situational changes for each camera as in the conventional art and allowing a specific imaging target zone to be efficiently covered by the remaining cameras with no blind spots even if some of multiple cameras are unserviceable.

Therefore, the present invention guarantees that any space can be imaged with no blind spots and has a particularly high practical value as a surveillance system for suspicious individuals in schools and buildings.

NUMERICAL REFERENCES

Figure 1:
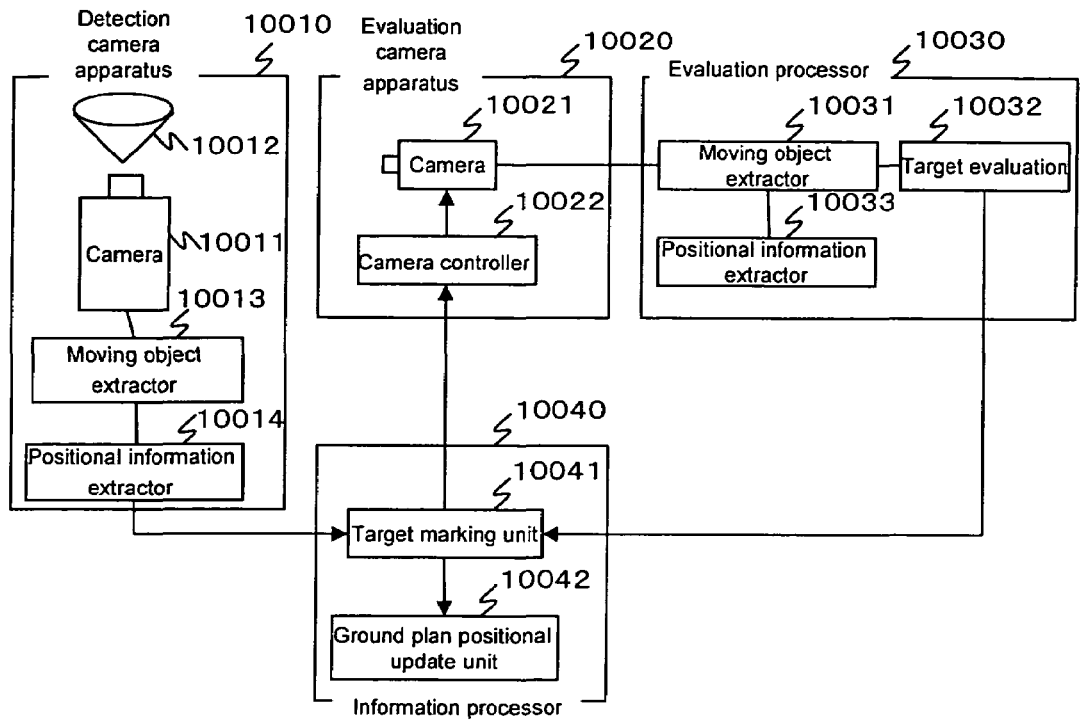
FIG. 1 is a block diagram showing the structure of a first conventional art.
Figure 2:
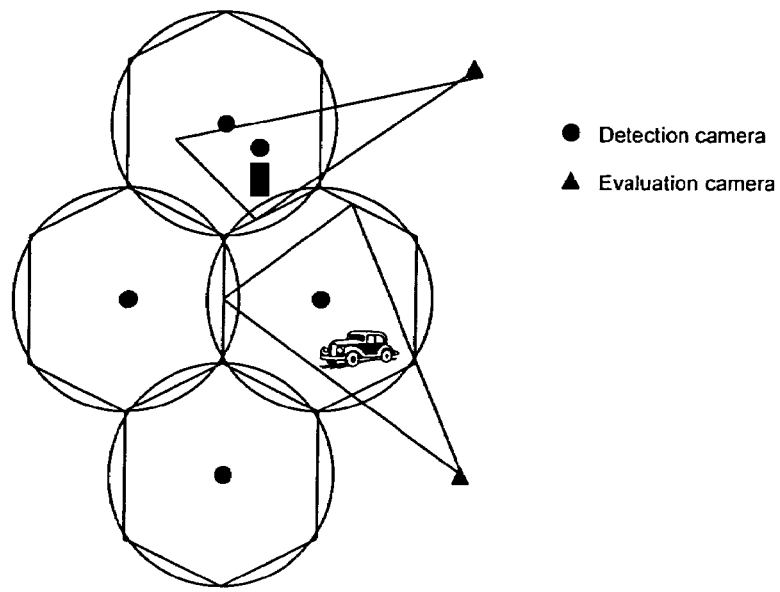
FIG. 2 is a drawing explaining the camera field of vision of the first conventional art.
Figure 3:
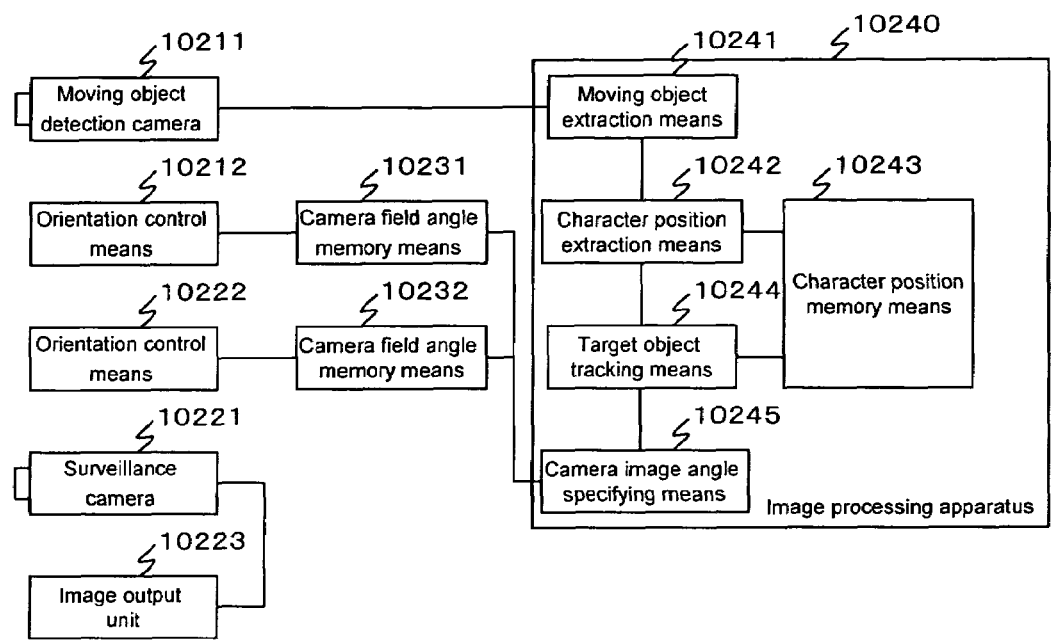
FIG. 3 is a block diagram showing the structure of a second conventional art.
Figure 4:
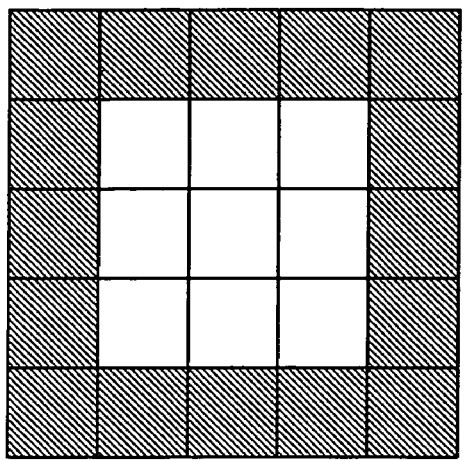
FIG. 4 is a drawing explaining the operation of the second conventional art.
Figure 5:
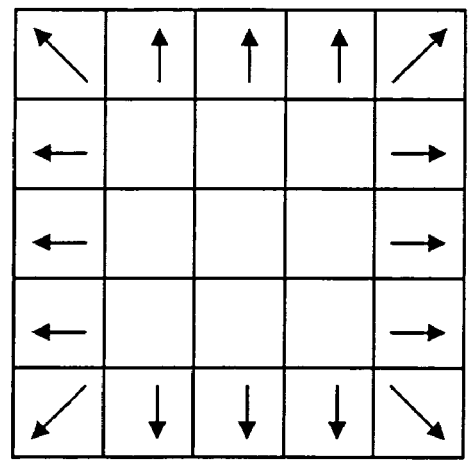
FIG. 5 is a drawing explaining the operation of the second conventional art.
Figure 6:
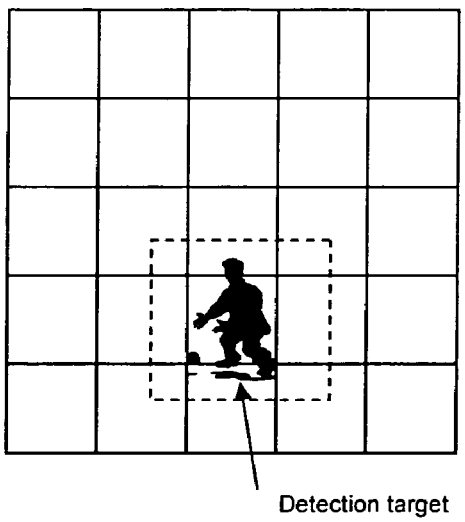
FIG. 6 is a drawing explaining the operation of the second conventional art.
Figure 7:
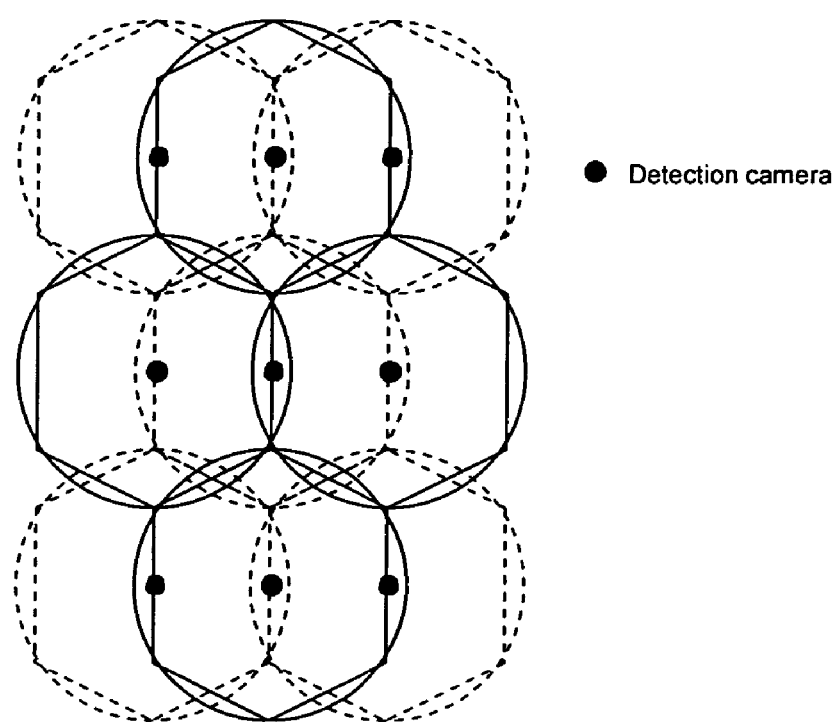
FIG. 7 is a drawing explaining the operation of the second conventional art.
Figure 8:
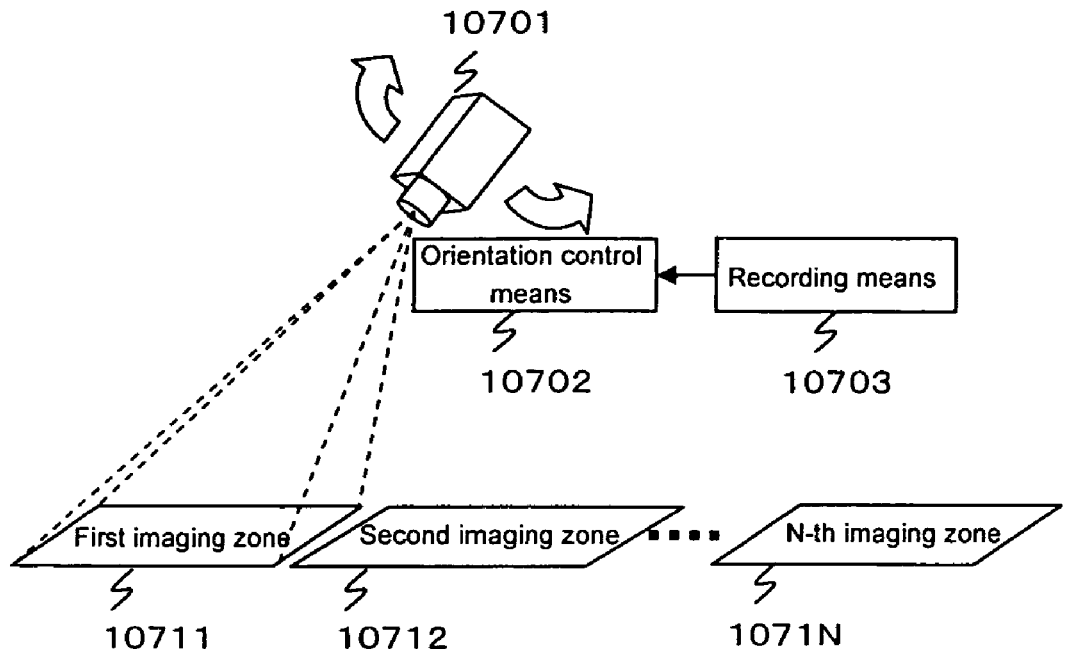
FIG. 8 is a drawing explaining the operation of a third conventional art.
Figure 9:
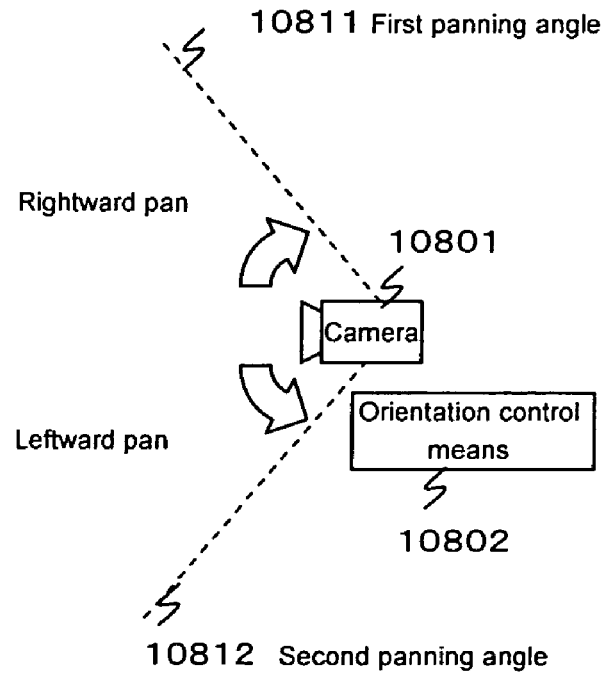
FIG. 9 is a drawing explaining the operation of the third conventional art.

101A-C camera terminal
102 operation terminal
103 network
201 camera
202 adjustor A
203 communications unit
204 cycle field angle adjustor A
205 cycle field angle adjustor B
206 adjustor B
207 cycle field angle adjustor C
208 adjustor C
211 lens
212 image pickup surface
213 image processor
214 orientation controller
215 cycle imaging controller
301 input
302 memory
2005 image merger
2006 display
2007 instruction

BEST MODE FOR CARRYING OUT THE INVENTION

Embodiments of the present invention are described in detail hereafter with reference to the drawings. Several terms and basic matters are explained before the embodiments are described.

(Camera Imaging Zone)

First, the imaging zone of a camera is described. A camera in this context is a camera to chronologically obtain continuous motion images, for example, 30 continuous images per second, and is not a camera to obtain a still image of a moment, such as a still photograph.

Figure 10:
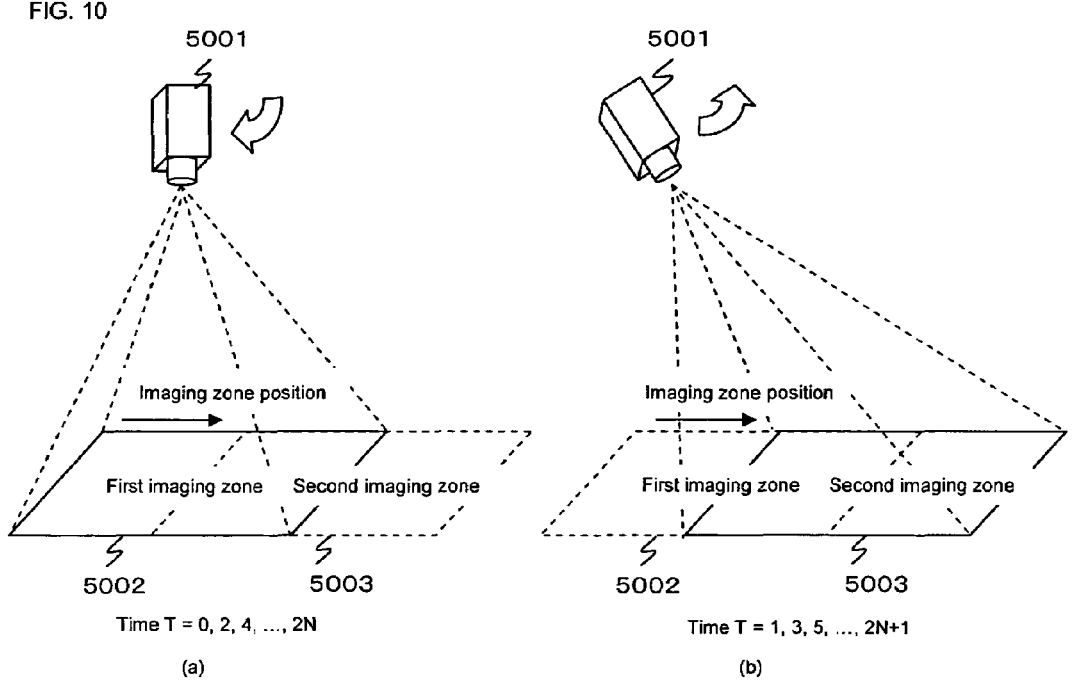
FIG. 10 is a drawing explaining the imaging zone of a camera.
Figure 10:
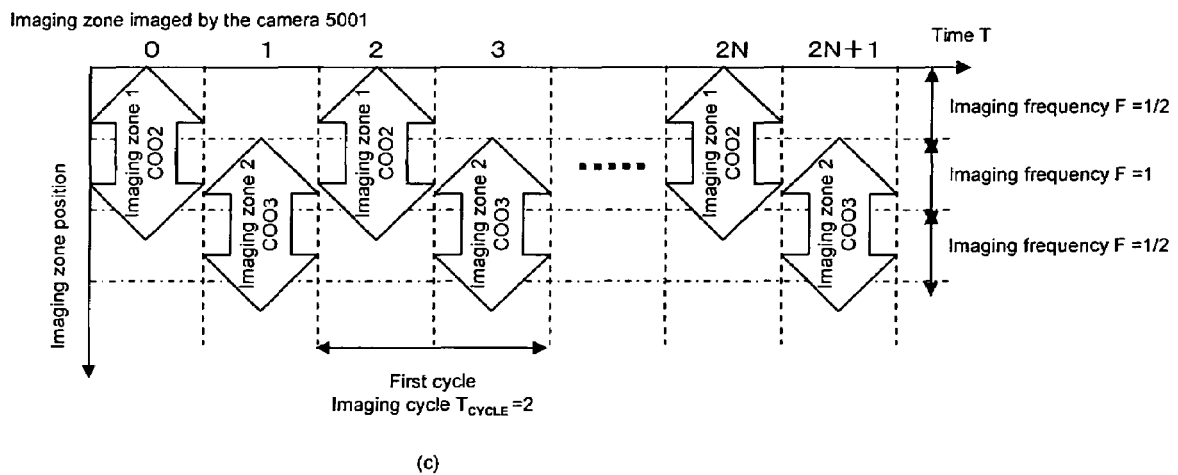

FIG. 10 is a drawing explaining the imaging zone of a camera.

In FIGS. 10(a) and (b), number 5001 is a camera, number 5002 is a first imaging zone, comprising the imaging zone imaged by the camera 5001 at a where time T=0, 2, 4, . . . , 2N, and the number 5003 is a second imaging zone, comprising the imaging zone imaged by the camera 5001 at a time T=1, 3, 5, . . . , 2N+1 (N is a natural number). FIG. 10(c) is a graphic representation showing the imaging zone positions of the camera 5001 at times T shown in FIGS. 10(a) and (b).

The term "camera imaging zone" is generally interpreted as a zone imaged by a camera at a moment of time. If the camera does not change its orientation at each moment, there is no problem with this interpretation. However, if the camera changes its orientation moment by moment, "the camera imaging zones" should be distinguished from each other as follows.

Time T Imaging Zone

This means a zone imaged by a camera at a moment of time T. In this specification, the imaging zone is termed a time T imaging zone. In FIGS. 10(a) and (b), the first imaging zone 5002 is a time 0 imaging zone and the second imaging zone 5003 is a time 1 imaging zone.

A time period $T_A$-$T_B$ imaging zone or a time period T imaging zone, and a cycle $T_{CYCLE}$ imaging zone These are examples of "hypothetical imaging zones" obtained by changing the position of an imaging zone within a specific zone in a specific period of time and a mean a zone imaged by a camera in a period of time from a time $T_A$ to a time $T_B$. In the specification, the zone is termed a time period $T_A$-$T_B$ imaging zone. Alternatively, a zone imaged by a camera in a period of time T from a time $T_A$ to a time $T_B$ is termed a time period T imaging zone. In particular, zones within an imaging zone are periodically imaged, in other words, a hypothetical imaging zone is repeatedly imaged by a camera in a specific cycle, this imaging zone is a zone imaged in a cycle TCYCLE and termed a cycle $T_{CYCLE}$ imaging zone. In FIGS. 10(a) and (b), the combined zone of the first imaging zone 5002 and second imaging zone 5003 is a time period 0-1 imaging zone or a time period 2 imaging zone. Further, as shown in FIG. 10(c), the first imaging zone 5002 and second imaging zone 5003 in the imaging zone are periodically imaged in 2 cycles. Therefore, the imaging zone is a 2 cycle imaging zone.

The following parameters can be defined for a cycle $T_{CYCLE}$ imaging zone in which zones are periodically imaged.

Imaging Frequency F

This means the imaging frequency per cycle of each zone within a cycle $T_{CYCLE}$ imaging zone. According to this definition, as shown in FIG. 10(c), the imaging zone where the first and second imaging zones overlap has an imaging frequency of 1 and the other imaging zones have an imaging frequency of ½. As shown in FIG. 10(c), the camera 5001 has different imaging frequencies F for different zones. The minimum imaging frequency F within the zone imaged by the camera 5001 is termed a minimum imaging frequency $F_{MIN}$ and the maximum imaging frequency F is termed a maximum imaging frequency $F_{MAX}$.

(Relationship Between a Detection Target and a cycle $T_{CYCLE}$ Imaging Zone)

Figure 11:
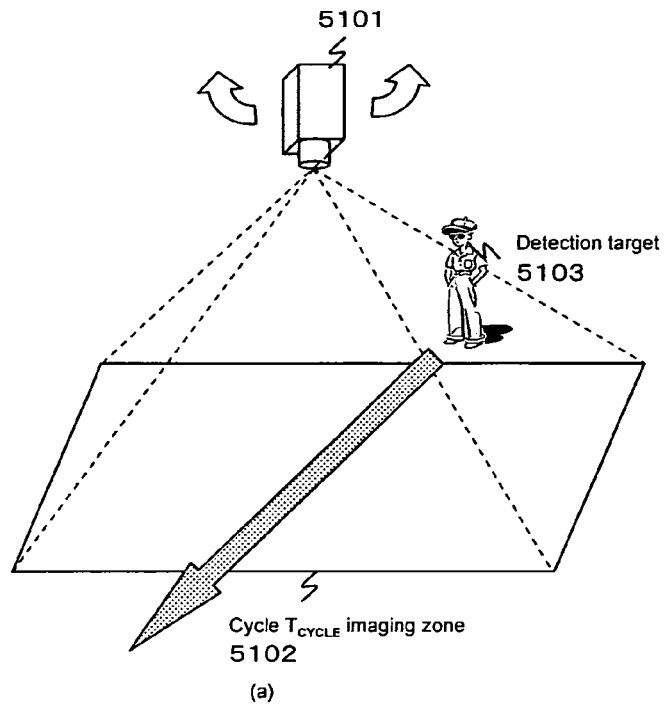
FIG. 11 is a drawing explaining the relationship between a detection target and a cycle $T_{CYCLE}$ imaging zone.
Figure 11:
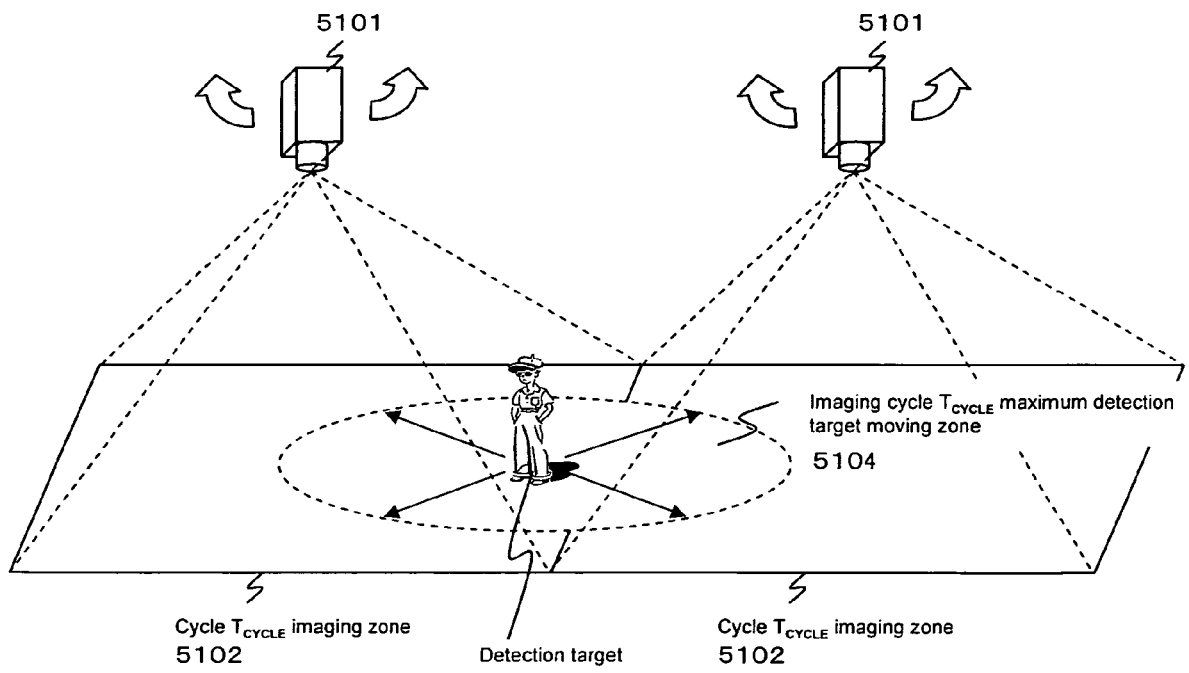

The relationship between a detection target detected through the imaging of a camera and a cycle $T_{CYCLE}$ imaging zone is described hereafter. FIGS. 11(a) and (b) are illustrations explaining the relationship between a detection target and a cycle $T_{CYCLE}$ imaging zone. In FIGS. 11(a) and (b), the number 5101 is a camera, the number 5102 is a cycle $T_{CYCLE}$ imaging zone of each camera 5101, the number 5103 is a detection target detected through the imaging of each camera 5101, the number 5104 is an imaging cycle $T_{CYCLE}$ maximum detection target moving zone comprising the maximum zone in which the detection target 5103 moves in an imaging cycle $T_{CYCLE}$.

As shown in FIG. 11(a), if the cycle $T_{CYCLE}$ imaging zone of the camera 5101 covers the imaging cycle $T_{CYCLE}$ maximum detection target moving zone, the imaging cycle $T_{CYCLE}$ maximum detection target moving zone is imaged in an imaging cycle $T_{CYCLE}$, in which case the camera 5101 can image and detect the detection target 5103 in the imaging cycle $T_{CYCLE}$.

Alternatively, if the imaging cycle $T_{CYCLE}$ maximum detection target moving zone is covered by the cycle $T_{CYCLE}$ imaging zones of multiple cameras 5101 in place of a single camera 5101, the imaging cycle $T_{CYCLE}$ maximum detection target moving zone is imaged in the imaging cycle $T_{CYCLE}$. Then, the cameras 5101 can image and detect the detection target 5103 in the imaging cycle $T_{CYCLE}$.

(Size of the Cycle $T_{CYCLE}$ Imaging Zone of a Camera)

Figure 12:
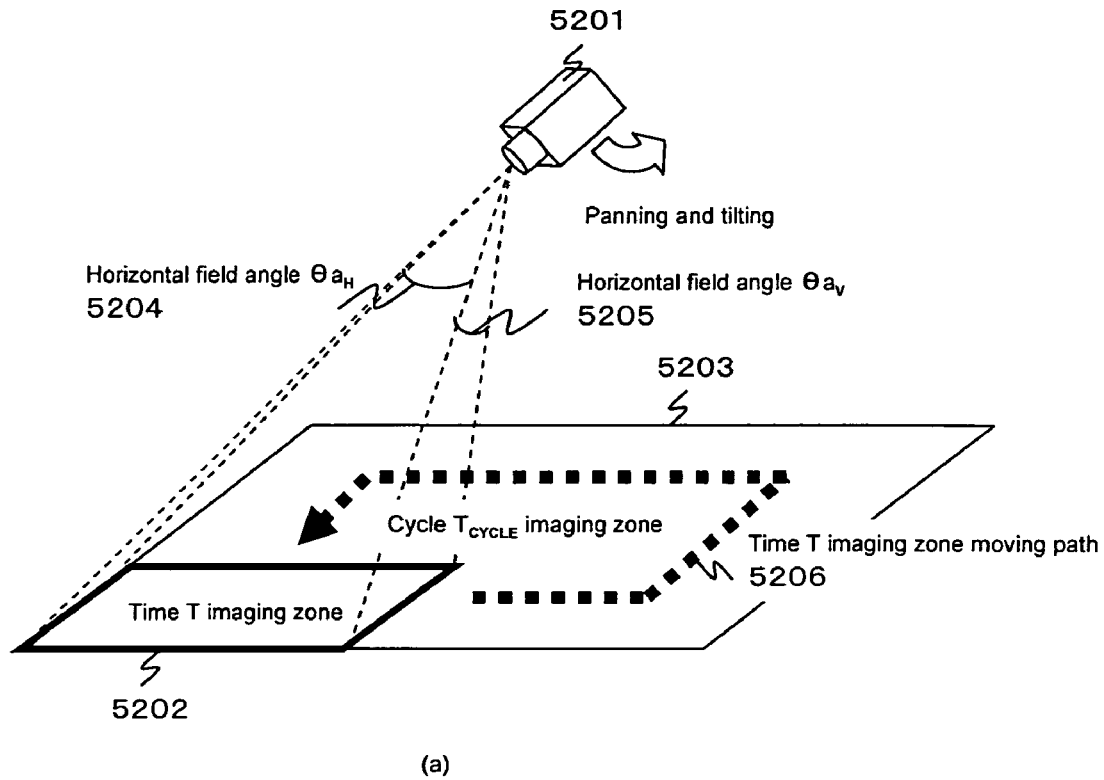
FIG. 12 is a drawing explaining the relationship between the size of a cycle $T_{CYCLE}$ imaging zone and various parameters of a camera.
Figure 12:
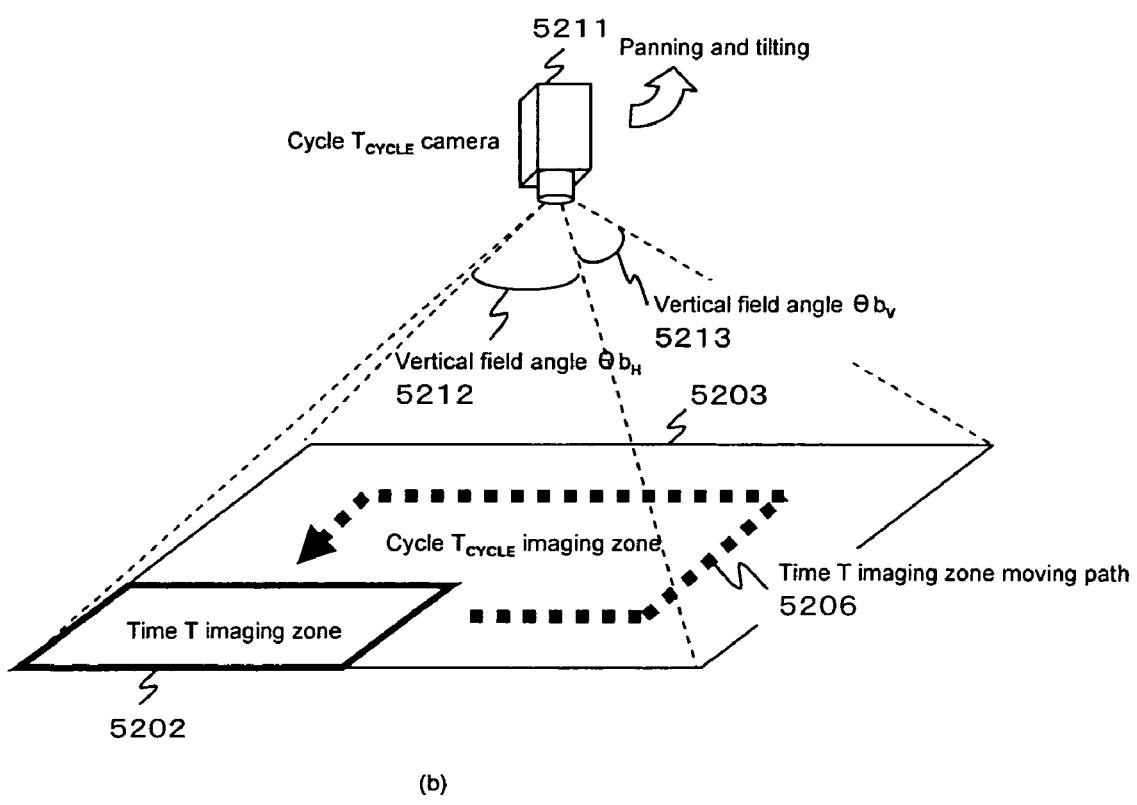

The size of the cycle $T_{CYCLE}$ imaging zone of a camera is described hereafter. FIGS. 12(a) and (b) are illustrations explaining the relationship between the size of the cycle $T_{CYCLE}$ imaging zone and various camera parameters. In FIG. 12(a), number 5201 is a camera. The orientation of the camera 5201 can be changed by panning and tilting operations and the field angles of the camera 5201 can also be changed. The number 5202 is a time T imaging zone comprising a zone imaged by the camera 5201 at a time T, the number 5203 is a cycle $T_{CYCLE}$ imaging zone comprising a zone imaged by the camera 5201 in a cycle $T_{CYCLE}$, the number 5204 is a horizontal field angle $\Theta a_H$ comprising a field angle of the camera 5201 in the horizontal direction, the number C205 is a vertical field angle $\Theta a_V$ comprising a field angle of the camera 5201 in the vertical direction, and the number 5206 is a moving path of the time T imaging zone 5202. The camera 5201 changes it's own orientation by panning and tilting operations over time. The position of the time T imaging zone 5202 is shifted along the path indicated by the time T imaging zone moving path 5206, whereby the cycle $T_{CYCLE}$ imaging zone 5203 is imaged. Therefore, the size of the cycle $T_{CYCLE}$ imaging zone 5203 obviously depends on the speed of panning and tilting operations by which the orientation of the camera 5201 is changed, the horizontal field angle $\Theta a_H$ 5204 and vertical field angle $\Theta a_V$ 5205 of the camera that determine the size of the time T imaging zone 5202, and the length of time of the cycle $T_{CYCLE}$. The cycle $T_{CYCLE}$ imaging zone 5203 is increased in size as the camera 5201 has higher panning and tilting speeds, greater field angles, and a greater cycle $T_{CYCLE}$.

(Field Angles and Panning and Tilting of a Camera Imaging a Cycle $T_{CYCLE}$ Imaging Zone)

The field angles and panning and tilting of a camera imaging a cycle $T_{CYCLE}$ imaging zone is described hereafter. FIG. 12(b) is a drawing showing a cycle $T_{CYCLE}$ camera 5211 equivalent in a cycle $T_{CYCLE}$ to the camera 5201 shown in FIG. 12(a). A time T imaging zone 5202, a cycle $T_{CYCLE}$ imaging zone 5203, and a time T imaging zone moving path 5205 in FIG. 12(b) are the same as those in FIG. 12(a). The number 5211 is a camera that images the cycle $T_{CYCLE}$ imaging zone 5203. The orientation of the camera 5211 can be changed by panning and tilting operations and the field angles of the camera 5211 can also be changed. Here, the cycle $T_{CYCLE}$ camera 5211 is present in the same spatial position as the camera 5201 although they are oriented differently. The number 5212 is a horizontal field angle $\Theta b_H$ comprising a field angle of the cycle $T_{CYCLE}$ camera 5211 in the horizontal direction, the number 5213 is a vertical field angle $\Theta b_V$ comprising a field angle of the cycle $T_{CYCLE}$ camera 5211 in the vertical direction. The camera 5201 in FIG. 12(a) images the cycle $T_{CYCLE}$ imaging zone 5203 in a cycle $T_{CYCLE}$. Therefore, the camera 5201 is considered to be the cycle $T_{CYCLE}$ camera 5211 in FIG. 12(b) that images the cycle $T_{CYCLE}$ imaging zone 5203 in a cycle $T_{CYCLE}$. Further in the cycle $T_{CYCLE}$ camera 5211, the horizontal field angle is considered to be the horizontal field angle $\Theta b_H$ 5212 and the vertical field angle is considered to be the vertical field angle $\Theta b_V$ 5212. In a general camera such as the camera 5201, the field angles depend on the aspect ratio of an image pickup surface of a CCD and the like. Therefore, the horizontal field angle $\Theta a_H$ 5204 and vertical field angle $\Theta a_V$ 5205 cannot be independently controlled. However, in the cycle $T_{CYCLE}$ camera 5211, the cycle $T_{CYCLE}$ imaging zone 5203 is determined by the panning and tilting operations of the camera 5201. Therefore, the horizontal field angle $\Theta b_H$ 5212 and vertical field angle Θb$_V$ 5212 can be independently controlled of the aspect ratio of the image pickup surface of a CCD and the like as in a general camera.

Figure 13:
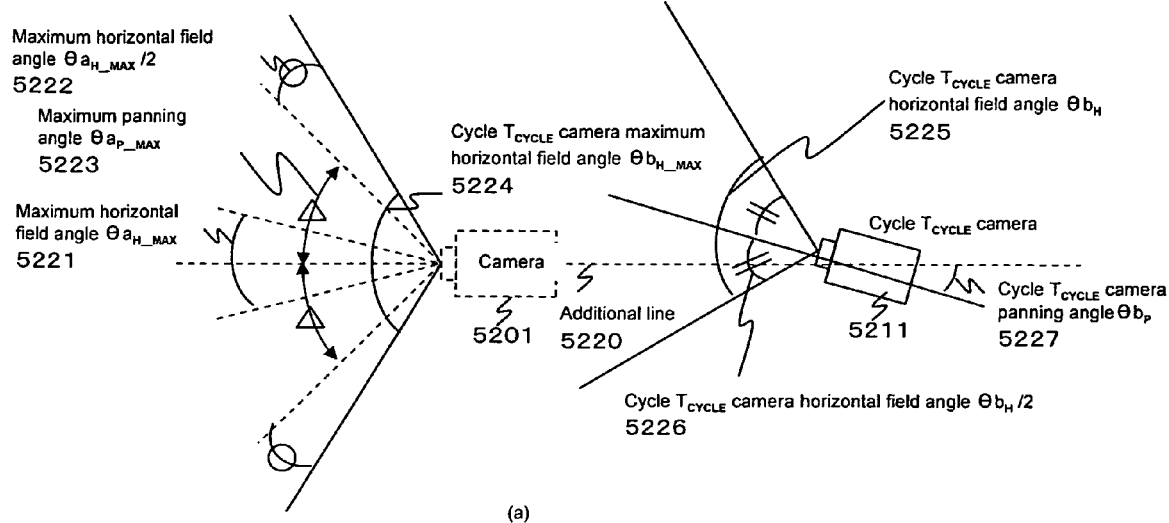
FIG. 13 is a drawing explaining the relationship between the size of a cycle $T_{CYCLE}$ imaging zone and various parameters of a camera.
Figure 13:
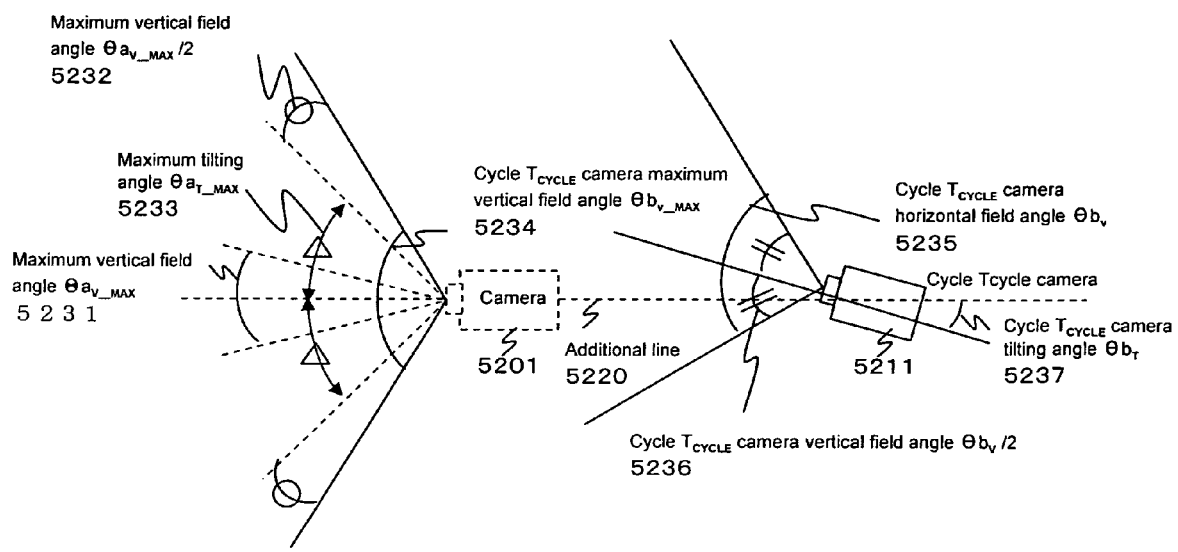

FIGS. 13(a) and (b) are illustrations showing the field angles and panning and tilting angles of the camera 5201 in FIG. 12(a) and the cycle T$_{CYCLE}$ camera 5211 in FIG. 12(b). A camera 5201 and a cycle T$_{CYCLE}$ camera 5211 in FIG. 13(a) comprise the same as the camera 5201 in FIG. 12(a) and the cycle T$_{CYCLE}$ camera 5211 in FIG. 12(b), respectively. Here, the camera 5201 and cycle T$_{CYCLE}$ camera 5211 are present in the same spatial position; however, these cameras are intentionally illustrated side by side in FIG. 13(a) for easier understanding. The number 5220 is an additional line, the number 5221 is the maximum horizontal field angle Θa$_{H\_MAX}$ comprising the maximum field angle of the camera 5201 in the horizontal direction, the number 5222 is the maximum field angle Θa$_{H\_MAX}$/2, and the number 5223 is the maximum panning angle Θa$_{P\_MAX}$ comprising the maximum displacement angle of the camera 5201 by panning. The camera 5201 can be panned to the maximum panning angle Θa$_{P\_MAX}$ 5223, respectively, about the additional line 5220. The number 5224 is the cycle T$_{CYCLE}$ camera maximum horizontal field angle Θb$_{H\_MAX}$ comprising the maximum field angle of the cycle T$_{CYCLE}$ camera 5211 in the horizontal direction, the number 5225 is the cycle T$_{CYCLE}$ camera horizontal field angle Θb$_H$ comprising the field angle of the cycle T$_{CYCLE}$ camera 5211 in the horizontal direction, the number 5226 is the cycle T$_{CYCLE}$ camera horizontal field angle Θb$_H$/2, and the number 5227 is the cycle T$_{CYCLE}$ camera panning angle Θb$_P$ comprising the panning angle of the cycle T$_{CYCLE}$ camera 5211.

A camera 5201 and a cycle T$_{CYCLE}$ camera 5211 in FIG. 13(b) comprise the same as the camera 5201 in FIG. 12(a) and the cycle T$_{CYCLE}$ camera 5211 in FIG. 12(b), respectively. Here, the camera 5201 and cycle T$_{CYCLE}$ camera 5211 are present in the same spatial position; however, these cameras are intentionally illustrated side by side in FIG. 13(a) for easier understanding. The number 5220 is an additional line, the number 5231 is the maximum vertical field angle Θa$_{V\_MAX}$ comprising the maximum field angle of the camera 5201 in the vertical direction, the number 5232 is the maximum field angle Θa$_{V\_MAX}$/2, and the number 5233 is the maximum tilting angle Θa$_{T\_MAX}$ comprising the maximum displacement angle of the camera 5201 by tilting. The camera 5201 can be tilted to the maximum tilting angle Θa$_{T\_MAX}$ 5223 upward and downward, respectively, about the additional line 5220. The number 5234 is the cycle T$_{CYCLE}$ camera maximum vertical field angle Θb$_{V\_MAX}$ comprising the maximum field angle of the cycle T$_{CYCLE}$ camera 5211 in the vertical direction, the number 5235 is the cycle T$_{CYCLE}$ camera vertical field angle Θb$_V$ comprising the field angle of the cycle T$_{CYCLE}$ camera 5211 in the vertical direction, the number 5236 is the cycle T$_{CYCLE}$ camera vertical field angle Θb$_V$/2, and the number 5237 is the cycle T$_{CYCLE}$ camera tilting angle Θb$_T$ comprising the tilting angle of the cycle T$_{CYCLE}$ camera 5211.

As shown in FIGS. 13(a) and (b), the maximum horizontal field angle Θb$_{H\_MAX}$ 5224 and maximum vertical field angle Θb$_{V\_MAX}$ 5234 of the cycle T$_{CYCLE}$ camera 5211 are presented by the expression 1. The minimum horizontal field angle Θb$_{H\_MIN}$ of the cycle T$_{CYCLE}$ camera 5211 in the horizontal direction is equal to the minimum horizontal field angle Θa$_{H\_MIN}$ of the camera 5201 in the horizontal direction and the minimum vertical field angle Θb$_{V\_MIN}$ of the cycle T$_{CYCLE}$ camera 5211 in the vertical direction is equal to the minimum vertical field angle Θa$_{V\_MIN}$ of the camera 5201 in the vertical direction. However, when the cycle T$_{CYCLE}$ camera 5211 is panned or tilted by the panning angle Θb$_P$ 5227 or by the tilting angle Θb$_T$ 5237, the maximum vertical field angle Θb$_{H\_MAX}$ 5224 and maximum vertical field angle Θb$_{V\_MAX}$ 5234 of the cycle T$_{CYCLE}$ camera 5221 are restricted by the expression 2. Therefore, the horizontal field angle Θb$_H$ 5225 and horizontal field angle Θb$_V$ 5235 of the cycle T$_{CYCLE}$ camera 5211 are variable within the range presented by the expression 3. Further, as shown in FIGS. 13(a) and (b), the maximum panning angle Θa$_{P\_MAX}$ and maximum panning angle Θb$_{T\_MAX}$ of the cycle T$_{CYCLE}$ camera 5211 are equal to the maximum panning angle Θa$_{P\_MAX}$ 5223 and maximum panning angle Θa$_{T\_MAX}$ 5233 of the camera 5201. Then, the panning angle Θb$_P$ 5227 and tilting angle Θb$_T$ 5237 of the cycle T$_{CYCLE}$ camera 5211 are variable within the range presented by the expression 4.

[Math 1]

$$\left.\begin{array}{r}\theta b_{H\_MAX}(0) = \theta a_{P\_MAX} + \dfrac{\theta a_{H\_MAX}}{2} \\ \theta b_{V\_MAX}(0) = \theta a_{T\_MAX} + \dfrac{\theta a_{V\_MAX}}{2} \\ \theta b_{H\_MIN} = \theta a_{H\_MIN} \\ \theta b_{V\_MIN} = \theta a_{V\_MIN}\end{array}\right\} \quad \text{(Formula 1)}$$

[Math 2]

$$\left.\begin{array}{r}\theta b_{H\_MAX}(\theta b_P) \le \theta b_{H\_MAX}(0) - 2 \times |\theta b_P| \\ \theta b_{V\_MAX}(\theta b_T) \le \theta b_{V\_MAX}(0) - 2 \times |\theta b_T|\end{array}\right\} \quad \text{(Formula 2)}$$

[Math 3]

$$\left.\begin{array}{r}\theta a_{H\_MIN} \le \theta b_H(\theta b_P) \le \theta b_{H\_MAX}(\theta b_P) \\ \theta a_{V\_MIN} \le \theta b_V(\theta b_T) \le \theta b_{V\_MAX}(\theta b_T)\end{array}\right\} \quad \text{(Formula 3)}$$

[Math 4]

$$\left.\begin{array}{r}0 \le \theta b_P \le \theta a_{P\_MAX} \\ 0 \le \theta b_T \le \theta a_{T\_MAX}\end{array}\right\} \quad \text{(Formula 4)}$$

(Imaging Zone Position and View Point of a Camera)

Figure 14:
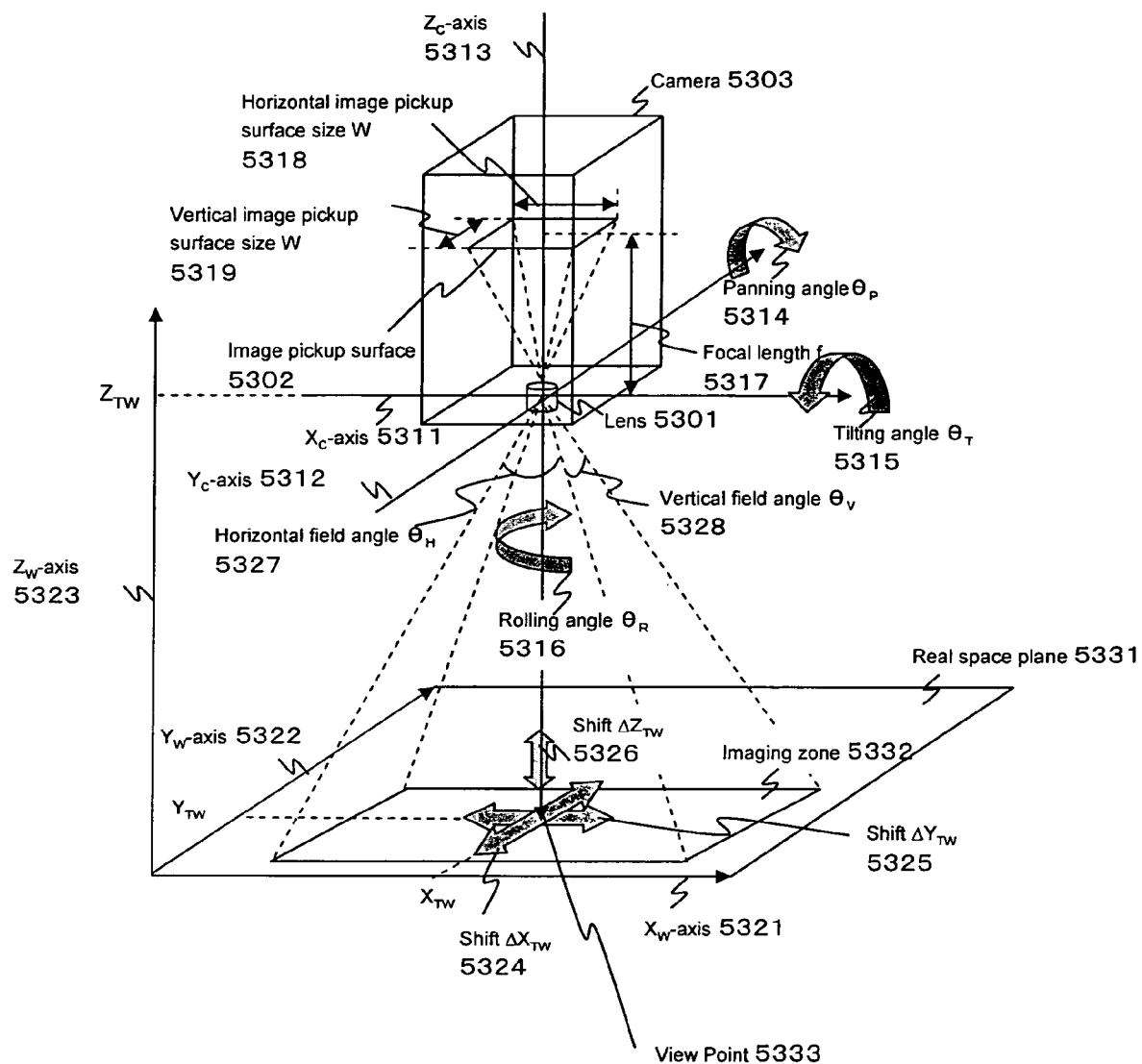
FIG. 14 is a drawing explaining the imaging zone position of a camera.

How the imaging zone position and view point of a camera is calculated is described hereafter. FIG. 14 is a drawing explaining the imaging zone position of a camera. In FIG. 14, the number 5301 is a lens for forming an image, the number 5302 is an image pickup surface of a CCD and the like for capturing the image formed by the lens 5301, and the number 5303 is a camera composed of the lens 5301 and image pickup surface 5302. The number 5311 is an X$_C$-axis, the number 5312 is a Y$_C$-axis, and the number 5313 is a Z$_C$-axis; these axes are orthogonal to one another and constitute a camera coordinates system having the origin at the lens 5301. Particularly, the Z$_C$-axis 5313 coincides with the sight line (imaging direction) of the camera 5303. The number 5314 is the panning angle Θ$_P$ comprising a rotation angle of the camera 5303 about the Y$_C$-axis 5312, the number 5315 is the tilting angle Θ$_T$ comprising a rotation angle of the camera 5303 about the X$_C$-axis 5311, and the number 5316 is the rolling angle Θ$_R$ comprising a rotation angle of the camera 5303 about the $Z_C$-axis 5313. The camera 5303 rotates by these rotation angles for orientation. The number 5317 is the focal length f comprising the distance from the lens 5301 to the image pickup surface 5302, the number 5318 is a horizontal image pickup surface size W comprising the size of the image pickup surface 5302 in the horizontal direction, and the number 5319 is a vertical image pickup surface size W comprising the size of the image pickup surface 5302 in the vertical direction. The number 5321 is an $X_W$-axis, the number 5322 is a $Y_W$-axis, and the number 5323 is a $Z_W$-axis; these axes are orthogonal to one another and constitute a world coordinates system. The number 5324 is a shift $\Delta X_{TW}$ comprising a shift of the camera 5303 in the $X_W$-axis 5321 direction, the number 5325 is a shift $\Delta Y_{TW}$ comprising a shift of the camera 5303 in the $Y_W$-axis 5322 direction, and the number 5326 is a shift $Z_{TW}$ comprising a shift of the camera 5303 in the $Z_W$-axis 5323 direction. The camera 5303 is present at a position $(X_{TW}, Y_{TW}, Z_{TW})$ on the world coordinates system and moves from this position as the reference by $(\Delta X_{TW}, \Delta Y_{TW}, \Delta Z_{TW})$. The number 5327 is a horizontal field angle $\Theta_H$ comprising a field angle of the camera 5303 in the horizontal direction and the number 5328 is a vertical field angle $\Theta_V$ comprising a field angle of the camera 5303 in the vertical direction. The number 5331 is a real space plane where $Z_W = Z_{CONST}$, the number 5332 is an imaging zone on the real space plane 5331 comprising imaged by the camera 5303, the number 5333 is a view point where the $Z_C$-axis 5313 intersects with the real space plane 5331 on which the imaging zone 5332 is present and also the position of the sight line of the camera 5303 comprising presented by the $Z_C$-axis 5313 on the real space plane.

A point $(X_{PC}, Y_{PC}, X_{PC})$ on the camera coordinates system consisting of the $X_C$-axis 5321, $Y_C$-axis 5322, and $Z_C$-axis 5323 can be converted to a point $(X_{PC}, Y_{PC}, X_{PW})$ on the world coordinates system consisting of the $X_W$-axis 5321, $Y_C$-axis 5322, and $Z_W$-axis 5323 using the expression 5. In this expression, a 3×3 matrix value having elements $M_{00}$ to $M_{22}$ is a matrix value for the orientation reference of the camera 5303 (the orientation of the camera 5303 when the rotation angles $(\Theta_P, \Theta_T, \Theta_R) = (0, 0, 0)$), a 3×3 matrix value having elements $R_{00}$ to $R_{22}$ is a matrix value for the orientation shift of the camera 5303 from the orientation reference, $(X_{TW}, Y_{TW}, X_{TW})$ is the positional reference of the camera 5303 (the position of the camera 5303 when the positional shift $(\Delta X_{TW}, \Delta Y_{TW}, \Delta X_{TW}) = (0, 0, 0)$), and $(\Delta X_{TW}, \Delta Y_{TW}, \Delta X_{TW})$ is a positional shift of the camera 5303 from the positional reference.

[Math 5]

$$\begin{pmatrix} X_{PW} \\ Y_{PW} \\ Z_{PW} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} X_{PC} \\ Y_{PC} \\ Z_{PC} \end{pmatrix} + \begin{pmatrix} X_{TW} \\ Y_{TW} \\ Z_{TW} \end{pmatrix} + \begin{pmatrix} \Delta X_{TW} \\ \Delta Y_{TW} \\ \Delta Z_{TW} \end{pmatrix}$$ (Formula 5)

The 3×3 matrix value having elements $M_{00}$ to $M_{22}$ and $(X_{TW}, Y_{TW}, X_{TW})$ can be calculated by placing the camera 5303 at the orientation reference and at the positional reference or by conducting the calibration referred to in Non-Patent Reference 1 below using the current orientation and position of the camera 5303 as the orientation reference and the positional reference, respectively. These values are calculated before the imaging zone adjusting apparatus of the present invention starts operating. Non-Patent Reference 1: A Versatile Camera Calibration Technique for High-Accuracy 3D Machine Vision Metrology Using Off-the-Shelf TV Cameras and Lenses. IEEE journal of Robotics and Automation, Vol. RA-3, No. 4, pp. 323-344, 1987. The 3×3 matrix value having elements $R_{00}$ to $R_{22}$ presenting the orientation shift of the camera 5303 from the orientation reference can be calculated as presented by the expression 6 using rotation angles $(\Theta_P, \Theta_T, \Theta_R)$ that reflect the orientation of the camera 5303. The rotation angles $(\Theta_P, \Theta_T, \Theta_R)$ or the orientation of the camera 5303 and the positional shift $(\Delta X_{TW}, \Delta Y_{TW}, \Delta X_{TW})$ of the camera 5303 from the positional reference can be obtained by reading the shift in the stepping motor where the position of the camera 5303 is changed by a stepping motor.

[Math 6]

$$\begin{pmatrix} R_{00} & R_{01} & R_{02} \\ R_{10} & R_{11} & R_{12} \\ R_{20} & R_{21} & R_{22} \end{pmatrix} = \begin{pmatrix} \cos\Theta_R & \sin\Theta_R & 0 \\ -\sin\Theta_R & \cos\Theta_R & 0 \\ 0 & 0 & 1 \end{pmatrix}$$ (Formula 6)

$$\begin{pmatrix} 1 & 0 & 0 \\ 0 & \cos\Theta_T & \sin\Theta_{TC} \\ 0 & -\sin\Theta_T & \cos\Theta_{TC} \end{pmatrix} \begin{pmatrix} \cos\Theta_P & 0 & -\sin\Theta_P \\ 0 & 1 & 0 \\ \sin\Theta_P & 0 & \cos\Theta_P \end{pmatrix}$$

Points $(X_{PC}, Y_{PC}, f)$ on the image pickup surface 5302 can be projected on the real space plane 5331 where $Z_W = Z_{CONST}$ by the expression 7. Points in the four corners of the image pickup surface, $(-W/2, -H/2, f)$, $(W/2, -H/2, f)$, $(-W/2, H/2, f)$, and $(W/2, H/2, f)$, are projected on the real space plane 5331 in the four corners of the imaging zone 5332 of the camera 5303. The $Z_C$-axis 5313 passes through a point $(0, 0, f)$ on the image pickup surface 5302. A projected point of the point $(0, 0, f)$ on the real space plane 5331 where $Z_W = Z_{CONST}$ is the view point 5333 of the camera 5303. Therefore, the position (points $(X_{PW0}, Y_{PW0}, Z_{PW0})$ to $(X_{PW3}, Y_{PW3}, Z_{PW3})$) and view point 5333 (a point $(X_{PW4}, Y_{PW4}, Z_{PW4})$) of the imaging zone 5332 of the camera 5303 on the real space plane 5331 where $Z_W = Z_{CONST}$ can be calculated by the expressions 8 to 12.

[Math 7]

$$\begin{pmatrix} X_{PW} \\ Y_{PW} \\ Z_{PW} \end{pmatrix} = \begin{pmatrix} X_O + \dfrac{(Z_O - Z_{CONST})X_D}{Z_D} \\ Y_O + \dfrac{(Z_O - Z_{CONST})Y_D}{Z_D} \\ Z_{CONST} \end{pmatrix}$$ (Formula 7)

$$\begin{pmatrix} X_O \\ Y_O \\ Z_O \end{pmatrix} = \begin{pmatrix} X_{TW} \\ Y_{TW} \\ Z_{TW} \end{pmatrix} + \begin{pmatrix} \Delta X_{TW} \\ \Delta Y_{TW} \\ \Delta Z_{TW} \end{pmatrix}$$

$$\begin{pmatrix} X_D \\ Y_D \\ Z_D \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} X_{PC} \\ Y_{PC} \\ f \end{pmatrix}$$

[Math 8]

$$\begin{pmatrix} X_{PW0} \\ Y_{PW0} \\ Z_{PW0} \end{pmatrix} = \begin{pmatrix} X_O + \dfrac{(Z_O - Z_{CONST})X_{D0}}{Z_{D0}} \\ Y_O + \dfrac{(Z_O - Z_{CONST})Y_{D0}}{Z_{D0}} \\ Z_{CONST} \end{pmatrix}$$ (Formula 8)

$$\begin{pmatrix} X_{D0} \\ Y_{D0} \\ Z_{D0} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -\dfrac{W}{2} \\ -\dfrac{H}{2} \\ f \end{pmatrix}$$

[Math 9]

$$\begin{pmatrix} X_{PW1} \\ Y_{PW1} \\ Z_{PW1} \end{pmatrix} = \begin{pmatrix} X_O + \dfrac{(Z_O - Z_{CONST})X_{D1}}{Z_{D1}} \\ Y_O + \dfrac{(Z_O - Z_{CONST})Y_{D1}}{Z_{D1}} \\ Z_{CONST} \end{pmatrix}$$

$$\begin{pmatrix} X_{D1} \\ Y_{D1} \\ Z_{D1} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} \dfrac{W}{2} \\ \dfrac{H}{2} \\ f \end{pmatrix}$$

(Formula 9)

[Math 10]

$$\begin{pmatrix} X_{PW2} \\ Y_{PW2} \\ Z_{PW2} \end{pmatrix} = \begin{pmatrix} X_O + \dfrac{(Z_O - Z_{CONST})X_{D2}}{Z_{D2}} \\ Y_O + \dfrac{(Z_O - Z_{CONST})Y_{D2}}{Z_{D2}} \\ Z_{CONST} \end{pmatrix}$$

$$\begin{pmatrix} X_{D2} \\ Y_{D2} \\ Z_{D2} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -\dfrac{W}{2} \\ \dfrac{h}{2} \\ f \end{pmatrix}$$

(Formula 10)

[Math 11]

$$\begin{pmatrix} X_{PW3} \\ Y_{PW3} \\ Z_{PW3} \end{pmatrix} = \begin{pmatrix} X_O + \dfrac{(Z_O - Z_{CONST})X_{D3}}{Z_{D3}} \\ Y_O + \dfrac{(Z_O - Z_{CONST})Y_{D3}}{Z_{D3}} \\ Z_{CONST} \end{pmatrix}$$

$$\begin{pmatrix} X_{D3} \\ Y_{D3} \\ Z_{D3} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} \dfrac{W}{2} \\ \dfrac{H}{2} \\ f \end{pmatrix}$$

(Formula 11)

[Math 12]

$$\begin{pmatrix} X_{PW4} \\ Y_{PW4} \\ Z_{PW4} \end{pmatrix} = \begin{pmatrix} X_O + \dfrac{(Z_O - Z_{CONST})X_{D4}}{Z_{D4}} \\ Y_O + \dfrac{(Z_O - Z_{CONST})Y_{D4}}{Z_{D4}} \\ Z_{CONST} \end{pmatrix}$$

$$\begin{pmatrix} X_{D4} \\ Y_{D4} \\ Z_{D4} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} 0 \\ 0 \\ f \end{pmatrix}$$

(Formula 12)

The horizontal field angle $\Theta_H$ 5327 and vertical field angle $\Theta_V$ 5328 have the relationship presented by expression 13 with the focal length f 5317, horizontal image pickup surface size W 5318, and vertical image pickup surface size W 5319. Therefore, the position and view point 5333 of the imaging zone 5232 of the camera 5303 on the real space plane 5331 where $Z_W = Z_{CONST}$ can also be calculated by the expressions 14 to 17.

[Math 13]

$$\begin{aligned} \dfrac{W}{2f} &= \tan\left(\dfrac{\theta_H}{2}\right) \\ \dfrac{H}{2f} &= \tan\left(\dfrac{\theta_V}{2}\right) \end{aligned}$$

(Formula 13)

[Math 14]

$$\begin{pmatrix} X_{PW0} \\ Y_{PW0} \\ Z_{PW0} \end{pmatrix} = \begin{pmatrix} X_O + \dfrac{(Z_O - Z_{CONST})X_{D0}}{Z_{D0}} \\ Y_O + \dfrac{(Z_O - Z_{CONST})Y_{D0}}{Z_{D0}} \\ Z_{CONST} \end{pmatrix}$$

$$\begin{pmatrix} X_{D0} \\ Y_{D0} \\ Z_{D0} \end{pmatrix} =$$

$$\begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -\tan\left(\dfrac{\theta_H}{2}\right) \\ -\tan\left(\dfrac{\theta_V}{2}\right) \\ 1 \end{pmatrix}$$

(Formula 14)

[Math 15]

$$\begin{pmatrix} X_{PW1} \\ Y_{PW1} \\ Z_{PW1} \end{pmatrix} = \begin{pmatrix} X_O + \dfrac{(Z_O - Z_{CONST})X_{D1}}{Z_{D1}} \\ Y_O + \dfrac{(Z_O - Z_{CONST})Y_{D1}}{Z_{D1}} \\ Z_{CONST} \end{pmatrix}$$

$$\begin{pmatrix} X_{D1} \\ Y_{D1} \\ Z_{D1} \end{pmatrix} =$$

$$\begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} \tan\left(\dfrac{\theta_H}{2}\right) \\ -\tan\left(\dfrac{\theta_V}{2}\right) \\ 1 \end{pmatrix}$$

(Formula 15)

[Math 16]

$$\begin{pmatrix} X_{PW2} \\ Y_{PW2} \\ Z_{PW2} \end{pmatrix} = \begin{pmatrix} X_O + \dfrac{(Z_O - Z_{CONST})X_{D2}}{Z_{D2}} \\ Y_O + \dfrac{(Z_O - Z_{CONST})Y_{D2}}{Z_{D2}} \\ Z_{CONST} \end{pmatrix}$$

$$\begin{pmatrix} X_{D2} \\ Y_{D2} \\ Z_{D2} \end{pmatrix} =$$

$$\begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -\tan\left(\dfrac{\theta_H}{2}\right) \\ \tan\left(\dfrac{\theta_V}{2}\right) \\ 1 \end{pmatrix}$$

(Formula 16)

[Math 17]

$$\begin{pmatrix} X_{PW3} \\ Y_{PW3} \\ Z_{PW3} \end{pmatrix} = \begin{pmatrix} X_O + \frac{(Z_O - Z_{CONST})X_{D3}}{Z_{D3}} \\ Y_O + \frac{(Z_O - Z_{CONST})Y_{D3}}{Z_{D3}} \\ Z_{CONST} \end{pmatrix}$$

$$\begin{pmatrix} X_{D3} \\ Y_{D3} \\ Z_{D3} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} \tan\left(\frac{\theta_H}{2}\right) \\ \tan\left(\frac{\theta_V}{2}\right) \\ 1 \end{pmatrix}$$

(Formula 17)

The above calculation process of the position of the imaging zone of a camera can be applied not only to the position and view point of a time T imaging zone but also to the position and view point of a cycle $T_{CYCLE}$ imaging zone. For calculating the position and view point of a cycle $T_{CYCLE}$ imaging zone, the panning angle $\Theta_P$ 5314, tilting angle $\Theta_T$ 5315, rolling angle $\Theta_R$ 5316, horizontal field angle $\Theta_H$ 5327, and vertical field angle $\Theta_V$ 5328 of the expression 13 are replaced by the panning angle $\Theta b_P$ 5227, tilting angle $\Theta b_T$ 5228, rolling angle $\Theta b_R$, horizontal field angle $\Theta b_H$ 5225, and vertical field angle $\Theta b_V$ 5335 shown in FIGS. 13(a) and (b), respectively (the rolling angle $\Theta b_R$ is not shown in FIGS. 13(a) and (b); however, it is equal to the rolling angle $\Theta a_R$ of the camera 5201). The 3×3 matrix value having elements $M_{00}$ to $M_{22}$ comprising the matrix value of the orientation reference of the camera 5303, the positional reference ($X_{TW}$, $Y_{TW}$, $Z_{TW}$) of the camera 5303, and the positional shift ($\Delta X_{TW}$, $\Delta Y_{TW}$, $\Delta Z_{TW}$) of the camera 5303 from the positional reference are obtained by using those of the camera imaging the time T imaging zone because the position and orientation reference of the cycle $T_{CYCLE}$ camera imaging the cycle $T_{CYCLE}$ imaging zone are the same as those of the camera imaging the time T imaging zone.

(Imaging Process of a Cycle $T_{CYCLE}$ Imaging Zone)

Figure 15:
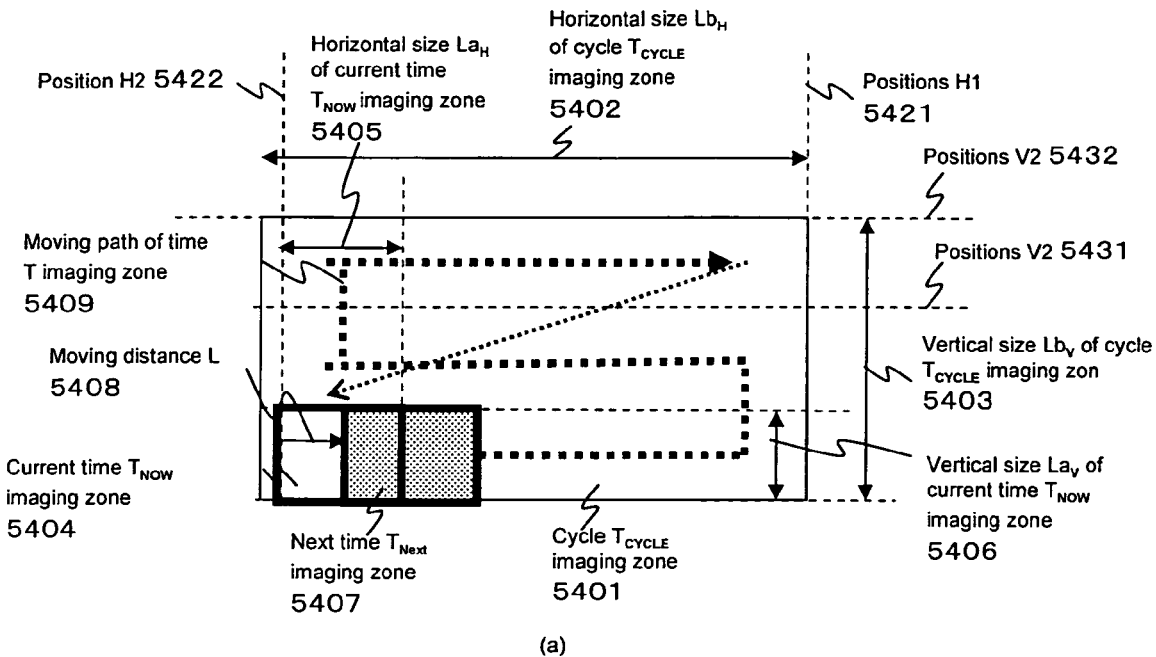
FIG. 15 is a drawing explaining the imaging process of a cycle $T_{CYCLE}$ imaging zone.
Figure 15:
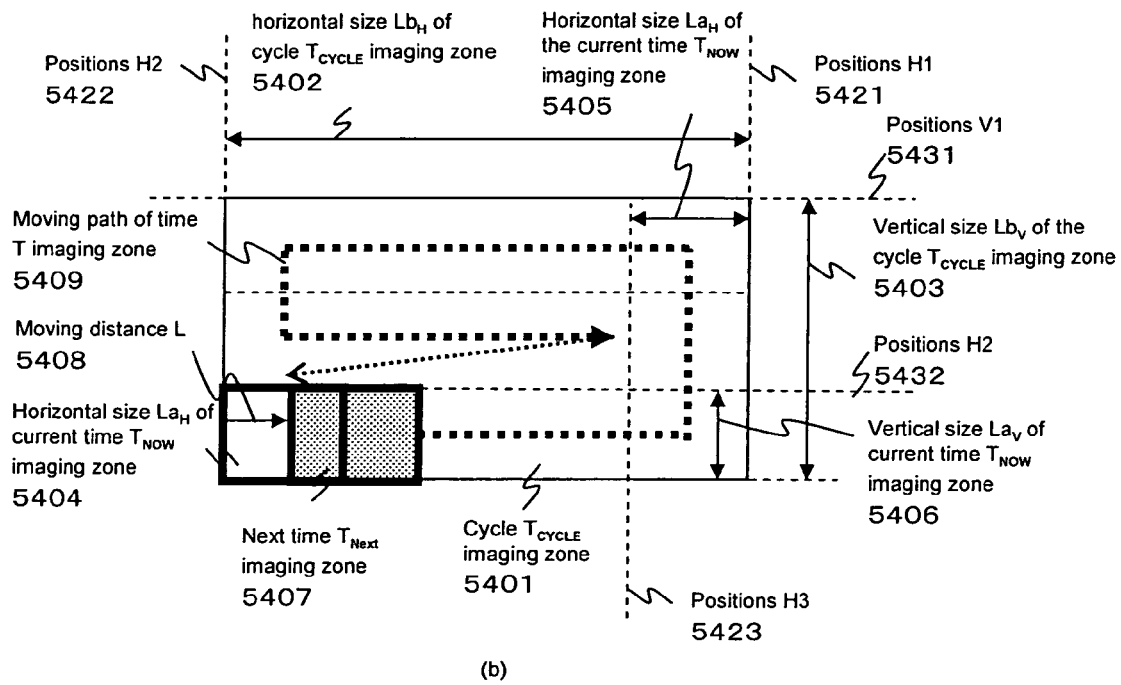
Figure 16:
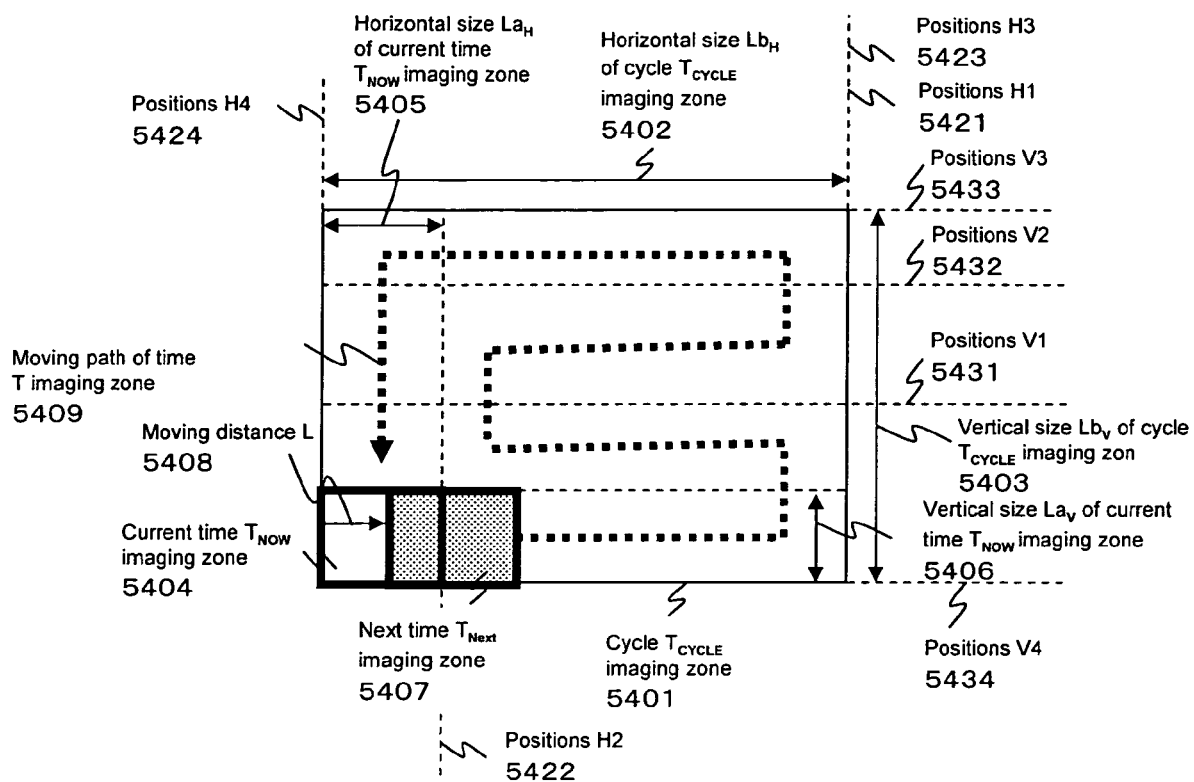
FIG. 16 is a drawing explaining the imaging process of a cycle $T_{CYCLE}$ imaging zone.

The imaging process of a cycle $T_{CYCLE}$ imaging zone is described hereafter. FIGS. 15 and 16 are illustrations explaining the imaging process of a cycle $T_{CYCLE}$ imaging zone. In FIGS. 15(a) and (b) and 16, the number 5401 is a cycle $T_{CYCLE}$ imaging zone, the number 5402 is the horizontal size $Lb_H$ of the cycle $T_{CYCLE}$ imaging zone 5401, the number 5403 is the vertical size $Lb_V$ of the cycle $T_{CYCLE}$ imaging zone 5401, the number 5404 is a current time $T_{NOW}$ imaging zone comprising an imaging zone at a current time $T_{NOW}$, the number 5405 is the horizontal size $La_H$ of the current time $T_{NOW}$ imaging zone 5404, the number 5406 is the vertical size $La_V$ of the current time $T_{NOW}$ imaging zone 5404, the number 5407 is a current time $T_{NEXT}$ imaging zone comprising an imaging zone at a next time $T_{NEXT}$ to the current time $T_{NOW}$, the number 5408 is the moving distance L from the current time $T_{NOW}$ imaging zone 5404 to the next time $T_{NEXT}$ imaging zone 5407, the number 5409 is the moving path of the time T imaging zone, the numbers 5421 to 5423 are horizontal positions H1 to H3, respectively, and the numbers 5431 to 5434 are vertical positions V1 to V4, respectively.

Figure 17:
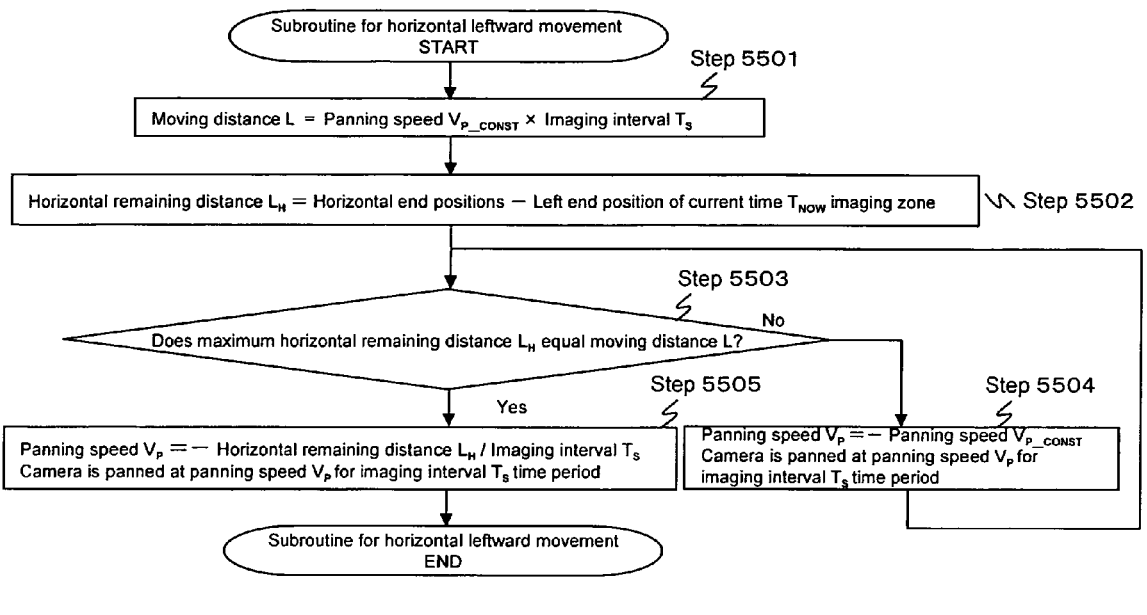
FIG. 17 is a flowchart showing the procedure of the imaging process of a cycle $T_{CYCLE}$ imaging zone.
Figure 17:
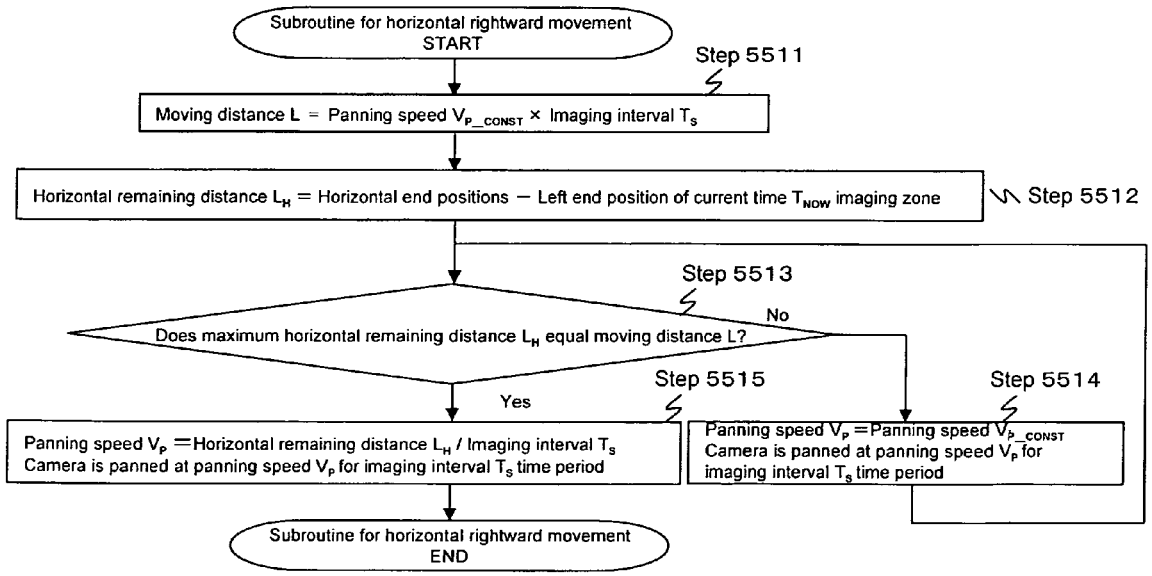
Figure 18:
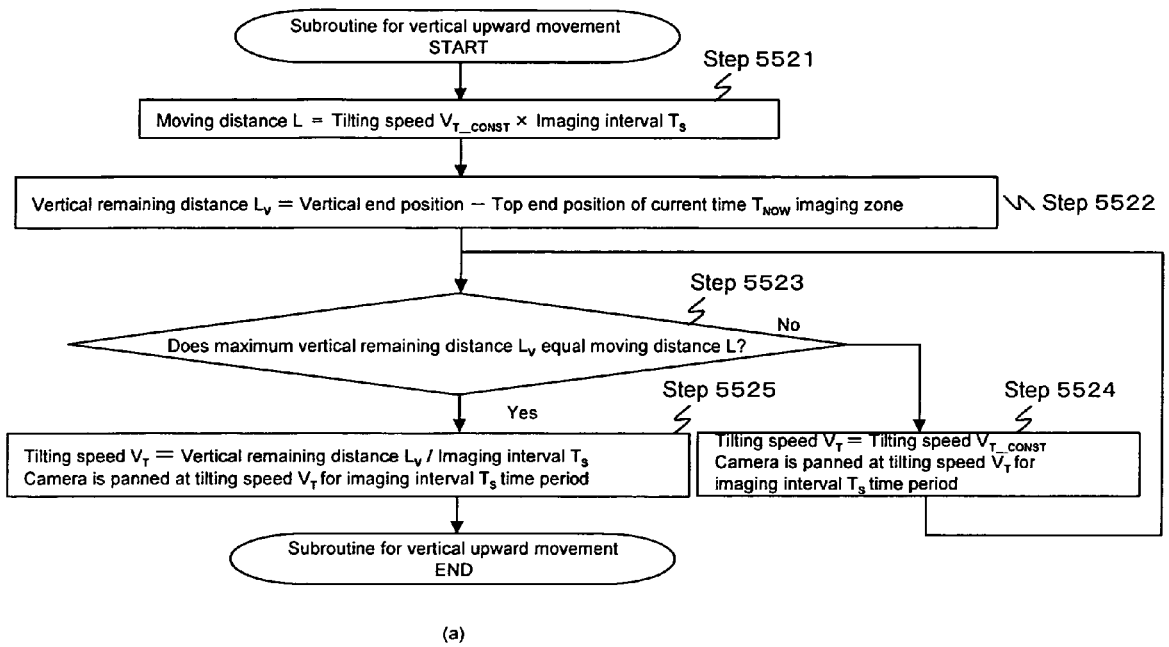
FIG. 18 is a flowchart showing the procedure of the imaging process of a cycle $T_{CYCLE}$ imaging zone.
Figure 18:
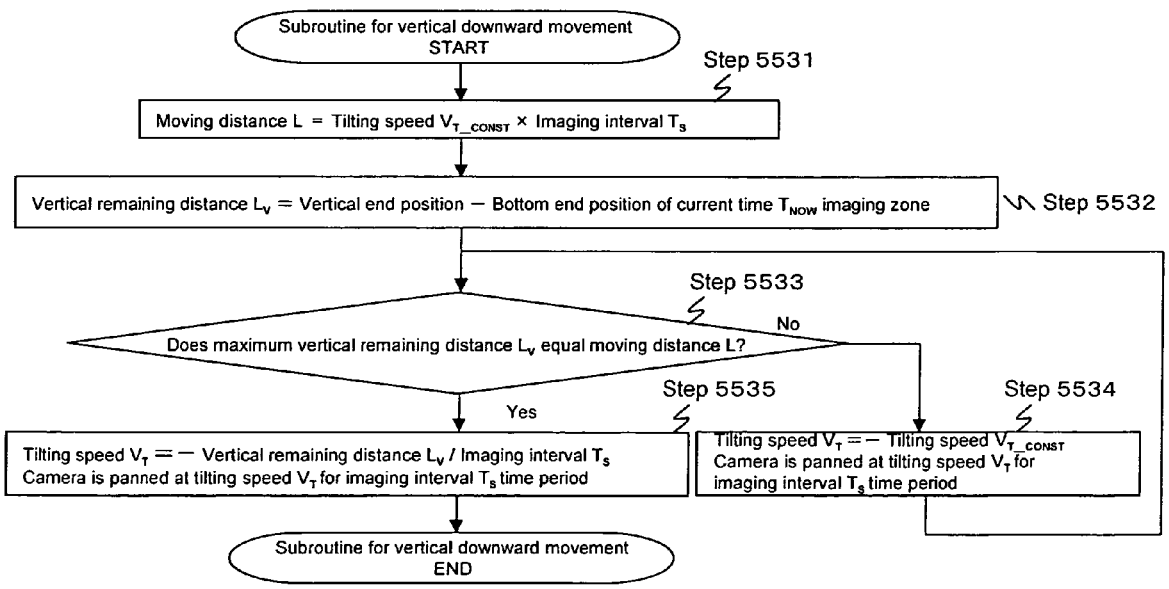
Figure 19:
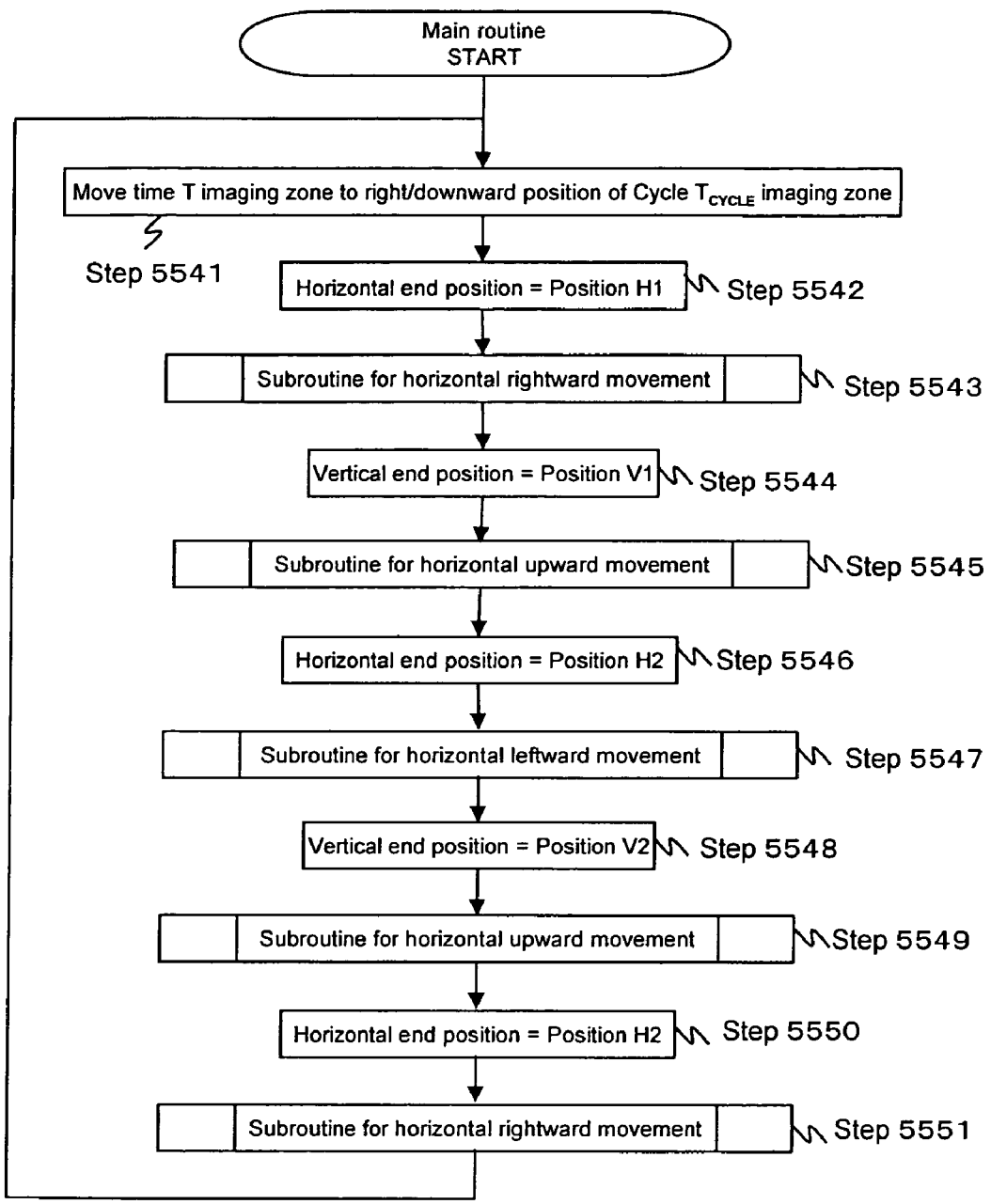
FIG. 19 is a flowchart showing the procedure of the imaging process of a cycle $T_{CYCLE}$ imaging zone.

FIGS. 17, 18, and 19 are flowcharts showing the procedures of the imaging process of a cycle $T_{CYCLE}$ imaging zone. The flowcharts shown in FIGS. 17(a), (b) and 18(a), (b) are for subroutines to move the time T imaging zone horizontally and vertically to the horizontal and vertical end positions. First, the subroutine for leftward movement shown in FIG. 17(a) is described. The subroutine starts with calculating a moving distance L 5408 in FIGS. 15 and 16 in Step 5501. The moving distance L 5408 is calculated by the expression 18. In this expression, $V_{P\_CONST}$ is a predetermined panning speed and $T_S$ is a predetermined camera imaging interval. Then, in Step 5502, a horizontal remaining distance $L_H$ comprising the distance between the left end position of the current time $T_{NOW}$ imaging zone 5404 and the horizontal end position is calculated. Subsequently, in Step 5503, a determination is made as to whether the horizontal remaining distance $L_H$ calculated in Step 5502 equal to or less than the moving distance L 5408 calculated in Step 5501. When the horizontal remaining distance $L_H$ is greater than the moving distance L 5408, the panning speed $V_P$ is set for the value presented by the expression 19 and the camera is panned to the left at the panning speed $V_P$ for an imaging time period $T_S$ (the camera is panned to the right when the panning speed is positive and to the left when the panning speed is negative) in Step 5504, and there is a return to Step 5503. On the other hand, when the horizontal remaining distance $L_H$ equal to or less than the moving distance L 5408, the panning speed $V_P$ is set for the value presented by the expression 20 and the camera is panned to the left at the panning speed $V_P$ for an imaging time period $T_S$. Consequently, in Step 5504, the camera is continuously panned to the left at the panning speed $V_P$ presented by the expression 19 until the horizontal remaining distance $L_H$ becomes equal to or less than the moving distance L 5408. Further, in Step 5505, the camera is panned to the left at the panning speed $V_P$ presented by the expression 20 for an imaging time period $T_S$, whereby the camera is panned to the left over the horizontal remaining distance $L_H$ and the time T imagining zone of the camera reaches the horizontal end position.

[Math 18]

$$L = V_{P\_CONST} \times T_S \qquad \text{(Formula 18)}$$

[Math 19]

$$V_P = -V_{P\_CONST} \qquad \text{(Formula 19)}$$

[Math 20]

$$V_P = -\frac{L_H}{T_S} \qquad \text{(Formula 20)}$$

The subroutine for leftward movement shown in FIG. 17(b) is described hereafter. The subroutine provides nearly the same operation as the subroutine for rightward movement shown in FIG. 17(a). The subroutine starts by calculating a moving distance L 5408 in FIGS. 15 and 16 in Step 5511. The moving distance L 5408 is calculated by the expression 18. Then, in Step 5512, a horizontal remaining distance $L_H$ comprising the distance between the right end position of the current time $T_{NOW}$ imaging zone 5404 and the horizontal end position is calculated. Subsequently, in Step 5513, a determination is made as to whether the horizontal remaining distance $L_H$ calculated in Step 5512 is equal to or less than the moving distance L 5408 calculated in Step 5511. When the horizontal remaining distance $L_H$ is greater than the moving distance L 5408, the panning speed $V_P$ is set for the value presented by the expression 21 and the camera is panned to the right at the panning speed $V_P$ for an imaging time period $T_S$ in Step 5514, and there is a return to Step 5513. On the other hand, when the horizontal remaining distance $L_H$ is equal to or less than 1 the moving distance L 5408, the panning speed $V_P$ is set for the value presented by the expression 22 and the camera is panned to the right at the panning speed $V_P$ for an imaging time period $T_S$. Consequently, in Step 5514, the camera is continuously panned to the right at the panning speed $V_P$ presented by the expression 22 until the horizontal remaining distance $L_H$ becomes equal to or less than the moving distance L 5408. Further, in Step 5515, the camera is panned to the right at the panning sped $V_P$ presented by the expression 22 for an imaging time period $T_S$, whereby the camera is panned to the right over the horizontal remaining distance $L_H$ and the time T imagining zone of the camera reaches the horizontal end position.

[Math 21]

$$V_P = V_{P\_CONST} \qquad \text{(Formula 21)}$$

[Math 22]

$$V_P = -\frac{L_H}{T_S} \qquad \text{(Formula 22)}$$

The subroutine for upward movement shown in FIG. 18(*a*) is described hereafter, and provides nearly the same operation as the subroutine for rightward movement shown in FIG. 17(*a*). The subroutine starts by calculating the moving distance L 5408 in FIGS. 15 and 16 in Step 5521, calculated by the expression 23. Then, in Step 5522, a vertical remaining distance $L_V$ comprising the distance between the top end position of the current time $T_{NOW}$ imaging zone 5404 and the vertical end position is calculated. Subsequently, in Step 5523, a determination is made as to whether the vertical remaining distance $L_V$ calculated in Step 5522 equal to or less than the moving distance L 5408 calculated in Step 5521. When the vertical remaining distance $L_V$ is greater than the moving distance L 5408, the tilting speed $V_T$ is set for the value presented by the expression 24 and the camera is panned upward at the tilting speed $V_T$ for an imaging time period $T_S$ (the camera is tilted upward when the tilting speed is positive and downward when the tilting speed is negative) in Step 5524, and there is a return to Step 5523. On the other hand, when the vertical remaining distance $L_V$ is equal to or less than the moving distance L 5408, the tilting speed $V_T$ is set for the value presented by the expression 25 and the camera is tilted upward at the tilting speed $V_T$ for an imaging time period $T_S$.

Consequently, in Step 5524, the camera is continuously tilted upward at the tilting speed $V_T$ presented by the expression 24 until the vertical remaining distance $L_V$ becomes equal to or less than the moving distance L 5408. Further, in Step 5525, the camera is tilted upward at the tilting speed $V_T$ presented by the expression 25 for an imaging time period $T_S$, whereby the camera is tilted upward over the vertical remaining distance $L_T$ and the time T imagining zone of the camera reaches the vertical end position.

[Math 23]

$$L = V_{T\_CONST} \times T_S \qquad \text{(Formula 23)}$$

[Math 24]

$$V_T = -V_{T\_CONST} \qquad \text{(Formula 24)}$$

[Math 25]

$$V_T = -\frac{L_H}{T_S} \qquad \text{(Formula 25)}$$

Finally, the subroutine for downward movement shown in FIG. 18(*b*) is described hereafter, and provides nearly the same operation as the subroutine for rightward movement shown in FIG. 17(*a*). The subroutine starts with calculating a moving distance L 5408 in FIGS. 15 and 16 in Step 5531. The moving distance L 5408 is calculated by the expression 23. Then, in Step 5532, a vertical remaining distance $L_V$ comprising the distance between the bottom end position of the current time $T_{NOW}$ imaging zone 5404 and the vertical end position is calculated. Subsequently, in Step 5533, a determination is made as to whether the vertical remaining distance $L_V$ calculated in Step 5532 equal to or less than the moving distance L 5408 calculated in Step 5531. When the vertical remaining distance $L_V$ is greater than the moving distance L 5408, the tilting speed $V_T$ is set for the value presented by the expression 26 and the camera is panned downward at the tilting speed $V_T$ for an imaging time period $T_S$ in Step 5534, and there is a return to Step 5533. On the other hand, when the vertical remaining distance $L_V$ equal to or less than the moving distance L 5408, the tilting speed $V_T$ is set for the value presented by the expression 27 and the camera is tilted downward at the tilting speed $V_T$ for an imaging time period $T_S$. Consequently, in Step 5534, the camera is continuously tilted downward at the tilting speed $V_T$ presented by the expression 26 until the vertical remaining distance $L_V$ becomes equal to or less than the moving distance L 5408. Further, in Step 5535, the camera is tilted downward at the tilting speed $V_T$ presented by the expression 27 for an imaging time period $T_S$, whereby the camera is tilted downward over the vertical remaining distance $L_T$ and the time T imagining zone of the camera reaches the vertical end position.

[Math 26]

$$V_T = V_{T\_CONST} \qquad \text{(Formula 26)}$$

[Math 27]

$$V_T = \frac{L_V}{T_S} \qquad \text{(Formula 27)}$$

As described above, according to the flowcharts of the subroutines shown in FIGS. 17(*a*), (*b*) and 18(*a*), (*b*), the time T imaging zone can be shifted horizontally and vertically to the horizontal and vertical end positions. The predetermined panning and tilting speeds $V_{P\_CONST}$ and $V_{T\_CONST}$ and imaging interval $T_S$ have the relationship presented by the expression 28 with the horizontal time T imaging zone size $La_H$ 5405 and vertical time T imaging zone size $La_V$ 5406.

[Math 28]

$$\left. \begin{array}{l} La_H \geq V_{P\_CONST} \times T_S \\ La_V \geq V_{T\_CONST} \times T_S \end{array} \right\} \qquad \text{(Formula 28)}$$

The flowchart shown in FIG. 19 is a flowchart for a main routine to move the time T imaging zone along the time T imaging zone moving path 5409 in FIG. 15(a) using the subroutines shown in FIGS. 17(a), (b) and 18(a), (b), thereby imaging the cycle $T_{CYCLE}$ imaging zone 5401. First, in Step C541, the time T imaging zone of the camera is moved to the bottom right position of the cycle $T_{CYCLE}$ imaging zone 5401 as the current time $T_{NOW}$ imaging zone 5404 in FIG. 15(a). Then, in Steps 5542 and 5543, with the horizontal end position at the position H1 (5421), the camera is panned to the right up to the position H1 (5421) using the subroutine shown in FIG. 17(b). Then, in Steps 5544 and 5545, with the vertical end position at the position V1 (54231), the camera is tilted upward up to the position V1 (5431) using the subroutine shown in FIG. 18(a). Then, in Steps 5546 and 5547, with the horizontal end position at the position H2 (5422), the camera is panned to the left up to the position H2 (5422) using the subroutine shown in FIG. 17(a). Then, in Steps 5548 and 5549, with the vertical end position at the position V2 (5432), the camera is tilted upward up to the position V2 (5432) using the subroutine shown in FIG. 18(a). Then, in Steps 5550 and 5551, with the horizontal end position at the position H3 (5423), the camera is panned to the right up to the position H3 (5423) using the subroutine shown in FIG. 17(b), and there is a return to Step 541. According to the flowchart, the time T imaging zone is moved along the time T imaging zone moving path 5409 of FIG. 15(a) so as to image the cycle $T_{CYCLE}$ imaging zone 5401.

In FIG. 19 shown is the flowchart to move the time T imaging zone along the time T imaging zone moving path 5409 in FIG. 15(a), thereby imaging the cycle $T_{CYCLE}$ imaging zone 5401. It is obvious and, therefore, not described here that the horizontal and vertical end positions and subroutines shown in FIGS. 17(a), (b) and 18(a), (b) can be used in different order for imaging when the time T imaging zone is moved along the time T imaging zone moving path 5409 in FIG. 15(b) or the time T imaging zone is moved along the time T imaging zone moving path 5409 in FIG. 16, thereby imaging the cycle $T_{CYCLE}$ imaging zone 5401.

The positions H1 (4321) to H3 used as the horizontal end position and the positions V1 (5431) to V4 (5434) used as the vertical end position each can be calculated using the relationship of the horizontal cycle $T_{CYCLE}$ imaging zone size $Lb_H$ 5402, vertical cycle $T_{CYCLE}$ imaging zone size $Lb_V$ 5403, horizontal time T imaging zone size $La_H$ 5405, and vertical time T imaging zone size $La_V$ 5406. For example, when the vertical cycle $T_{CYCLE}$ imaging zone size $Lb_V$ 5403 is 2.8 times greater than the vertical time T imaging zone size $La_V$ 5406, the position V1 (5431) in FIG. 15(a) can be double the vertical imaging zone size $La_V$ (5406) and the position V2 (5432) in FIG. 15(a) can be 2.8 times greater than the vertical imaging zone size $La_V$ 5406. The position V2 (5432) in FIG. 15(a) can also be 3 times greater than the vertical imaging zone size $La_V$ 5406. When the position V2 (5432) in FIG. 15(a) is 3 times greater than the vertical imaging zone size $La_V$ 5406, the time T imaging zone runs off the edge of the cycle $T_{CYCLE}$ imaging zone 5401; however, the cycle $T_{CYCLE}$ imaging zone 5401 is completely imaged and no problems occur.

The horizontal cycle $T_{CYCLE}$ imaging zone size $Lb_H$ 5402, vertical cycle $T_{CYCLE}$ imaging zone size $Lb_V$ 5403, horizontal time T imaging zone size $La_H$ 5405, and vertical time T imaging zone size $La_V$ 5406 can be obtained by the calculation process of the camera imaging zone position described above based on the four corner positions of the cycle $T_{CYCLE}$ imaging zone and time T imaging zone obtained from the panning angle $\Theta_P$, tilting angle $\Theta_T$, rolling angle $\Theta R_P$, horizontal field angle $\Theta_H$, and vertical field angle $\Theta_V$.

FIGS. 15(a), (b) and 16 show three examples of the time T imaging zone moving path 5409. However, the time T imaging zone moving path 5409 is not restricted thereto. Any path that allows the cycle $T_{CYCLE}$ imaging zone 5401 to be thoroughly imaged, with a single stroke if possible, can be used.

The time T imaging zone moving path 5409 can be selected from the time T imaging zone moving path 5409 shown in FIGS. 15 (a), (b) and 16 depending on the horizontal cycle $T_{CYCLE}$ imaging zone size $Lb_H$ 5402, vertical cycle $T_{CYCLE}$ imaging zone size $Lb_V$ 5403, horizontal time T imaging zone size $La_H$ 5405, and vertical time T imaging zone size $La_V$ 5406.

The above explanation is made on the assumption that the cycle $T_{CYCLE}$ imaging zone is greater than the time T imaging zone. According to FIGS. 12(a) and (b), when the cycle $T_{CYCLE}$ imaging zone is equal to or smaller than the time T imaging zone such as the time T camera horizontal field angle $\Theta a_H \geq$ the cycle $T_{CYCLE}$ camera horizontal field angle $\Theta b_H$, the time T camera vertical field angle $\Theta a_V \geq$ the cycle $T_{CYCLE}$ camera vertical field angle $\Theta b_V$, and the horizontal and vertical field angles of the cycle $T_{CYCLE}$ imaging zone 5203 are equal to or less than those of the time T imaging zone 5302, the entire cycle $T_{CYCLE}$ imaging zone can be imaged at a time with the time T imaging zone. In such a case, the time T imaging zone position is not sequentially moved by the technique described above. Instead, the position (panning/tilting/rolling angles) and size (zoom ratio) of the time T imaging zone is adjusted to image the entire cycle $T_{CYCLE}$ imaging zone. In such a case, the cycle $T_{CYCLE}$ imaging zone has a cycle of O and the entire cycle $T_{CYCLE}$ imaging zone is constantly imaged. The position and size of the time T imaging zone should be adjusted so that the entire cycle $T_{CYCLE}$ imaging zone is imaged with the time T imaging zone and the area within the time T imaging zone where the cycle $T_{CYCLE}$ imaging zone is not imaged is minimized. As described above, the cycle $T_{CYCLE}$ imaging zone includes not only a zone greater than the time T imaging zone but also a zone equal to or smaller than the time T imaging zone.

(Shape of the Imaging Zone)

Figure 20:
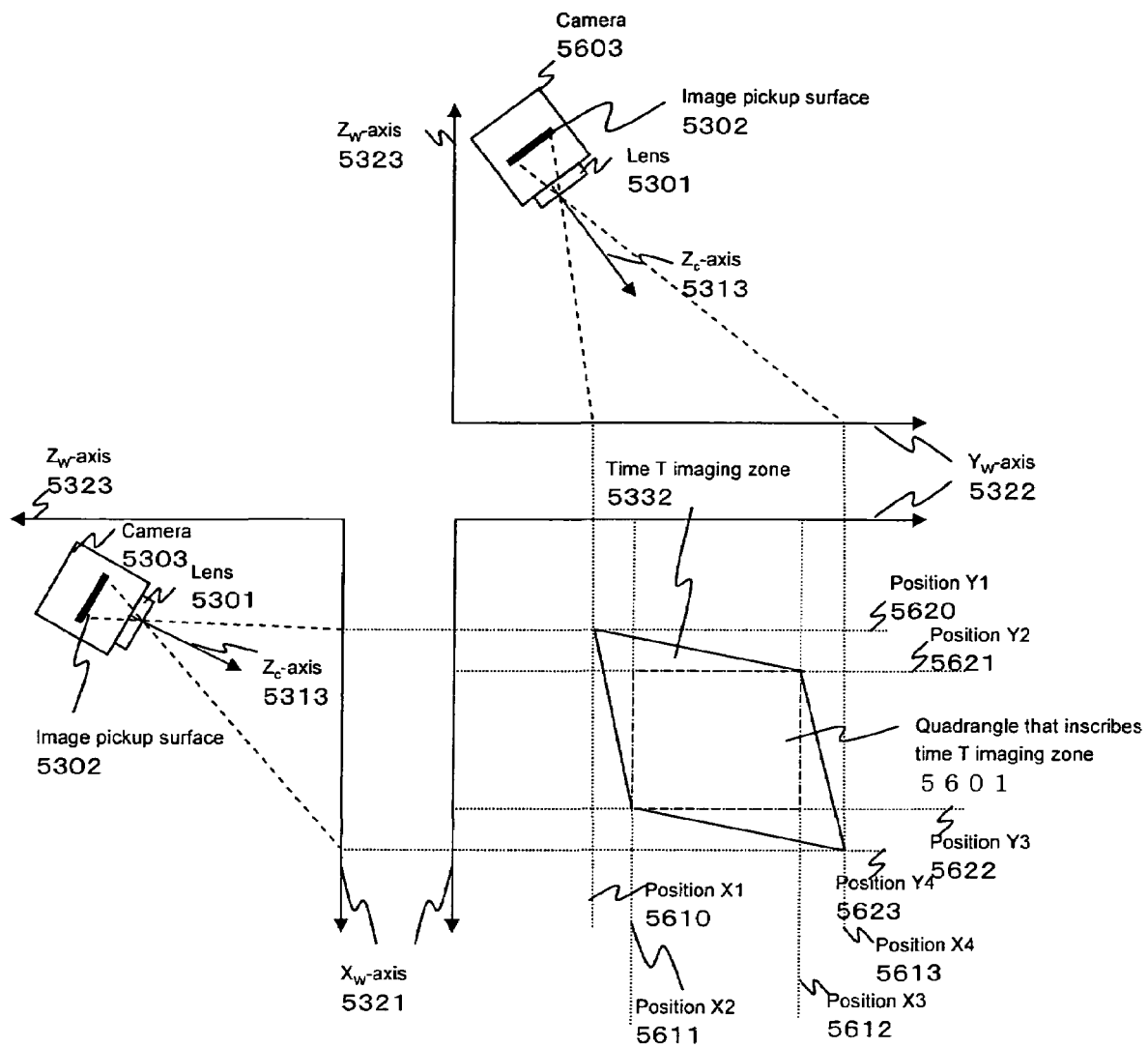
FIG. 20 is a drawing explaining the shape of an imaging zone.

The shape of the time T imaging zone and cycle $T_{CYCLE}$ imaging zone is described hereafter. FIG. 20 is an illustration explaining the shape of the time T imaging zone. In FIG. 20, the number 5301 is a lens, the number 5302 is an image pickup surface, the number 5303 is a camera, the number 5313 is a $Z_C$-axis, the number 5321 is an $X_W$-axis, the number 5322 is a $Y_W$-axis, the number 5323 is a $Z_W$-axis, and the number 5332 is a time T imaging zone. The elements are the same as those in FIG. 14. The number 5601 is a quadrangle that inscribes the time T imaging zone 5332 and has sides parallel to the $X_W$-axis 5321 and $Y_W$-axis 5322. The numbers 5610 to 5613 are positions X1 to X4 that comprise four corner positions of the time T imaging zone 5332 on the $X_W$-axis 5321. The numbers 5620 to 5623 are positions Y1 to Y4 that comprise four corner positions of the time T imaging zone 5332 on the $Y_W$-axis 5322.

In the embodiment, the time T imaging zone and cycle $T_{CYCLE}$ imaging zone are quadrangles having sides parallel to the $X_W$-axis 5321 and $Y_W$-axis 5322 for simplified explanation. However, as shown in FIG. 20, the time T imaging zone 5332 of the camera 5303 is a rectangular having sides not parallel to the $X_W$-axis 5321 and $Y_W$-axis 5322 when the $Z_C$-axis 5313 that coincides with the imaging direction of the camera 5303 is not parallel to the $Z_W$-axis 5323. In such a case, the time T imaging zone is assumed to be a quadrangle inscribing the time T imaging zone 5323 and having sides parallel to the $X_W$-axis 5321 and $Y_W$-axis 5322 shown as the time T imaging zone-inscribed quadrangle 5601. The four corner positions of the time T imaging zone-inscribed quadrangle 5601 can be obtained by comparing the positions X1 (5620) to X3 (5623) comprising the four corner positions of the time T imaging zone 5332 on the $X_W$-axis 5321 and the positions Y1 (5630) to Y3 (5633) comprising the four corner positions of the time T imaging zone 5332 on the $Y_W$-axis 5322 in magnitude, respectively, as shown in FIG. 20. The second and third largest positions among the positions X1 (5620) to X3 (5623) and the second and third largest positions among the positions Y1 (5630) to Y3 (5633) comprise the four corner positions of the time T imaging zone-inscribed quadrangle 5601. Here, the time T imaging zone-inscribed quadrangle 5601 is not necessarily a quadrangle obtained as described above, but can be any rectangular that inscribes the time T imaging zone 5332 and has sides parallel to the $X_W$-axis 5321 and $Y_W$-axis 5322. The positions X1 (5620) to X3 (5623) and positions Y1 (5630) to Y3 (5633) can be obtained by the calculation process of a camera imaging zone position described above using the panning angle $\Theta_P$, tilting angle $\Theta_T$, rolling angle $\Theta_R$, horizontal field angle $\Theta_H$, and vertical field angle $\Theta_V$.

Figure 21:
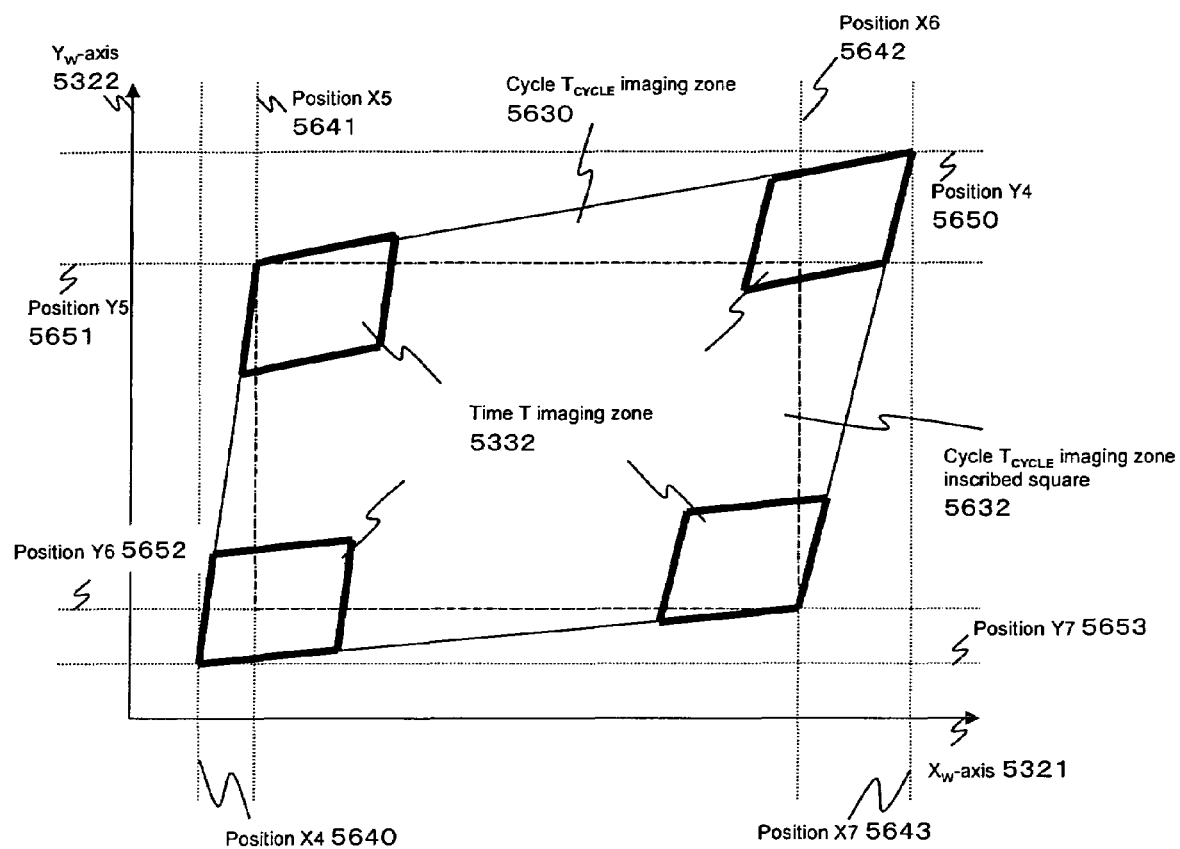
FIG. 21 is a drawing explaining the shape of an imaging zone.

FIG. 21 is an illustration explaining the shape of the cycle $T_{CYCLE}$ imaging zone. In FIG. 21, the number 5321 is an $X_W$-axis, the number 5322 is a $Y_W$-axis, and the number 5332 is a time T imaging zone. These elements are the same as those in FIG. 14. The number 5630 is a cycle $T_{CYCLE}$ imaging zone, the number 5631 is a quadrangle that inscribes the cycle $T_{CYCLE}$ imaging zone 5630 and has sides parallel to the $X_W$-axis 5321 and $Y_W$-axis 5322, the numbers 5640 to 5643 are positions X4 to X7 that comprise four corner positions of the cycle $T_{CYCLE}$ imaging zone 5630 on the $X_W$-axis 5321, and the numbers 5650 to 5653 are positions Y4 to Y7 that comprise four corner positions of the cycle $T_{CYCLE}$ imaging zone 5630 on the $Y_W$-axis 5322. As shown in FIG. 21, similar to the time T imaging zone 5332, the cycle $T_{CYCLE}$ imaging zone 5630 may be a rectangular having sides not parallel to the $X_W$-axis 5321 and $Y_W$-axis 5322. In such a case, the cycle $T_{CYCLE}$ imaging zone is assumed to be a quadrangle inscribing the cycle $T_{CYCLE}$ imaging zone 5630 and having sides parallel to the $X_W$-axis 5321 and $Y_W$-axis 5322 shown as the cycle $T_{CYCLE}$ imaging zone-inscribed quadrangle 5631.

The four corner positions of the cycle $T_{CYCLE}$ imaging zone-inscribed quadrangle 5631 can be obtained by comparing the positions X4 (5640) to X7 (5643) comprising the four corner positions of the cycle $T_{CYCLE}$ imaging zone 5630 on the $X_W$-axis 5321 and the positions Y4 (5650) to Y7 (5653) comprising the four corner positions of the cycle $T_{CYCLE}$ imaging zone 5630 on the $Y_W$-axis 5322 in magnitude, respectively, as shown in FIG. 21. The second and third largest positions among the positions X4 (5640) to X7 (5643) and the second and third largest positions among the positions Y4 (5650) to Y7 (5653) comprise the four corner positions of the cycle $T_{CYCLE}$ imaging zone-inscribed quadrangle 5631. Here, the cycle $T_{CYCLE}$ imaging zone-inscribed quadrangle 5631 is not necessarily a quadrangle obtained as described above, but can be any quadrangle that inscribes the cycle $T_{CYCLE}$ imaging zone 5630 and has sides parallel to the $X_W$-axis 5321 and $Y_W$-axis 5322. The positions X4 (5640) to X7 (5643) and positions Y4 (5650) to Y7 (5653) can be obtained by the calculation process of a the camera imaging zone position described above using the panning angle $\Theta_P$, tilting angle $\Theta_T$, rolling angle $\Theta_R$, horizontal field angle $\Theta_H$, and vertical field angle $\Theta_V$.

(Adjacent Imaging Zones)

Adjacent imaging zones are described hereafter. Adjacent imaging zones comprise the nearest other imaging zones to an imaging zone in question in the horizontal or vertical direction. The procedure to obtain adjacent imaging zones to an imaging zone in question is described hereafter.

Figure 22:
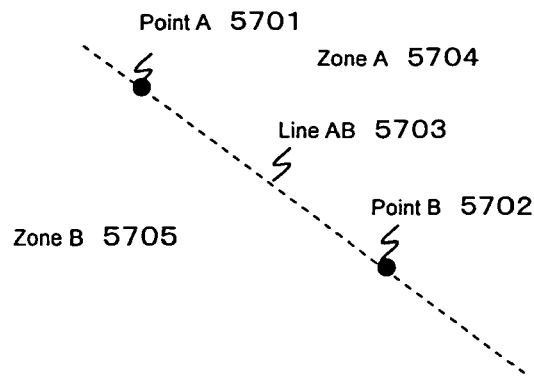
FIG. 22 is a drawing explaining the zone determination process.

First, the direction in which other imaging zones are present is determined for the imaging zone in question. The determination process shown in FIG. 22 is used for this determination. FIG. 22 is an illustration explaining the zone determination process. In FIG. 22, the number 5701 is a point A at coordinates $(X_A, Y_A)$, the number 5702 is a point B at coordinates $(X_B, Y_B)$, the number 5703 is a line AB passing through the points A 5701 and B 5702, the number 5704 is the top right zone A divided by the line AB 5703, and the number 5705 is the top right zone B divided by the line AB 5703. In FIG. 22, the expression 29 is satisfied when a point Z at coordinates $(X_Z, Y_Z)$ is present in the zone A 5704. When point Z is present in the zone B 5705, the expression 30 is satisfied (when point Z is present on line AB 5703, it is assumed that the point is present in the zone B 5705). With the expressions being evaluated, it is determined in which zone the point Z is present, the zone A 5704 or the zone B 5705.

Figure 23:
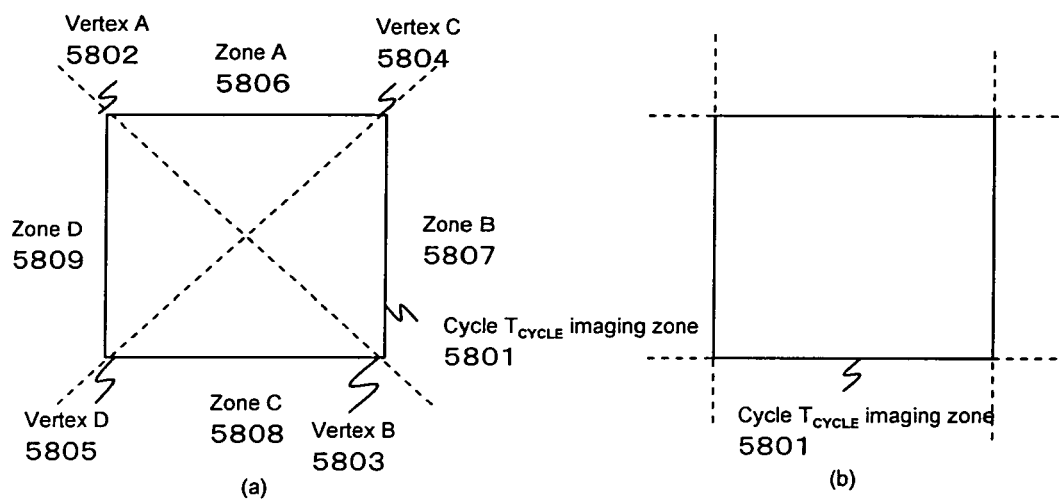
FIG. 23 is a drawing explaining how to determine in which direction another imaging zone is present in relation to the current imaging zone.
Figure 23:
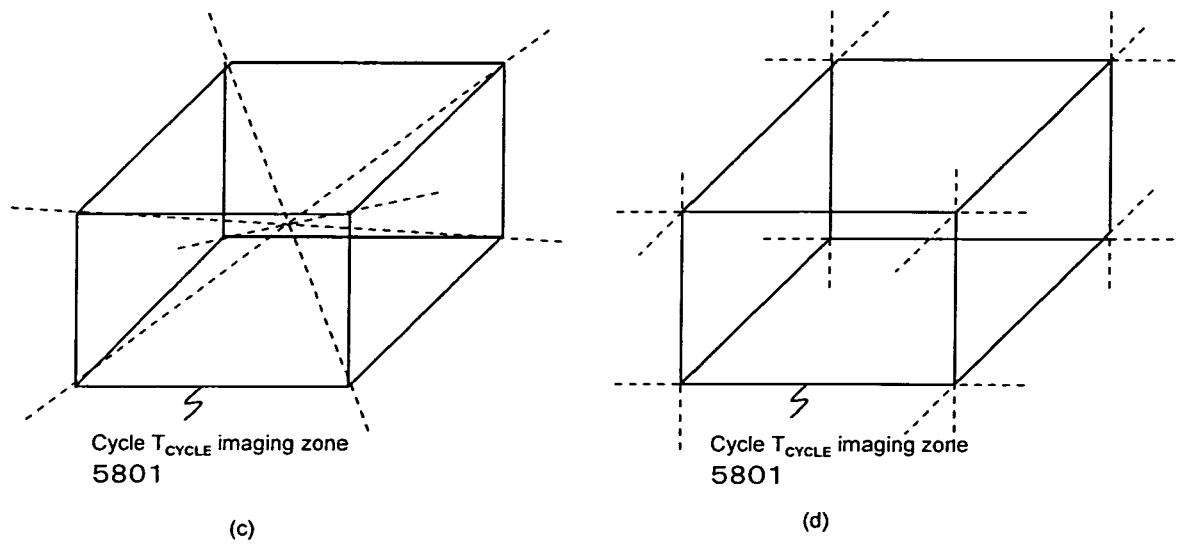

Using the process described above and assuming that the point Z is the gravity center of another imaging zone (the average of vertexes of the imaging zone), it is determined in which direction the imaging zone is present. FIG. 23(a), (b), (c), and (d) are illustrations explaining in which direction another imaging zone is present for an imaging zone in question. In FIG. 23, the number 5801 is a cycle $T_{CYCLE}$ imaging zone, which corresponds to an imaging zone in question. The number 5802 is a first vertex A of the cycle $T_{CYCLE}$ imaging zone 5801 at coordinates $(X_A, X_A)$, the number 5803 is a second vertex B of the cycle $T_{CYCLE}$ imaging zone 5801 at coordinates $(X_B, X_B)$, the number 5804 is a third vertex C of the cycle $T_{CYCLE}$ imaging zone 5801 at coordinates $(X_C, X_C)$, the number 5805 is a fourth vertex D of the cycle $T_{CYCLE}$ imaging zone 5801 at coordinates $(X_D, X_D)$, the number 5806 is a zone A above the cycle $T_{CYCLE}$ imaging zone 5801 or an imaging zone in question, the number 5807 is a zone B to the right of the cycle $T_{CYCLE}$ imaging zone 5801 or an imaging zone in question, the number 5808 is a zone C below the cycle $T_{CYCLE}$ imaging zone 5801 or an imaging zone in question, and the number 5809 is a zone D to the left of the cycle $T_{CYCLE}$ imaging zone 5801 or an imaging zone in question.

[Math 29]

$$(Y_Z - Y_A) < \frac{(Y_B - Y_A)}{(X_B - X_A)}(X_Z - X_A) \qquad \text{(Formula 29)}$$

[Math 30]

$$(Y_Z - Y_A) \geq \frac{(Y_B - Y_A)}{(X_B - X_A)}(X_Z - X_A) \qquad \text{(Formula 30)}$$

Using the determination process shown in FIG. 22, when the expressions 29 and 31 are satisfied in FIG. 23(a), it is determined that the point Z comprising the gravity center of another imaging zone is present in the zone A 5806 and the other imaging zone is above the imaging zone in question. When the expressions 29 and is 32 are satisfied, it is determined that the point Z comprising the gravity center of another imaging zone is present in the zone B 5807 and the other imaging zone is to the right of the imaging zone in question. When the expressions 30 and 32 are satisfied, it is determined that the point Z comprising the gravity center of another imaging zone is present in the zone C 5808 and the other imaging zone is below the imaging zone in question. Finally, when the expressions 30 and 31 are satisfied, it is determined that the point Z comprising the gravity center of another imaging zone is present in the zone D 5809 and the other imaging zone is to the left of the imaging zone in question.

[Math 31]

$$(Y_Z - Y_C) < \frac{(Y_D - Y_C)}{(X_D - X_C)}(X_Z - X_C) \qquad \text{(Formula 31)}$$

[Math 32]

$$(Y_Z - Y_C) \geq \frac{(Y_D - Y_C)}{(X_D - X_C)}(X_Z - X_C) \qquad \text{(Formula 32)}$$

Among the other imaging zones, the nearest one in each direction is assumed to be the adjacent imaging zone in that direction. If only one other imaging zone is found in a certain direction according to the process above, the zone is assumed to be the adjacent imaging zone in that direction. If multiple zones are found, the zone of which the gravity center is the nearest to the gravity center of the imaging zone in question is assumed to be the adjacent imaging zone.

The process to obtain the adjacent imaging zone to an imaging zone in question is as described above. In the process, the point Z used for the determination is the gravity center of another imaging zone. However, the point Z can be the view point of another imaging zone. Similarly, the distance between the gravity centers of an imaging zone in question and another imaging zone can be the distance between the view points of an imaging zone in question and another imaging zone.

In the process described above, as shown in FIG. 23(*a*), the zone is divided into top, bottom, right, and left zones so as to obtain the adjacent imaging zone in each zone. Alternatively, the zone can be divided into top, bottom, right, left, top right, top left, bottom right, and bottom left zones by the lines passing through the vertexes of the cycle $T_{CYCLE}$ imaging zone 5801 (indicated by the broken lines in FIG. 23) so as to obtain the adjacent imaging zone in each zone as shown in FIG. 23(*b*). In the above explanation of the process, the cycle $T_{CYCLE}$ imaging zone 5801 is two-dimensional as shown in FIG. 23(*a*). Needless to say, the adjacent imaging zone can be similarly obtained for a three-dimensional cycle $T_{CYCLE}$ imaging zone 5801 as shown in FIG. 23(*c*) and (*d*).

(Zone Dividing)

Figure 24:
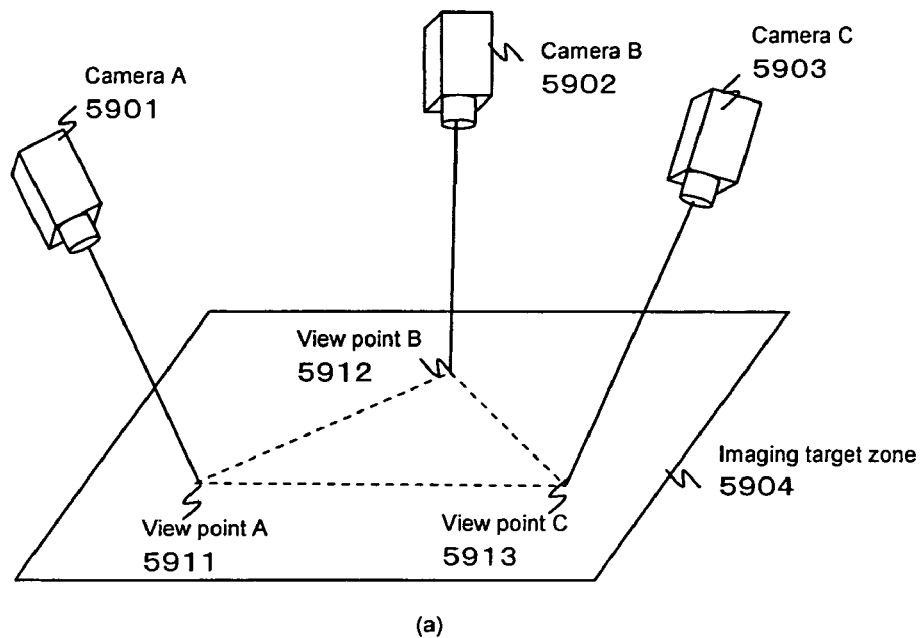
FIG. 24 is a drawing explaining-the zone dividing process.
Figure 24:
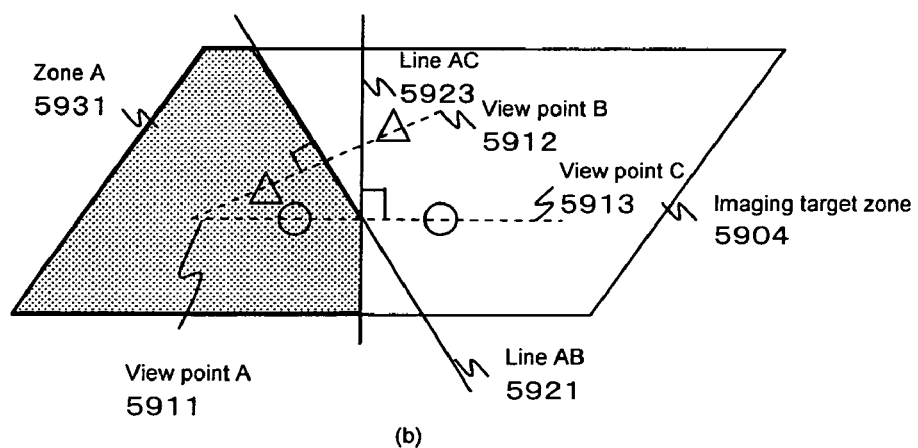
Figure 24:
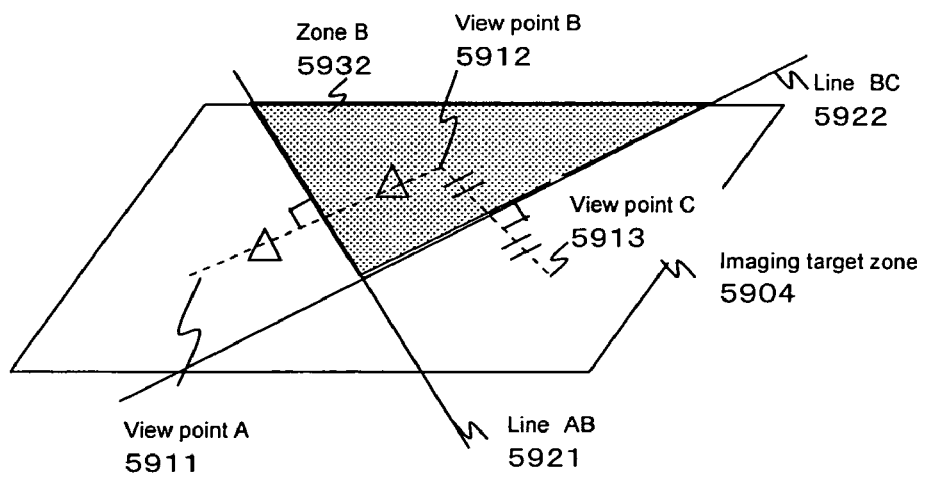
Figure 25:
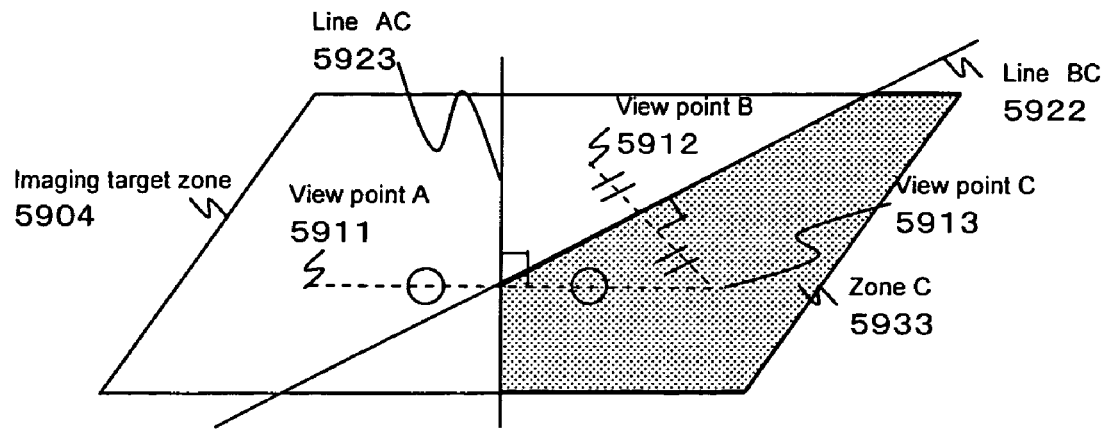
FIG. 25 is a drawing explaining the zone dividing process.
Figure 25:
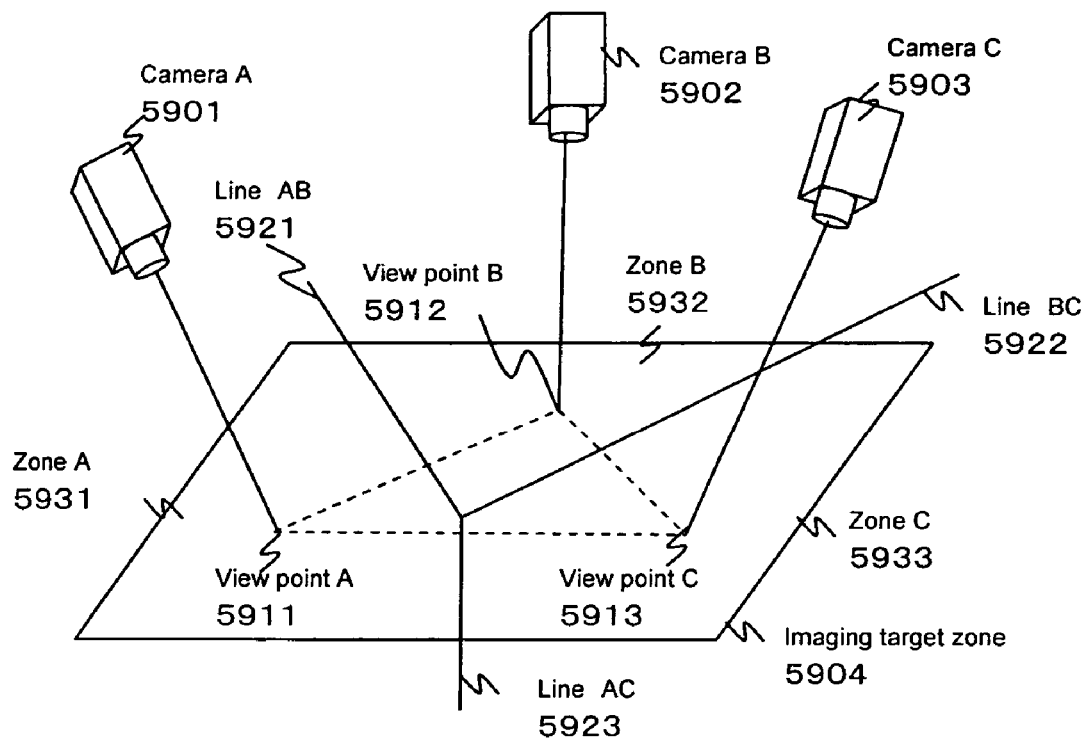

Finally, the zone dividing process is described. FIGS. 24(*a*), (*b*), (*c*) and 25(*a*), (*b*) are illustrations explaining the zone dividing process. In FIGS. 24 and 25, the numbers 5901 to 5903 indicate cameras A to C, respectively, the number 5904 is an imaging target zone comprising a target zone to be imaged by the cameras A 5901 to C 5903, the numbers 5911 to 5913 indicate the view points of the cameras A 5901 to C 5903, respectively, the number 5921 is a line AB comprising a perpendicular bisector of the line connecting the view points A 5911 and B 5912 of the cameras A 5901 and B 5902, the number 5922 is a line BC comprising a perpendicular bisector of the line connecting the view points B 5912 and C 5913 of the cameras B 5902 and C 5903, the number 5923 is a line AC comprising a perpendicular bisector of the line connecting the view points A 5911 and C 5913 of the cameras A 5901 and C 5903, the numbers 5931 to 5933 indicate zones A to C divided by the lines AB 5931, BC 5932, and AC 5933, respectively.

First, as shown in FIG. 24(*b*), (*c*) and 25(*a*), the perpendicular bisectors AB, 5931, BC 5932, and AC 5933 of the lines each connecting the view points A 5911 to C 5913 of the cameras A 5901 to C 5903 are obtained. The perpendicular bisectors are obtained, for example, by the expression 33 provided that the view points are present at coordinates $(X_A, Y_A)$ and $(X_B, Y_B)$. Then, a zone enclosed by the perpendicular bisectors of the lines connecting the view points of one's own camera and other cameras and the boundaries of the imaging target zone is assumed to be one's own division. For the camera A 5901, as shown in FIG. 24(*b*), the zone A 5931 enclosed by the lines AB 5931 and AC 5933 and the boundaries of the imaging target zone is the division for the camera A 5901. Similarly, for the camera B 5902, as shown in FIG. 24(*c*), the zone B 5932 is the division for the camera B 5902. For the camera C 5903, as shown in FIG. 25(*a*), the zone C 5933 is the division for the camera C 5903. Consequently, as shown in FIG. 25(*b*), the imaging target zone 5904 is divided into the zones A 5931 to C 5933 for the cameras.

[Math 33]

$$Y = -\frac{X_B - X_A}{Y_B - Y_A}\left(X - \frac{X_A + X_B}{2}\right) + \frac{Y_A + Y_B}{2} \qquad \text{(Formula 33)}$$

In the dividing process described above, perpendicular bisectors based on the view points of the cameras are used to divide the zone. Needless to say, similar divisions can be obtained by using the gravity centers of the imaging zones of the cameras.

The imaging zone of a camera, relationship between a detection target and a cycle $T_{CYCLE}$ imaging zone, size of a cycle $T_{CYCLE}$ imaging zone of a camera, field angles and panning and tilting of a camera imaging a cycle $T_{CYCLE}$ imaging zone, position of the imaging zone of a camera, imaging process of a cycle $T_{CYCLE}$ imaging zone, shape of an imaging zone, adjacent imaging zone, and zone dividing are described above. On the premises of these, embodiments of the present invention are described hereafter with reference to the drawings.

First Embodiment

The First Embodiment of the present invention is described hereafter. In the embodiment, an imaging zone adjusting apparatus in which the cycle $T_{CYCLE}$ imaging zones of the cameras of the camera terminals are self-adjusted so that a combined zone of the cycle $T_{CYCLE}$ imaging zones of the cameras of the camera terminals completely covers a specific imaging target zone is described with reference to FIGS. 26 to 31.

Figure 26:
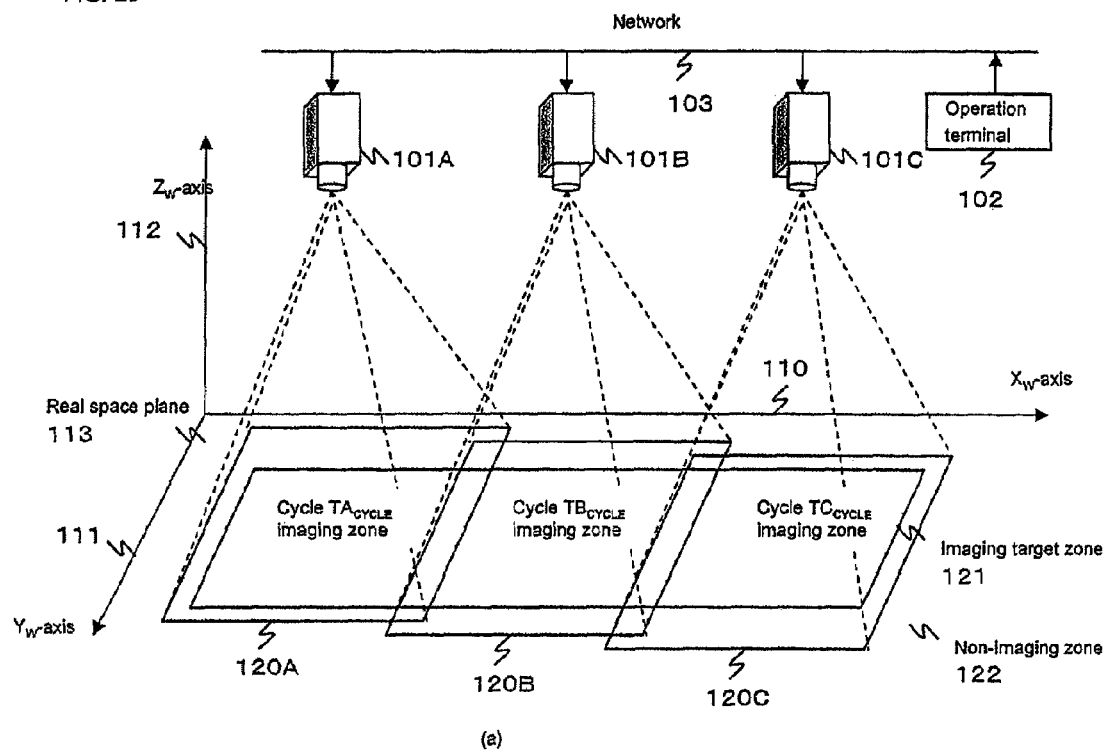
FIG. 26 is a block diagram showing the structure of an imaging zone adjusting apparatus in Embodiment 1 of the present invention.
Figure 26:
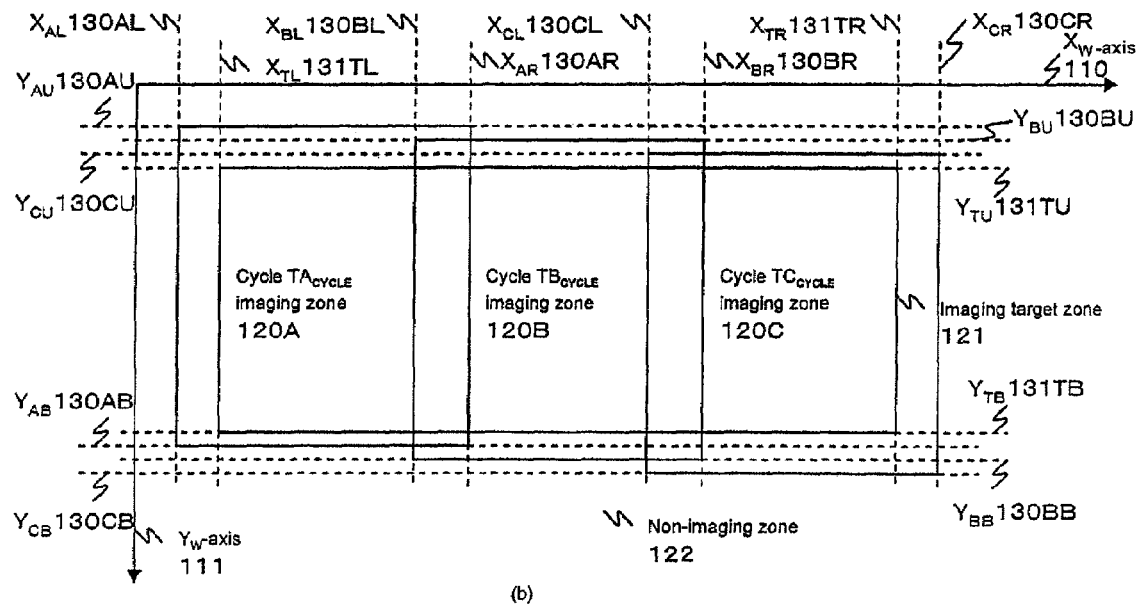

First, components of the imaging zone adjusting apparatus of the embodiment are described. FIG. 26(*a*) is a block diagram showing the structure of the imaging zone adjusting apparatus of the embodiment. The imaging zone adjusting apparatus comprises camera terminals 101A to 101C, an operation terminal 102, and a network 103 used for communication among the camera terminals 101A to C101C and operation terminal 102. In FIG. 26, an $X_W$-axis 110, a $Y_W$-axis 111, and a $Z_W$-axis 112, which are orthogonal to each other, are defined for indicating zones and positions of the zones. The number 113 is a plane in the real space in which the camera terminals 101A to 101C are present; for example, it is a floor surface when the camera terminals 101A to 101C are suspended from the ceiling downward. In the embodiment, a plane where the $Z_W$-axis 112=0 is used. Various zones and positions of the zones are expressed based on the plane. On the real space plane 113, a cycle $TA_{CYCLE}$ imaging zone 120A is a zone that is periodically imaged by the camera terminal 101A in a cycle $TA_{CYCLE}$, a cycle $TB_{CYCLE}$ imaging zone 120B is a zone that is periodically imaged by the camera terminal 101B in a cycle $TB_{CYCLE}$, a cycle $TC_{CYCLE}$ imaging zone 120C is a zone that is periodically imaged by the camera terminal 101C in a cycle $TC_{CYCLE}$, an imaging target zone 121 is a target zone to be imaged in the present invention, and a non-imaging zone 122 is a zone excluded from the image target zone 121.

FIG. 26(b) is an illustration showing the positions of the imaging zones on the real space plane 113 in the imaging zone adjusting apparatus of the embodiment shown in FIG. 26(a) in detail. An $X_W$-axis 110, a $Y_W$-axis 111, a cycle $TA_{CYCLE}$ imaging zone 120A, a cycle $TB_{CYCLE}$ imaging zone 120B, a cycle $TC_{CYCLE}$ imaging zone 120C, an imaging target zone 121, and a non-imaging zone 122 in FIG. 26(b) are the same as those in FIG. 26(a).

The numbers 130AL, 130AR, 130AU, and 130AB comprise the left end $X_{AL}$, right end $X_{AR}$, top end $Y_{AU}$, and bottom end $Y_{AB}$ positions of the cycle $T_{CYCLE}$ imaging zone 120A. In other words, the cycle $TA_{CYCLE}$ imaging zone 120A is a zone enclosed by $X_{AL}$ 130AL, $X_{AR}$ 130AR, $Y_{AU}$ 130AU, and $Y_{AB}$ 130AB and the position of the cycle $TA_{CYCLE}$ imaging zone 120A is expressed by these. The numbers 130BL, 130BR, 130BU, and 130BB comprise the left end $X_{BL}$, right end $X_{BR}$, top end $Y_{BU}$, and bottom end $Y_{BB}$ positions of the cycle $TB_{CYCLE}$ imaging zone 120B. In other words, the cycle $TB_{CYCLE}$ imaging zone 120A is a zone enclosed by $X_{BL}$ 130BL, $X_{BR}$ 130BR, $Y_{BU}$ 130BU, and $Y_{BB}$ 130BB and the position of the cycle $TB_{CYCLE}$ imaging zone 120B is expressed by these. The numbers 130CL, 130CR, 130CU, and 130CB comprise the left end $X_{CL}$, right end $X_{CR}$, top end $Y_{CU}$, and bottom end $Y_{CB}$ positions of the cycle $TC_{CYCLE}$ imaging zone 120C. In other words, the cycle $TC_{CYCLE}$ imaging zone 120A is a zone enclosed by $X_{CL}$ 130CL, $X_{CR}$ 130CR, $Y_{CU}$ 130CU, and $Y_{CB}$ 130CB and the position of the cycle $TC_{CYCLE}$ imaging zone 120C is expressed by these. The numbers 131TL, 131TR, 131TU, and 131TB comprise the left end $X_{TL}$, right end $X_{TR}$, top end $Y_{TU}$, and bottom end $Y_{TB}$ positions of the imaging target zone 121. In other words, the imaging target zone 121 is a zone enclosed by $X_{TL}$ 131TL, $X_{TR}$ 131TR, $Y_{TU}$ 131TU, and $Y_{TB}$ 131TB and the non-imaging zone 122 is a zone excluded from the zone enclosed by $X_{TL}$ 131TL, $X_{TR}$ 131TR, $Y_{TU}$ 131TU, and $Y_{TB}$ 131TB, by which the positions of the imaging target zone 121 and non-imaging zone 122 are expressed.

A zone enclosed by $X_{BL}$ 130BL, $X_{AR}$ 130AR, $Y_{BU}$ 130BU, and $Y_{AB}$ 130AB where the cycle $TA_{CYCLE}$ imaging zone 120A and cycle $TB_{CYCLE}$ imaging zone 120B overlap is a zone double imaged by the camera terminals 101A and 101B. The zone is termed an imaging overlapping zone AB. The zone has a measure of $X_{AR}$-$X_{BL}$ in the $X_W$-axis direction 110. A zone enclosed by $X_{CL}$ 130CL, $X_{BR}$ 130BR, $Y_{CU}$ 130CU, and $Y_{BB}$ 130BB where the cycle $TB_{CYCLE}$ imaging zone 120B and cycle $TC_{CYCLE}$ imaging zone 120C overlap is a zone double imaged by the camera terminals 101B and 101C. The zone is termed an imaging overlapping zone BC. The zone has a measure of $X_{BR}$-$X_{CL}$ in the $X_W$-axis direction 110. A zone enclosed by $X_{AL}$ 130AL, $X_{TL}$ 131TL, $Y_{AU}$ 130AU, and $Y_{AB}$ 130AB where the non-imaging zone 122 and cycle $TA_{CYCLE}$ imaging zone 120A overlap is termed a non-imaging overlapping zone AL. The zone has a measure of $X_{TL}$-$X_{AL}$ in the $X_W$-axis direction 110. A zone enclosed by $X_{TR}$ 131TR, $X_{CR}$ 130CR, $Y_{CU}$ 130CU, and $Y_{CB}$ 130CB where the non-imaging zone 122 and cycle $TC_{CYCLE}$ imaging zone 120C overlap is termed a non-imaging overlapping zone CR. The zone has a measure of $X_{CR}$-$X_{TR}$ in the $X_W$-axis direction 110. A zone enclosed by $X_{AL}$ 130AL, $X_{AR}$ 130AR, $Y_{AU}$ 130AU, and $Y_{TU}$ 131TU where the non-imaging zone 122 and cycle $TA_{CYCLE}$ imaging zone 120A overlap is termed a non-imaging overlapping zone AU. The zone has a measure of $Y_{TU}$-$Y_{AU}$ in the $Y_W$-axis direction 111. A zone enclosed by $X_{AL}$ 130AL, $X_{AR}$ 130AR, $Y_{TB}$ 131TB, and $Y_{AB}$ 130AB where the non-imaging zone 122 and cycle $TA_{CYCLE}$ imaging zone 120A overlap is termed a non-imaging overlapping zone AB. The zone has a measure of $Y_{AB}$-$Y_{TB}$ in the $Y_W$-axis direction 111. A zone enclosed by $X_{BL}$ 130BL, $X_{BR}$ 130BR, $Y_{BU}$ 130BU, and $Y_{TU}$ 131TU where the non-imaging zone 122 and cycle $TB_{CYCLE}$ imaging zone 120B overlap is termed a non-imaging overlapping zone BU. The zone has a measure of $Y_{TU}$-$Y_{BU}$ in the $Y_W$-axis direction 111. A zone enclosed by $X_{BL}$ 130BL, $X_{BR}$ 130BR, $Y_{TB}$ 131TB, and $Y_{BB}$ 130BB where the non-imaging zone 122 and cycle $TB_{CYCLE}$ imaging zone 120B overlap is termed a non-imaging overlapping zone BB. The zone has a measure of $Y_{BB}$-$Y_{TB}$ in the $Y_W$-axis direction 111. A zone enclosed by $X_{CL}$ 130CL, $X_{CR}$ 130CR, $Y_{CU}$ 130CU, and $Y_{TU}$ 131TU where the non-imaging zone 122 and cycle $TC_{CYCLE}$ imaging zone 120C overlap is termed a non-imaging overlapping zone CU. The zone has a measure of $X_{TU}$-$X_{CU}$ in the $Y_W$-axis direction 111. A zone enclosed by $X_{CL}$ 130CL, $X_{CR}$ 130CR, $Y_{TB}$ 131TB, and $Y_{CB}$ 130CB where the non-imaging zone 122 and cycle $TC_{CYCLE}$ imaging zone 120C overlap is termed a non-imaging overlapping zone CB. The zone has a measure of $X_{CB}$-$X_{TB}$ in the $Y_W$-axis direction 111.

Figure 27:
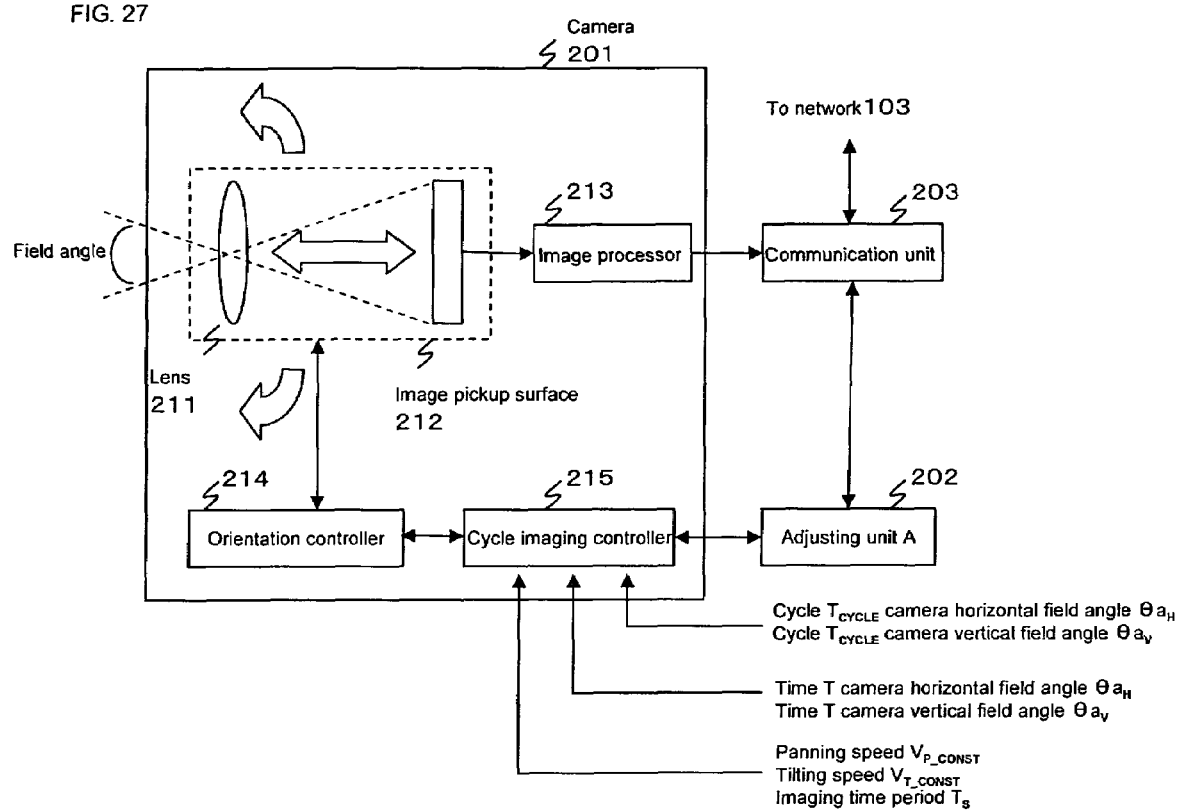
FIG. 27 is a block diagram showing the structure of a camera terminal in Embodiment 1 of the present invention.

FIG. 27 is a block diagram showing the structure of the camera terminals 101A to 101C in FIG. 26(a). The camera terminals 101A to 101C each comprise a camera 201, an adjusting unit A 202 comprising a processor to adjust the imaging zone position of the camera 201, and a communications unit 203 to transmit the imaging zone position of the camera 201 via a network 103.

The camera 201 is, for example, a camera that repeatedly captures images of a hypothetical imaging zone comprising a hypothetical imaging zone obtained by changing the imaging zone position within a specific zone in a specific period of time and a specific cycle. The camera 201 further comprises a lens 211, an image pickup surface 212, an image processor 213, an orientation controller 214, and a cycle imaging controller 215. The lens 211 is a lens forming images. The image pickup surface 212 is an image pickup surface of a CCD and the like that captures images formed by the lens 211. The image processor 312 is a processor that processes images captured by the image pickup surface 212. The orientation controller 214 is a processor that controls the orientation of the lens 211 and image pickup surface 212 and the distance between the lens 211 and image pickup surface 212. The cycle imaging controller 215 is a processor that sends periodic orientation control signals to the orientation controller 214 so that the camera 201 images the cycle $T_{CYCLE}$ imaging zone in a cycle $T_{CYCLE}$. The orientation control of the lens 211 and image pickup surface 212 conducted by the orientation controller 214 controls so-called panning and tilting. The lens 211 and image pickup surface 212 are rotated about a point or an axis in association with each other. The distance control between the lens 211 and image pickup surface 212 conducted by the orientation controller 214 is a so-called zooming control. The distance between the lens 211 and image pickup surface 212 is increased or decreased to adjust the field angle of the camera 201.

The communications unit 203 is a communication interface to exchange hypothetical imaging zone information indicating the hypothetical imaging zone. Here, it exchanges hypothetical zone positions with other cameras.

The adjusting unit A 202 is a processor to control the camera 201 and, accordingly, the hypothetical imaging zone position. Here, it adjusts the hypothetical imaging zone position of one's own camera terminal based on the hypothetical imaging zone of one's own camera terminal and the hypothetical imaging zones of other camera terminals indicated by information received by the communications unit 203 so that a combined zone of the hypothetical imaging zones of multiple camera terminals constituting the imaging zone adjusting apparatus completely covers the imaging target zone. For example, it adjusts the hypothetical imaging zone position of one's own camera terminal so that an overlapping zone amount comprising the quantity of an overlapping zone where the hypothetical imaging zone of one's own camera terminal and the hypothetical imaging zone of another camera terminal adjacent thereto overlap is a target quantity comprising a fixed quantity greater than 0.

Figure 28:
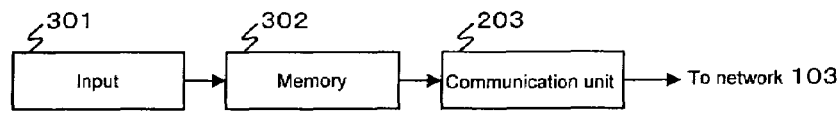
FIG. 28 is a block diagram showing the structure of the operation terminal in Embodiment 1 of the present invention.

FIG. 28 is a block diagram showing the structure of the operation terminal 102 in FIG. 26(b). The operation terminal 102 comprises an input unit 301 that receives $X_{TL}$ 131TL, $X_{TR}$ 131TR, $Y_{TU}$ 131TU, and $Y_{TB}$ 131TB or the position of the imaging target zone 121, a memory 302 that stores the position of the imaging target zone 121 received at the input unit 301, and a communications unit 203 that is similar to the communications unit 203 in FIG. 27 and transmits the position of the imaging target zone 121 recoded in memory 302 via a network 103. The input unit 301 is unnecessary where the position of the imaging target zone 121 is pre-recorded in memory 302.

Operation of the imaging zone adjusting apparatus of the embodiment is described hereafter. The camera 201 comprising a component of the camera terminals 101A to 101C has an internal structure shown in FIG. 27. In the camera 201, an image formed by the lens 211 is converted to image signals at the image pickup surface 212. The image processor 213 detects a detection target and extracts its information in the image signals through a conventional image processing or image recognition technique. Thus, the camera 201 detects a detection target and extracts its information within the detection zone comprising one's own time T imaging zone determined by the orientation of the lens 211 and image pickup surface 212 and their distance in the real space. The conventional image processing or image recognition technique described above includes well-known background difference calculus and dynamic difference calculus. The camera 201 images a cycle $T_{CYCLE}$ imaging zone in a cycle $T_{CYCLE}$ using the cycle imaging controller 215, which is described later. Therefore, the camera 201 detects a detection target and extracts its information within the detection zone comprising one's own cycle $T_{CYCLE}$ imaging zone determined by the cycle imaging controller 215 in the real space. The information of a detected detection target is sent to the communications unit 203.

Further, the orientation controller 214 of the camera 201 controls the orientation of the lens 211 and image pickup surface 212 or the distance between the lens 211 and image pickup surface 212 so that the time T imaging zone position of the camera 201 is moved to a time T imaging zone position based on orientation control signals specified by the cycle imaging controller 215. The orientation controller 214 obtains positional information of the time T imaging zone of the camera 201 determined by the orientation of the lens 211 and image pickup surface 212 or their distance at a time T and sends it to the cycle imaging controller 215. Thus, the position of the time T imaging zone of the camera 201 is controlled by the cycle imaging controller 215 and the positional information of the time T imaging zone of the camera 201 at a time T is sent to the cycle imaging controller 215. The calculation process of the position of the time T imaging zone of the camera 201 determined by the orientation of the lens 211 and image pickup surface 212 or their distance at a time T is described above for the imaging zone position of a camera. The orientation of the lens 211 and image pickup surface 212 or their distance can be changed and their orientation and distance at a time T can be read, for example, using a stepping motor.

The cycle imaging controller 215 sends orientation control signals including the panning speed $V_P$ and tilting speed $V_T$ to the orientation controller 214 based on the time T imaging zone positional information sent from the orientation controller 214 and a cycle $T_{CYCLE}$ camera panning angle $\Theta b_P$ and cycle $T_{CYCLE}$ camera tilting angle $\Theta b_T$ specified by the adjusting unit A 202 according to the process described above for the imaging process of a cycle $T_{CYCLE}$ imaging zone so that the time T imaging zone position of the camera 201 is controlled and the camera 201 operates as a cycle $T_{CYCLE}$ camera imaging the cycle $T_{CYCLE}$ imaging zone. As described for the imaging process of a cycle $T_{CYCLE}$ imaging zone, in addition to the cycle $T_{CYCLE}$ camera panning angle $\Theta b_P$ and cycle $T_{CYCLE}$ camera tilting angle $\Theta b_T$ specified by the adjusting unit A 202, a cycle $T_{CYCLE}$ camera horizontal filed angle $\Theta b_H$ and cycle $T_{CYCLE}$ camera vertical field angle $\Theta b_V$ necessary for the calculation of the imaging position of a cycle $T_{CYCLE}$ imaging zone, a time T camera horizontal filed angle $\Theta a_H$ and time T camera vertical field angle $\Theta a_V$ necessary for the calculation of the position of a time T imaging zone, panning speed $V_{P\_CONST}$, tilting speed $V_{T\_CONST}$, and imaging interval $T_S$ are required to image the cycle $T_{CYCLE}$ imaging zone. In the embodiment, the values are predetermined fixed values, for example, recorded in a memory unit, and sent to the cycle imaging controller 215. Alternatively, the values can be specified through the operation terminal 102. The cycle imaging controller 215 sends the positional information of the cycle $T_{CYCLE}$ imaging zone of the camera 201 to the adjusting unit A 202. The calculation process of a cycle $T_{CYCLE}$ imaging zone position is described above for the imaging zone position of a camera.

The adjusting unit A 202 periodically sends the positional information of the cycle $T_{CYCLE}$ imaging zone of the camera 201 sent from the cycle imaging controller 215 to the adjusting unit A 202 of the other camera terminals via the communications unit 203 and network 103. Further, the adjusting unit A 202 receives the positional information of the cycle $T_{CYCLE}$ imaging zone of the camera 201 of the other camera terminals that is periodically sent from the adjusting unit A 202 of the other camera terminals. Further, the communications unit 203 of the operation terminal 102 periodically sends the positional information of the imaging target zone 121 to the adjusting unit A 202 of the camera terminals 101A to 101C via the network 103.

Therefore, the adjusting unit A 202 of the camera terminals 101A to 101C periodically obtains the positional information of the cycle $T_{CYCLE}$ imaging zone of one's own camera terminal and other camera terminals and the positional information of the imaging target zone 121. In the embodiment, each adjusting unit A 202 periodically obtains $X_{AL}$ 130AL, $X_{AR}$ 130AR, $Y_{AU}$ 130AU, and $Y_{AB}$ 130AB or the position of the cycle $TA_{CYCLE}$ imaging zone 120A of the camera terminal 101A, $X_{BL}$ 130BL, $X_{BR}$ 130BR, $Y_{BU}$ 130BU, and $Y_{BB}$ 130BB or the position of the cycle $TB_{CYCLE}$ imaging zone 120B of the camera terminal 101B, $X_{CL}$ 130CL, $X_{CR}$ 130CR, $Y_{CU}$ 130CU, and $Y_{CB}$ 130CB or the position of the cycle $TC_{CYCLE}$ imaging zone 120C of the camera terminal 101C, and $X_{TL}$ 131TL, $X_{TR}$ 131TR, $Y_{TU}$ 131TU, and $Y_{TB}$ 131TB or the position of the imaging target zone 121 via the communications unit 203 and network 103.

Further, the adjusting unit A 202 performs the procedure of the steps below and shown in FIG. 29 based on the obtained positional information of the cycle $T_{CYCLE}$ imaging zones and imaging target zone 121 (which is also the positional information of the non-imaging zone 122).

First, in Step 401, the cycle $T_{CYCLE}$ imaging zone of another imaging zone adjacent to the cycle $T_{CYCLE}$ imaging zone of one's own camera terminal or the non-imaging zone 122 is selected based on the positional information of the cycle $T_{CYCLE}$ imaging zones of the cameras 201 of one's own camera terminal and other camera terminals. The selection process of the cycle $T_{CYCLE}$ imaging zone of another camera terminal adjacent to the cycle $T_{CYCLE}$ imaging zone of one's own camera terminal is described above for the adjacent imaging zone. When no adjacent imaging zone is found in the selection process described for the adjacent imaging zone, the non-imaging zone 122 is selected as the adjacent imaging zone.

Therefore, the camera terminal 101A has, as the adjacent imaging zone, the non-imaging zone 122 to the left and above and below it and the cycle $TB_{CYCLE}$ imaging zone 120B to the right. The camera terminal 101B has, as the adjacent imaging zone, the cycle $TA_{CYCLE}$ imaging zone 120A to the left, the non-imaging zone 122 above and below it, and the cycle $TC_{CYCLE}$ imaging zone 120C to the right. The camera terminal 101C has, as the adjacent imaging zone, the cycle $TB_{CYCLE}$ imaging zone 120B to the left and the non-imaging zone 122 above and below it and to the right.

Then, in Step 402, the quantity that comprising the magnitude of the overlapping zone where the imaging zone selected in Step 401 and the imaging zone of one's own camera terminal overlap is calculated. This is easily calculated by comparing the positions of the selected imaging zone and the imaging zone of one's own camera terminal in magnitude as shown in FIG. 26(a).

Therefore, the following is calculated for the camera terminal 101A: a quantity of $X_{TL}-X_{AL}$ that is the magnitude of the non-imaging overlapping zone AL or the overlapping zone on the left, a quantity of $X_{AR}-X_{BL}$ that is the magnitude of the non-imaging overlapping zone AB or the overlapping zone on the right, a quantity of $Y_{TU}-Y_{AU}$ that is the magnitude of the non-imaging overlapping zone AU or the overlapping zone at the top, and a quantity of $Y_{AB}-Y_{TB}$ that is the magnitude of the non-imaging overlapping zone AB or the overlapping zone at the bottom. The following is calculated for the camera terminal 101B: a quantity of $X_{AR}-X_{BL}$ that is the magnitude of the non-imaging overlapping zone AB or the overlapping zone on the left, a quantity of $X_{BR}-X_{CL}$ that is the magnitude of the non-imaging overlapping zone BC or the overlapping zone on the right, a quantity of $Y_{TU}-Y_{BU}$ that is the magnitude of the non-imaging overlapping zone BU or the overlapping zone at the top, and a quantity of $Y_{BB}-Y_{TB}$ that is the magnitude of the non-imaging overlapping zone BB or the overlapping zone at the bottom. The following is calculated for the camera terminal 101C: a quantity of $X_{BR}-X_{CL}$ that is the magnitude of the non-imaging overlapping zone BC or the overlapping zone on the left, a quantity of $X_{CR}-X_{TR}$ that is the magnitude of the non-imaging overlapping zone CR or the overlapping zone on the right, a quantity of $Y_{TU}-Y_{CU}$ that is the magnitude of the non-imaging overlapping zone CR or the overlapping zone at the top, and a quantity of $Y_{CB}-Y_{TB}$ that is the magnitude of the non-imaging overlapping zone CB or the overlapping zone at the bottom.

Then, in Step 403, the imaging zone position of one's own camera terminal is adjusted so that the quantities that indicate the magnitudes of the overlapping zones calculated in Step 402 converge on a fixed quantity $C_{OVERLAP}$. The adjustment process is described hereafter. First, a function FA ( ) yielding a quantity indicating the difference between the quantity indicating the magnitude of an overlapping zone and 0 or a fixed quantity $C_{OVERLAP}$ equal to or greater than 0 is selected. In the embodiment, this function is presented by the expressions 34 to 36.

[Math 34]

$$\left.\begin{aligned} FA_{AL}(X_{AL}) &= (X_{TL} - X_{AL} - C_{OVERLAP})^2 \\ FA_{AR}(X_{AR}) &= (X_{AR} - X_{BL} - C_{OVERLAP})^2 \\ FA_{AU}(Y_{AU}) &= (Y_{TU} - Y_{AU} - C_{OVERLAP})^2 \\ FA_{AB}(Y_{AB}) &= (Y_{AB} - Y_{TB} - C_{OVERLAP})^2 \end{aligned}\right\} \quad \text{(Formula 34)}$$

[Math 35]

$$\left.\begin{aligned} FA_{BL}(X_{BL}) &= (X_{AR} - X_{BL} - C_{OVERLAP})^2 \\ FA_{BR}(X_{BR}) &= (X_{BR} - X_{CL} - C_{OVERLAP})^2 \\ FA_{BU}(Y_{BU}) &= (Y_{TU} - Y_{BU} - C_{OVERLAP})^2 \\ FA_{BB}(Y_{BB}) &= (Y_{BB} - Y_{TB} - C_{OVERLAP})^2 \end{aligned}\right\} \quad \text{(Formula 35)}$$

[Math 36]

$$\left.\begin{aligned} FA_{CL}(X_{CL}) &= (X_{BR} - X_{CL} - C_{OVERLAP})^2 \\ FA_{CR}(X_{CR}) &= (X_{CR} - X_{CL} - C_{OVERLAP})^2 \\ FA_{CU}(Y_{CU}) &= (Y_{TU} - Y_{CU} - C_{OVERLAP})^2 \\ FA_{CB}(Y_{CB}) &= (Y_{CB} - Y_{TB} - C_{OVERLAP})^2 \end{aligned}\right\} \quad \text{(Formula 36)}$$

The expressions 34 to 36 correspond to the camera terminals 101A to 101C, respectively, raising the difference between the quantity indicating the magnitude of an overlapping zone and a fixed quantity $C_{OVERLAP}$ to the second power to yield a quantity indicating the individual difference. Then, the position of the next imaging zone of one's own camera terminal is calculated by the generally known steepest descent method as presented by the expressions 37 to 39.

[Math 37]

$$\begin{aligned}X'_{AL} &= X_{AL} - \alpha \frac{\partial FA_{AL}(X_{AL})}{\partial X_{AL}} \\ X'_{AR} &= X_{AR} - \alpha \frac{\partial FA_{AR}(X_{AR})}{\partial X_{AR}} \\ Y'_{AU} &= Y_{AU} - \alpha \frac{\partial FA_{AU}(Y_{AU})}{\partial Y_{AU}} \\ Y'_{AB} &= Y_{AB} - \alpha \frac{\partial FA_{AB}(Y_{AB})}{\partial Y_{AB}}\end{aligned}$$ (Formula 37)

[Math 38]

$$\begin{aligned}X'_{BL} &= X_{BL} - \alpha \frac{\partial FA_{BL}(X_{BL})}{\partial X_{BL}} \\ X'_{BR} &= X_{BR} - \alpha \frac{\partial FA_{BR}(X_{BR})}{\partial X_{BR}} \\ X'_{BU} &= X_{BU} - \alpha \frac{\partial FA_{BU}(X_{BU})}{\partial X_{BU}} \\ X'_{BB} &= X_{BB} - \alpha \frac{\partial FA_{BB}(X_{BB})}{\partial X_{BB}}\end{aligned}$$ (Formula 38)

[Math 39]

$$\begin{aligned}X'_{CL} &= X_{CL} - \alpha \frac{\partial FA_{CL}(X_{CL})}{\partial X_{CL}} \\ X'_{CR} &= X_{CR} - \alpha \frac{\partial FA_{CR}(X_{CR})}{\partial X_{CR}} \\ X'_{CU} &= X_{CU} - \alpha \frac{\partial FA_{CU}(X_{CU})}{\partial X_{CU}} \\ X'_{CB} &= X_{CB} - \alpha \frac{\partial FA_{CB}(X_{CB})}{\partial X_{CB}}\end{aligned}$$ (Formula 39)

In the expressions 37 to 39, $X'_{AL}$, $X'_{AR}$, $Y'_{AU}$, $Y'_{AB}$, $X'_{BL}$, $X'_{BR}$, $Y'_{BU}$, $Y'_{BB}$, $X'_{CL}$, $X'_{CR}$, $Y'_{AU}$, $Y'_{CB}$ comprise the positions of the next cycle $TA_{CYCLE}$ imaging zone 120A to next cycle $TC_{CYCLE}$ imaging zone 120C of the camera terminals and α is a constant. Finally, the positions of the cycle $T_{CYCLE}$ imaging zones of the camera terminals 101A to 101C are adjusted for the cycle $T_{CYCLE}$ imaging zone positions. In the process above, $X_{AL}$ 130AL, $X_{AR}$ 130AR, $X_{AU}$ 130AU, and $X_{AB}$ 130AB for the position of the cycle $TA_{CYCLE}$ imaging zone 120A of the camera terminal 101A should be adjusted independently. The same is true for the camera terminals 101B and 101C. When they cannot be adjusted independently, a function that linearly adds the function FA of the elements that comprise not adjusted independently is defined and this function is subject to the steepest descent method. For example, in the camera 201 of the embodiment, the cycle $T_{CYCLE}$ camera horizontal and vertical field angles $\Theta b_H$ and $\Theta b_V$ are fixed. Therefore, $X_{AL}$ 130AL and $X_{AR}$ 130AR cannot be adjusted independently and $X_{AU}$ 130AU and $X_{AB}$ 130AB cannot be adjusted independently, either. However, a function G ( ) presented by the expression 40 to 42 can be selected and subject to the steepest descent method presented by the expressions 43 to 45 to conduct the similar adjustment to that described above. In the expressions above, $\Theta b_{PA}$ and $\Theta b_{TA}$, $\Theta b_{PB}$ and $\Theta b_{TB}$, and $\Theta b_{PC}$ and $\Theta b_{TC}$ comprise the cycle $T_{CYCLE}$ camera panning and tilting angles of the camera terminals 101A to 101C, respectively.

[Math 40]

$$\begin{aligned}FA_A(X_{AL}, X_{AR}, Y_{AU}, Y_{AB}) &= \\ FA_{AL}(X_{AL}) + FA_{AR}(X_{AR}) &+ FA_{AU}(Y_{AU}) + FA_{AB}(Y_{AB}) \\ X_{AL} &= G_{AL}(\Theta b_{PA}, \Theta b_{TA}) \\ X_{AR} &= G_{AR}(\Theta b_{PA}, \Theta b_{TA}) \\ X_{AU} &= G_{AU}(\Theta b_{PA}, \Theta b_{TA}) \\ X_{AB} &= G_{AB}(\Theta b_{PA}, \Theta b_{TA}) \\ FA_A(X_{AL}, X_{AR}, Y_{AU}, Y_{AB}) &= FA_A(\Theta b_{PA}, \Theta b_{TA}) \\ &= (X_{TL} - G_{AL}(\Theta b_{PA}, \Theta b_{TA}) - C_{OVERLAP})^2 \\ &+ (G_{AR}(\Theta b_{PA}, \Theta b_{TA}) - X_{BL} - C_{OVERLAP})^2 \\ &+ (Y_{TU} - G_{AU}(\Theta b_{PA}, \Theta b_{TA}) - C_{OVERLAP})^2 \\ &+ (G_{AB}(\Theta b_{PA}, \Theta b_{TA}) - Y_{TB} - C_{OVERLAP})^2\end{aligned}$$ (Formula 40)

[Math 41]

$$\begin{aligned}FA_B(X_{BL}, X_{BR}, Y_{BU}, Y_{BB}) &= \\ FA_{BL}(X_{BL}) + FA_{BR}(X_{BR}) &+ FA_{BU}(Y_{BU}) + FA_{BB}(Y_{BB}) \\ X_{BL} &= G_{BL}(\Theta b_{PB}, \Theta b_{TB}) \\ X_{BR} &= G_{BR}(\Theta b_{PB}, \Theta b_{TB}) \\ X_{BU} &= G_{BU}(\Theta b_{PB}, \Theta b_{TB}) \\ X_{BB} &= G_{BB}(\Theta b_{PB}, \Theta b_{TB}) \\ FA_B(X_{BL}, X_{BR}, Y_{BU}, Y_{BB}) &= FA_B(\Theta b_{PB}, \Theta b_{TB}) \\ &= (X_{AR} - G_{BL}(\Theta b_{PB}, \Theta b_{TB}) - C_{OVERLAP})^2 \\ &+ (G_{BR}(\Theta b_{PB}, \Theta b_{TB}) - X_{CL} - C_{OVERLAP})^2 \\ &+ (Y_{TU} - G_{BU}(\Theta b_{PB}, \Theta b_{TB}) - C_{OVERLAP})^2 \\ &+ (G_{BB}(\Theta b_{PB}, \Theta b_{TB}) - Y_{TB} - C_{OVERLAP})^2\end{aligned}$$ (Formula 41)

[Math 42]

$$\begin{aligned}FA_C(X_{CL}, X_{CR}, Y_{CU}, Y_{CB}) &= \\ FA_{CL}(X_{CL}) + FA_{CR}(X_{CR}) &+ FA_{CU}(Y_{CU}) + FA_{CB}(Y_{CB}) \\ X_{CL} &= G_{CL}(\Theta b_{PC}, \Theta b_{TC}) \\ X_{CR} &= G_{CR}(\Theta b_{PC}, \Theta b_{TC}) \\ X_{CU} &= G_{CU}(\Theta b_{PC}, \Theta b_{TC}) \\ X_{CB} &= G_{CB}(\Theta b_{PC}, \Theta b_{TC}) \\ FA_C(X_{CL}, X_{CR}, Y_{CU}, Y_{CB}) &= FA_C(\Theta b_{PC}, \Theta b_{TC}) \\ &= (X_{BR} - G_{CL}(\Theta b_{PC}, \Theta b_{TC}) - C_{OVERLAP})^2 \\ &+ (G_{CR}(\Theta b_{PC}, \Theta b_{TC}) - X_{TR} - C_{OVERLAP})^2 \\ &+ (Y_{TU} - G_{CU}(\Theta b_{PC}, \Theta b_{TC}) - C_{OVERLAP})^2 \\ &+ (G_{CB}(\Theta b_{PC}, \Theta b_{TC}) - Y_{TB} - C_{OVERLAP})^2\end{aligned}$$ (Formula 42)

[Math 43]

$$\left.\begin{aligned}
FA_C(X_{CL}, X_{CR}, Y_{CU}, Y_{CB}) &= \\
FA_{CL}(X_{CL}) + FA_{CR}(X_{CR}) + FA_{CU}(Y_{CU}) &+ FA_{CB}(Y_{CB}) \\
X_{CL} &= G_{CL}(\theta b_{PC}, \theta b_{TC}) \\
X_{CR} &= G_{CR}(\theta b_{PC}, \theta b_{TC}) \\
X_{CU} &= G_{CU}(\theta b_{PC}, \theta b_{TC}) \\
X_{CB} &= G_{CB}(\theta b_{PC}, \theta b_{TC}) \\
FA_C(X_{CL}, X_{CR}, Y_{CU}, Y_{CB}) &= FA_C(\theta b_{PC}, \theta b_{TC}) \\
&= (X_{BR} - G_{CL}(\theta b_{PC}, \theta b_{TC}) - \\
&\quad C_{OVERLAP})^2 + \\
&\quad (G_{CR}(\theta b_{PC}, \theta b_{TC}) - X_{TR} - \\
&\quad C_{OVERLAP})^2 + \\
&\quad (Y_{TU} - G_{CU}(\theta b_{PC}, \theta b_{TC}) - \\
&\quad C_{OVERLAP})^2 + \\
&\quad (G_{CB}(\theta b_{PC}, \theta b_{TC}) - Y_{TB} - \\
&\quad C_{OVERLAP})^2
\end{aligned}\right\} \quad \text{(Formula 43)}$$

[Math 44]

$$\left.\begin{aligned}
\theta b'_{PB} &= \theta b_{PB} - \alpha \frac{\partial FA_B(\theta b_{PB}, \theta b_{TB})}{\partial \theta b_{PB}} \\
\theta b'_{TB} &= \theta b_{TB} - \alpha \frac{\partial FA_B(\theta b_{PB}, \theta b_{TB})}{\partial \theta b_{TB}}
\end{aligned}\right\} \quad \text{(Formula 42)}$$

[Math 45]

$$\left.\begin{aligned}
\theta b'_{PC} &= \theta b_{PC} - \alpha \frac{\partial FA_C(\theta b_{PC}, \theta b_{TC})}{\partial \theta b_{PC}} \\
\theta b'_{TC} &= \theta b_{TC} - \alpha \frac{\partial FA_C(\theta b_{PC}, \theta b_{TC})}{\partial \theta b_{TC}}
\end{aligned}\right\} \quad \text{(Formula 45)}$$

The adjusting unit A 202 performs the procedures of Steps 401, 402, and 403 in sequence and returns to Step 401 after completing the procedure of Step 403. Constantly repeating the procedures of Steps 401 to 403, the adjusting unit A 202 sends updated values of the cycle $T_{CYCLE}$ camera panning angle $\Theta b'_{PA}$ (or $\Theta'_{PB}$ or $\Theta b'_{PC}$) and cycle $T_{CYCLE}$ camera tilting angle $\Theta b'_{TA}$ (or $\Theta b'_{TB}$ or $\Theta b'_{TC}$) calculated by the expressions above to the cycle imaging controller 215 so that the position of the cycle $T_{CYCLE}$ imaging zone of the camera 201 is adjusted.

The operation of the imaging zone adjusting apparatus of the embodiment is as described above. In Step 403, the position of the next cycle $T_{CYCLE}$ imaging zone of one's own camera terminal is calculated using the steepest descent method in which the quantity indicating the magnitude of the overlapping zone converges on 0 or a fixed quantity $C_{OVERLAP}$ equal to or greater than 0 and the cycle $T_{CYCLE}$ imaging zone position of the camera 201 is adjusted for the next cycle $T_{CYCLE}$ imaging zone position. Then, with the procedures of Steps 401 to 403 being repeated, the cycle $TA_{CYCLE}$ imaging zone 120A, cycle $TB_{CYCLE}$ imaging zone 120B, and cycle $TC_{CYCLE}$ imaging zone 120C, or the cycle $T_{CYCLE}$ imaging zones of the camera terminals 101A to 101C, and the non-imaging zone 122 overlap by a fixed quantity of 0 or a fixed quantity $C_{OVERLAP}$ equal to or greater than 0. As shown in FIG. 26, when the cycle $T_{CYCLE}$ imaging zones of the camera terminals and the non-imaging zone 122 overlap by a fixed quantity of 0 or a fixed quantity $C_{OVERLAP}$ equal to or greater than 0, the imaging target zone 121 is contained in a combined zone of the cycle $T_{CYCLE}$ imaging zones of the camera terminals. Hence, the imaging zone adjusting apparatus of the present invention allows the camera terminals 101A to 101C to image the imaging target zone 121 with no blind spots.

With the adjusting unit A 202 repeating the procedures of Steps 401 to 403, the effect that the imaging target zone 121 is imaged with no blind spots is obtained. The procedures of Steps 402 and 403 are repeated for the cycle $T_{CYCLE}$ imaging zone of another camera adjacent to the $T_{CYCLE}$ imaging zone of one's own camera terminal and selected In Step 401 and for the non-imaging zone 122.

Therefore, even if any change occurs in the position of the cycle $T_{CYCLE}$ imaging zone of another camera adjacent to the $T_{CYCLE}$ imaging zone of one's own camera terminal or in the position of the non-imaging zone 122 (which is also the position of the imaging target zone 121) at each time point, the effect that the imaging target zone 121 is imaged with no blind spots can be obtained in accordance with the change. The position of the cycle $T_{CYCLE}$ imaging zone or imaging target zone 121 can be changed when:

(1) the cycle $T_{CYCLE}$ imaging zone of a camera terminal is intentionally changed;
(2) an additional camera terminal is installed;
(3) some of the camera terminals are removed or unserviceable; or
(4) the imaging target zone position sent from the operation terminal is changed. The operation of the present invention in response to the situational changes is described in Embodiments 6 and 7, described later. Even if the cycle $T_{CYCLE}$ imaging zone position sent from each camera terminal or the imaging target zone position sent from the operation terminal is changed or not sent, or a new cycle $T_{CYCLE}$ imaging zone position is sent according to the changes, the imaging zone adjusting apparatus of the present invention allows the camera terminals to image the imaging target zone with no blind spots in accordance with changes in the cycle $T_{CYCLE}$ imaging zone position or imaging target zone position.

Figure 30:
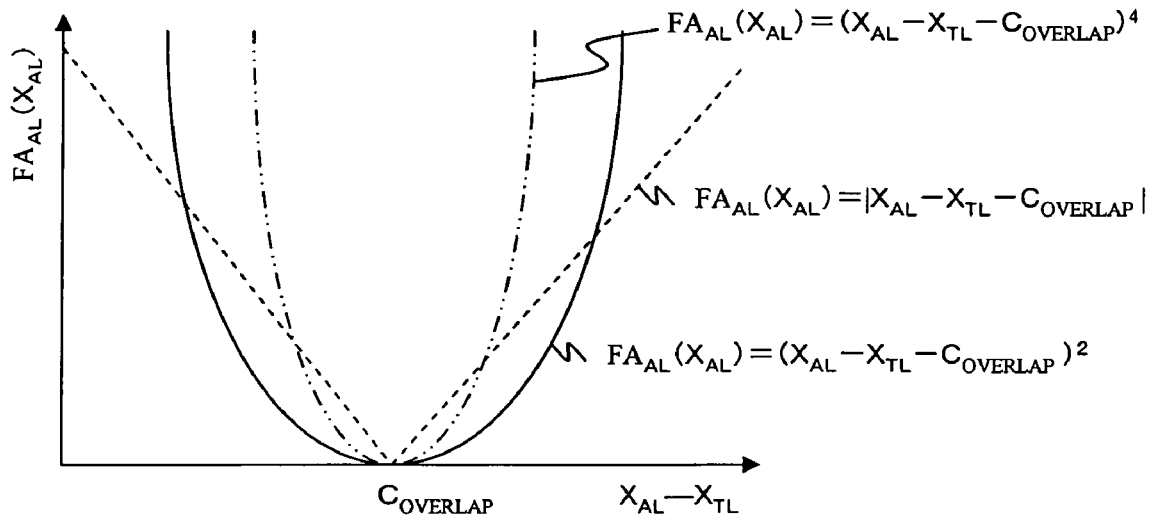
FIG. 30 is a drawing explaining a function FA ( ) in Embodiment 1 of the present invention.

In the embodiment, the function FA ( ) presenting the difference between a quantity indicating the magnitude of the overlapping zone and 0 or a fixed quantity $C_{OVERLAP}$ equal to or greater than 0 is a function raising the difference between a quantity indicating the magnitude of the overlapping zone and a fixed quantity $C_{OVERLAP}$ to the second power as presented by the expressions 34 to 36 or the expressions 40 to 42. However, as shown in FIG. 30, the function FA ( ) can be a function raising the difference between a quantity indicating the magnitude of the overlapping zone and a fixed quantity $C_{OVERLAP}$ to an even-numbered power such as the fourth, sixth, and tenth power or a function yielding the absolute value of the difference between a quantity indicating the magnitude of the overlapping zone and a fixed quantity $C_{OVERLAP}$. The functions have the minimum values when $X_{AL}-X_{TL}=C_{OVERLAP}$ and a quantity indicating the magnitude of the overlapping zone converges on a fixed quantity $C_{OVERLAP}$ in the steepest descent method In Step 403. Needless to say, the same effect can be obtained.

Figure 31:
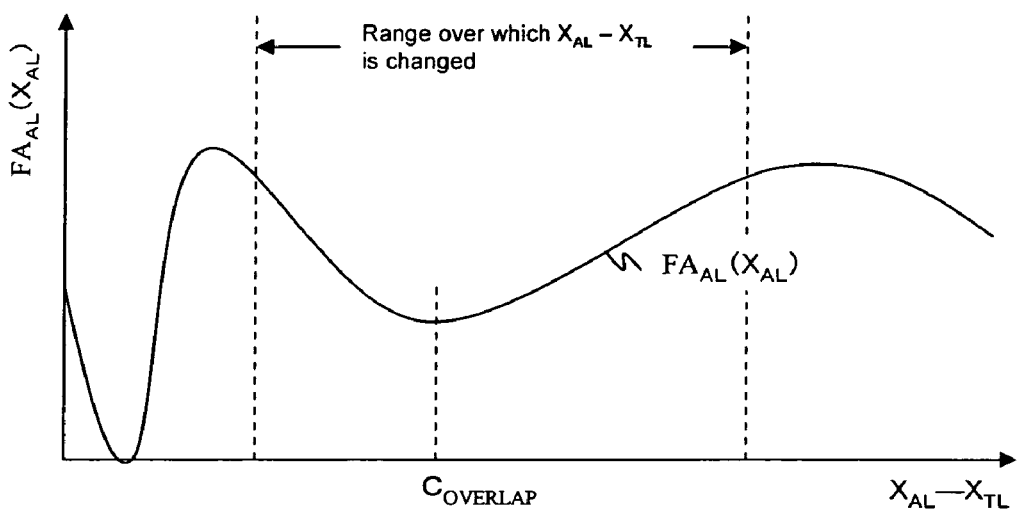
FIG. 31 is a drawing explaining a function FA ( ) in Embodiment 1 of the present invention.

The same effect can be obtained even if the function FA ( ) presenting the difference between a quantity indicating the magnitude of the overlapping zone and 0 or a fixed quantity $C_{OVERLAP}$ equal to or greater than 0 has a minimal value, not the minimum value, when $X_{AL}-X_{TL}=C_{OVERLAP}$ as shown in FIG. 31 as long as the function FA ( ) has the minimum value when $X_{AL}-X_{TL}=C_{OVERLAP}$ within a range over which $X_{AL}-X_{TL}$ is changed.

The magnitude of the overlapping zone has a target value of 0 or a fixed quantity $C_{OVERLAP}$ equal to or greater than 0. The fixed quantity $C_{OVERLAP}$ is preferably greater than 0 because it is ensured that the hypothetical imaging zones (the cycle $T_{CYCLE}$ imaging zones in the embodiment) overlap, and do not simply abut. Then, the imaging target zone can be completely imaged in a more reliable manner and, as described later, images of the hypothetical imaging zones (the cycle $T_{CYCLE}$ imaging zones in the embodiment) can be easily merged (put together) into an image.

In the embodiment, as shown in FIG. 27, the adjusting unit A 202 is distributed at each camera terminal 101A to 101C. Needless to say, the same effect can be obtained where only one adjusting unit A 202 is present and the only one adjusting unit A 202 controls the cycle $T_{CYCLE}$ imaging zone positions of the cameras of the camera terminals 101A to 101C.

In the embodiment, the network 103 is a network line used for general communication. Needless to say, the same effect can be obtained regardless of that the network 103 is a wired or wireless network.

In the embodiment, the magnitudes of the overlapping zones on the right and left and at the top and bottom are adjusted to a common fixed quantity $C_{OVERLAP}$. However, the same effect can be obtained even if they are adjusted to different fixed quantities $C_{OVERLAP}$ on the right and left and at the top and bottom, furthermore, to different fixed quantities $C_{OVERLAP}$ in the camera terminals 101A to 101C as long as each fixed quantity $C_{OVERLAP}$ is 0 or equal to or greater than 0.

In the embodiment, the cycle $T_{CYCLE}$ camera panning and tilting angles $\Theta b_P$ and $\Theta b_T$ are adjusted and updated by the adjusting unit A 202 and the cycle $T_{CYCLE}$ camera horizontal and vertical field angles $\Theta b_H$ and $\Theta b_V$ are fixed values. However, the cycle $T_{CYCLE}$ camera imaging zone position is changed according to the cycle $T_{CYCLE}$ camera horizontal and vertical field angles $\Theta b_H$ and $\Theta b_V$. Needless to say, the same effect can be obtained where the cycle $T_{CYCLE}$ camera panning and tilting angles $\Theta b_P$ and $\Theta b_T$ are fixed values and a similar unit to the adjusting unit A 202 is provided for the cycle $T_{CYCLE}$ camera horizontal and vertical field angles $\Theta b_H$ and $\Theta b_V$ to adjust and update them as presented by the expression 46. Similarly, the same is true for the time T camera horizontal and vertical field angles $\Theta a_H$ and $\Theta a_V$, panning and tilting speeds $V_{P\_CONST}$ and $V_{T\_CONST}$, and imaging time period $T_S$ besides the cycle $T_{CYCLE}$ camera horizontal and vertical field angles $\Theta b_H$ and $\Theta b_V$.

[Math 46]

$$\left.\begin{aligned}
X_{AL} &= G_{AL}(\theta b_{HA}, \theta b_{VA}) \\
X_{AR} &= G_{AR}(\theta b_{HA}, \theta b_{VA}) \\
X_{AU} &= G_{AU}(\theta b_{HA}, \theta b_{VA}) \\
X_{AB} &= G_{AB}(\theta b_{HA}, \theta b_{VA}) \\
FA_A(X_{AL}, X_{AR}, Y_{AU}, Y_{AB}) &= FA_A(\theta b_{HA}, \theta b_{VA}) \\
&= (X_{TL} - G_{AL}(\theta b_{HA}, \theta b_{VA}) - C_{OVERLAP})^2 + \\
&\quad (G_{AR}(\theta b_{HA}, \theta b_{VA}) - X_{BL} - C_{OVERLAP})^2 + \\
&\quad (Y_{TU} - G_{AU}(\theta b_{HA}, \theta b_{VA}) - C_{OVERLAP})^2 + \\
&\quad (G_{AB}(\theta b_{HA}, \theta b_{VA}) - Y_{TB} - C_{OVERLAP})^2 \\
\theta b'_{HA} &= \theta b_{HA} - \alpha \frac{\partial FA_A(\theta b_{HA}, \theta b_{VA})}{\partial \theta b_{HA}} \\
\theta b'_{VA} &= \theta b_{VA} - \alpha \frac{\partial FA_A(\theta b_{HA}, \theta b_{VA})}{\partial \theta b_{VA}}
\end{aligned}\right\} \quad \text{(Formula 46)}$$

Needless to say, the same effect can be obtained where the cycle $T_{CYCLE}$ camera panning and tilting angles $\Theta b_P$ and $\Theta b_T$ are adjusted and updated by the adjusting unit A 202 and the cycle $T_{CYCLE}$ camera horizontal and vertical field angles $\Theta b_H$ and $\Theta b_V$ are adjusted and updated by an adjusting unit similar to the adjusting unit A 202 using the expression 47, respectively.

Similarly, the same is true for the time T camera horizontal and vertical field angles $\Theta a_H$ and $\Theta a_V$, panning and tilting speeds $V_{P\_CONST}$ and $V_{T\_CONST}$, and imaging time period $T_S$ besides the cycle $T_{CYCLE}$ camera horizontal and vertical field angles $\Theta b_H$ and $\Theta b_V$.

[Math 47]

$$\left.\begin{aligned}
X_{AL} &= G_{AL}(\theta b_{PA}, \theta b_{TA}, \theta b_{HA}, \theta b_{VA}) \\
X_{AR} &= G_{AR}(\theta b_{PA}, \theta b_{TA}, \theta b_{HA}, \theta b_{VA}) \\
X_{AU} &= G_{AU}(\theta b_{PA}, \theta b_{TA}, \theta b_{HA}, \theta b_{VA}) \\
X_{AB} &= G_{AB}(\theta b_{PA}, \theta b_{TA}, \theta b_{HA}, \theta b_{VA}) \\
FA_A(X_{AL}, X_{AR}, Y_{AU}, Y_{AB}) &= FA_A(\theta b_{PA}, \theta b_{TA}, \theta b_{HA}, \theta b_{VA}) \\
&= (X_{TL} - G_{AL}(\theta b_{PA}, \theta b_{TA}, \theta b_{HA}, \theta b_{VA}) - C_{OVERLAP})^2 + \\
&\quad (G_{AR}(\theta b_{PA}, \theta b_{TA}, \theta b_{HA}, \theta b_{VA}) - X_{BL} - C_{OVERLAP})^2 + \\
&\quad (Y_{TU} - G_{AU}(\theta b_{PA}, \theta b_{TA}, \theta b_{HA}, \theta b_{VA}) - C_{OVERLAP})^2 + \\
&\quad (G_{AB}(\theta b_{PA}, \theta b_{TA}, \theta b_{HA}, \theta b_{VA}) - Y_{TB} - C_{OVERLAP})^2 \\
\theta b'_{PA} &= \theta b_{PA} - \alpha \frac{\partial FA_A(\theta b_{PA}, \theta b_{TA}, \theta b_{HA}, \theta b_{VA})}{\partial \theta b_{PA}} \\
\theta b'_{TA} &= \theta b_{TA} - \alpha \frac{\partial FA_A(\theta b_{PA}, \theta b_{TA}, \theta b_{HA}, \theta b_{VA})}{\partial \theta b_{TA}} \\
\theta b'_{HA} &= \theta b_{HA} - \alpha \frac{\partial FA_A(\theta b_{PA}, \theta b_{TA}, \theta b_{HA}, \theta b_{VA})}{\partial \theta b_{HA}} \\
\theta b'_{VA} &= \theta b_{VA} - \alpha \frac{\partial FA_A(\theta b_{PA}, \theta b_{TA}, \theta b_{HA}, \theta b_{VA})}{\partial \theta b_{VA}}
\end{aligned}\right\} \quad \text{(Formula 47)}$$

Embodiment 2

Embodiment 2 of the present invention is described hereafter. In the embodiment, an imaging zone adjusting apparatus in which the cycle $T_{CYCLE}$ imaging zones of the cameras of the camera terminals are self-adjusted so that a combined zone of the cycle $T_{CYCLE}$ imaging zones of the cameras of the camera terminals completely covers a specific imaging target zone and the imaging cycles $T_{CYCLE}$ of the cameras of the camera terminals are self-adjusted to be equal is described with reference to FIGS. 32 to 33.

First, advantages of the imaging cycles $T_{CYCLE}$ of the cameras of the camera terminals being equal are described. The imaging zone adjusting apparatus described in Embodiment 1 above allows the imaging zones of the cameras of the camera terminals to cover a specific imaging target zone with no blind spots. This does not mean that the imaging cycles $T_{CYCLE}$ of the cameras of the camera terminals are equal. When the imaging cycles $T_{CYCLE}$ of the cameras of the camera terminals are not equal, for example when a specific camera terminal has a significantly large imaging cycle $T_{CYCLE}$, the update of images of a cycle $T_{CYCLE}$ imaging zone imaged by that camera terminal is delayed and it takes more time to find a detection target within that cycle $T_{CYCLE}$ imaging zone. This is problematic when the imaging zone adjusting apparatus of the present invention is used for surveillance. Therefore, it is desired that the imaging cycles $T_{CYCLE}$ of the cameras of the camera terminals are not different, but nearly equal.

Figure 32:
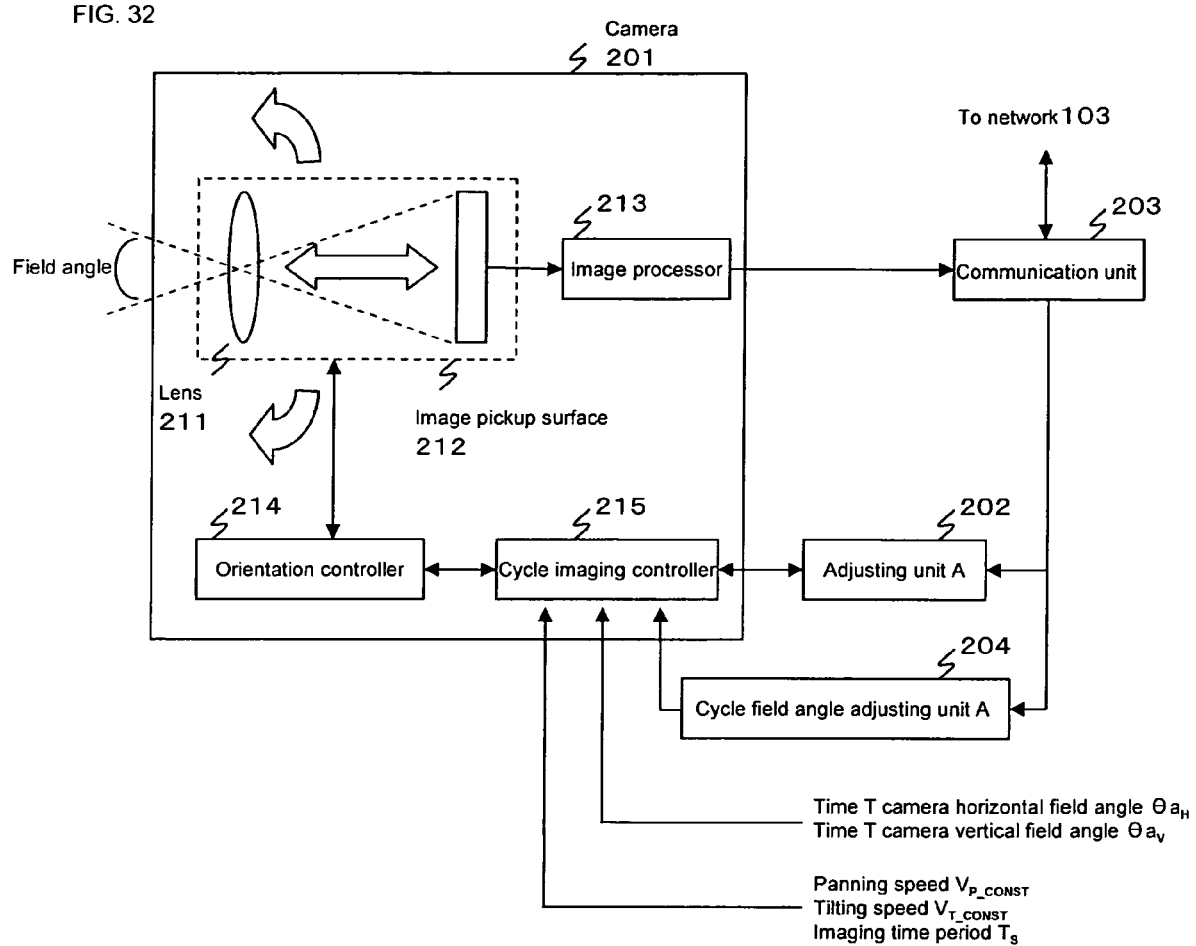
FIG. 32 is a block diagram showing the structure of a camera terminal in Embodiment 2 of the present invention.

Components of the imaging zone adjusting apparatus of the embodiment are described hereafter. FIG. 32 is a block diagram showing the structure of a camera 201 in the embodiment, which corresponds to the camera terminals 101A to 101C in FIG. 26(a). The camera terminals 101A to 101C each comprise at least a camera 201, an adjusting unit A 202, a communications unit 203, and a cycle field angle adjusting unit A 204. The camera 201 comprises a lens 211, an image pickup surface 212, an image processor 213, an orientation controller 214, and a cycle imaging controller 215. The camera 201, adjusting unit A 202, communications unit 203, lens 211, image pickup surface 212, image processor 213, orientation controller 214, and cycle imaging controller 215 in FIG. 32 are the same as those in the block diagram showing the structure of the camera terminals 101A to 101C of Embodiment 1 in FIG. 27. In the block diagram showing the structure of the camera terminals 101A to 101C of the embodiment in FIG. 32, the cycle $T_{CYCLE}$ camera horizontal and vertical field angles $\Theta b_H$ and $\Theta b_V$ are not fixed values. The cycle field angle adjusting unit A 204 comprising a processor to adjust and output the field angles of the cycle $T_{CYCLE}$ imaging zone of the camera 201 is added.

This is the only difference in components between Embodiment 1 and the embodiment. The imaging zone adjusting apparatus has the same structure as that in FIG. 26(a), the imaging zone positions on the real space plane 113 of the imaging zone adjusting apparatus are the same as those in FIG. 26(b), and the operation terminal 102 has the same structure as that in FIG. 28.

With the addition of the cycle field angle adjusting unit A 204, in the embodiment, the adjusting unit A 202 and cycle field angle adjusting unit A 204 adjust the position and imaging cycle of the hypothetical imaging zone (the cycle $T_{CYCLE}$ imaging zone in the embodiment) of one's own camera terminal so that the imaging cycle of the hypothetical imaging zone (the cycle $T_{CYCLE}$ imaging zone in the embodiment) of one's own camera terminal and the imaging cycles of hypothetical imaging zones (the cycle $T_{CYCLE}$ imaging zones in the embodiment) adjacent thereto are nearly equal in addition to the adjustment of Embodiment 1.

Operation of the imaging zone adjusting apparatus of the embodiment is described hereafter. The cycle field angle adjusting unit A 204 is the only additional unit in the embodiment compared to Embodiment 1. The cycle field angle adjusting unit A 204 sends the cycle $T_{CYCLE}$ camera horizontal and vertical field angles $\Theta b_H$ and $\Theta b_V$ to the cycle imaging controller 215. Needless to say, the embodiment has all effects described for Embodiment 1. In other words, the imaging zones of the cameras of the camera terminals are self-adjusted so that a combined zone of the imaging zones of the cameras of the camera terminals completely covers a specific imaging target zone.

The field angle adjusting unit A 204 periodically sends field angle information of the cycle $T_{CYCLE}$ imaging zone of the camera 201 to the field angle adjusting unit A 204 of the other camera terminals via the communications unit 203 and network 103. Further, the field angle adjusting unit A 204 receives the field angle information of the cycle $T_{CYCLE}$ imaging zone of the camera 201 of the other camera terminals that is periodically sent from the field angle adjusting unit A 204 of the other camera terminals. Therefore, the field angle adjusting unit A 204 of the camera terminals 101A to 101C periodically receives the field angle information of the cycle $T_{CYCLE}$ imaging zone of the camera 201 of one's own camera terminal and other camera terminals. In the embodiment, each field angle adjusting unit A 204 periodically obtains field angles $\Theta b_{HA}$ and $\Theta b_{VA}$ (horizontal and vertical field angles, respectively) of the cycle $TA_{CYCLE}$ imaging zone 120A of the camera terminal 101A, field angles $\Theta b_{HB}$ and $\Theta b_{VB}$ of the cycle $TB_{CYCLE}$ imaging zone 120B of the camera terminal 101B, and field angles $\Theta b_{HC}$ and $\Theta b_{VC}$ of the cycle $TC_{CYCLE}$ imaging zone 120C of the camera terminal 101C via the communications unit 203 and network 103.

Then, the field angle adjusting unit A 204 performs the procedures of the steps below and shown in FIG. 33 based on the obtained field angle information of the cycle $T_{CYCLE}$ imaging zones described above.

First, in Step 801, a cycle $T_{CYCLE}$ imaging zone of another camera terminal adjacent to the cycle $T_{CYCLE}$ imaging zone of one's own camera terminal is selected. This process is explained for Embodiment 1 and, therefore, not described here. The process is also performed by the adjusting unit A 202 and the processing result of Step 401 performed by the adjusting unit A 202 can be used. However, the adjusting unit A 202 may select the non-imaging zone 122. Therefore, when the non-imaging zone 122 is selected, it is assumed that there is no adjacent cycle $T_{CYCLE}$ imaging zone of another camera terminal.

Then, in Step 802, quantities indicating the differences in field angle between the imaging zone selected In Step 801 and the imaging zone of one's own camera terminal are calculated. To do so, quantities $\Theta b_{HB}-\Theta b_{HA}$ and $\Theta b_{VB}-\Theta b_{VA}$ indicating the differences in field angle from the cycle $TB_{CYCLE}$ imaging zone 120B or the imaging zone on the right are calculated for the camera terminal 101A, quantities $\Theta b_{HA}-\Theta b_{HB}$ and $\Theta b_{VA}-\Theta b_{VB}$ indicating the differences in field angle from the cycle $TA_{CYCLE}$ imaging zone 120A or the imaging zone on the left and quantities $\Theta b_{HC}-\Theta b_{HB}$ and $\Theta b_{VC}-\Theta b_{VB}$ indicating the differences in field angle from the cycle $TC_{CYCLE}$ imaging zone 120C or the imaging zone on the right are calculated for the camera terminal 101B, and quantities $\Theta b_{HB}-\Theta b_{HC}$ and $\Theta b_{VB}-\Theta b_{VC}$ indicating the differences in field angle from the cycle $TB_{CYCLE}$ imaging zone 120B or the imaging zone on the left are calculated for the camera terminal 101C.

Then, in Step 803, the field angles of the imaging zone of one's own camera terminal are adjusted so that the quantities indicating the differences in field angle and calculated In Step 802 converge on 0. The adjustment process is described below. First, is a function FB ( ) presenting a quantity indicating the difference in field angle is selected. In the embodiment, the function is presented by the expressions 48 to 50 (the function FB ( )=0 for the direction in which there is no adjacent imaging zone).

[Math 48]

$$\left.\begin{array}{l} FB_{ALH}(\theta b_{HA}) = 0 \\ FB_{ALV}(\theta b_{VA}) = 0 \\ FB_{ARH}(\theta b_{HA}) = (\theta b_{HB} - \theta b_{HA})^2 \\ FB_{ARV}(\theta b_{VA}) = (\theta b_{VB} - \theta b_{VA})^2 \\ FB_{AUH}(\theta b_{HA}) = 0 \\ FB_{AUV}(\theta b_{VA}) = 0 \\ FB_{ABH}(\theta b_{HA}) = 0 \\ FB_{ABV}(\theta b_{VA}) = 0 \\ FB_{AH}(\theta b_{HA}) = FB_{ALH}(\theta b_{HA}) + FB_{ARH}(\theta b_{HA}) + \\ \qquad FB_{AUH}(\theta b_{HA}) + FB_{ABH}(\theta b_{HA}) \\ FB_{AV}(\theta b_{VA}) = FB_{ALV}(\theta b_{VA}) + FB_{ARV}(\theta b_{VA}) + \\ \qquad FB_{AUV}(\theta b_{VA}) + FB_{ABV}(\theta b_{VA}) \end{array}\right\} \quad \text{(Formula 48)}$$

[Math 49]

$$FB_{BLH}(\theta b_{HB}) = (\theta b_{HA} - \theta b_{HB})^2$$
$$FB_{BLV}(\theta b_{VB}) = (\theta b_{VA} - \theta b_{VB})^2$$
$$FB_{BRH}(\theta b_{HB}) = (\theta b_{HC} - \theta b_{HB})^2$$
$$FB_{BRV}(\theta b_{VH}) = (\theta b_{VC} - \theta b_{VB})^2$$
$$FB_{BUH}(\theta b_{HB}) = 0$$
$$FB_{BUV}(\theta b_{VB}) = 0$$
$$FB_{BBH}(\theta b_{HB}) = 0$$
$$FB_{BRV}(\theta b_{VB}) = 0$$
$$FB_{BH}(\theta b_{HB}) = FB_{BLH}(\theta b_{HB}) + FB_{BRH}(\theta b_{HB}) + FB_{BUH}(\theta b_{HB}) + FB_{BBH}(\theta b_{HB})$$
$$FB_{BV}(\theta b_{VB}) = FB_{BLV}(\theta b_{VB}) + FB_{BRV}(\theta b_{VB}) + FB_{BUV}(\theta b_{VB}) + FB_{BBV}(\theta b_{VB})$$

(Formula 49)

[Math 50]

$$FB_{CLH}(\theta b_{HC}) = (\theta b_{HB} - \theta b_{HC})^2$$
$$FB_{CLV}(\theta b_{VC}) = (\theta b_{VB} - \theta b_{VC})^2$$
$$FB_{CRH}(\theta b_{HC}) = 0$$
$$FB_{CRV}(\theta b_{VC}) = 0$$
$$FB_{CUH}(\theta b_{HC}) = 0$$
$$FB_{CUV}(\theta b_{VC}) = 0$$
$$FB_{CBH}(\theta b_{HC}) = 0$$
$$FB_{CRV}(\theta b_{VC}) = 0$$
$$FB_{CH}(\theta b_{HC}) = FB_{CLH}(\theta b_{HC}) + FB_{CRH}(\theta b_{HC}) + FB_{CUH}(\theta b_{HC}) + FB_{CBH}(\theta b_{HC})$$
$$FB_{CV}(\theta b_{VC}) = FB_{CLV}(\theta b_{VC}) + FB_{CRV}(\theta b_{VC}) + FB_{CUV}(\theta b_{VC}) + FB_{CBV}(\theta b_{VC})$$

(Formula 50)

The expressions 48 to 50 correspond to the camera terminals 101A to 101C, respectively, raising a quantity indicating the difference in field angle to the second power to yield a quantity indicating the individual difference. Then, the generally known 10 steepest descent method is used as presented by the expressions 51 to 53 to calculate the field angles of the next imaging zone of one's own camera terminal. In the expressions 51 to 53, ($\Theta b'_{HA}$, $\Theta b'_{VA}$, $\Theta b'_{HB}$, $\Theta b'_{VB}$, $\Theta b'_{HC}$, and $\Theta b'_{VC}$ comprise the field angles of the next cycle $TA_{CYCLE}$ imaging zone 120A to cycle $TC_{CYCLE}$ imaging zone 120C is of the camera terminals, respectively, and α is a constant. Finally, the field angles of the cycle $T_{CYCLE}$ imaging zones of the camera terminals 101A to 101C are adjusted for the field angles of the cycle $T_{CYCLE}$ imaging zones, respectively.

[Math 51]

$$\theta b'_{HA} = \theta b_{HA} - \alpha \frac{\partial FB_{AH}(\theta b_{HA})}{\partial \theta b_{HA}}$$
$$\theta b'_{VA} = \theta b_{VA} - \alpha \frac{\partial FB_{AV}(\theta b_{VA})}{\partial \theta b_{VA}}$$

(Formula 51)

[Math 52]

$$\theta b'_{HB} = \theta b_{HB} - \alpha \frac{\partial FB_{BH}(\theta b_{HB})}{\partial \theta b_{HB}}$$
$$\theta b'_{VB} = \theta b_{VB} - \alpha \frac{\partial FB_{BV}(\theta b_{VB})}{\partial \theta b_{VB}}$$

(Formula 52)

[Math 53]

$$\theta b'_{HC} = \theta b_{HC} - \alpha \frac{\partial FB_{CH}(\theta b_{HC})}{\partial \theta b_{HC}}$$
$$\theta b'_{VC} = \theta b_{VC} - \alpha \frac{\partial FB_{CV}(\theta b_{VC})}{\partial \theta b_{VC}}$$

(Formula 53)

The cycle field angle adjusting unit A 204 performs the procedures of Steps 801, 802, and 803 in sequence and returns to the procedure of Step 801 after completing the procedure of Step 803. Constantly repeating the procedures of Steps 801 to 803, the cycle field angle adjusting unit A 204 sends updated values of the cycle $T_{CYCLE}$ camera horizontal and vertical field angles $\Theta b'_H$ and $\Theta b'_V$ calculated by the expressions above to the cycle imaging controller 215 so that the field angles of the cycle $T_{CYCLE}$ imaging zone of the camera 201 are adjusted.

The operation of the imaging zone adjusting apparatus of the embodiment is as described above. In Step 803, the field angles of the next cycle $T_{CYCLE}$ imaging zone of one's own camera terminal are calculated using the steepest descent method in which the quantities indicating the differences in field angle converge of 0 and the field angles of the cycle $T_{CYCLE}$ imaging zone of the camera 201 are adjusted for the field angles of the next cycle $T_{CYCLE}$ imaging zone. Therefore, with the procedures of Steps 801 to 803 being repeated, the field angles of the cycle $TA_{CYCLE}$ imaging zone 120A, cycle $TB_{CYCLE}$ imaging zone 120B, and cycle $TC_{CYCLE}$ imaging zone 120C, or the cycle $T_{CYCLE}$ imaging zones of the camera terminals 101A to 101C, become equal to one another. In other words, in addition to the adjustment of Embodiment 1, the position and imaging cycle of the hypothetical imaging zone (the cycle $T_{CYCLE}$ imaging zone in the embodiment) of one's own camera terminal is adjusted so that the imaging cycle of the hypothetical imaging zone (the cycle $T_{CYCLE}$ imaging zone in the embodiment) of one's own camera terminal and the imaging cycles of the hypothetical imaging zones (the cycle $T_{CYCLE}$ imaging zones in the embodiment) adjacent thereto are nearly equal.

With the camera terminals 101A to 101C, when the field angles of the cycle $T_{CYCLE}$ imaging zones are equal and the panning and tilting speeds $V_{P\_CONST}$ and $V_{T\_CONST}$ at which the orientation of the camera 201 is changed and the horizontal and vertical field angles $\Theta a_H$ and $\Theta a_V$ of the camera 201 that determine the size of the time T imaging zone are equal, the imaging cycles $T_{CYCLE}$ of the camera terminals 101A to 101C are equal according to the explanation of the imaging process of a cycle $T_{CYCLE}$ imaging zone. In the embodiment, the panning and tilting speeds $V_{P\_CONST}$ and $V_{T\_CONST}$ and the horizontal and vertical field angles $\Theta a_H$ and $\Theta a_V$ are predetermined fixed values. The values can be set for the same value with the camera terminals 101A to 101C. Then, according to the operation of the embodiment described above, the imaging cycles $T_{CYCLE}$ of the camera terminals 101A to 101C can be equal.

In the explanation of the above operation, the camera terminals 101A to 101C have the same panning and tilting speeds $V_{P\_CONST}$ and $V_{T\_CONST}$ and horizontal and vertical field angles $\Theta a_H$ and $\Theta a_V$. When the values cannot be the same because of restrictions in mechanical performance of the camera terminals 101A to 101C, the imaging cycles $T_{CYCLE}$ of the camera terminals 101A to 101C can be made equal by the process below.

According to the explanation of the imaging process of a cycle $T_{CYCLE}$ imaging zone, the imaging cycle $T_{CYCLE}$ of the cycle $T_{CYCLE}$ imaging zone can be calculated by an approximate expression presented by the expression 54. Then, the calculation In Step 802 is executed by the expressions 55 to 57 and the calculation In Step 803 is executed by the expressions 58 to 60 (here, the horizontal and vertical cycle $T_{CYCLE}$ imaging zone sizes $Lb_H$ and $Lb_V$ and the horizontal and vertical time T imaging zone sizes $La_H$ and $ab_V$ are functions of the field angles $\Theta b_H$ and $\Theta b_V$ of the cycle $T_{CYCLE}$ imaging zone and the field angles $\Theta a_H$ and $\Theta a_V$ of the time T imaging zone, respectively).

[Math 54]

$$T_{CYCLE} = \frac{Lb_H}{La_H \times V_{P\_CONST} \times T_S} \times \frac{LB_V}{LA_V \times V_{V\_CONST} \times T_S} \quad \text{(Formula 54)}$$

[Math 55]

$$\left.\begin{array}{l} FB_{AL}(T_{CYCLE\_A}) = 0 \\ FB_{AR}(T_{CYCLE\_A}) = (T_{CYCLE\_B} - T_{CYCLE\_A})^2 \\ FB_{AU}(T_{CYCLE\_A}) = 0 \\ FB_{AB}(T_{CYCLE\_A}) = 0 \\ FB_A(T_{CYCLE\_A}) = FB_{AL}(T_{CYCLE\_A}) + FB_{AR}(T_{CYCLE\_A}) + \\ \qquad FB_{AU}(T_{CYCLE\_A}) + FB_{AB}(T_{CYCLE\_A}) \end{array}\right\} \quad \text{(Formula 55)}$$

[Math 56]

$$\left.\begin{array}{l} FB_{BL}(T_{CYCLE\_B}) = (T_{CYCLE\_A} - T_{CYCLE\_B})^2 \\ FB_{BR}(T_{CYCLE\_B}) = (T_{CYCLE\_C} - T_{CYCLE\_B})^2 \\ FB_{BU}(T_{CYCLE\_B}) = 0 \\ FB_{BB}(T_{CYCLE\_B}) = 0 \\ FB_B(T_{CYCLE\_B}) = FB_{BL}(T_{CYCLE\_B}) + FB_{BR}(T_{CYCLE\_B}) + \\ \qquad FB_{BU}(T_{CYCLE\_B}) + FB_{BB}(T_{CYCLE\_B}) \end{array}\right\} \quad \text{(Formula 56)}$$

[Math 57]

$$\left.\begin{array}{l} FB_{CL}(T_{CYCLE\_C}) = (T_{CYCLE\_B} - T_{CYCLE\_C})^2 \\ FB_{CR}(T_{CYCLE\_C}) = 0 \\ FB_{CU}(T_{CYCLE\_C}) = 0 \\ FB_{CB}(T_{CYCLE\_C}) = 0 \\ FB_C(T_{CYCLE\_C}) = FB_{CL}(T_{CYCLE\_C}) + FB_{CR}(T_{CYCLE\_C}) + \\ \qquad FB_{CU}(T_{CYCLE\_C}) + FB_{CB}(T_{CYCLE\_C}) \end{array}\right\} \quad \text{(Formula 57)}$$

[Math 58]

$$\left.\begin{array}{l} \theta b'_{HA} = \theta b_{HA} - \alpha \dfrac{\partial FB_A(T_{CYCLE\_A})}{\partial \theta b_{HA}} \\ \theta b'_{VA} = \theta b_{VA} - \alpha \dfrac{\partial FB_A(T_{CYCLE\_A})}{\partial \theta b_{VA}} \\ \theta a'_{HA} = \theta \alpha_{HA} - \alpha \dfrac{\partial FB_A(T_{CYCLE\_A})}{\partial \theta a_{HA}} \\ \theta a'_{VA} = \theta a_{VA} - \alpha \dfrac{\partial FB_A(T_{CYCLE\_A})}{\partial \theta b_{VA}} \\ V'_{P\_CONST\_A} = V_{P\_CONST\_A} - \alpha \dfrac{\partial FB_A(T_{CYCLE\_A})}{\partial V_{P\_CONST\_A}} \\ V'_{T\_CONST\_A} = V_{T\_CONST\_A} - \alpha \dfrac{\partial FB_A(T_{CYCLE\_A})}{\partial V_{T\_CONST\_A}} \\ T'_{SA} = T_{SA} - \alpha \dfrac{\partial FB_A(T_{CYCLE\_A})}{\partial T_{SA}} \end{array}\right\} \quad \text{(Formula 58)}$$

[Math 59]

$$\left.\begin{array}{l} \theta b'_{HB} = \theta b_{HB} - \alpha \dfrac{\partial FB_B(T_{CYCLE\_B})}{\partial \theta b_{HB}} \\ \theta b'_{VB} = \theta b_{VB} - \alpha \dfrac{\partial FB_B(T_{CYCLE\_B})}{\partial \theta b_{VB}} \\ \theta a'_{HB} = \theta \alpha_{HB} - \alpha \dfrac{\partial FB_B(T_{CYCLE\_B})}{\partial \theta a_{HB}} \\ \theta a'_{VB} = \theta a_{VB} - \alpha \dfrac{\partial FB_B(T_{CYCLE\_B})}{\partial \theta b_{VB}} \\ V'_{P\_CONST\_B} = V_{P\_CONST\_B} - \alpha \dfrac{\partial FB_B(T_{CYCLE\_B})}{\partial V_{P\_CONST\_B}} \\ V'_{T\_CONST\_B} = V_{T\_CONST\_B} - \alpha \dfrac{\partial FB_B(T_{CYCLE\_B})}{\partial V_{T\_CONST\_B}} \\ T'_{SB} = T_{SB} - \alpha \dfrac{\partial FB_B(T_{CYCLE\_B})}{\partial T_{SB}} \end{array}\right\} \quad \text{(Formula 59)}$$

[Math 60]

$$\left.\begin{array}{l} \theta b'_{HC} = \theta b_{HC} - \alpha \dfrac{\partial FB_C(T_{CYCLE\_C})}{\partial \theta b_{HC}} \\ \theta b'_{VC} = \theta b_{VC} - \alpha \dfrac{\partial FB_C(T_{CYCLE\_C})}{\partial \theta b_{VC}} \\ \theta a'_{HC} = \theta \alpha_{HC} - \alpha \dfrac{\partial FB_C(T_{CYCLE\_C})}{\partial \theta a_{HC}} \\ \theta a'_{VC} = \theta a_{VC} - \alpha \dfrac{\partial FB_C(T_{CYCLE\_C})}{\partial \theta b_{VC}} \\ V'_{P\_CONST\_C} = V_{P\_CONST\_C} - \alpha \dfrac{\partial FB_C(T_{CYCLE\_C})}{\partial V_{P\_CONST\_C}} \\ V'_{T\_CONST\_C} = V_{T\_CONST\_C} - \alpha \dfrac{\partial FB_C(T_{CYCLE\_C})}{\partial V_{T\_CONST\_C}} \\ T'_{SC} = T_{SC} - \alpha \dfrac{\partial FB_C(T_{CYCLE\_C})}{\partial T_{SC}} \end{array}\right\} \quad \text{(Formula 60)}$$

With the cycle field angle adjusting unit A 204 repeating the procedures of Steps 801 to 803, the effect that the imaging cycle $T_{CYCLE}$ is made equal is obtained. The procedures of Steps 802 and 803 are repeated for the cycle $T_{CYCLE}$ imaging zone of another camera adjacent to the cycle $T_{CYCLE}$ imaging zone of one's own camera terminal selected In Step 801.

Therefore, even if any change occurs in the field angles of the cycle $T_{CYCLE}$ imaging zone of another camera adjacent to the cycle $T_{CYCLE}$ imaging zone of one's own camera terminal (and the panning and tilting speeds $V_{P\_CONST}$ and $V_{T\_CONST}$, imaging interval $T_S$, and field angles of the time T imaging zone) at each time point, the effect that the imaging cycle $T_{CYCLE}$ is made equal can be obtained in accordance with the change. The imaging cycle $T_{CYCLE}$ of the cycle $T_{CYCLE}$ imaging zone described above may be changed when:

(1) the field angles of the cycle $T_{CYCLE}$ imaging zone (and the panning and tilting speeds $V_{P\_CONST}$ and $V_{T\_CONST}$, imaging interval $T_S$, and field angles of the time T imaging zone) of a camera terminal is intentionally changed;

(2) an additional camera terminal is installed; or (3) some of the camera terminals are removed or unserviceable. The operation of the present invention in response to the situational changes is described in Embodiments 6 and 7, described later. Even if the cycle $T_{CYCLE}$ imaging zone field angles sent from the camera terminals are changed or not sent or new cycle $T_{CYCLE}$ imaging zone fields angles are sent according to the changes, the imaging zone adjusting apparatus of the present invention allows the camera terminals to have an equal imaging cycle $T_{CYCLE}$ in accordance with changes in field angle of the cycle $T_{CYCLE}$ imaging zones.

In the embodiment, the function FB ( ) presenting the difference in field angle and the difference in imaging cycle $T_{CYCLE}$ is a function raising the difference in field angle or the difference in imaging cycle $T_{CYCLE}$ to the second power as presented by the expressions 48 to 50 and the expressions 55 to 57. As in Embodiment 1, the function FB ( ) can raise the difference in field angle or the difference in imaging cycle $T_{CYCLE}$ to an even-numbered power such as the fourth, sixth, and tenth power. The function FB ( ) can also yield the absolute value of the difference in field angle or the difference in imaging cycle $T_{CYCLE}$. The functions FB ( ) have the minimum value when the difference in field angle or the difference in imaging cycle $T_{CYCLE}$ is 0. Therefore, the steepest descent method In Step 803 leads the difference in field angle or the difference in imaging cycle $T_{CYCLE}$ to 0, whereby the same effect can be obtained.

Needless to say, as in Embodiment 1, the same effect can be obtained even if the function FB ( ) presenting the difference in field angle or the difference in imaging cycle $T_{CYCLE}$ has a minimal value, not the minimum value, when the difference in field angle or the difference in imaging cycle $T_{CYCLE}$ is 0 as long as the function FB ( ) has the minimum value when the difference in field angle or the difference in imaging cycle $T_{CYCLE}$ is 0 within a range over which the field angles or imaging cycle $T_{CYCLE}$ is changed.

Further, in the embodiment, as shown in FIG. 32, the cycle field angle adjusting unit A 204 is distributed at each camera terminal 101A to 101C. Needless to say, the same effect can be obtained where only one cycle field angle adjusting unit A 204 is present and the only one cycle field angle adjusting unit A 204 controls the cycle $T_{CYCLE}$ imaging zone field angles (and the panning and tilting speeds $V_{P\_CONST}$ and $V_{T\_CONST}$, imaging interval $T_S$, and field angles of the time T imaging zone) of the camera 201 of the camera terminals 101A to 101C.

Further, in the embodiment, the network 103 is a network line used for general communication. Needless to say, the same effect can be obtained regardless of that the network 103 is a wired or wireless network.

In Embodiment 1, the imaging zone adjusting apparatus that self-adjusts the cycle $T_{CYCLE}$ imaging zones of the cameras of the camera terminals so that a combined zone of the cycle $T_{CYCLE}$ imaging zones of the cameras of the camera terminals completely covers a specific imaging target zone is described. In the embodiment, the operation of the imaging zone adjusting apparatus that further self-adjusts the imaging cycles $T_{CYCLE}$ of the cameras of the camera terminals to be equal is described. When the adjustments cannot be performed independently, a function that linearly adds the functions FA ( ) and FB ( ) for the terms that cannot be adjusted independently is defined and the steepest descendent method is applied. For example, as presented by the expression 61, a function FAB ( ) that linearly adds the functions FA ( ) and FB ( ) is defined and the steepest descent method is applied.

[Math 61]

$$\left.\begin{aligned}
X_{AL} &= G_{AL}(\theta b_{PA}, \theta b_{TA}, \theta b_{HA}, \theta b_{VA}) \\
X_{AR} &= G_{AR}(\theta b_{PA}, \theta b_{TA}, \theta b_{HA}, \theta b_{VA}) \\
Y_{AU} &= G_{AU}(\theta b_{PA}, \theta b_{TA}, \theta b_{HA}, \theta b_{VA}) \\
Y_{AB} &= G_{AB}(\theta b_{PA}, \theta b_{TA}, \theta b_{HA}, \theta b_{VA}) \\
FA_A \begin{pmatrix} X_{AL}, \\ X_{AR}, \\ Y_{AU}, \\ Y_{AB} \end{pmatrix} &= FA_A \begin{pmatrix} \theta b_{PA}, \\ \theta b_{TA}, \\ \theta b_{HA}, \\ \theta b_{VA} \end{pmatrix} = \\
&\left( X_{TL} - G_{AL} \begin{pmatrix} \theta b_{PA}, \\ \theta b_{TA}, \\ \theta b_{HA}, \\ \theta b_{VA} \end{pmatrix} - C \right)^2 + \\
&\left( G_{AR} \begin{pmatrix} \theta b_{PA}, \\ \theta b_{TA}, \\ \theta b_{HA}, \\ \theta b_{VA} \end{pmatrix} - X_{BL} - C \right)^2 + \\
&\left( Y_{TU} - G_{AU} \begin{pmatrix} \theta b_{PA}, \\ \theta b_{TA}, \\ \theta b_{HA}, \\ \theta b_{VA} \end{pmatrix} - C \right)^2 + \\
&\left( G_{AB} \begin{pmatrix} \theta b_{PA}, \\ \theta b_{TA}, \\ \theta b_{HA}, \\ \theta b_{VA} \end{pmatrix} - Y_{TB} - C \right)^2 \\
FB_A(\theta b_{HA}, \theta b_{VA}) &= FB_{AH}(\theta b_{HA}) + FB_{AV}(\theta b_{VA}) \\
FAB_A \begin{pmatrix} \theta b_{PA}, \\ \theta b_{TA}, \\ \theta b_{HA}, \\ \theta b_{VA} \end{pmatrix} &= FA_A \begin{pmatrix} \theta b_{PA}, \\ \theta b_{TA}, \\ \theta b_{HA}, \\ \theta b_{VA} \end{pmatrix} + FB_A(\theta b_{HA}, \theta b_{VA}) \\
\theta b'_{PA} &= \theta b_{PA} - \alpha \frac{\partial FAB_A(\theta b_{PA}, \theta b_{TA}, \theta b_{HA}, \theta b_{VA})}{\partial \theta b_{PA}} \\
\theta b'_{TA} &= \theta b_{TA} - \alpha \frac{\partial FAB_A(\theta b_{PA}, \theta b_{TA}, \theta b_{HA}, \theta b_{VA})}{\partial \theta b_{TA}} \\
\theta b'_{HA} &= \theta b_{HA} - \alpha \frac{\partial FAB_A(\theta b_{PA}, \theta b_{TA}, \theta b_{HA}, \theta b_{VA})}{\partial \theta b_{HA}} \\
\theta b'_{VA} &= \theta b_{VA} - \alpha \frac{\partial FAB_A(\theta b_{PA}, \theta b_{TA}, \theta b_{HA}, \theta b_{VA})}{\partial \theta b_{VA}}
\end{aligned}\right\} \quad \text{(Formula 61)}$$

Embodiment 3

Embodiment 3 of the present invention is described hereafter. In the embodiment, an imaging zone adjusting apparatus in which the cycle $T_{CYCLE}$ imaging zones of the cameras of the camera terminals are self-adjusted so that a combined zone of the cycle $T_{CYCLE}$ imaging zones of the cameras of the camera terminals completely covers a specific imaging target zone and the imaging cycles $T_{CYCLE}$ of the cameras of the camera terminals are self-adjusted to be minimized is described with reference to FIGS. 34 and 35.

First, advantages of the imaging cycles $T_{CYCLE}$ of the cameras of the camera terminals being minimized are described. The imaging zone adjusting apparatus described in Embodiment 1 allows the imaging zones of the cameras of the camera terminals to completely cover a specific imaging target zone. This does not mean that the imaging cycles $T_{CYCLE}$ of the cameras of the camera terminals are minimized. When the imaging cycle $T_{CYCLE}$ of the camera of a camera terminal is larger, the update of images of the cycle $T_{CYCLE}$ imaging zone imaged by that camera terminal is delayed and it takes more time to find a detection target within that cycle $T_{CYCLE}$ imaging zone. This is problematic when the imaging zone adjusting apparatus of the present invention is used for surveillance. Therefore, it is desired that the imaging cycles $T_{CYCLE}$ of the cameras of the camera terminals are minimized.

Figure 34:
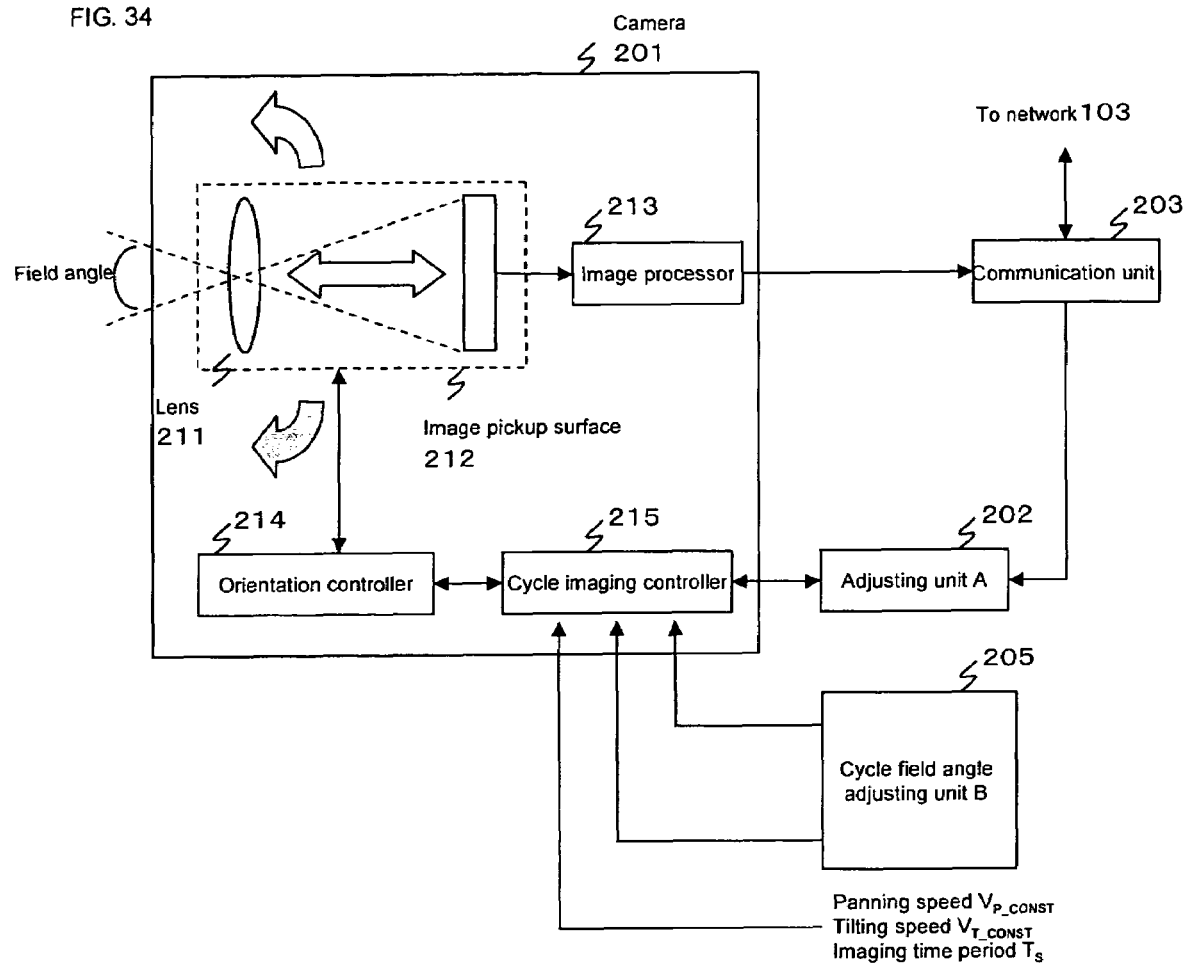
FIG. 34 is a block diagram showing the structure of a camera terminal in Embodiment 3 of the present invention.

Components of the imaging zone adjusting apparatus of the embodiment are described hereafter. FIG. 34 is a block diagram showing the structure of the camera terminals 101A to 101C in FIG. 26(*a*). The camera terminals 101A to 101C each comprise at least a camera 201, an adjusting unit A 202, a communications unit 203, and a cycle field angle adjusting unit B 205. The camera 201 comprises a lens 211, an image pickup surface 212, an image processor 213, an orientation controller 214, and a cycle imaging controller 215. The camera 201, adjusting unit A 202, communications unit 203, lens 211, image pickup surface 212, image processor 213, orientation controller 214, and cycle imaging controller 215 in FIG. 34 are the same as those in the block diagram showing the structure of the camera terminals 101A to 101C of Embodiment 1 in FIG. 27. In the block diagram showing the structure of the camera terminals 101A to 101C of the embodiment in FIG. 34, the cycle $T_{CYCLE}$ camera horizontal and vertical field angles $\Theta b_H$ and $\Theta b_V$ and the time T camera horizontal and vertical field angles $\Theta a_H$ and $\Theta a_V$ are not fixed values. The cycle field angle adjusting unit B 205 comprising a processor to adjust and output the field angles of the cycle $T_{CYCLE}$ imaging zone and time T imaging zone of the camera 201 is added.

This is the only difference in components between Embodiment 1 and the embodiment. The imaging zone adjusting apparatus has the same structure as that in FIG. 26(*a*), the imaging zone positions on the real space plane 113 of the imaging zone adjusting apparatus are the same as those in FIG. 26(*b*), and the operation terminal 102 has the same structure as that in FIG. 28.

With the addition of the cycle field angle adjusting unit B 205, in the embodiment, the adjusting unit A 202 and cycle field angle adjusting unit B 205 adjust the position and imaging cycle of the hypothetical imaging zone (the cycle $T_{CYCLE}$ imaging zone in the embodiment) of one's own camera terminal so that the imaging cycle of the hypothetical imaging zone (the cycle $T_{CYCLE}$ imaging zone in the embodiment) of one's own camera terminal is made smaller in addition to the adjustment of Embodiment 1.

Operation of the imaging zone adjusting apparatus of the embodiment is described hereafter. The cycle field angle adjusting unit B 205 is the only additional unit in the embodiment compared to Embodiment 1. The cycle field angle adjusting unit B 205 sends the cycle $T_{CYCLE}$ camera horizontal and vertical field angles $\Theta b_H$ and $\Theta b_V$ and the time T camera horizontal and vertical field angles $\Theta a_H$ and $\Theta a_V$ to the cycle imaging controller 215. Needless to say, the embodiment has all effects described for Embodiment 1. In other words, the imaging zones of the cameras of the camera terminals are self-adjusted so that a combined zone of the imaging zones of the cameras of the camera terminals completely covers a specific imaging target zone.

The cycle field angle adjusting unit B 205 performs the procedures of the steps below and shown in FIG. 35 based on field angel information of the cycle $T_{CYCLE}$ imaging zone of one's own camera terminal.

First, in Step 1001, updated values of the cycle $T_{CYCLE}$ camera field angles of one's own camera terminal that lead the cycle $T_{CYCLE}$ camera field angles to 0 are calculated. The calculation process is described hereafter. First, a function FC ( ) presenting a quantity indicating the magnitude of the cycle $T_{CYCLE}$ camera field angles is selected. In the embodiment, the function is presented by the expression 62. The expression 62 corresponds to the camera terminals 101A to 101C and yields the product of the cycle $T_{CYCLE}$ camera horizontal and vertical field angles $\Theta b_H$ and $\Theta b_V$ as the quantity indicating their magnitude. Then, the generally known steepest descent method is used as presented by the expression 63 to calculate the updated values of the cycle $T_{CYCLE}$ camera field angles of one's own camera terminal. In the expression 63, $\Theta b'_{HA}$, $\Theta b'_{VA}$, $\Theta b'_{HB}$, $\Theta b'_{VB}$, $\Theta b'_{HC}$, and $\Theta b'_{VC}$ comprise the updated values of the cycle $T_{CYCLE}$ camera field angles of the cycle $TA_{CYCLE}$ imaging zone 120A to cycle $TC_{CYCLE}$ imaging zone 120C, respectively, and α is a constant.

In Step 1002, a determination is made as to whether the updated values of the cycle $T_{CYCLE}$ camera field angles calculated In Step 1001 are equal to or less than the time T camera field angles, in other words, whether the updated value of the cycle $T_{CYCLE}$ camera horizontal field angle $\Theta b'_H$ is equal to or less than the time T camera horizontal field angle $\Theta a_H$ (for the vertical field angle, whether the updated value of the cycle $T_{CYCLE}$ camera vertical field angle $\Theta b'_V$ is equal to or less than the time T camera horizontal field angle $\Theta a_V$).

[Math 62]

$$\left.\begin{aligned} FC_A(\theta b_{HA}, \theta b_{VA}) &= \theta b_{HA} \times \theta b_{VA} \\ FC_B(\theta b_{HB}, \theta b_{VB}) &= \theta b_{HB} \times \theta b_{VB} \\ FC_C(\theta b_{HC}, \theta b_{VC}) &= \theta b_{HC} \times \theta b_{VC} \end{aligned}\right\} \quad \text{(Formula 62)}$$

[Math 63]

$$\left.\begin{aligned} \theta b'_{HA} &= \theta b_{HA} - \alpha \frac{\partial FC_A(\theta b_{HA}, \theta b_{VA})}{\partial \theta b_{HA}} \\ \theta b'_{VA} &= \theta b_{VA} - \alpha \frac{\partial FC_A(\theta b_{HA}, \theta b_{VA})}{\partial \theta b_{VA}} \\ \theta b'_{HB} &= \theta b_{HB} - \alpha \frac{\partial FC_B(\theta b_{HB}, \theta b_{VB})}{\partial \theta b_{HB}} \\ \theta b'_{VB} &= \theta b_{VB} - \alpha \frac{\partial FC_B(\theta b_{HB}, \theta b_{VB})}{\partial \theta b_{VB}} \\ \theta b'_{HC} &= \theta b_{HC} - \alpha \frac{\partial FC_C(\theta b_{HC}, \theta b_{VC})}{\partial \theta b_{HC}} \\ \theta b'_{VC} &= \theta b_{VC} - \alpha \frac{\partial FC_C(\theta b_{HC}, \theta b_{VC})}{\partial \theta b_{VC}} \end{aligned}\right\} \quad \text{(Formula 63)}$$

When the updated values of the cycle $T_{CYCLE}$ camera field angles are greater than those of the time T camera field angles, the updated values of the cycle $T_{CYCLE}$ camera field angles are adopted as the cycle $T_{CYCLE}$ camera field angles and the cycle $T_{CYCLE}$ camera field angles of the camera terminals 101A to 101C are adjusted for the cycle $T_{CYCLE}$ camera field angles.

When the updated values of the cycle $T_{CYCLE}$ camera field angles are equal to or less than the time T camera field angles, updated values of the time T camera field angles of one's own camera terminal that lead the time T camera field angles to 0 are calculated in Step 1004 because the cycle $T_{CYCLE}$ camera field angles cannot be adjusted for values equal to or less than the time T camera field angles. The calculation process is described hereafter. First, a function FD ( ) presenting a quantity indicating the magnitude of the time T camera field angles is selected. In this embodiment, the function is presented by the expression 64. The expression 64 corresponds to the camera terminals 101A to 101C and yields the product of the time T camera horizontal and vertical field angles $\Theta a_H$ and $\Theta a_V$ as the quantity indicating their magnitude. Then, the generally known steepest descent method is used as presented by the expression 65 to calculate the updated values of the time T camera field angles of one's own camera terminal. In the expression 65, $\Theta b'_{HA}$, $\Theta b'_{VA}$, $\Theta b'_{HB}$, $\Theta b'_{VB}$, $\Theta b'_{HC}$, and $\Theta b'_{VC}$ comprise the updated values of the time T camera field angles of the cycle $TA_{CYCLE}$ imaging zone 120A to cycle $TC_{CYCLE}$ imaging zone 120C, respectively, and α is a constant.

[Math 64]

$$FD_A(\theta a_{HA}, \theta b_{VA}) = \theta a_{HA} \times \theta a_{VA}$$
$$FD_B(\theta a_{HB}, \theta a_{VB}) = \theta a_{HB} \times \theta a_{VB}$$
$$FD_C(\theta a_{HC}, \theta a_{VC}) = \theta a_{HC} \times \theta a_{VC}$$

(Formula 64)

[Math 65]

$$\theta a'_{HA} = \theta a_{HA} - \alpha \frac{\partial FD_A(\theta a_{HA}, \theta b_{VA})}{\partial \theta a_{HA}}$$
$$\theta a'_{VA} = \theta a_{VA} - \alpha \frac{\partial FD_A(\theta a_{HA}, \theta b_{VA})}{\partial \theta a_{VA}}$$
$$\theta a'_{HB} = \theta a_{HB} - \alpha \frac{\partial FD_B(\theta a_{HB}, \theta a_{VB})}{\partial \theta a_{HB}}$$
$$\theta a'_{VB} = \theta a_{VB} - \alpha \frac{\partial FD_B(\theta a_{HB}, \theta a_{VB})}{\partial \theta a_{VB}}$$
$$\theta a'_{HC} = \theta a_{HC} - \alpha \frac{\partial FD_C(\theta a_{HC}, \theta a_{VC})}{\partial \theta a_{HC}}$$
$$\theta a'_{VC} = \theta a_{VC} - \alpha \frac{\partial FD_C(\theta a_{HC}, \theta a_{VC})}{\partial \theta a_{VC}}$$

(Formula 65)

Then, in Step 1005, in Step 1004, the updated values of the time T camera field angles are adopted as the time T camera field angles and the time T camera field angles of the cycle $T_{CYCLE}$ imaging zones of the camera terminals 101A to 101C are adjusted for the time T camera field angles.

The cycle field angle adjusting unit B 205 performs the procedures of Steps 1001 to 1005 in sequence and returns to the procedure of Step 1001 after completing the procedure of Step 1003 or 1005. Constantly repeating the procedures of Steps 1001 to 1005, the cycle field angle adjusting unit B 205 sends updated values of the cycle $T_{CYCLE}$ camera horizontal and vertical field angles $\Theta b'_H$ and $\Theta b'_V$ or of the time T camera horizontal and vertical field angles $\Theta a'_H$ and $\Theta a'_V$ calculated by the expressions above to the cycle imaging controller 215 so that the field angles of the cycle $T_{CYCLE}$ imaging zone of the camera 201 are adjusted.

The operation of the imaging zone adjusting apparatus of this embodiment is as described above. In Step 1001 or 1004, the field angles of the next cycle $T_{CYCLE}$ imaging zone of one's own camera terminal is calculated using the steepest descent method in which the field angles converge of 0 and the field angles of the cycle $T_{CYCLE}$ imaging zone of the camera 201 are adjusted for the field angles of the next the cycle $T_{CYCLE}$ imaging zone. With the procedures of Steps 1001 to 1005 being repeated, the field angles of the cycle $TA_{CYCLE}$ imaging zone 120A, cycle $TB_{CYCLE}$ imaging zone 120B, and cycle $TC_{CYCLE}$ imaging zone 120C, or the cycle $T_{CYCLE}$ imaging zones of the camera terminals 101A to 101C, are made smaller. If the field angles of the cycle $T_{CYCLE}$ imaging zone of each camera terminal 101A to 101C becomes smaller, the imaging zone cycles $T_{CYCLE}$ of the camera terminals 101A to 101C become smaller according to the explanation of the imaging process of a cycle $T_{CYCLE}$ imaging zone. In addition to the adjustment in Embodiment 1, the position and imaging cycle of the hypothetical imaging zone (the cycle $T_{CYCLE}$ imaging zone in the embodiment) of one's own camera terminal is adjusted so that the imaging cycle of the hypothetical imaging zone (the cycle $T_{CYCLE}$ imaging zone in the embodiment) of one's own camera terminal becomes smaller in the embodiment.

With the cycle field image adjusting unit B 205 repeating the procedures of Steps 1001 to 1005, the effect that the imaging cycle $T_{CYCLE}$ is made smaller is obtained. No information on the cycle $T_{CYCLE}$ imaging zones of the other cameras is necessary for the repeated procedures of Steps 1001 to 1005. Therefore, even if any change occurs in the cycle $T_{CYCLE}$ imaging zones of the other cameras at each time point, the effect that the imaging cycle $T_{CYCLE}$ is made smaller can be obtained regardless of that change.

In this embodiment, the functions FC ( ) and FD ( ) yield the products of horizontal and vertical field angles, respectively, as presented by the expressions 62 and 57. Needless to say, the same effect can be obtained even if the functions FC ( ) and FD ( ) raise the products of horizontal and vertical field angles to a N-th power (N is a positive real number) because the functions FC ( ) and FD ( ) have the minimum values when the field angles are 0 and, therefore, the field angles converge of 0 as a result of the steepest descent method In Steps 1001 and 1004.

Needless to say, similar to Embodiment 1, the same effect can be obtained even if the functions FC ( ) and FD ( ) presenting the magnitudes of the field angles have minimal values, not the minimum values, when the field angles are 0 as long as the functions FC ( ) and FD ( ) have the minimum values when the field angles are 0 within ranges over which the field angles are changed. Further, in this embodiment, as shown in FIG. 34, the cycle field angle adjusting unit B 205 is distributed at each camera terminal 101A to 101C. Needless to say, the same effect can be obtained where only one cycle field angle adjusting unit B 205 is present and the only one cycle field angle adjusting unit B 205 controls the field angles of the cycle $T_{CYCLE}$ imaging zones of the cameras 201 of the camera terminals 101A to 101C.

Further, in this embodiment, the network 103 is a network line used for general communications. Needless to say, the same effect can be obtained regardless of whether the network 103 is a wired or wireless network.

In Embodiment 1, the imaging zone adjusting apparatus that self-adjusts the cycle $T_{CYCLE}$ imaging zones of the cameras of the camera terminals so that a combined zone of the cycle $T_{CYCLE}$ imaging zones of the cameras of the camera terminals completely covers a specific imaging target zone is described. In the embodiment, the operation of the imaging zone adjusting apparatus that further self-adjusts the imaging cycles $T_{CYCLE}$ of the cameras of the camera terminals to be smaller is described. When the self-adjustment cannot be performed independently, a function that linearly adds the functions FA ( ) and FC ( ) for the terms that cannot be adjusted independently is defined and the steepest descendent method is applied. For example, as present by the expression 66, a function FAC ( ) that linearly adds the functions FA ( ) and FC ( ) is defined and the steepest descendent method is applied.

[Math 66]

$$\begin{aligned}
X_{AL} &= G_{AL}(\theta b_{PA}, \theta b_{TA}, \theta b_{HA}, \theta b_{VA}) \\
X_{AR} &= G_{AR}(\theta b_{PA}, \theta b_{TA}, \theta b_{HA}, \theta b_{VA}) \\
Y_{AU} &= G_{AU}(\theta b_{PA}, \theta b_{TA}, \theta b_{HA}, \theta b_{VA}) \\
Y_{AB} &= G_{AB}(\theta b_{PA}, \theta b_{TA}, \theta b_{HA}, \theta b_{VA})
\end{aligned}$$

$$FA_A \begin{pmatrix} X_{AL}, \\ X_{AR}, \\ Y_{AU}, \\ Y_{AB} \end{pmatrix} = FA_A \begin{pmatrix} \theta b_{PA}, \\ \theta b_{TA}, \\ \theta b_{HA}, \\ \theta b_{VA} \end{pmatrix} =$$

$$\left( X_{TL} - G_{AL} \begin{pmatrix} \theta b_{PA}, \\ \theta b_{TA}, \\ \theta b_{HA}, \\ \theta b_{VA} \end{pmatrix} - C \right)^2 +$$

$$\left( G_{AR} \begin{pmatrix} \theta b_{PA}, \\ \theta b_{TA}, \\ \theta b_{HA}, \\ \theta b_{VA} \end{pmatrix} - X_{BL} - C \right)^2 +$$

$$\left( Y_{TU} - G_{AU} \begin{pmatrix} \theta b_{PA}, \\ \theta b_{TA}, \\ \theta b_{HA}, \\ \theta b_{VA} \end{pmatrix} - C \right)^2 +$$

$$\left( G_{AB} \begin{pmatrix} \theta b_{PA}, \\ \theta b_{TA}, \\ \theta b_{HA}, \\ \theta b_{VA} \end{pmatrix} - Y_{TB} - C \right)^2$$

$$FC_A(\theta b_{HA}, \theta b_{VA}) = \theta b_{HA} \times \theta b_{VA}$$

$$FAC_A \begin{pmatrix} \theta b_{PA}, \\ \theta b_{TA}, \\ \theta b_{HA}, \\ \theta b_{VA} \end{pmatrix} = FA_A \begin{pmatrix} \theta b_{PA}, \\ \theta b_{TA}, \\ \theta b_{HA}, \\ \theta b_{VA} \end{pmatrix} + FC_A(\theta b_{HA}, \theta b_{VA})$$

$$\theta b'_{PA} = \theta b_{PA} - \alpha \frac{\partial FAC_A(\theta b_{PA}, \theta b_{TA}, \theta b_{HA}, \theta b_{VA})}{\partial \theta b_{PA}}$$

$$\theta b'_{TA} = \theta b_{TA} - \alpha \frac{\partial FAC_A(\theta b_{PA}, \theta b_{TA}, \theta b_{HA}, \theta b_{VA})}{\partial \theta b_{TA}}$$

$$\theta b'_{HA} = \theta b_{HA} - \alpha \frac{\partial FAC_A(\theta b_{PA}, \theta b_{TA}, \theta b_{HA}, \theta b_{VA})}{\partial \theta b_{HA}}$$

$$\theta b'_{VA} = \theta b_{VA} - \alpha \frac{\partial FAC_A(\theta b_{PA}, \theta b_{TA}, \theta b_{HA}, \theta b_{VA})}{\partial \theta b_{VA}}$$

(Formula 66)

Figure 35:
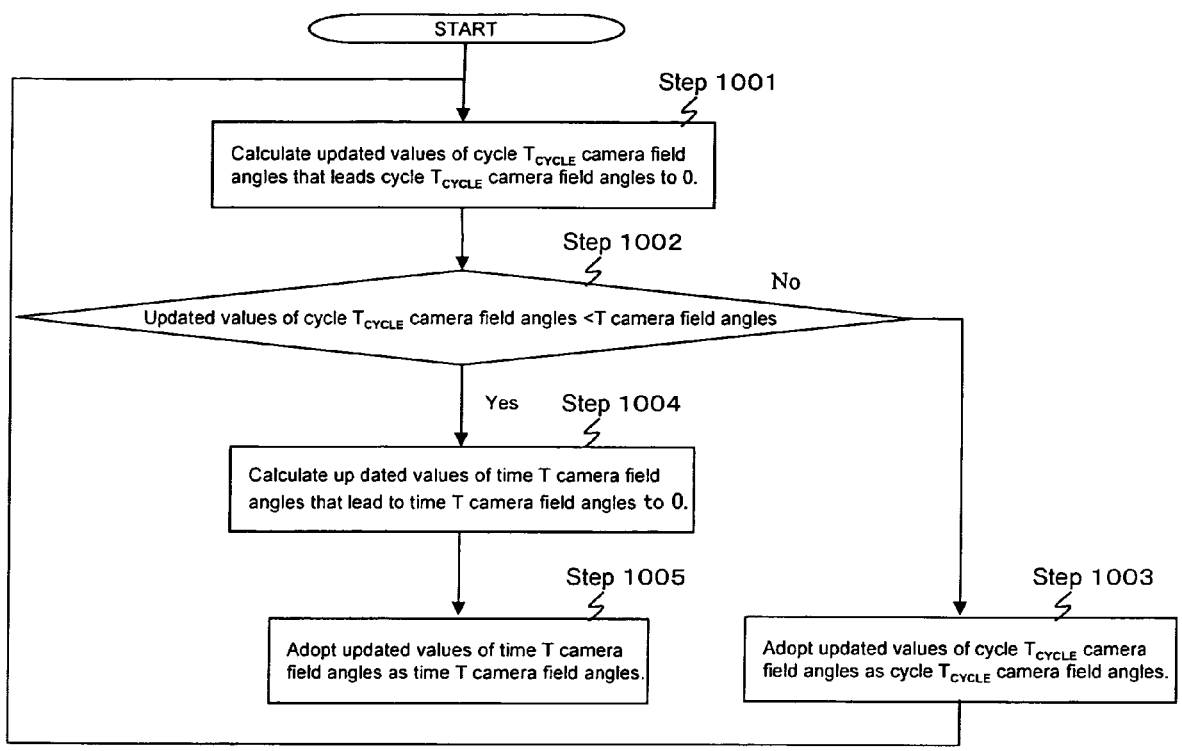
FIG. 35 is a flowchart of the procedure performed by the field angle adjustor B in Embodiment 3 of the present invention.

Further, in this embodiment, the procedure of the flowchart shown in FIG. 35 realizes a process to make the field angles of the cycle $T_{CYCLE}$ imaging equal to or less than the field angles of the time T imaging zone. In Embodiments 1, 2, and 4, when the field angles of the cycle $T_{CYCLE}$ imaging zone need to be made equal to or less than the field angles of the time T imaging zone, the procedure of the flowchart shown in FIG. 35 can be incorporated to realize this process.

Embodiment 4

Embodiment 4 of the present invention is described hereafter. In this embodiment, an imaging zone adjusting apparatus in which the positions of the cycle $T_{CYCLE}$ imaging zones of the cameras of the camera terminals are self-adjusted so that a combined zone of the cycle $T_{CYCLE}$ imaging zones of the cameras of the camera terminals completely covers a specific imaging target zone and, further, the aspect ratios of the cycle $T_{CYCLE}$ imaging zones of the cameras of the camera terminals are self-adjusted for specific aspect ratios, whereby the specific imaging target zone is efficiently imaged is described with reference to FIGS. 29 to 32. In this embodiment, the specific aspect ratios comprise the aspect ratios of the time T imaging zones.

First, the aspect ratio is described. The aspect ratio of an imaging zone in this embodiment is the ratio of length to width of a time T imaging zone or a cycle $T_{CYCLE}$ imaging zone, which is a so-called aspect ratio. With reference to FIGS. 12(a) and (b), the aspect ratio can be expressed as the ratio of the horizontal field angle to the vertical field angle of a camera. Then, in Embodiment 4, the aspect ratio of a cycle $T_{CYCLE}$ imaging zone is expressed by a cycle $T_{CYCLE}$ camera horizontal field angle $\Theta b_H$/a cycle $T_{CYCLE}$ camera vertical field angle $\Theta b_V$ and the aspect ratio of a time T imaging zone is expressed by a time T camera horizontal field angle $\Theta a_H$/a time T camera vertical field angle $\Theta a_V$.

The fact that a specific imaging target zone is efficiently imaged by self-adjusting the aspect ratio of the cycle $T_{CYCLE}$ imaging zone of the camera terminals for the aspect ratio of the time T imaging zone is described with reference to FIGS. 36 and 37 and using examples. Here, the above "efficiently imaged" means that cameras are required less motion to image one and the same hypothetical imaging zone (the cycle $T_{CYCLE}$ imaging zone in this embodiment) or overlapping zone with adjacent hypothetical imaging zones (the cycle $T_{CYCLE}$ imaging zone in this embodiment) are smaller.

FIGS. 36(a), 36(b), 37(a), and 37(b) illustrate the positions of the cycle $T_{CYCLE}$ imaging zones of the cameras of the camera terminals being self-adjusted so that a combined zone of the cycle $T_{CYCLE}$ imaging zones of the cameras of the camera terminals completely covers a specific imaging target zone according to the operation described in Embodiment 1. The camera terminal 101B, cycle $TA_{CYCLE}$ imaging zone 120A, cycle $TB_{CYCLE}$ imaging zone 120B, cycle $TC_{CYCLE}$ imaging zone 120C, and imaging target zone 121 in the figures are the same as those of Embodiment 1 in FIG. 26(a). A time T imaging zone 2701, a time T camera horizontal field angle $\Theta a_H$ 2702, a time T camera vertical field angle $\Theta a_V$ 2703, a cycle $T_{CYCLE}$ camera horizontal field angle $\Theta b_H$ 2704, and a cycle $T_{CYCLE}$ camera vertical field angle $\Theta b_V$ 2705 comprise the same as the time T imaging zone 5202, time T camera horizontal field angle $\Theta a_H$ 5204, time T camera vertical field angle $\Theta a_V$ 5205, cycle $T_{CYCLE}$ camera horizontal field angle $\Theta b_H$ 5212, and cycle $T_{CYCLE}$ camera vertical field angle $\Theta b_V$ 5213 in FIGS. 12(a) and (b). These elements are all for the camera terminal 101B.

Figure 36:
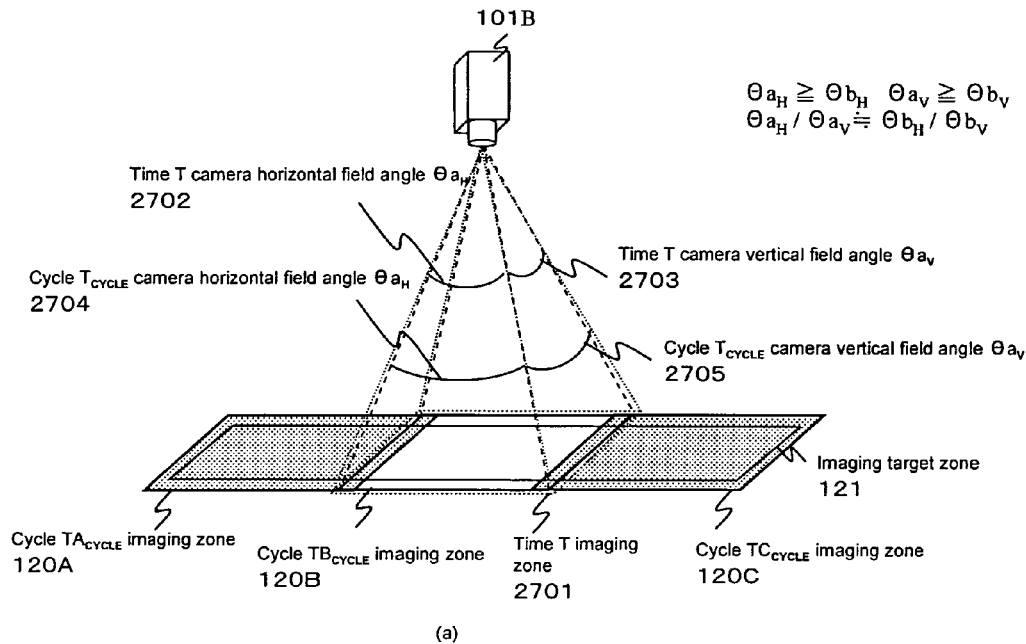
FIG. 36 is a drawing explaining the imaging efficiency in Embodiment 4 of the present invention.
Figure 36:
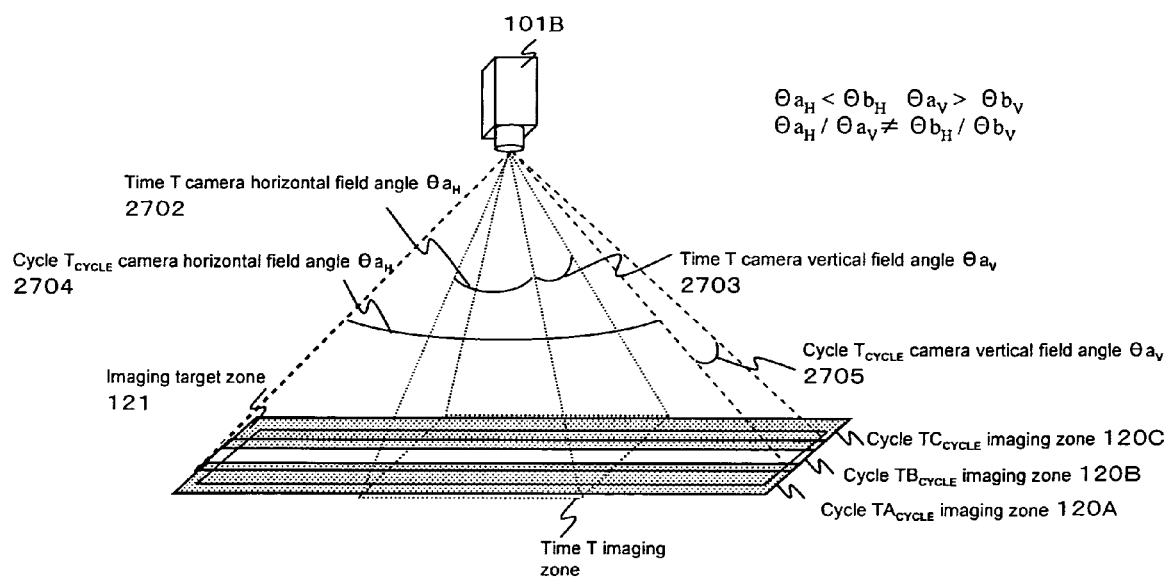

A first embodiment is described hereafter with reference to FIG. 36. FIG. 36(a) illustrates an embodiment in which the time T camera horizontal field angle $\Theta a_H \geq$ the cycle $T_{CYCLE}$ camera horizontal field angle $\Theta b_H$ and the time T camera vertical field angle $\Theta a_V \geq$ the cycle $T_{CYCLE}$ camera vertical field angle $\Theta b_V$, in other words, both the horizontal field angle and the vertical field angle of the cycle $TB_{CYCLE}$ imaging zone 120B are equal to or less than those of the time T imaging zone of the camera terminal 101B. FIG. 36(b) illustrates an embodiment in which the time T camera horizontal field angle $\Theta a_H <$ the cycle $T_{CYCLE}$ camera horizontal field angle $\Theta b_H$ and the time T camera vertical field angle $\Theta a_V \geq$ the cycle $T_{CYCLE}$ camera vertical field angle $\Theta b_V$, in other words, the horizontal field angle of the cycle $TB_{CYCLE}$ imaging zone 120B is greater than that of the time T imaging zone of the camera terminal 101B. According to the imaging process of a cycle $T_{CYCLE}$ imaging zone described above, the time T imaging zone of the camera terminal 101B allows the entire cycle $TB_{CYCLE}$ imaging zone 120B to be imaged at a time (the cycle $T_{CYCLE}$=0); consequently, the entire cycle TB imaging zone 120 is constantly imaged in the embodiment shown in FIG. 36(a). However, the time T imaging zone of the camera terminal 101B does not allow the entire cycle $TB_{CYCLE}$ imaging zone 120B to be imaged at a time; consequently, the entire cycle $TB_{CYCLE}$ imaging zone 120B is not constantly imaged in the embodiment shown in FIG. 36(a). If possible, it is ideal for surveillance apparatus and efficient in imaging that the cycle $T_{CYCLE}$ imaging zones of the cameras of the camera terminals are self-adjusted so that a combined zone of the cycle $T_{CYCLE}$ imaging zones of the cameras of the camera terminals completely covers a specific imaging target zone in the manner of the embodiment shown in FIG. 36(a) where constant imaging is available rather than in the manner of the embodiment shown in FIG. 36(b). In the embodiment shown in FIG. 36(a), compared to the embodiment shown in FIG. 36(b), the time T camera horizontal field angle $\Theta a_H$/the time T camera vertical field angle $\Theta a_V \cong$ the cycle $T_{CYCLE}$ camera horizontal field angle $\Theta b_H$/the cycle $T_{CYCLE}$ camera vertical field $\Theta b_V$, in other words, the aspect ratio of the time T imaging zone≅the aspect ratio of the cycle $T_{CYCLE}$ imaging zone. In the embodiment shown in FIG. 36(b), compared to the embodiment shown in FIG. 36(a), the time T camera horizontal field angle $\Theta a_H$/the time T camera vertical field angle $\Theta a_V \neq$ the cycle $T_{CYCLE}$ camera horizontal field angle $\Theta b_H$/the cycle $T_{CYCLE}$ camera vertical field $\Theta b_V$, in other words, the aspect ratio of the time T imaging zone≠the aspect ratio of the cycle $T_{CYCLE}$ imaging zone. Therefore, higher imaging efficiency is obtained when the aspect ratio of the cycle $T_{CYCLE}$ imaging zone is nearly equal to the aspect ratio of the time T imaging zone.

Figure 37:
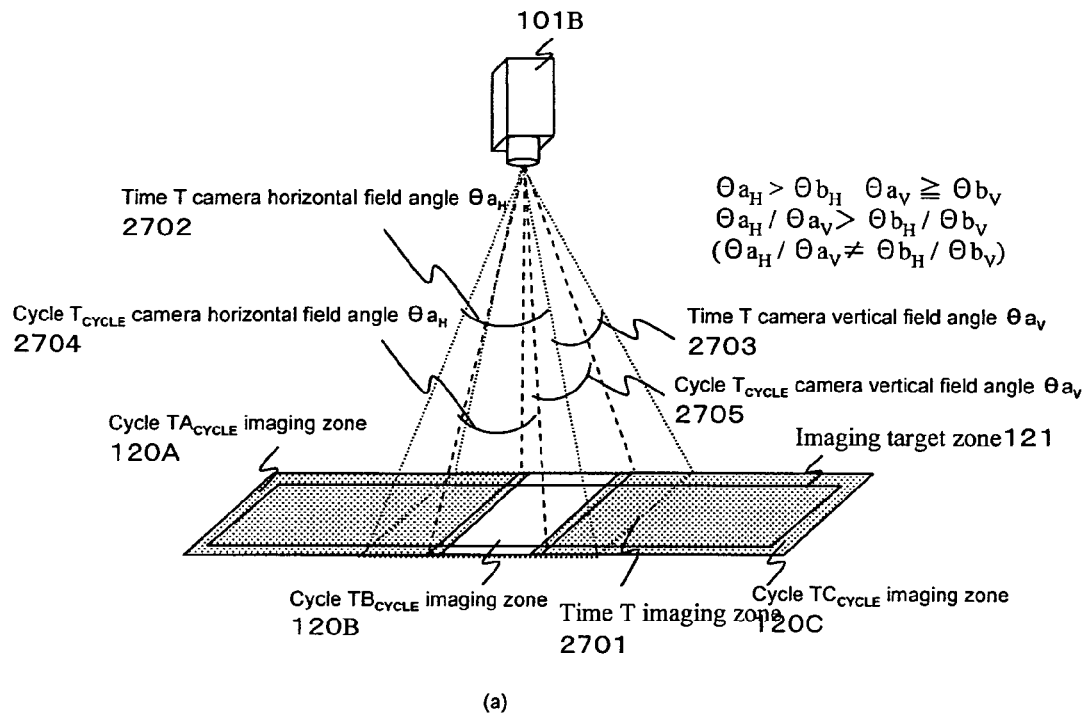
FIG. 37 is a drawing explaining the imaging efficiency in Embodiment 4 of the present invention.
Figure 37:
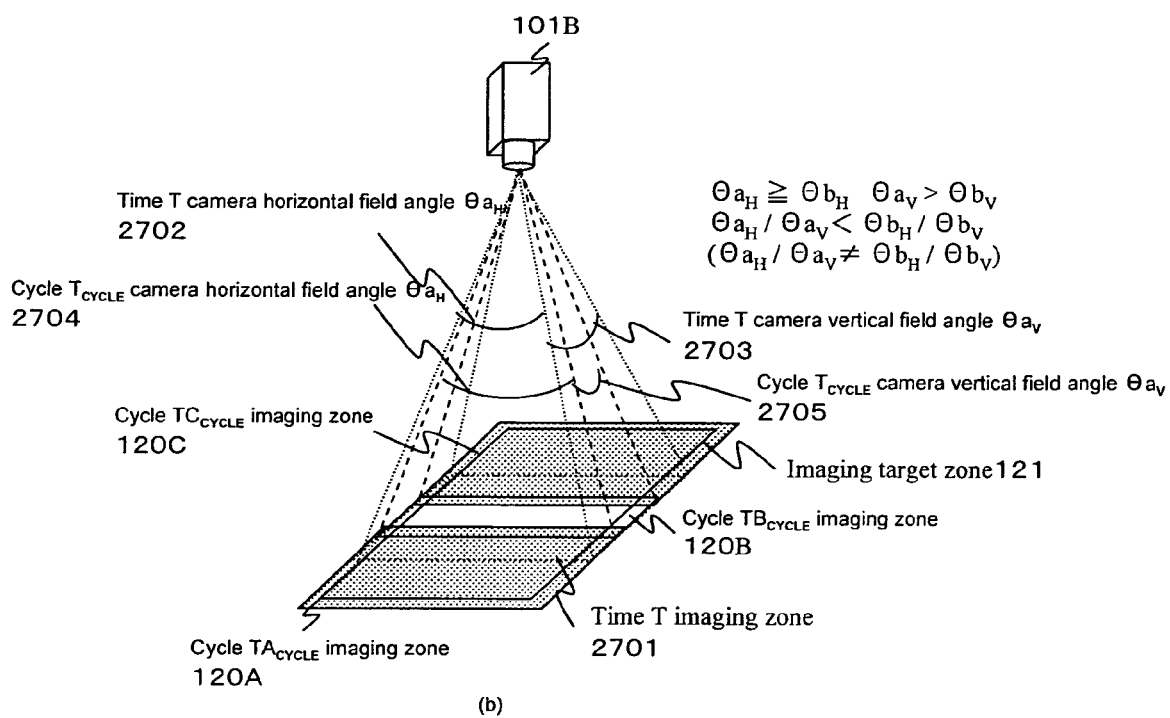

A second embodiment is described hereafter with reference to FIG. 37. The time T camera horizontal field angle $\Theta a_H$>the cycle $T_{CYCLE}$ camera horizontal field angle $\Theta b_H$ and the time T camera vertical field angle $\Theta a_V \geq$ the cycle $T_{CYCLE}$ camera vertical field angle $\Theta b_V$ in FIG. 37(a) and the time T camera horizontal field angle $\Theta a_H \geq$ the cycle $T_{CYCLE}$ camera horizontal field angle $\Theta b_H$ and the time T camera vertical field angle $\Theta a_V$>the cycle $T_{CYCLE}$ camera vertical field angle $\Theta b_V$ in FIG. 37(b), in other words, both the horizontal field angle and the vertical field angle of the cycle $TB_{CYCLE}$ imaging zone 120B are equal to or less than those of the time T imaging zone of the camera terminal 101B. Therefore, in both embodiments, the entire cycle $TB_{CYCLE}$ imaging zone 120B is constantly imaged. In this point, higher imaging efficiency is obtained. However, FIG. 37(a) further illustrates an embodiment in which the time T camera horizontal field angle $\Theta a_H$/the time T camera vertical field angle $\Theta a_V$>the cycle $T_{CYCLE}$ camera horizontal field $\Theta b_H$ angle/the cycle $T_{CYCLE}$ camera vertical field angle $\Theta b_V$, in other words, the aspect ratio of the time T imaging zone>the aspect ratio of the cycle $T_{CYCLE}$ imaging zone. On the other hand, FIG. 37(b) further illustrates an embodiment in which the time T camera horizontal field angle $\Theta a_H$/the time T camera vertical field angle $\Theta a_V$<the cycle $T_{CYCLE}$ camera horizontal field $\Theta b_H$ angle/the cycle $T_{CYCLE}$ camera vertical field angle $\Theta b_V$, in other words, the aspect ratio of the time T imaging zone<the aspect ratio of the cycle $T_{CYCLE}$ imaging zone. Therefore, according to the imaging process of a cycle $T_{CYCLE}$ imaging zone described above, the time $T_{CYCLE}$ imaging zone of the camera terminal 101B allows for the imaging of the cycle $TA_{CYCLE}$ imaging zone 120A and cycle $TC_{CYCLE}$ imaging zone 120C that comprise to be imaged by the camera terminals 101A and 101C in the horizontal and vertical directions while the cycle $TB_{CYCLE}$ imaging zone 120B is imaged in both embodiments shown in FIGS. 37(a) and (b). The cycle $TA_{CYCLE}$ imaging zone 120A and cycle $TC_{CYCLE}$ imaging zone 120C are supposed to be imaged by the camera terminals 101A and 101C, respectively. Therefore, the camera terminal 101B conducts redundant imaging of these zones. When the camera terminal 101B images only the $TB_{CYCLE}$ imaging zone 120B, which is smaller than the zone above, as in the embodiment shown in FIG. 36(a) where possible, detailed images of higher resolutions of the zone can be obtained and, consequently, higher imaging efficiency is obtained. In the embodiments shown in FIGS. 37(a) and (b), compared to the embodiment shown in FIG. 36(a), the time T camera horizontal field angle $\Theta a_H$/the time T camera vertical field angle $\Theta a_V \neq$ the cycle $T_{CYCLE}$ camera horizontal field angle $\Theta b_H$/the cycle $T_{CYCLE}$ camera vertical field angle $\Theta b_V$, in other words, the aspect ratio of the time T imaging zone≠the aspect ratio of the cycle $T_{CYCLE}$ imaging zone. In the embodiment shown in FIG. 36(a), compared to the embodiments shown in FIGS. 37(a) and (b), the time T camera horizontal field angle $\Theta a_H$/the time T camera vertical field angle $\Theta a_V \cong$ the cycle $T_{CYCLE}$ camera horizontal field angle $\Theta b_H$/the cycle $T_{CYCLE}$ camera vertical field angle $\Theta b_V$, in other words, the aspect ratio of the time T imaging zone≅the aspect ratio of the cycle $T_{CYCLE}$ imaging zone. Therefore, higher imaging efficiency is obtained when the aspect ratio of the cycle $T_{CYCLE}$ imaging zone is nearly equal to the aspect ratio of the time T imaging zone.

Figure 38:
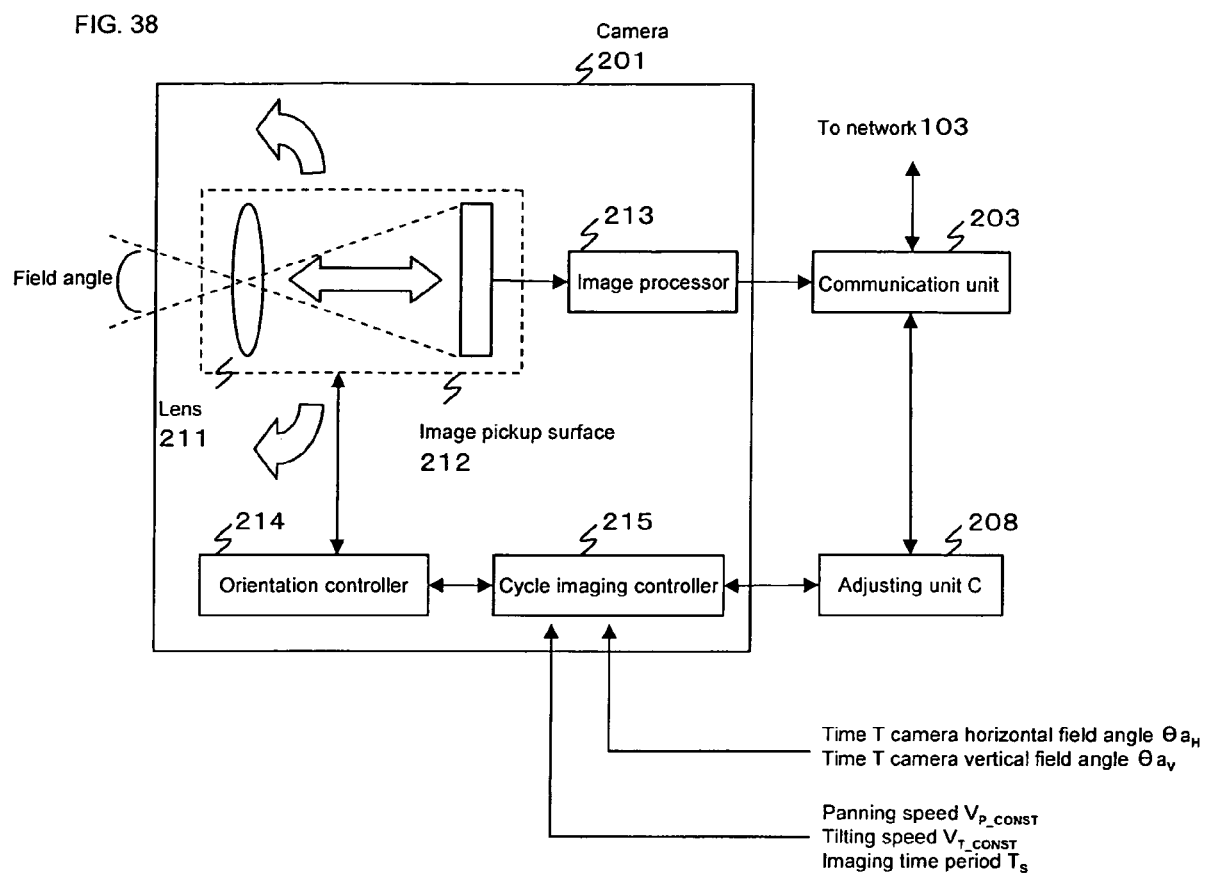
FIG. 38 is a block diagram showing the structure of a camera terminal in Embodiment 4 of the present invention.

Components of the imaging zone adjusting apparatus of the embodiment are described hereafter. FIG. 38 is a block diagram showing the structure of a camera 201 in the embodiment, which corresponds to the camera terminals 101A to 101C in FIG. 26(a). The camera terminals 101A to 101C each comprise at least a camera 201, an adjusting unit C 208, and a communications unit 203. The camera 201 comprises a lens 211, an image pickup surface 212, an image processor 213, an orientation controller 214, and a cycle imaging controller 215. The camera 201, communications unit 203, lens 211, image pickup surface 212, image processor 213, orientation controller 214, and cycle imaging controller 215 in FIG. 38 are the same as those in the block diagram showing the structure of the camera terminals 101A to 101C of Embodiment 1 shown in FIG. 27. The adjusting unit A 202 of Embodiment 1 is replaced by the adjusting unit C 208 in the block diagram showing the structure of the camera terminals 101A to 101C of the embodiment shown in FIG. 38.

The adjusting unit C 208 is a processor to adjust the position and aspect ratio of the hypothetical imaging zone (the cycle $T_{CYCLE}$ imaging zone in the embodiment) of one's own camera terminal so that the aspect ratio of the hypothetical imaging zone (the cycle $T_{CYCLE}$ imaging zone in the embodiment) of one's own camera terminal has a specific target quantity in addition to the adjustment of Embodiment 1.

This is the only difference in components between Embodiment 1 and the embodiment. The imaging zone adjusting apparatus has the same structure as that in FIG. 26(a), the imaging zone positions on the real space plane 113 of the imaging zone adjusting apparatus are the same as those in FIG. 26(b), and the operation terminal 102 has the same structure as that in FIG. 28. In FIG. 26(b), the cycle $TA_{CYCLE}$ imaging zone 120A has a measure of $X_{AR}-X_{AL}$ in the horizontal ($X_W$-axis 110) direction and a measure of $Y_{AB}-Y_{AU}$ in the vertical ($Y_W$-axis 111) direction and an aspect ratio of $(X_{AR}-X_{AL})/(Y_{AB}-Y_{AU})$. The cycle $TB_{CYCLE}$ imaging zone 120B has a measure of $X_{BR}-X_{BL}$ in the horizontal direction and a measure of $Y_{BB}-Y_{BU}$ in the vertical direction and an aspect ratio of $(X_{BR}-X_{BL})/(Y_{BB}-Y_{BU})$. The cycle $TC_{CYCLE}$ imaging zone 120C has a measure of $X_{CR}-X_{CL}$ in the horizontal direction and a measure of $Y_{CB}-Y_{CU}$ in the vertical direction and an aspect ratio of $(X_{CR}-X_{CL})/(Y_{CB}-Y_{CU})$. The aspect ratio of the cycle $TA_{CYCLE}$ imaging zone 120A is also $\Theta b_{HA}/\Theta b_{VA}$; the aspect ratio of the cycle $TB_{CYCLE}$ imaging zone 120B is also $\Theta b_{HB}/\Theta b_{VB}$; and the aspect ratio of the cycle $TC_{CYCLE}$ imaging zone 120C is also $\Theta b_{HC}/\Theta b_{VC}$.

Operation of the imaging zone adjusting apparatus of the embodiment is described hereafter. The only change in the embodiment in comparison with Embodiment 1 is the replacement of the adjusting unit A 202 by the adjusting unit C 208. Therefore, operation of only the adjusting unit C 208 is described.

Similar to the adjusting unit A 202, the adjusting unit C 208 periodically sends the positional information of the cycle $T_{CYCLE}$ imaging zone of the camera 201 sent from the cycle imaging controller 215 to the adjusting unit C 208 of the other camera terminals via the communications unit 203 and network 103. The adjusting unit C 208 further, also similar to the adjusting unit A 202, receives the positional information of the cycle $T_{CYCLE}$ imaging zones of the cameras 201 of the other camera terminals periodically sent from the adjusting unit C 208 of the other camera terminals. Therefore, similar to Embodiment 1, the adjusting unit C 208 of the camera terminals 101A to 101C periodically obtains the positional information of the cycle $T_{CYCLE}$ imaging zones of one's own camera terminal and other camera terminals and the positional information of the imaging target zone 121.

Figure 39:
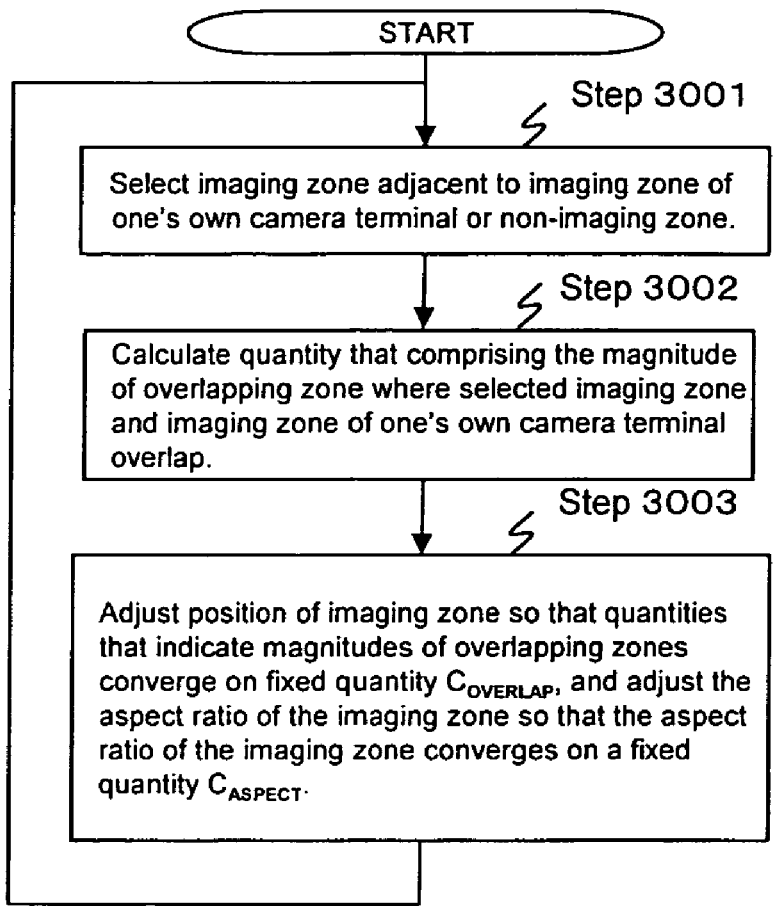
FIG. 39 is a flowchart of the procedure performed by an adjustor B in Embodiment 4 of the present invention.

The adjusting unit C 208 further performs the procedures of the steps shown in FIG. 39 similar to Embodiment 1 based on the obtained positional information of the cycle $T_{CYCLE}$ imaging zones and imaging target zone 121 (which is also the positional information of the non-imaging zone 122).

First, in Step 3001, a cycle $T_{CYCLE}$ imaging zone of another camera terminal adjacent to the cycle $T_{CYCLE}$ imaging zone of one's own camera terminal or the non-imaging zone 122 is selected based on the information indicating the cycle $T_{CYCLE}$ imaging zone positions of the cameras 201 of one's own camera terminal and other camera terminals. The procedure of the step is the same as in Embodiment 1 (Step 401 in FIG. 29).

Then, in Step 3002, a quantity indicating the magnitude of the overlapping zone where the imaging zone selected In Step 3001 and the imaging zone of one's own camera terminal overlap is calculated. The procedure of the step is also the same as in Embodiment 1 (Step 402 in FIG. 29).

Then, in Step 3003, the position of the imaging zone of one's own camera terminal is adjusted so that the quantity indicating the magnitude of the overlapping zone calculated In Step 3002 converges on a fixed quantity $C_{OVERLAP}$ and the aspect ratio of the imaging zone of one's own camera terminal is adjusted so that the aspect ratio of the imaging zone converges on a fixed quantity $C_{ASPECT}$. The adjustment process is described hereafter. A function FA( ) presented by the expressions 67 to 69 as is in Embodiment 1 is selected to yield a quantity indicating the difference between the quantity indicating the magnitudes of the overlapping zone and a fixed quantity $C_{OVERLAP}$ equal to or greater than 0. Further, a function FE( ) is selected to yield a quantity indicating the difference between the aspect ratio of the imaging zone and a fixed quantity $C_{ASPECT}$. This function is presented by the expression 70 in the embodiment. Then, a function FX( ) presented by the expression 71 is selected to yield the linear addition of the functions FA( ) and FE( ). In the expression 71, $\beta_A$ and $\beta_B$ are constants.

[Math 67]

$$\begin{aligned}&FA_A(X_{AL}, X_{AR}, Y_{AU}, Y_{AB}) = FA_{AL}(X_{AL}) + \\ &\quad FA(X_{AR}) + FA_{AU}(Y_{AU}) + FA_{AB}(Y_{AB}) \\ &X_{AL} = G_{AL}(\theta b_{PA}, \theta b_{TA}, \theta b_{HA}, \theta b_{VA}) \\ &X_{AR} = G_{AR}(\theta b_{PA}, \theta b_{TA}, \theta b_{HA}, \theta b_{VA}) \\ &Y_{AU} = G_{AU}(\theta b_{PA}, \theta b_{TA}, \theta b_{HA}, \theta b_{VA}) \\ &Y_{AB} = G_{AB}(\theta b_{PA}, \theta b_{TA}, \theta b_{HA}, \theta b_{VA},) \\ &FA_A(X_{AL}, X_{AR}, Y_{AU}, Y_{AB}) = \\ &FA_A(\theta b_{PA}, \theta b_{TA}, \theta b_{HA}, \theta b_{VA}) = \\ &(X_{TL} - G_{AL}(\theta b_{PA}, \theta b_{TA}, \theta b_{HA}, \theta b_{VA}) - C_{OVERLAP})^2 + \\ &(G_{AR}(\theta b_{PA}, \theta b_{TA}, \theta b_{HA}, \theta b_{VA}) - X_{BL} - C_{OVERLAP})^2 + \\ &(Y_{TU} - G_{AU}(\theta b_{PA}, \theta b_{TA}, \theta b_{HA}, \theta b_{VA}) - C_{OVERLAP})^2 + \\ &(G_{AB}(\theta b_{PA}, \theta b_{TA}, \theta b_{HA}, \theta b_{VA}) - Y_{TB} - C_{OVERLAP})^2\end{aligned}$$

(Formula 67)

[Math 68]

$$\begin{aligned}&FA_B(X_{BL}, X_{BR}, Y_{BU}, Y_{BB}) = FA_{BL}(X_{BL}) + \\ &\quad FA(X_{BR}) + FA_{BU}(Y_{BU}) + FA_{BB}(Y_{BB}) \\ &X_{BL} = G_{BL}(\theta b_{PB}, \theta b_{TB}, \theta b_{HB}, \theta b_{VB}) \\ &X_{BR} = G_{BR}(\theta b_{PB}, \theta b_{TB}, \theta b_{HB}, \theta b_{VB}) \\ &Y_{BU} = G_{BU}(\theta b_{PB}, \theta b_{TB}, \theta b_{HB}, \theta b_{VB}) \\ &Y_{BB} = G_{BB}(\theta b_{PB}, \theta b_{TB}, \theta b_{HB}, \theta b_{VB}) \\ &FA_B(X_{BL}, X_{BR}, Y_{BU}, Y_{BB}) = \\ &FA_B(\theta b_{PB}, \theta b_{TB}, \theta b_{HB}, \theta b_{VB},) = \\ &(X_{AR} - G_{BL}(\theta b_{PB}, \theta b_{TB}, \theta b_{HB}, \theta b_{VB}) - C_{OVERLAP})^2 + \\ &(G_{BR}(\theta b_{PB}, \theta b_{TB}, \theta b_{HB}, \theta b_{VB}) - X_{CL} - C_{OVERLAP})^2 + \\ &(Y_{TU} - G_{BU}(\theta b_{PB}, \theta b_{TB}, \theta b_{HB}, \theta b_{VB}) - C_{OVERLAP})^2 + \\ &(G_{BB}(\theta b_{PB}, \theta b_{TB}, \theta b_{HB}, \theta b_{VB}) - Y_{TB} - C_{OVERLAP})^2\end{aligned}$$

(Formula 68)

[Math 69]

$$\begin{aligned}&FA_C(X_{CL}, X_{CR}, Y_{CU}, Y_{CB}) = FA_{CL}(X_{CL}) + \\ &\quad FA_{CR}(X_{CR}) + FA_{CU}(Y_{CU}) + FA_{CB}(Y_{CB}) \\ &X_{CL} = G_{CL}(\theta b_{PC}, \theta b_{TC}, \theta b_{HC}, \theta b_{VC}) \\ &X_{CR} = G_{CR}(\theta b_{PC}, \theta b_{TC}, \theta b_{HC}, \theta b_{VC}) \\ &Y_{CU} = G_{CU}(\theta b_{PC}, \theta b_{TC}, \theta b_{HC}, \theta b_{VC}) \\ &Y_{CB} = G_{CB}(\theta b_{PC}, \theta b_{TC}, \theta b_{HC}, \theta b_{VC}) \\ &FA_C(X_{CL}, X_{CR}, Y_{CU}, Y_{CB},) = \\ &FA_C(\theta b_{PC}, \theta b_{TC}, \theta b_{HC}, \theta b_{VC}) = \\ &(X_{BR} - G_{CL}(\theta b_{PC}, \theta b_{TC}, \theta b_{HC}, \theta b_{VC}) - C_{OVERLAP})^2 + \\ &(G_{CR}(\theta b_{PC}, \theta b_{TC}, \theta b_{HC}, \theta b_{VC}) - X_{TR} - C_{OVERLAP})^2 + \\ &(Y_{TU} - G_{CU}(\theta b_{PC}, \theta b_{TC}, \theta b_{HC}, \theta b_{VC}) - C_{OVERLAP})^2 + \\ &(G_{CB}(\theta b_{PC}, \theta b_{TC}, \theta b_{HC}, \theta b_{VC}) - Y_{TB} - C_{OVERLAP})^2\end{aligned}$$

(Formula 69)

[Math 70]

$$FE_A(\theta b_{HA}, \theta b_{VA}) = \left(\frac{\theta b_{HA}}{\theta b_{VA}} - C_{ASPECT}\right)^2$$

$$FE_B(\theta b_{HB}, \theta b_{VB}) = \left(\frac{\theta b_{HB}}{\theta b_{VB}} - C_{ASPECT}\right)^2$$

$$FE_C(\theta b_{HC}, \theta b_{VC}) = \left(\frac{\theta b_{HC}}{\theta b_{VC}} - C_{ASPECT}\right)^2$$

(Formula 70)

[Math 71]

$$FX_A(\theta b_{PA}, \theta b_{TA}, \theta b_{HA}, \theta b_{VA}) = \beta_A \times FA_A(\theta b_{PA}, \theta b_{TA}, \theta b_{HA}, \theta b_{VA}) + \beta_B \times FE_A(\theta b_{HA}, \theta b_{VA})$$

$$FX_B(\theta b_{PB}, \theta b_{TB}, \theta b_{HB}, \theta b_{VB}) = \beta_A \times FA_B(\theta b_{PB}, \theta b_{TB}, \theta b_{HB}, \theta b_{VB}) + \beta_B \times FE_B(\theta b_{HB}, \theta b_{VB})$$

$$FX_C(\theta b_{PC}, \theta b_{TC}, \theta b_{HC}, \theta b_{VC}) = \beta_A \times FA_C(\theta b_{PC}, \theta b_{TC}, \theta b_{HC}, \theta b_{VC}) + \beta_B \times FE_C(\theta b_{HC}, \theta b_{VC})$$

(Formula 71)

Then, the generally known steepest descent method is used as presented by the expressions 72 and 74 to calculate the position of the next imaging zone of one's own camera terminal.

[Math 72]

$$\theta b'_{PA} = \theta b_{PA} - \alpha \frac{\partial FX_A(\theta b_{PA}, \theta b_{TA}, \theta b_{HA}, \theta b_{VA})}{\partial \theta b_{PA}}$$

$$\theta b'_{TA} = \theta b_{TA} - \alpha \frac{\partial FX_A(\theta b_{PA}, \theta b_{TA}, \theta b_{HA}, \theta b_{VA})}{\partial \theta b_{TA}}$$

$$\theta b'_{HA} = \theta b_{HA} - \alpha \frac{\partial FX_A(\theta b_{PA}, \theta b_{TA}, \theta b_{HA}, \theta b_{VA})}{\partial \theta b_{HA}}$$

$$\theta b'_{VA} = \theta b_{VA} - \alpha \frac{\partial FX_A(\theta b_{PA}, \theta b_{TA}, \theta b_{HA}, \theta b_{VA})}{\partial \theta b_{VA}}$$

(Formula 72)

[Math 73]

$$\theta b'_{PB} = \theta b_{PB} - \alpha \frac{\partial FX_B(\theta b_{PB}, \theta b_{TB}, \theta b_{HB}, \theta b_{VB})}{\partial \theta b_{PB}}$$

$$\theta b'_{TB} = \theta b_{TB} - \alpha \frac{\partial FX_B(\theta b_{PB}, \theta b_{TB}, \theta b_{HB}, \theta b_{VB})}{\partial \theta b_{TB}}$$

$$\theta b'_{HB} = \theta b_{HB} - \alpha \frac{\partial FX_B(\theta b_{PB}, \theta b_{TB}, \theta b_{HB}, \theta b_{VB})}{\partial \theta b_{HB}}$$

$$\theta b'_{VB} = \theta b_{VB} - \alpha \frac{\partial FX_B(\theta b_{PB}, \theta b_{TB}, \theta b_{HB}, \theta b_{VB})}{\partial \theta b_{VB}}$$

(Formula 73)

[Math 74]

$$\theta b'_{PC} = \theta b_{PC} - \alpha \frac{\partial FX_C(\theta b_{PC}, \theta b_{TC}, \theta b_{HC}, \theta b_{VC})}{\partial \theta b_{PC}}$$

$$\theta b'_{TC} = \theta b_{TC} - \alpha \frac{\partial FX_C(\theta b_{PC}, \theta b_{TC}, \theta b_{HC}, \theta b_{VC})}{\partial \theta b_{TC}}$$

$$\theta b'_{HC} = \theta b_{HC} - \alpha \frac{\partial FX_C(\theta b_{PC}, \theta b_{TC}, \theta b_{HC}, \theta b_{VC})}{\partial \theta b_{HC}}$$

$$\theta b'_{VC} = \theta b_{VC} - \alpha \frac{\partial FX_C(\theta b_{PC}, \theta b_{TC}, \theta b_{HC}, \theta b_{VC})}{\partial \theta b_{VC}}$$

(Formula 74)

The adjusting unit C 208 performs the procedures of Steps 3001, 3002, and 3003 in sequence and returns to the procedure of Step 3001 after completing the procedure of Step 3003.

Constantly repeating the procedures of Steps 3001 to 3003, the adjusting unit C 208 sends undated values of the cycle $T_{CYCLE}$ camera panning angle $\Theta b'_{PA}$ (or $\Theta b'_{PB}$ or $\Theta b'_{PC}$), cycle $T_{CYCLE}$ camera tilting angle $\Theta b'_{TA}$ (or $\Theta b'_{TB}$ or $\Theta b'_{TC}$), cycle $T_{CYCLE}$ camera horizontal field angle $\Theta b'_{HA}$ (or $\Theta b'_{HB}$ or $\Theta b'_{HC}$), and cycle $T_{CYCLE}$ camera vertical field angle $\Theta b'_{VA}$ (or $\Theta b'_{VB}$ or $\Theta'_{VC}$) calculated using the expressions above to the cycle imaging controller 215 so that the position of the cycle $T_{CYCLE}$ imaging zone of the camera 201 is adjusted.

The operation of the imaging zone adjusting apparatus of the embodiment is as described above. In Step 3003, the position of the next cycle $T_{CYCLE}$ imaging zone of one's own camera terminal is calculated by the steepest descent method in which the quantity indicating the magnitude of the overlapping zone converges on a fixed quantity $C_{OVERLAP}$ equal to or greater than 0 and the position of the cycle $T_{CYCLE}$ imaging zone of the camera 201 is adjusted for the next cycle $T_{CYCLE}$ imaging zone position. Therefore, with the procedures of Steps 3001 to 3003 being repeated, the cycle $TA_{CYCLE}$ imaging zone 120A, cycle $TB_{CYCLE}$ imaging zone 120BA, and cycle $TC_{CYCLE}$ imaging zone 120C, or the cycle $T_{CYCLE}$ imaging zones of the camera terminals 101A to 101C, and the non-imaging zone 122 overlap with each other by a fixed quantity $C_{OVERLAP}$ equal to or greater than 0. As shown in FIG. 26, when the cycle $T_{CYCLE}$ imaging zones of the camera terminals and the non-imaging zone 122 overlap with each other by a fixed quantity $C_{OVERLAP}$ equal to or greater than 0, the imaging target zone 121 is covered by a combined zone of the cycle $T_{CYCLE}$ imaging zones of the camera terminals. Therefore, the imaging zone adjusting apparatus of the present invention allows the camera terminals 101A to 101C to image the imaging target zone 121 with no blind spots.

In Step 3003, the aspect ratio of the next cycle $T_{CYCLE}$ imaging zone of one's own camera terminal is calculated by the steepest descent method in which the aspect ratio of the imaging zone converges on a fixed quantity $C_{ASPECT}$ and the aspect ratio of the cycle $T_{CYCLE}$ imaging zone of the camera 201 is adjusted for the next cycle $T_{CYCLE}$ imaging zone position. Therefore, the aspect ratios of the cycle $TA_{CYCLE}$ imaging zone 120A, cycle $TB_{CYCLE}$ imaging zone 120B, and cycle $TC_{CYCLE}$ imaging zone 120C, or the cycle $T_{CYCLE}$ imaging zones of the camera terminals 101A to 101C, are adjusted for a fixed quantity $C_{ASPECT}$. Assuming that the fixed quantity $C_{ASPECT}$ is the aspect ratio of the time T imaging zone of the camera terminals 120A to 120C, the aspect ratio of the cycle $T_{CYCLE}$ imaging zone of the camera of the camera terminals is adjusted for the aspect ratio of the time T imaging zone. Then, as described above, the imaging zone adjusting apparatus of the present invention allows the imaging target zone 121, or a specific imaging target zone, to be efficiently imaged.

With the adjusting unit C 208 repeating the procedures of Steps 3001 to 3003, the effect is obtained that the imaging target zone 121 is efficiently imaged with no blind spots. The procedures of Steps 3002 and 3003 are repeated for the cycle $T_{CYCLE}$ imaging zone of another camera terminal adjacent to the cycle $T_{CYCLE}$ imaging zone of one's own camera terminal and the non-imaging zone 122, which is selected In Step 3001.

Therefore, similar to Embodiment 1, even if any change occurs in the position of the cycle $T_{CYCLE}$ imaging zone of another camera adjacent to the cycle $T_{CYCLE}$ imaging zone of one's own camera terminal or the position of the non-imaging zone 122 (which is also the position of the imaging target zone 121), the effect that the imaging target zone 121 is imaged with no blind spots can be obtained in accordance with the change. The position of the cycle $T_{CYCLE}$ imaging zone or imaging target zone 121 can be changed when:

(1) the cycle $T_{CYCLE}$ imaging zone of a camera terminal is intentionally changed;
(2) an additional camera terminal is installed;
(3) some of the camera terminals are removed or unserviceable; or
(4) the imaging target zone position sent from the operation terminal is changed. The operation of the present invention in response to the situational changes is described in Embodiments 6 and 7, described later. Even if the cycle $T_{CYCLE}$ imaging zone position sent from the camera terminals or the imaging target zone position sent from the operation terminal is changed or not sent, or a new cycle $T_{CYCLE}$ imaging zone position is sent according to these changes, the imaging zone adjusting apparatus of the present invention allows the camera terminals to image the imaging target zone with no blind spots in accordance with changes in the cycle $T_{CYCLE}$ imaging zone position or imaging target zone position.

In the embodiment, the function FE ( ) presenting the difference between the aspect ratio of the imaging zone and a fixed quantity $C_{ASPECT}$ is, as presented by the expression 70, a function which raises the difference between the aspect ratio of the imaging zone and a fixed quantity $C_{ASPECT}$ to the second power. However, similar to the function FA ( ) in Embodiment 1, the function FE ( ) can be a function raising the difference between the aspect ratio of the imaging zone and a fixed quantity $C_{ASPECT}$ to an even-numbered power such as the fourth, sixth, and tenth power or a function yielding the absolute value of the difference between the aspect ratio of the imaging zone and a fixed quantity $C_{ASPECT}$. The functions FE ( ) have the minimum values when the aspect ratio of the imaging zone is $C_{ASPECT}$ and the aspect ratio of the imaging zone converges on a fixed quantity $C_{ASPECT}$ in the steepest descent method In Step 3004. Needless to say, the same effect can be obtained.

Needless to say, similar to the function FA ( ) in Embodiment 1, the same effect can be obtained even if the function FE ( ) presenting the difference between the aspect ratio of the imaging zone and a fixed quantity $C_{ASPECT}$ has a minimal value, not the maximum value, when the aspect ratio of the imaging zone is $C_{ASPECT}$ as long as the function FE ( ) has the minimum value when the aspect ratio of the imaging zone is $C_{ASPECT}$ within a range over which the aspect ratio of the imaging zone is changed.

In the embodiment, as shown in FIG. 38, the adjusting unit C 208 is distributed at each camera terminal 101A to 101C. Needless to say, the same effect can be obtained where only one adjusting unit C 208 is present and the only one adjusting unit C 208 controls the position and aspect ratio of the camera 201 of the camera terminals 101A to 101C.

In the embodiment, the network 103 is a network line used for general communication. Needless to say, the same effect can be obtained regardless of that the network 103 is a wired or wireless network.

In the embodiment, the function FA ( ) presenting the difference between a quantity indicating the magnitude of the overlapping zone and a fixed quantity $C_{OVERLAP}$, which is used to adjust the position of the cycle $T_{CYCLE}$ imaging zones of the camera terminals 120A to 120C so that a combined zone of the cycle $T_{CYCLE}$ imaging zones of the cameras of the camera terminals 120A to 120C completely covers the imaging target zone 121, and the function FE ( ) presenting the difference between the aspect ratio of the imaging zone and a fixed quantity $C_{ASPECT}$, which is used to adjust the aspect ratio of the cycle $T_{CYCLE}$ imaging zone of the camera of the terminals 120A to 120C so that the imaging target zone 121 is efficiently imaged, are linearly added. Then, the position of the next imaging zone of one's own camera terminal is calculated and adjusted by the steepest descent method as presented by the expressions 72 to 74. The function FX ( ) resulting from the linear addition of the functions FA ( ) and FE ( ) may have a minimal value, not the minimum value, when the quantity indicating the magnitude of the overlapping zone is $C_{OVERLAP}$ and the aspect ratio of the imaging zone is $C_{ASPET}$. In such a case, the following process can be used to self-adjust the position of the cycle $T_{CYCLE}$ imaging zone of the camera of the camera terminals 120A to 120C so that a combined zone of the cycle $T_{CYCLE}$ imaging zones of the cameras of the camera terminals 120A to 120C completely covers the imaging target zone 121 and to self-adjust the aspect ratio of the cycle $T_{CYCLE}$ imaging zone of the camera of the camera terminals 120A to 120C for a specific aspect ratio as much as possible, thereby efficiently imaging the imaging target zone 121.

With the camera terminals 120A to 120C, when there is no overlapping zone where the cycle $T_{CYCLE}$ imaging zone of one's own camera terminal and an adjacent cycle $T_{CYCLE}$ imaging zone or the non-imaging target zone 122 overlap or when the magnitude of the overlapping zone is equal to or less than $C_{ASPECT}$ (which can be determined by the adjusting unit C 208 based on the positional information of the cycle $T_{CYCLE}$ imaging zones of the camera terminals and non-imaging zone 121 sent to and from the adjusting unit C 208), for example, $\beta_A$ and $\beta_B$ in the expression 71 are assumed to be 1 and 0, respectively. Then, the function FX ( ) is a function consisting of only the function FA ( ). Consequently, the positions of the cycle $T_{CYCLE}$ imaging zones of the cameras of the camera terminals 120A to 120C are self-adjusted so that a combined zone of the cycle $T_{CYCLE}$ imaging zones of the cameras of the camera terminals 120A to 120C completely covers the imaging target zone 121. On the other hand, with the camera terminals 120A to 120C, when there is an overlapping zone where the cycle $T_{CYCLE}$ imaging zone of one's own camera terminal and an adjacent cycle $T_{CYCLE}$ imaging zone or the non-imaging target zone 122 overlap or when the magnitude of the overlapping zone is equal to or greater than $C_{ASPECT}$, this is the result of the positions of the cycle $T_{CYCLE}$ imaging zones of the cameras of the camera terminals being self-adjusted so that a combined zone of the cycle $T_{CYCLE}$ imaging zones of the cameras of the camera terminals 120A to 120C completely covers the imaging target zone 121. Therefore, both $\beta_A$ and $\beta_B$ in the expression 71 are assumed to be 1. Then, the function FX ( ) is a function resulting from the linear addition of the functions FA ( ) and FE ( ). Further, the aspect ratio of the cycle $T_{CYCLE}$ imaging zone of the camera of the camera terminals 120A to 120C is self-adjusted, whereby the imaging target zone 121 is efficiently imaged.

The fact that a specific imaging target zone is efficiently imaged when the aspect ratio of the cycle $T_{CYCLE}$ imaging zone of the camera of the camera terminals 120A to 120C is self-adjusted for the aspect ratio of the time T imaging zone is described above with reference to FIGS. 36 and 37. According to the embodiments shown in FIGS. 36 and 37, the requirements for the imaging target zone 121 to be efficiently imaged include the time T camera horizontal field angle $\Theta a_H \geq$ the cycle $T_{CYCLE}$ camera horizontal field angle $\Theta b_H$ and the time T camera vertical field angle $\Theta a_V \geq$ the cycle $T_{CYCLE}$ camera vertical field angle $\Theta b_V$. Then, a function FH ( ) presenting quantities indicating the magnitude of the field angles of the imaging zone as presented by the expression 75 is selected, and the expression 71 is replaced by the expression 76 and the expressions 72 to 74 are replaced by the expressions 77 to 79 to further satisfy the requirements above. Needless to say, the imaging zone adjusting apparatus of the present invention allows the cycle $T_{CYCLE}$ imaging zones of the camera terminals 120A to 120C to be adjusted so that the imaging target zone 121 is efficiently imaged.

[Math 75]

$$\left.\begin{aligned}FH_A(\theta b_{HA}, \theta b_{VA}) &= \theta b_{HA} \times \theta b_{VA} \\ FH_B(\theta b_{HB}, \theta b_{VB}) &= \theta b_{HB} \times \theta b_{VB} \\ FH_C(\theta b_{HC}, \theta b_{VC}) &= \theta b_{HC} \times \theta b_{VC}\end{aligned}\right\} \quad \text{(Formula 75)}$$

[Math 76]

$$\left.\begin{aligned}FY_A(\theta b_{PA}, \theta b_{TA}, \theta b_{HA}, \theta b_{VA}) &= \beta_A \times \\ FA_A(\theta b_{PA}, \theta b_{TA}, \theta b_{HA}, \theta b_{VA}) + \beta_B \times \\ FE_A(\theta b_{HA}, \theta b_{VA}) + \beta_C \times FH_A(\theta b_{HA}, \theta b_{VA}) \\ FY_B(\theta b_{PB}, \theta b_{TB}, \theta b_{HB}, \theta b_{VB}) &= \beta_A \times \\ FA_B(\theta b_{PB}, \theta b_{TB}, \theta b_{HB}, \theta b_{VB}) + \\ \beta_B \times FE_B(\theta b_{HB}, \theta b_{VB}) + \beta_C \times FH_B(\theta b_{HB}, \theta b_{VB}) \\ FY_C(\theta b_{PC}, \theta b_{TC}, \theta b_{HC}, \theta b_{VC}) &= \beta_A \times \\ FA_C(\theta b_{PC}, \theta b_{TC}, \theta b_{HC}, \theta b_{VC}) + \\ \beta_B \times FE_C(\theta b_{HC}, \theta b_{VC}) + \beta_C \times FH_C(\theta b_{HC}, \theta b_{VC})\end{aligned}\right\} \quad \text{(Formula 76)}$$

[Math 77]

$$\left.\begin{aligned}\theta b'_{PA} &= \theta b_{PA} - \alpha \frac{\partial FY_A(\theta b_{PA}, \theta b_{TA}, \theta b_{HA}, \theta b_{VA})}{\partial \theta b_{PA}} \\ \theta b'_{TA} &= \theta b_{TA} - \alpha \frac{\partial FY_A(\theta b_{PA}, \theta b_{TA}, \theta b_{HA}, \theta b_{VA})}{\partial \theta b_{TA}} \\ \theta b'_{HA} &= \theta b_{HA} - \alpha \frac{\partial FY_A(\theta b_{PA}, \theta b_{TA}, \theta b_{HA}, \theta b_{VA})}{\partial \theta b_{HA}} \\ \theta b'_{VA} &= \theta b_{VA} - \alpha \frac{\partial FY_A(\theta b_{PA}, \theta b_{TA}, \theta b_{HA}, \theta b_{VA})}{\partial \theta b_{VA}}\end{aligned}\right\} \quad \text{(Formula 77)}$$

[Math 78]

$$\left.\begin{aligned}\theta b'_{PB} &= \theta b_{PB} - \alpha \frac{\partial FY_B(\theta b_{PB}, \theta b_{TB}, \theta b_{HB}, \theta b_{VB})}{\partial \theta b_{PB}} \\ \theta b'_{TB} &= \theta b_{TB} - \alpha \frac{\partial FY_B(\theta b_{PB}, \theta b_{TB}, \theta b_{HB}, \theta b_{VB})}{\partial \theta b_{TB}} \\ \theta b'_{HB} &= \theta b_{HB} - \alpha \frac{\partial FY_B(\theta b_{PB}, \theta b_{TB}, \theta b_{HB}, \theta b_{VB})}{\partial \theta b_{HB}} \\ \theta b'_{VB} &= \theta b_{VB} - \alpha \frac{\partial FY_B(\theta b_{PB}, \theta b_{TB}, \theta b_{HB}, \theta b_{VB})}{\partial \theta b_{VB}}\end{aligned}\right\} \quad \text{(Formula 78)}$$

[Math 79]

$$\left.\begin{aligned}\theta b'_{PC} &= \theta b_{PC} - \alpha \frac{\partial FY_C(\theta b_{PC}, \theta b_{TC}, \theta b_{HC}, \theta b_{VC})}{\partial \theta b_{PC}} \\ \theta b'_{TC} &= \theta b_{TC} - \alpha \frac{\partial FY_C(\theta b_{PC}, \theta b_{TC}, \theta b_{HC}, \theta b_{VC})}{\partial \theta b_{TC}} \\ \theta b'_{HC} &= \theta b_{HC} - \alpha \frac{\partial FY_C(\theta b_{PC}, \theta b_{TC}, \theta b_{HC}, \theta b_{VC})}{\partial \theta b_{HC}} \\ \theta b'_{VC} &= \theta b_{VC} - \alpha \frac{\partial FY_C(\theta b_{PC}, \theta b_{TC}, \theta b_{HC}, \theta b_{VC})}{\partial \theta b_{VC}}\end{aligned}\right\} \quad \text{(Formula 79)}$$

In the embodiment, the aspect ratio of an imaging zone can also be expressed by the horizontal and vertical field angles for simplified explanation. However, if the aspect ratio of an imaging zone is the ratio of horizontal to vertical measure of an imaging zone as is defined, the aspect ratio of the time T imaging zone is expressed by the expression 80 according to the expressions 8 to 11 explained above for the position and view point of the imaging zone of a camera.

[Math 80]

$$\frac{\text{Magnitude of Time } T \text{ Imaging Region in the Horizontal Direction}}{\text{Magnitude of the Time } T \text{ Region in the Perpendicular Direction}} = \frac{X_{PW0} - X_{PW1}}{Y_{PW2} - Y_{PW0}}$$

$$= \frac{Z_{D2}(X_{D0}Z_{D1} - X_{D1}Z_{D0})}{Z_{D1}(Y_{D2}Z_{D0} - Y_{D0}Z_{D2})}$$

$$= FZ(R_{00}, R_{01}, R_{02}, R_{10}, \ldots, R_{22}, M_{00}, M_{01}, M_{02}, M_{10}, \ldots, M_{22})$$

$$= FZ(\Theta_P, \Theta_T, \Theta_R, M_{00}, M_{01}, M_{02}, M_{10}, \ldots, M_{22})$$

(Formula 80)

As presented by the expression 80, the aspect ratio of the time T imaging zone is a function of $M_{00}$ to $M_{22}$ that indicate the orientation reference of a camera and rotation angles $\Theta_P$, $\Theta_T$, and $\Theta R_P$ that indicate the orientation shift from the orientation reference of a camera. Therefore, the aspect ratio of the cycle $T_{CYCLE}$ imaging zone changes in association with the orientation reference and the rotation angles or the shift therefrom, in other words, the time T camera panning angle $\Theta a_P$, time T camera tilting angle $\Theta a_T$, and time T camera rolling angle $\Theta a_R$ that comprise adjusted by the imaging zone adjusting apparatus of the present invention every second. Needless to say, the imaging zone adjusting apparatus of the present invention can adjust the cycle $T_{CYCLE}$ imaging zones of the camera terminals 120A to 120C based on accurate aspect ratios provided that $C_{ASPECT}$ presented by the expression 70, or the target value in the aspect ratio adjustment, is calculated by the expression 80 using the orientation reference of the camera and the current time T camera panning angle $\Theta a_P$, time T camera tilting angle $\Theta a_T$, and time T camera rolling angle $\Theta a_R$ in the procedure of Step 3003 repeated by the adjusting unit C 208. Then, it is preferable that the target value of the aspect ratio is the aspect ratio of an imaging zone determined by the imaging zone position and camera installation position.

Embodiment 5

Embodiment 5 of the present invention is described hereafter. In the embodiment, an imaging zone adjusting apparatus in which the cycle $T_{CYCLE}$ imaging zones of the cameras of the camera terminals are self-adjusted using a zone dividing process so that a combined zone of the cycle $T_{CYCLE}$ imaging zones of the cameras of the camera terminals completely covers a specific imaging target zone is described with reference to FIGS. 40 to 43.

Figure 40:
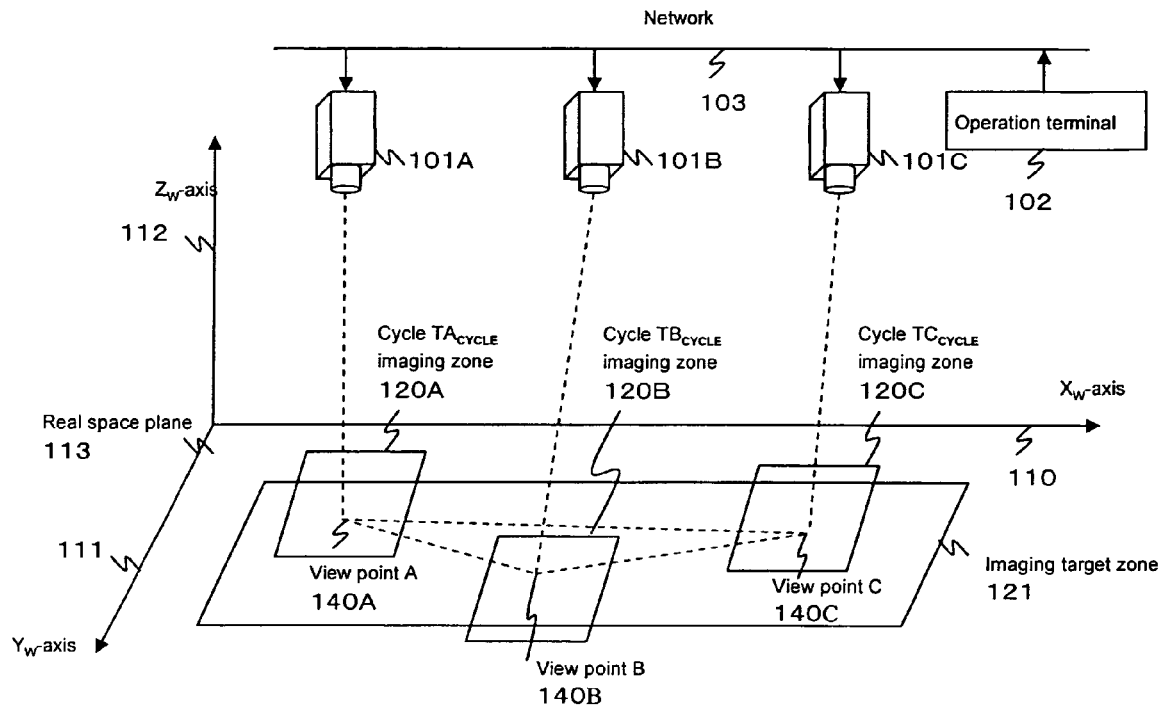
FIG. 40 is a block diagram showing the structure of an imaging zone adjusting apparatus in Embodiment 5 of the present invention.
Figure 41:
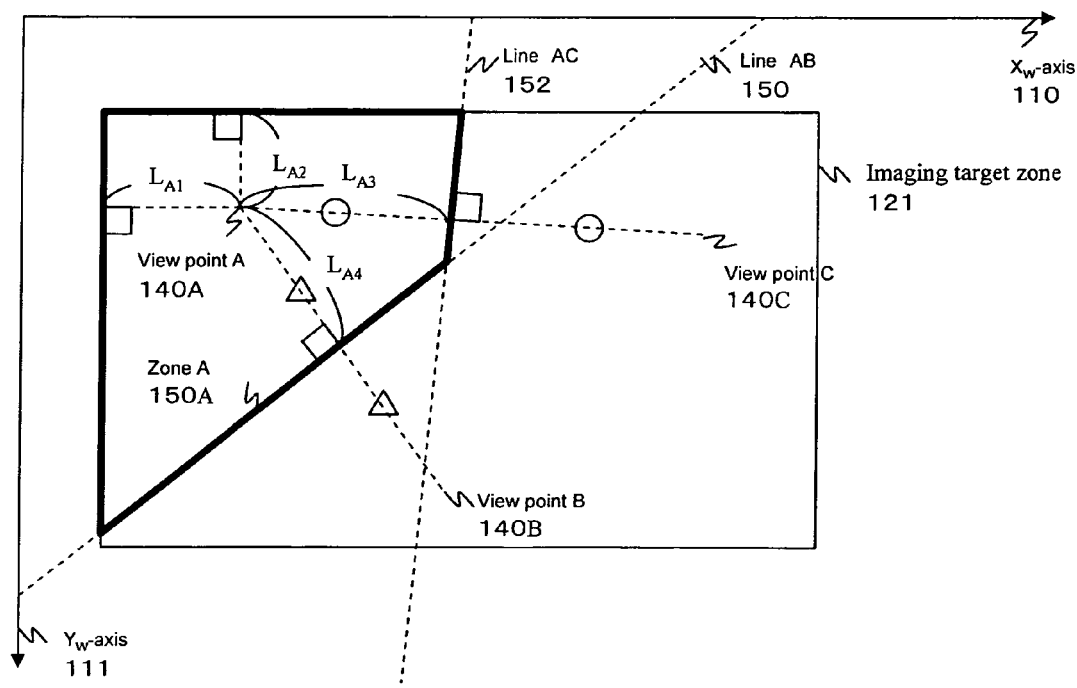
FIG. 41 is a drawing showing the detailed view points of the cycle $T_{CYCLE}$ imaging zones on a real space plane of the imaging zone adjusting apparatus in Embodiment 5 of the present invention.
Figure 41:
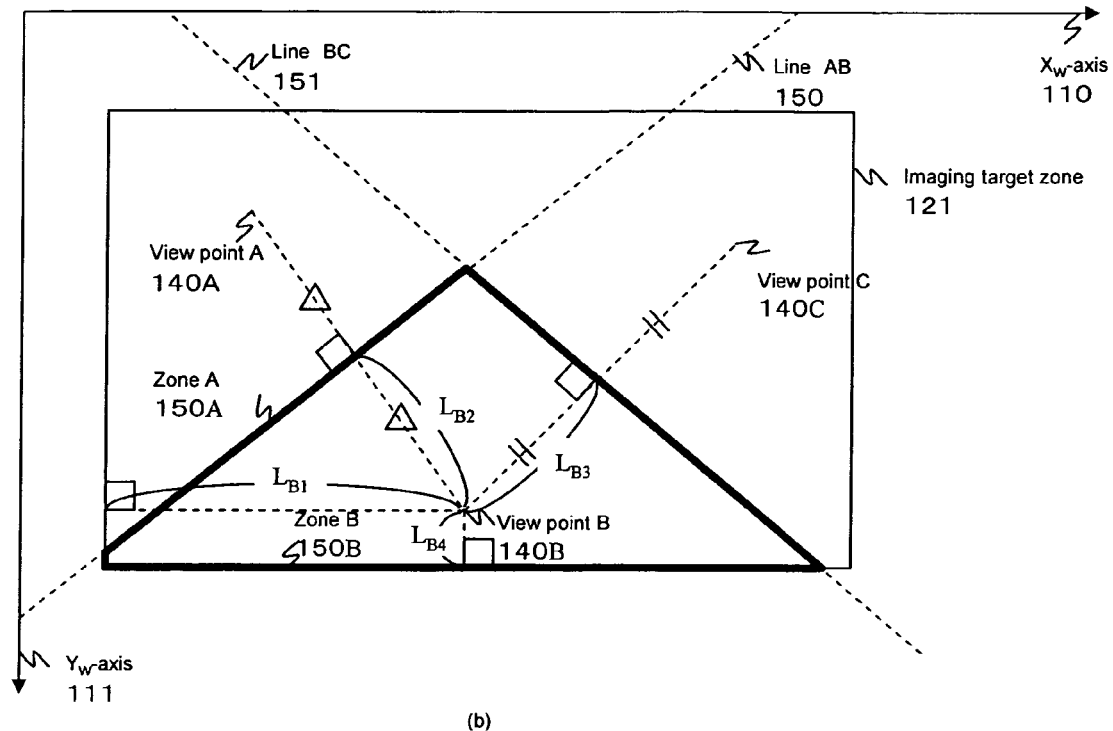
Figure 41:
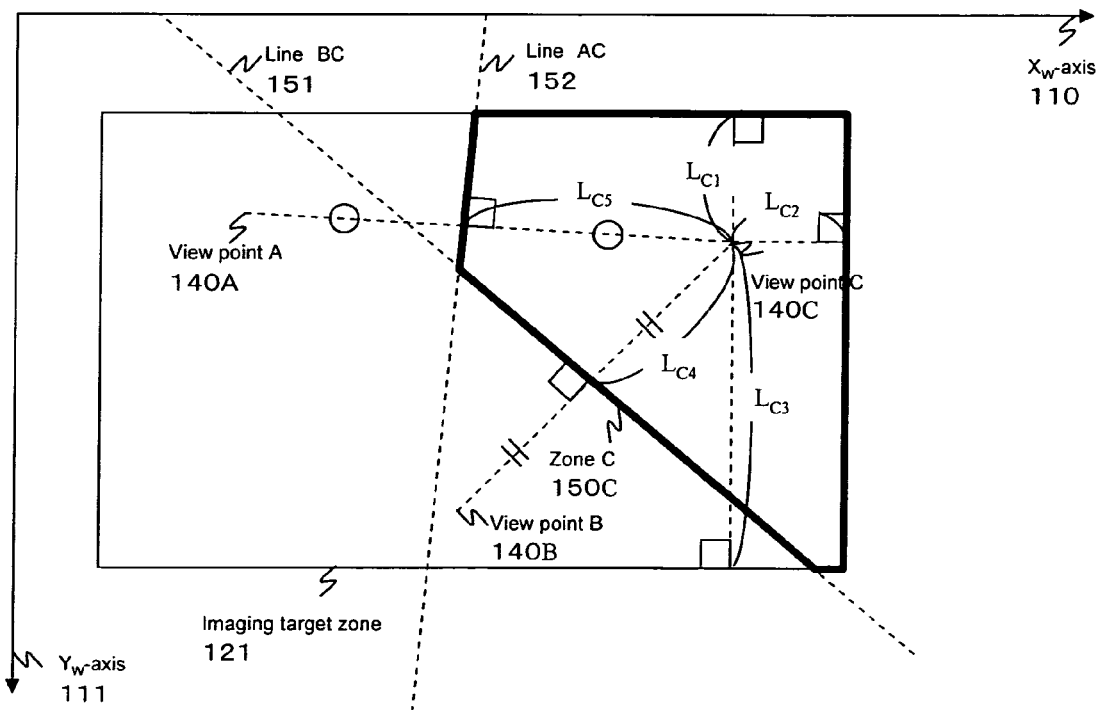

First, components of the imaging zone adjusting apparatus of the embodiment are described. FIG. 40 is a block diagram showing the structure of the imaging zone adjusting apparatus of the embodiment. The imaging zone adjusting apparatus comprises camera terminals 101A to 101C, an operation terminal 102, and a network 103. The camera terminals 101A to 101C, operation terminal 102, and network 103 in FIG. 40 are the same as those of Embodiment 1. Further, an $X_W$-axis 110, a $Y_W$-axis 111, a $Z_W$-axis 112, a real space plane 113, a cycle $TA_{CYCLE}$ imaging zone 120A, a cycle $TB_{CYCLE}$ imaging zone 120B, a cycle $TC_{CYCLE}$ imaging zone 120C, and an imaging target zone 121 in FIG. 40 are the same as those of Embodiment 1. On the real space plane 113, the number 140A indicates a view point A comprising the view point of the cycle TA$_{CYCLE}$ imaging zone 120A periodically imaged by the camera terminal 101A in a cycle TA$_{CYCLE}$, the number 140B indicates a view point B comprising the view point of the cycle TB$_{CYCLE}$ imaging zone 120B periodically imaged by the camera terminal 101B in a cycle TB$_{CYCLE}$, and the number 140C indicates a view point C comprising the view point of the cycle TC$_{CYCLE}$ imaging zone 120C periodically imaged by the camera terminal 101C in a cycle TC$_{CYCLE}$.

FIG. 41(a) to (c) are illustrations showing the view points of the cycle T$_{CYCLE}$ imaging zones on the real space plane 113 of the imaging zone adjusting apparatus of this embodiment shown in FIG. 40 in detail. An X$_W$-axis 110, a Y$_W$-axis 111, a view point A 140A, a view point B 140B, a view point C 140C, and an imaging target zone 121 in FIG. 41(a) are the same as those in FIG. 40. The number 150 indicates a line AB comprising a perpendicular bisector of the line connecting the view points A 140A and B 140B. The number 151 indicates a line BC comprising a perpendicular bisector of the line connecting the view points B 140B and C 140C. The number 152 indicates a line AC comprising a perpendicular bisector of the line connecting the view points A 140A and C 140C. The number 150A indicates a zone A comprising a zone obtained by dividing the imaging target zone 121 by the lines AB 150 and AC 152. The number 150B indicates a zone B comprising a zone obtained by dividing the imaging target zone 121 by the lines AB 150 and BC 151. The number 150C indicates a zone C comprising a zone obtained by dividing the imaging target zone 121 by the lines BC 151 and AC 152.

Figure 42:
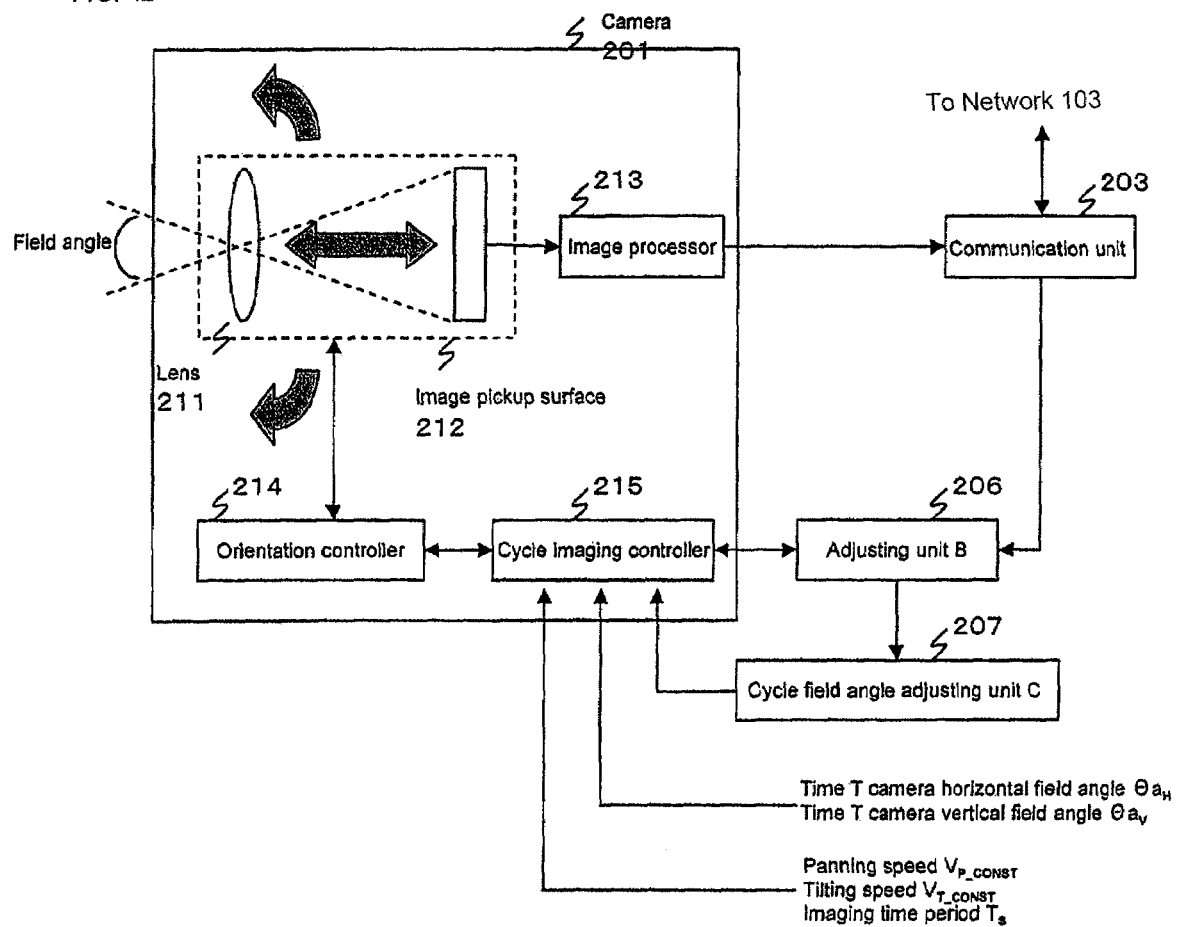
FIG. 42 is a block diagram showing the structure of a camera terminal in Embodiment 5 of the present invention.

FIG. 42 is a block diagram showing the structure of the camera terminals 101A to 101C in FIG. 26(a). The camera terminals 101A to 101C each comprise at least a camera 201, an adjusting unit B 206, a communications unit 203, and a cycle field angle adjusting unit C 207. The camera 201 comprises a lens 211, an image pickup surface 212, an image processor 213, an orientation controller 214, and a cycle imaging controller 215. The camera 201, communications unit 203, lens 211, image pickup surface 212, image processor 213, orientation controller 214, and cycle imaging controller 215 in FIG. 42 are the same as those in the block diagram showing the structure of the camera terminals 101A to 101C of Embodiment 1 shown in FIG. 27. In the block diagram showing the structure of the camera terminals 101A to 101C of the embodiment shown in FIG. 42, the adjusting unit A 202 of the Embodiment 1 is replaced by the adjusting unit B 206, the cycle T$_{CYCLE}$ camera horizontal and vertical field angles Θb$_H$ and Θb$_V$ are not fixed values, and the cycle field angle adjusting unit C 207 comprising a processor to adjust and output the field angles of the cycle T$_{CYCLE}$ imaging zone of the camera 201 is added. The operation terminal 102 has the same structure as that of FIG. 28.

Operation of the imaging zone adjusting apparatus of the embodiment is described hereafter. The adjusting unit B 206 periodically sends view point position information of the cycle T$_{CYCLE}$ imaging zone of the camera 201 sent from the cycle imaging controller 215 to the adjusting unit B 206 of the other camera terminals via the communications unit 203 and network. Further, the adjusting unit B 206 receives the view point position information of the cycle T$_{CYCLE}$ imaging zone of the camera 201 of the other camera terminals periodically sent from the adjusting unit B 206 of the other camera terminals. In addition, the communications unit 203 of the operation terminal 102 periodically sends positional information of the imaging target zone 121 to the adjusting unit B 206 of the camera terminals 101A to 101C via the network 103.

Therefore, with the camera terminals 101A to 101C, the adjusting unit B 206 periodically receives the view point position information of the cycle T$_{CYCLE}$ imaging zone of the camera 201 of one's own camera terminal and other camera terminals and the positional information of the imaging target zone 121. In the embodiment, each adjusting unit B 206 periodically receives the position of the view point 140A comprising the view point of the cycle TA$_{CYCLE}$ imaging zone 120A of the camera terminal 101A, the position of the view point 140B comprising the view point of the cycle TB$_{CYCLE}$ imaging zone 120B of the camera terminal 101B, the position of the view point 140C comprising the view point of the cycle TC$_{CYCLE}$ imaging zone 120C of the camera terminal 101C, and X$_{TL}$ 131TL, X$_{TR}$ 131TR, Y$_{TU}$ 131TU, and Y$_{TB}$ 131TB comprising the position of the imaging target zone 121 via the communications unit 203 and network 103.

Further, the adjusting unit B 206 performs the procedures of the steps below and shown in FIG. 43 based on the obtained view point positions of the cycle T$_{CYCLE}$ imaging zones and the obtained positional information of the imaging target zone 121.

First, in Step 1301, the imaging target zone 121 is divided based on the view point position information of the cycle T$_{CYCLE}$ imaging zones of the cameras 201 of one's own camera terminal and other camera terminals and the positional information of the imaging target zone 121. The dividing process is already described (zone dividing) and not explained here. As a result of the diving process, the imaging target zone 121 is divided into the zone A 150A assigned to the camera terminal 101A, zone B 150B assigned to the camera terminal 101B, and zone C 150C assigned to the camera terminal 101C as shown in FIG. 41(a) to (c). Then, in Step 1302, the adjusting unit B 206 of the camera terminal 101A adjusts the cycle T$_{CYCLE}$ camera panning and tilting angles to make the distances from the view point A 140A to the boundaries of the zone A 150A assigned to the camera terminal (L$_{A1}$ to A$_{A4}$ in FIG. 41(a)) equal, the adjusting unit B 206 of the camera terminal 101B adjusts the cycle T$_{CYCLE}$ camera panning and tilting angles to make the distances from the view point B 140B to the boundaries of the zone B 150B assigned to the camera terminal (L$_{B1}$ to A$_{B4}$ in FIG. 41(b)) equal, and the adjusting unit B 206 of the camera terminal 101C adjusts the cycle T$_{CYCLE}$ camera panning and tilting angles to make the distances from the view point C 140C to the boundaries of the zone C 150C assigned to the camera terminal (L$_{C1}$ to A$_{C5}$ in FIG. 41(c)) equal.

The adjusting process is described below. First, a function FK ( ) that has the minimum value when the distances to the boundaries are equal is selected. In the embodiment, the function is presented by the expression 81. The expressions of the expression 81 correspond to the camera terminals 101A to 101C, respectively, yielding the sum of the values obtained by raising the difference between the distance to each boundary and the average of the distances to the boundaries to the second power and having the minimum value when the distances to the boundaries are equal.

[Math 81]

$$FK_A(L_{A1}, L_{A2}, \ldots L_{An}) = \sum_{i=1}^{n}\left(L_{Ai} - \frac{\sum_{j=1}^{n}L_{Aj}}{n}\right)^2$$

$$FK_B(L_{B1}, L_{B2}, \ldots L_{Bn}) = \sum_{i=1}^{n}\left(L_{Bi} - \frac{\sum_{j=1}^{n}L_{Bj}}{n}\right)^2$$

$$FK_C(L_{C1}, L_{C2}, \ldots L_{Cn}) = \sum_{i=1}^{n}\left(L_{Ci} - \frac{\sum_{j=1}^{n}L_{Cj}}{n}\right)^2$$

(Formula 81)

Then, the generally known steepest descent method is used as presented by the expression 82 to calculate the next cycle $T_{CYCLE}$ camera panning and tilting angles of one's own camera terminal. In the expression 82, $\Theta b_{PA}$ and $\Theta b_{TA}$, $\Theta b_{PB}$ and $\Theta b_{TB}$, and $\Theta b_{PC}$ and $\Theta b_{TC}$ comprise the cycle $T_{CYCLE}$ camera panning and tilting angles of the camera terminals 101A to 101C, respectively, $\Theta b'_{PA}$ and $\Theta b'_{TA}$, $\Theta b'_{PB}$ and $\Theta b'_{TB}$, and $\Theta b'_{PC}$ and $\Theta b'_{TC}$ comprise the next cycle $T_{CYCLE}$ camera panning and tilting angles of the camera terminals 101A to 101C, respectively, and α is a constant (functions $G_A$ i ( ), $G_B$ i ( ), and $G_C$ i ( ) are functions to calculate the distances from the view points A 140A, B 140B, and C 140C to the respective boundaries determined by $\Theta b_{PA}$ and $\Theta b_{TA}$, $\Theta b_{PB}$ and $\Theta b_{TB}$, and $\Theta b_{PC}$ and $\Theta b_{TC}$, respectively).

[Math 82]

$$\left.\begin{aligned}
L_{Ai} &= G_{Bi}(\theta b_{PA}, \theta b_{TA}) \\
L_{Bi} &= G_{Bi}(\theta b_{PB}, \theta b_{TB}) \\
L_{Ci} &= G_{Ci}(\theta b_{PC}, \theta b_{TC}) \\
FK_A(L_{A1}, L_{A2}, \ldots L_{An}) &= FK(\theta b_{PA}, \theta b_{TA}) \\
&= \sum_{i=1}^{n}\left(G_{Ai}(\theta b_{PA}, \theta b_{TA}) - \frac{\sum_{j=1}^{n} G_{Aj}(\theta b_{PA}, \theta b_{TA})}{n}\right) \\
FK_B(L_{A1}, L_{A2}, \ldots L_{An}) &= FK(\theta b_{PB}, \theta b_{TB}) \\
&= \sum_{i=1}^{n}\left(G_{Bi}(\theta b_{PB}, \theta b_{TB}) - \frac{\sum_{j=1}^{n} G_{Bj}(\theta b_{PB}, \theta b_{TB})}{n}\right) \\
FK_C(L_{A1}, L_{A2}, \ldots L_{An}) &= FK(\theta b_{PC}, \theta b_{TC}) \\
&= \sum_{i=1}^{n}\left(G_{Ci}(\theta b_{PC}, \theta b_{TC}) - \frac{\sum_{j=1}^{n} G_{Cj}(\theta b_{PC}, \theta b_{TC})}{n}\right) \\
\theta b'_{PA} &= \theta b_{PA} - \alpha \frac{\partial FK_A(\theta b_{PA}, \theta b_{TA})}{\partial \theta b_{PA}} \\
\theta b'_{TA} &= \theta b_{TA} - \alpha \frac{\partial FK_A(\theta b_{PA}, \theta b_{TA})}{\partial \theta b_{TA}} \\
\theta b'_{PB} &= \theta b_{PB} - \alpha \frac{\partial FK_B(\theta b_{PB}, \theta b_{TB})}{\partial \theta b_{PB}} \\
\theta b'_{TB} &= \theta b_{TB} - \alpha \frac{\partial FK_B(\theta b_{PB}, \theta b_{TB})}{\partial \theta b_{TB}} \\
\theta b'_{PC} &= \theta b_{PC} - \alpha \frac{\partial FK_C(\theta b_{PC}, \theta b_{TC})}{\partial \theta b_{PC}} \\
\theta b'_{TC} &= \theta b_{TC} - \alpha \frac{\partial FK_C(\theta b_{PC}, \theta b_{TC})}{\partial \theta b_{TC}}
\end{aligned}\right\} \quad \text{(Formula 82)}$$

Finally, the cycle $T_{CYCLE}$ camera panning and tilting angles of the camera terminals 101A to 101C are adjusted for the next cycle $T_{CYCLE}$ camera panning and tilting angles of one's own camera terminal.

The adjusting unit B 206 performs the procedures of Steps 1301 and 1302 in sequence and returns to the procedure of Step 1301 after completing the procedure of Step 1302. Constantly repeating the procedures of Steps 1301 to 1303, the adjusting unit B 206 sends the cycle $T_{CYCLE}$ camera panning and tilting angles calculated by the expressions above to the cycle imaging controller 215 so that the view point position of the cycle $T_{CYCLE}$ imaging zone of the camera 201 is adjusted.

The operation of the adjusting unit B 206 is as described above. In Step 1302*l*, the cycle $T_{CYCLE}$ camera panning and tilting angles of one's own camera terminal are calculated by the steepest descent method in which the distances to the boundaries become equal and adjusted for the next cycle $T_{CYCLE}$ camera panning and tilting angles, thereby adjusting the view point position of the cycle $T_{CYCLE}$ imaging zone of the camera 201. Therefore, with the procedures of Steps 1301 to 1302 being repeated, the distances to the boundaries $L_{A1}$ to $L_{A4}$, $L_{B1}$ to $L_{B4}$, and $L_{C1}$ to $L_{C5}$ in FIG. 41(*a*) to (*c*) are made equal, respectively. When the distances to the boundaries are equal in FIG. 41(*a*) to (*c*), the zones A 140A, B 140B, and C 140C are equal in size.

The cycle field angle adjusting unit C 207 adjusts the horizontal and vertical field angles $\Theta b_H$ and $\Theta b_V$ of the cycle $T_{CYCLE}$ imaging zone of the camera 201 each time the adjusting unit B 206 completes the zone dividing procedure of Step 1301 so that the zone divided by the zone dividing process and assigned to one's own camera terminal is covered. In the embodiment, the horizontal and vertical field angles $\Theta b_{HA}$ and $\Theta b_{VA}$ of the cycle $TA_{CYCLE}$ imaging zone 120A are adjusted so that the camera terminal 101A covers the zone A 140A assigned thereto; the horizontal and vertical field angles $\Theta b_{HB}$ and $\Theta b_{VB}$ of the cycle $TB_{CYCLE}$ imaging zone 120B are adjusted so that the camera terminal 101B covers the zone B 140B assigned thereto; and the horizontal and vertical field angles $\Theta b_{HC}$ and $\Theta b_{VC}$ of the cycle $TC_{CYCLE}$ imaging zone 120C are adjusted so that the camera terminal 101C covers the zone C 140C assigned thereto. The zone positions are calculated in the zone dividing procedure of Step 1301; therefore, the horizontal and vertical field angles $\Theta b_H$ and $\Theta b_V$ are easily calculated from the zone positions in the adjustment.

The operation of the imaging zone adjusting apparatus of the embodiment is as described above. The imaging target zone 121 is divided into zones by the adjusting unit B 206 In Step 1301 and the field angles of the cycle $T_{CYCLE}$ imaging zones of the camera terminals are adjusted by the cycle field angle adjusting unit C 207 so that the divided zones are covered, whereby the imaging zone adjusting apparatus of the present invention allows the camera terminals 101A to 101C to image the imaging target zone 121 with no blind spots.

The adjusting unit B206 adjusts the cycle $T_{CYCLE}$ camera panning and tilting angles so that the distances to the boundaries of a zone become equal and, therefore, the zones are nearly equal in size In Step 1302. The procedure serves to prevent a divided zone from being too large to adjust the field angles of the cycle $T_{CYCLE}$ imaging zone so that the camera terminal assigned thereto covers the zone. The procedure is unnecessary where no divided zones can be excessively large. For example, when the camera terminals are installed in the manner that the view point positions of the cycle $T_{CYCLE}$ imaging zones of the camera terminals are equally spaced from each other within the imaging target zone 121, no divided zones can be excessively large and the procedure of Step 1302 is unnecessary.

The effect that the imaging target zone 121 is imaged with no blind spots is obtained by the adjusting unit B 206 repeating the procedures of Step 1301 to 1302 and the cycle field angle adjusting unit C 207 adjusting the field angles of the cycle $T_{CYCLE}$ imaging zones each time the dividing procedure of Step 1301 is completed so that the zone assigned to one's own camera terminal is covered. The procedure of Step 1302 and the procedure performed by the cycle field angle adjusting unit C 207 are repeated for the zone divided based on the sight line positions of the camera terminals and the position of the imaging target zone 121 and assigned to one's own camera terminal.

Therefore, even if any change occurs in the sight line positions of the camera terminals and the position of the imaging target zone 121 at each time point, the effect that the imaging target zone 121 is imaged with no blind spots can be obtained in accordance with the change. The sight line positions of the camera terminals and the position of the imaging target zone 121 may be changed when:

(1) the sight line position of the cycle $T_{CYCLE}$ imaging zone of a camera terminal is intentionally changed;
(2) an additional camera terminal is installed;
(3) some of the camera terminals are removed or unserviceable; or
(4) the imaging target zone position sent from the operation terminal is changed.

The operation of the present invention in response to these situational changes is described in Embodiments 6 and 7, described later. Even if the view point positions of the cycle $T_{CYCLE}$ imaging zones sent from the camera terminals or the imaging target zone position sent from the operation terminal is changed or not sent, or the view point position of a new cycle $T_{CYCLE}$ imaging zone is sent according to these changes, the imaging zone adjusting apparatus of the present invention allows the camera terminals to image the imaging target zone with no blind spots, in accordance with changes in the view point positions of the cycle $T_{CYCLE}$ imaging zones or the position of the imaging target zone.

In the embodiment, as shown in FIG. 40, the adjusting unit B 206 and field angle adjusting unit C 207 are distributed at each camera terminal 101A to 101C. Needless to say, the same effect can be obtained where one each of the adjusting unit B 206 and angle adjusting unit C 207 is present and the only one each of the adjusting unit B 206 and field angle adjusting unit C 207 controls the view point position and field angles of the cycle $T_{CYCLE}$ imaging zone of the camera 201 of the camera terminals 101A to 101C.

In the embodiment, the network 103 is a network line used for general communication. Needless to say, the same effect can be obtained regardless of that the network 103 is a wired or wireless network.

Embodiment 6

Embodiment 6 of the present invention is described hereafter. In the embodiment, the operation terminal 102 of the imaging zone adjusting apparatus of the present invention described in Embodiments 1 to 5 of the present invention is additionally described with reference to several modified embodiments.

In Embodiments 1 to 5, the operation terminal 102 having the structure shown in FIG. 28 sends the positional information of the imaging target zone 121 to the camera terminals 101A to 101C in FIG. 26 or 40 from the communications unit 203. The operation terminal 102 is required for the operation and structure of the camera terminals 101A to 101C described in Embodiments 1 to 5. However, the operation terminal 102 is not particularly necessary where the positional information of the imaging target zone is preset in the camera terminals 101A to 101C.

The operation terminal 102 contains the communications unit 203 as a component. The communications unit 203 is also provided to camera terminals 101A to 101C. If the communications unit 203 of the camera terminals 101A to 101C sends the positional information of the imaging target zone 121, the camera terminals 101A to 101C also serve as the operation terminal 203, in which case the operation terminal 102 is not particularly necessary.

Further, in Embodiments 1 to 5, the operation terminal 102 sends the positional information of the imaging target zone 121. The positional information of the imaging target zone 121 is the positional information of the ends of the imaging target zone 121. One operations terminal 102 is used in Embodiments 1 to 5. Needless to say, the same effect of the imaging zone adjusting apparatus of the present invention can be obtained using N operation terminals 102 to send the positional information of each end of the imaging target zone 121 and to define a closed zone constituted by the end positions as the imaging target zone 121 where the imaging target zone 121 has N ends.

Further, the positional information of the imaging target zone 121 sent from the operation terminal 102 is a predetermined fixed value in Embodiments 1 to 5, according to which, even if the position of the imaging target zone 121 sent from the operation terminals 102 is changed, the imaging zone adjusting apparatus of the present invention can have the effect that the imaging target zone 121 is imaged with no blind spots in accordance with the change. Therefore, the positional information of the imaging target zone 121 sent from the operation terminal 102 can be chronologically changed while the imaging zone adjusting apparatus of the present invention is in operation.

Figure 44:
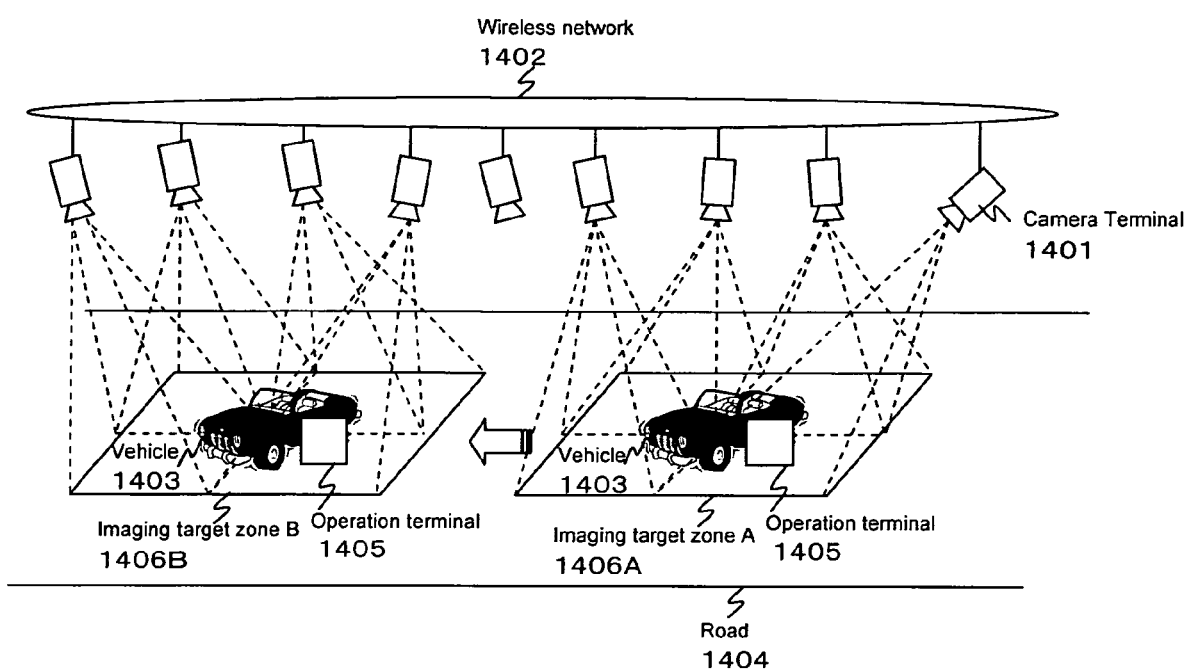
FIG. 44 is a block diagram showing the structure of an imaging zone adjusting apparatus in Embodiment 6 of the present invention.

The operation terminal 102 is additionally described above. Exemplary operation of the imaging zone adjusting apparatus of the present invention including the above additional explanation is described with reference to FIG. 44. In FIG. 44, camera terminals 1401 comprise the camera terminals in Embodiments 1 to 5 and communicate with the other camera terminals 1401 and an operation terminal 1405 via a wireless network 1402. A vehicle 1403 runs on a road 1404 and is provided with the operation terminal 1405. An imaging target zone A 1406A and an imaging target zone B 1406B comprise the cycle $T_{CYCLE}$ imaging zones of the vehicle 1403 running on the road 1404 at each time point. The imaging target zone is a zone having a specific size around the position of the vehicle 1403 and obtained by GPS or gyro-compass, being sent from the operation terminal 1405.

The operation is as follows. The multiple camera terminals 1401 of the imaging zone adjusting apparatus of the present invention installed over the road 1404 communicate with the other camera terminals via the wireless network 1402. The operation terminal 1405 installed in the vehicle 1403 running on the road 1404 sends the positional information of the imaging target zone around the current position the vehicle 1403 to the camera terminals 1401 via the wireless network 1402.

With the imaging zone adjusting apparatus having the structure above, the imaging target zone around the position of the vehicle 1403 that chronologically changes can be imaged with no blind spots. Image information obtained with no blind spots is provided to the driver of the vehicle 1403 via the wireless network 1402. The driver of the vehicle 1403 can obtains information on the surroundings with no blind spots, supporting safe driving and parking.

Embodiment 7

Embodiment 7 of the present invention is described hereafter. In the embodiment, the process to specify the cycle $T_{CYCLE}$ imaging zone position of the camera terminals of the imaging zone adjusting apparatus of the present invention described in Embodiments 1 to 5 is additionally described with reference to several modified embodiments.

In Embodiments 1 to 5, the adjusting unit A 202, cycle field angle adjusting unit A 204, cycle field angle adjusting unit B 205, adjusting unit B 206, or adjusting unit C 208 of the camera terminals 101A to 101C in FIG. 26 or 40 operates based on the flowcharts shown in FIGS. 29, 33, 35, 39, and 43, respectively. In the embodiment, the adjusting unit A 202 of the camera terminals operating based on the flowchart shown in FIG. 29 operates based on FIG. 45, the cycle field angle adjusting unit A 204 of the camera terminals operating based on the flowchart shown in FIG. 33 operates based on the flowchart shown in FIG. 37, the cycle field angle adjusting unit B 205 of the camera terminals operating based on the flowchart shown in FIG. 35 operates based on the flowchart shown in FIG. 47, the adjusting unit C 208 of the camera terminals operating based on the flowchart shown in FIG. 39 operates based on the flowchart shown in FIG. 48, and the adjusting unit B 206 of the camera terminals operating based on the flowchart shown in FIG. 43 operates based on the flowchart shown in FIG. 49.

Figure 29:
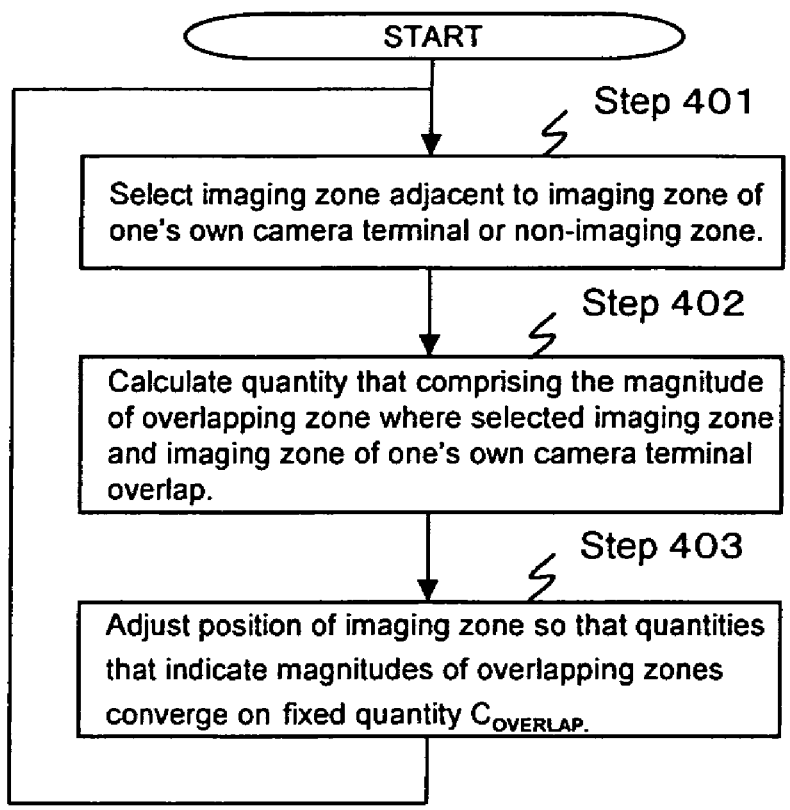
FIG. 29 is a flowchart of the procedure performed by an adjustor A in Embodiment 1 of the present invention.
Figure 45:
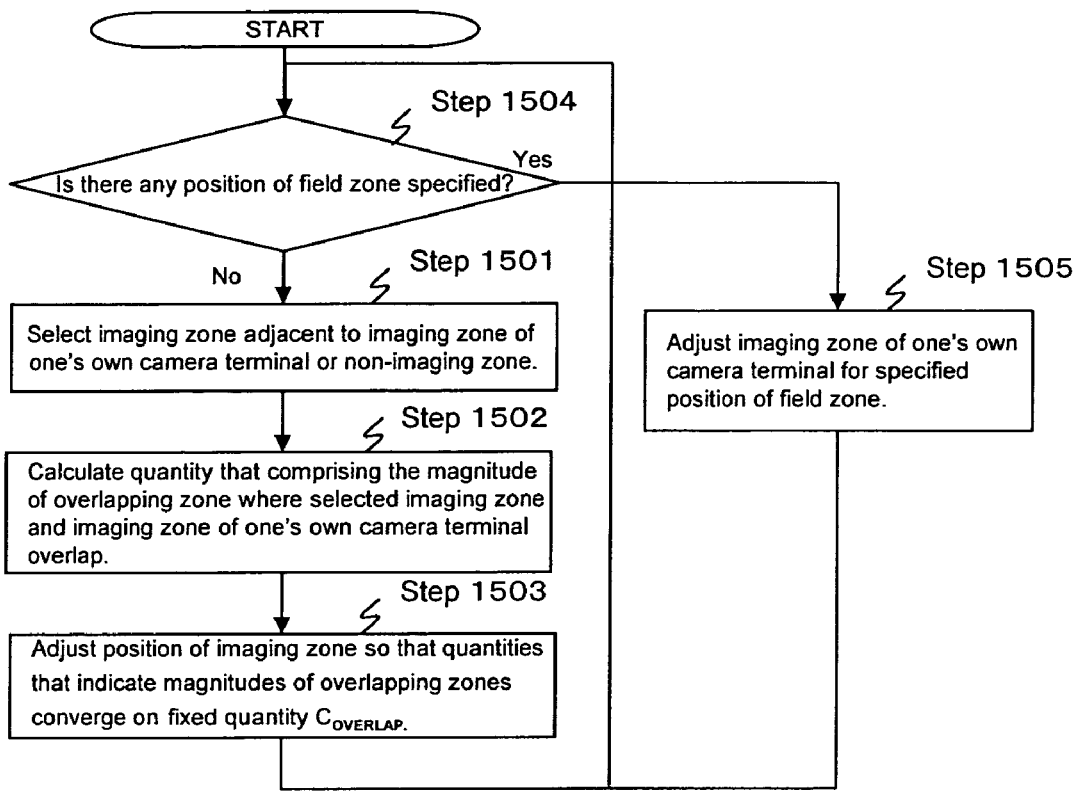
FIG. 45 is a flowchart of the procedure performed by an adjustor A in Embodiment 7 of the present invention.

The flowchart shown in FIG. 45 is the flowchart shown in FIG. 29 and described in Embodiment 1 with the addition of Steps 1504 and 1505. Needless to say, the effect of the imaging zone adjusting apparatus of the present invention can be obtained since the procedures of Steps 1501 to 1503 are repeated as in Embodiment 1 when No is selected, or the position of a cycle $T_{CYCLE}$ imaging zone is not specified, in Step 1504.

Figure 33:
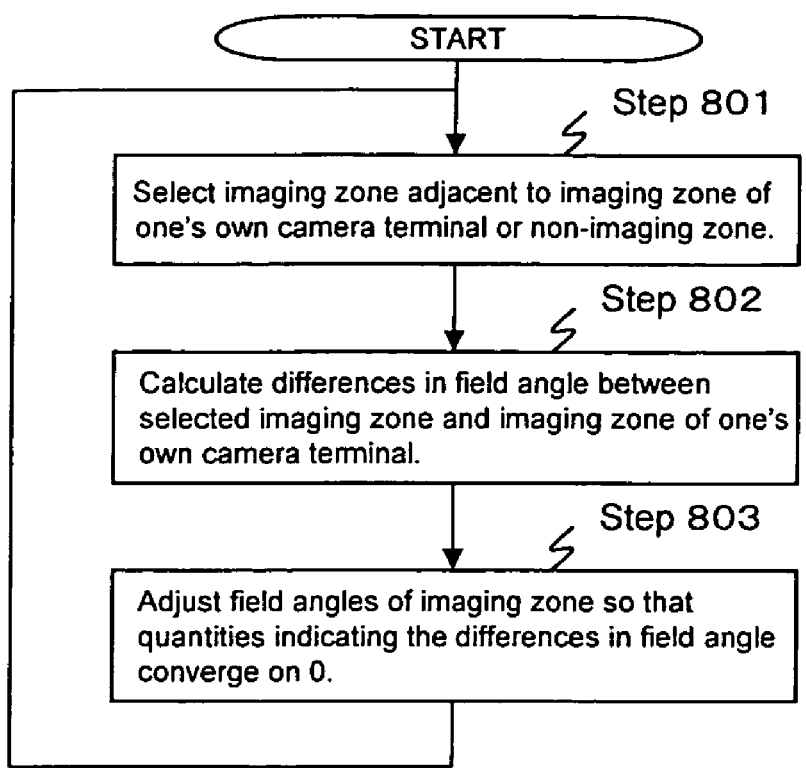
FIG. 33 is a flowchart of the procedure performed by the field angle adjustor A in Embodiment 2 of the present invention.
Figure 46:
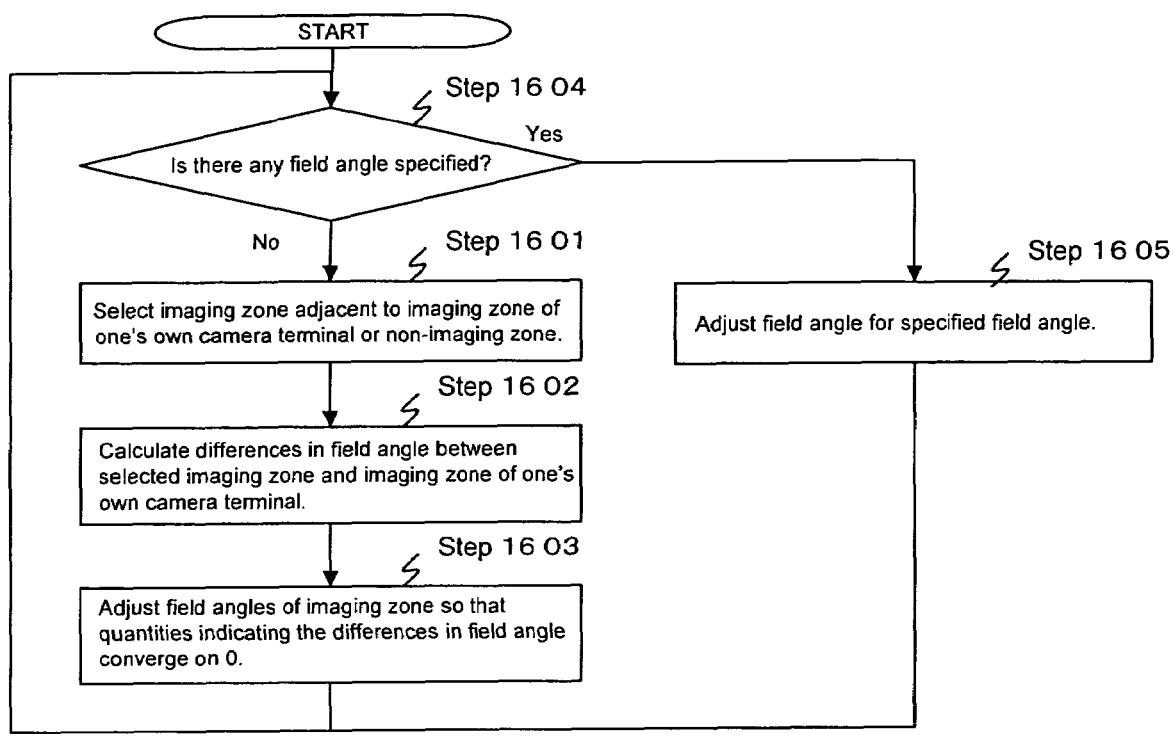
FIG. 46 is a flowchart of the procedure performed by the field angle adjustor A in Embodiment 7 of the present invention.

The flowchart shown FIG. 46 is the flowchart shown in FIG. 33 and described in Embodiment 2 with the addition of Steps 1604 and 1605. Needless to say, the effect of the imaging zone adjusting apparatus of the present invention can be obtained since the procedures of Steps 1601 to 1603 are repeated as in Embodiment 2 when No is selected, or the field angles of a cycle $T_{CYCLE}$ imaging zone are not specified, in Step 1604.

Figure 47:
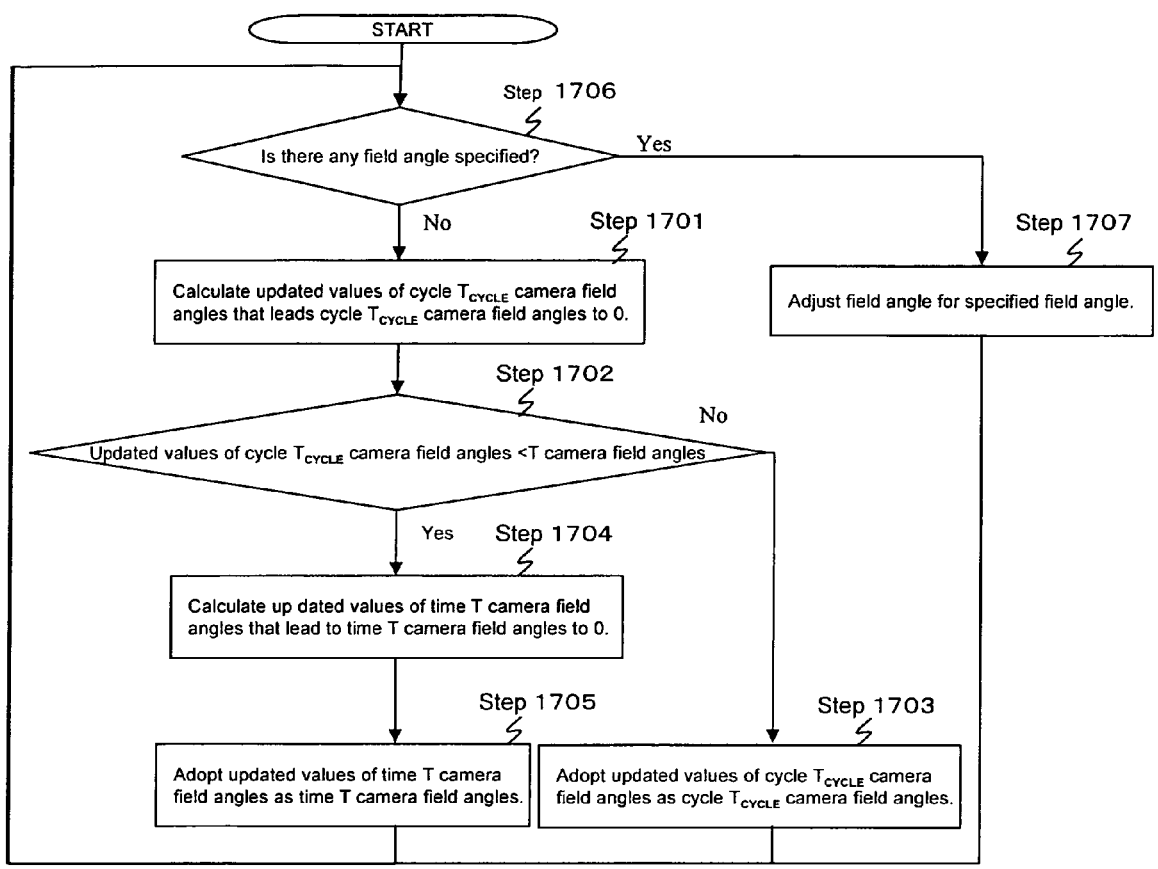
FIG. 47 is a flowchart of the procedure performed by the field angle adjustor B in Embodiment 7 of the present invention.

The flowchart shown in FIG. 47 is the flowchart shown in FIG. 35 and described in Embodiment 3 with the addition of Steps 1706 and 1707. Needless to say, the effect of the imaging zone adjusting apparatus of the present invention can be obtained since the procedures of Steps 1701 to 1705 are repeated as in Embodiment 3 when No is selected, or the field angles of a cycle $T_{CYCLE}$ imaging zone are not specified, in Step 1706.

Figure 48:
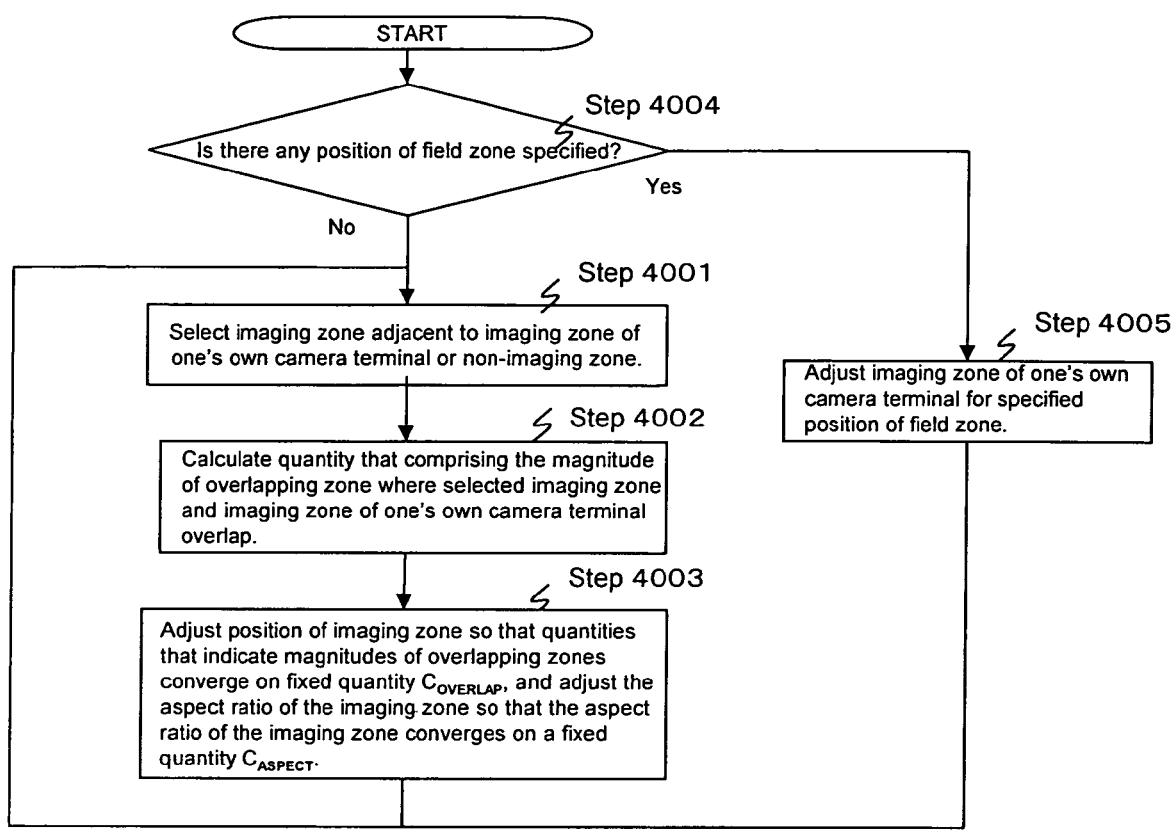
FIG. 48 is a flowchart of the procedure performed by adjustor C in Embodiment 7 of the present invention.

The flowchart shown in FIG. 48 is the flowchart shown in FIG. 39 and described in Embodiment 4 with the addition of Steps 4004 and 4005. Needless to say, the effect of the imaging zone adjusting apparatus of the present invention can be obtained since the procedures of Steps 4001 to 4003 are repeated as in Embodiment 4 when No is selected, or the field angles of a cycle $T_{CYCLE}$ imaging zone are not specified, in Step 1904.

Figure 43:
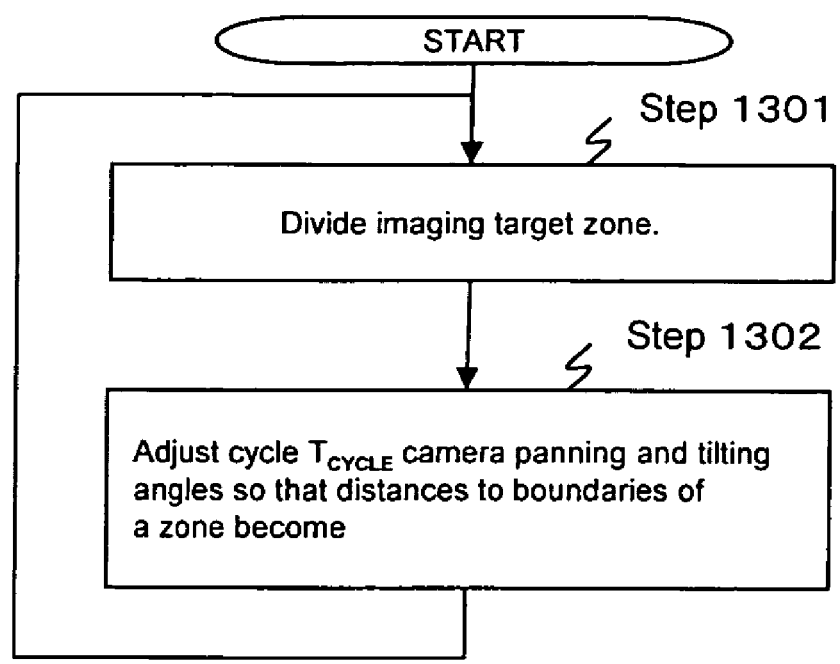
FIG. 43 is a flowchart of the procedure performed by an adjustor B in Embodiment 5 of the present invention.
Figure 49:
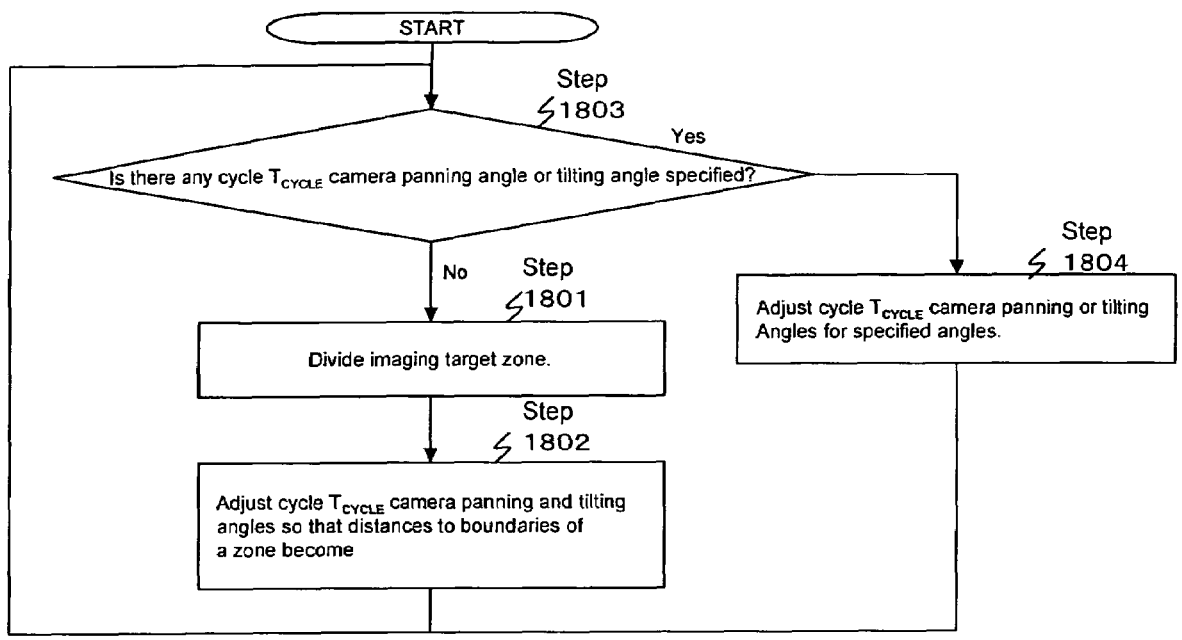
FIG. 49 is a flowchart of the procedure performed by adjustor B in Embodiment 7 of the present invention.

The flowchart shown in FIG. 49 is the flowchart shown in FIG. 43 and described in Embodiment 5 with the addition of Steps 1803 and 1804. Needless to say, the effect of the imaging zone adjusting apparatus of the present invention can be obtained since the procedures of Steps 1801 to 1802 are repeated as in Embodiment 4 when No is selected, or the cycle $T_{CYCLE}$ camera panning or tilting angle is not specified, in Step 1803.

In the flowcharts shown in FIGS. 45 to 49, when Yes is selected, or the position or field angles of a cycle $T_{CYCLE}$ imaging zone or the cycle $T_{CYCLE}$ camera panning or tilting angle is specified, in Step 1504, 1604, 1706, 1803, or 4004, then, in Step 1505, 1605, 1707, 1804, or 4005, the position or field angles of the cycle $T_{CYCLE}$ imaging zone or the cycle $T_{CYCLE}$ camera panning or tilting angle of the camera terminal is adjusted for the cycle $T_{CYCLE}$ imaging zone position or field angles or cycle $T_{CYCLE}$ camera panning or tilting angle specified In Step 1504, 1604, 1706, 1803, or 4004.

The position or field angles of a cycle $T_{CYCLE}$ imaging zone or the cycle $T_{CYCLE}$ camera panning or tilting angle specified In Step 1504, 1604, 1706, 1803, or 4004 is manually specified via the network 103. Alternatively, they are detected by the image processor 213 in FIG. 27 using a conventional image processing such as pattern matching of the position and size of a detection target based on images captured by the camera terminals. Then, the cycle $T_{CTCLE}$ imaging zone position or field angles or cycle $T_{CTCLE}$ camera panning or tilting angle that allows the cycle $T_{CTCLE}$ imaging zone to have the detected detection target at the center and contain the entire detection target is specified.

As described above, through the operation of the camera terminals based on the flowcharts shown in FIGS. 45 to 49, when the position or field angles of a cycle $T_{CTCLE}$ imaging zone or the cycle $T_{CYCLE}$ camera panning or tilting angle is specified or as for a camera terminal to which these are specified, the position or field angles of the cycle $T_{CTCLE}$ imaging zone or the cycle $T_{CTCLE}$ camera panning or tilting angle is adjusted. When the position or field angles of a cycle $T_{CTCLE}$ imaging zone or the cycle $T_{CYCLE}$ camera panning or tilting angle is not specified or as for a camera terminal to which these are not specified, the camera terminal images the imaging target zone with no blind spots as in Embodiments 1 to 5. The process to specify the position and the like of a cycle $T_{CYCLE}$ imaging zone of a camera terminal is additionally described above. Exemplary operation of the imaging zone adjusting apparatus of the present invention including the above additional explanation is described with reference to FIGS. 50 and 51.

Figure 50:
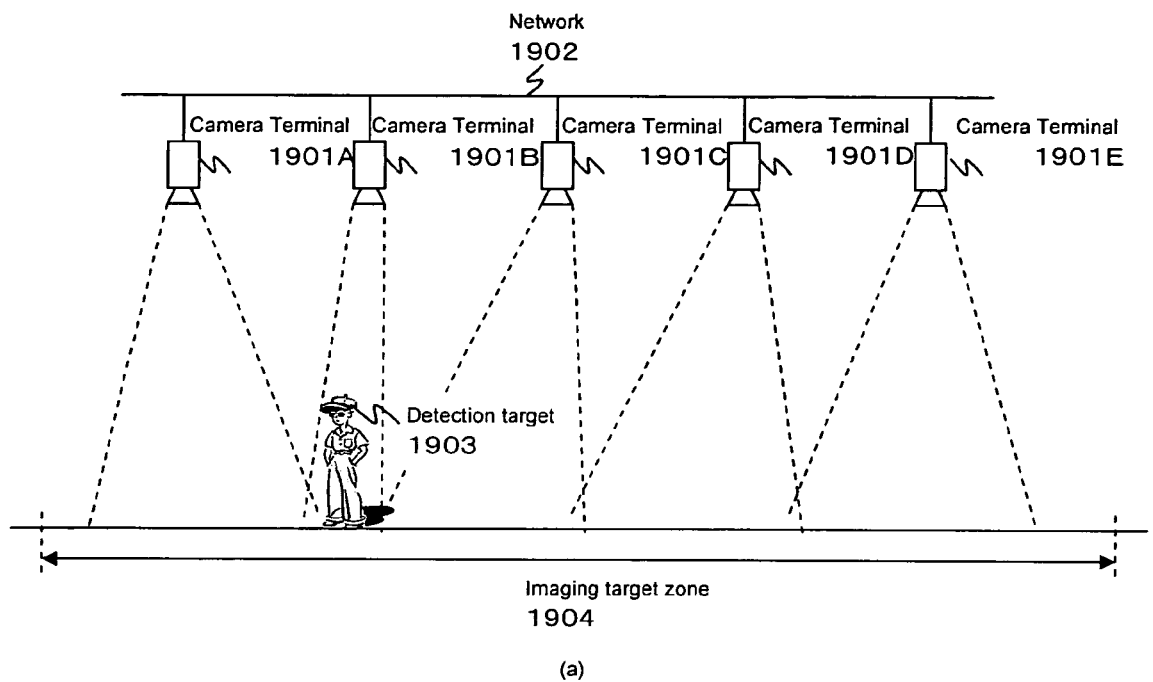
FIG. 50 is a block diagram showing the structure of an imaging zone adjusting apparatus in Embodiment 7 of the present invention.
Figure 50:
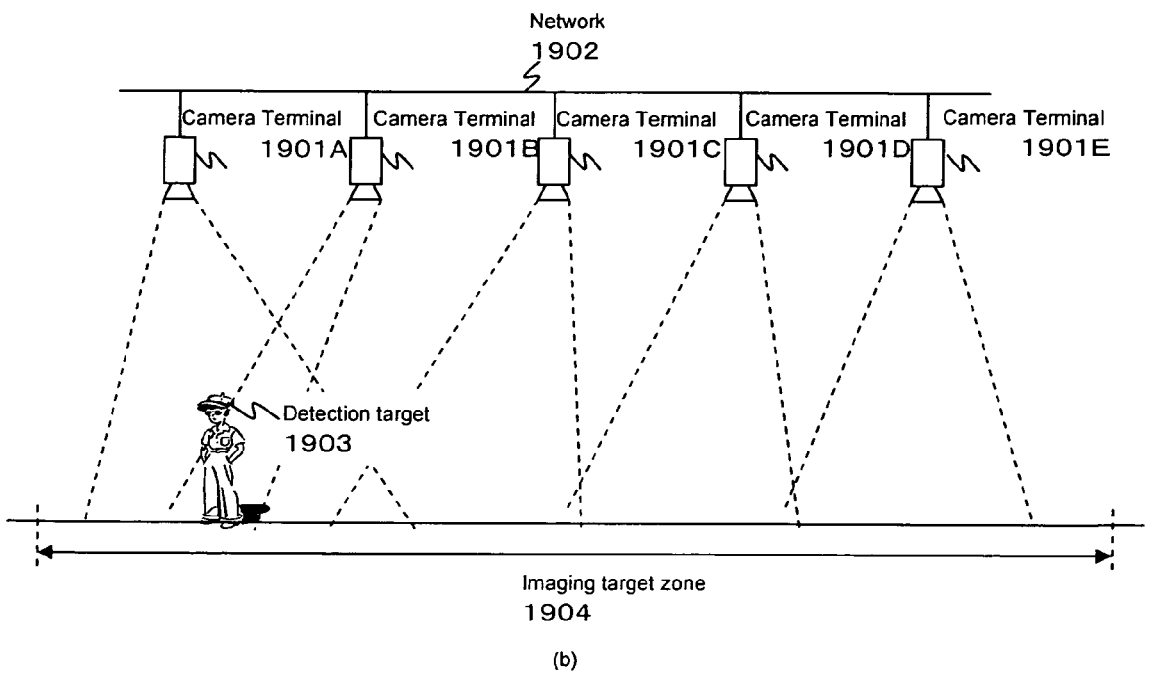

In FIGS. 50(*a*) and (*b*), camera terminals 1901A to 1901E comprise the camera terminals in Embodiments 1 to 5 and operate based on the flowcharts shown in FIGS. 45 to 49. A network 1902 is a network transferring information among the camera terminals 1901A to 1901E. A detection target 1903 is a detection target to be detected by the camera terminals 1901A to 1901E and present within an imaging target zone 1904.

The operation is as follows. The camera terminals 1901A to 1901E operate based on the flowcharts shown in FIGS. 45 to 49. The camera terminal 1901B detects the detection target 1903; therefore, the position or field angles of the cycle $T_{CYCLE}$ imaging zone or the cycle $T_{CYCLE}$ camera panning or tilting angle is specified In Step 1504, 1604, 1706, 1803, or 4004. The specified cycle $T_{CYCLE}$ imaging zone position or field angles or cycle $T_{CYCLE}$ camera panning or tilting angle is a position or field angles of the cycle $T_{CYCLE}$ imaging zone or a cycle $T_{CYCLE}$ camera panning or tilting angle that allows the cycle $T_{CYCLE}$ imaging zone to have the detection target 1903 at the center and contain the entire detection target 1903. Consequently, the camera terminal 1901B is adjusted for a cycle $T_{CYCLE}$ imaging zone position or field angles or a cycle $T_{CYCLE}$ camera panning or tilting angle that allows the cycle $T_{CYCLE}$ imaging zone to have the detection target 1903 at the center and contain the entire detection target 1903. The camera terminals 1901A, 1901C, 1901D, and 1901E do not detect the detection target 1903 and, therefore, are adjusted to image the imaging target zone 1904 with no blind spots as in Embodiments 1 to 5.

With the operation of the camera terminals 1901A to 1901E described above, when the detection target 1903 is present in the imaging target zone 1904, an detailed image of the cycle $T_{CYCLE}$ imaging zone having the detection target 1903 at the center and containing the entire detection target 1903 is obtained and the imaging target zone is imaged with no blind spots. Needless to say, even if the detection target 1903 moves, the same operation is performed with the camera terminal to detect the detection target 1903 being switched.

In FIGS. 50(a) and (b), the camera terminal 1901B detects the detection target 1903 and a detailed image of the cycle $T_{CYCLE}$ imaging zone having the detection target 1903 at the center and containing the entire detection target 1903 is obtained. If the camera terminal 1901B continues to send the positional information of one's own cycle $T_{CYCLE}$ imaging zone via the network, the camera terminals 1901A and 1901C image the imaging target zone 1904 with no blind spots in cooperation with the camera terminal 1901B because they recognize the cycle $T_{CYCLE}$ imaging zone imaged by the camera terminal 1901B as an adjacent cycle $T_{CYCLE}$ imaging zone as shown in FIG. 50(a). If the camera terminal 1901B discontinues sending the positional information of one's own cycle $T_{CYCLE}$ imaging zone via the network, the camera terminals 1901A and 1901C image the imaging target zone 1904 with no blind spots without the camera terminal 1901B because they do not recognize the cycle $T_{CYCLE}$ imaging zone imaged by the camera terminal 1901B as an adjacent cycle $T_{CYCLE}$ imaging zone as shown in FIG. 50(b).

As shown in FIG. 50(a), when cooperating with the camera terminal 1901B that detects and follows the detection target 1903, the cycle $T_{CYCLE}$ imaging zones of the camera terminals 1901A, 1901C, 1901D, and 1901E are significantly influenced by the movement of the cycle $T_{CYCLE}$ imaging zone of the camera terminal B, or the motion of the detection target 1903, and, consequently, images of the cycle $T_{CYCLE}$ imaging zones may be disrupted. The problem can be resolved, for example, by allowing the camera terminal imaging the detection target to discontinue sending the positional information of one's own cycle $T_{CYCLE}$ imaging zone via the network 1902 when the detection target 1903 is in vigorous motion.

Figure 51:
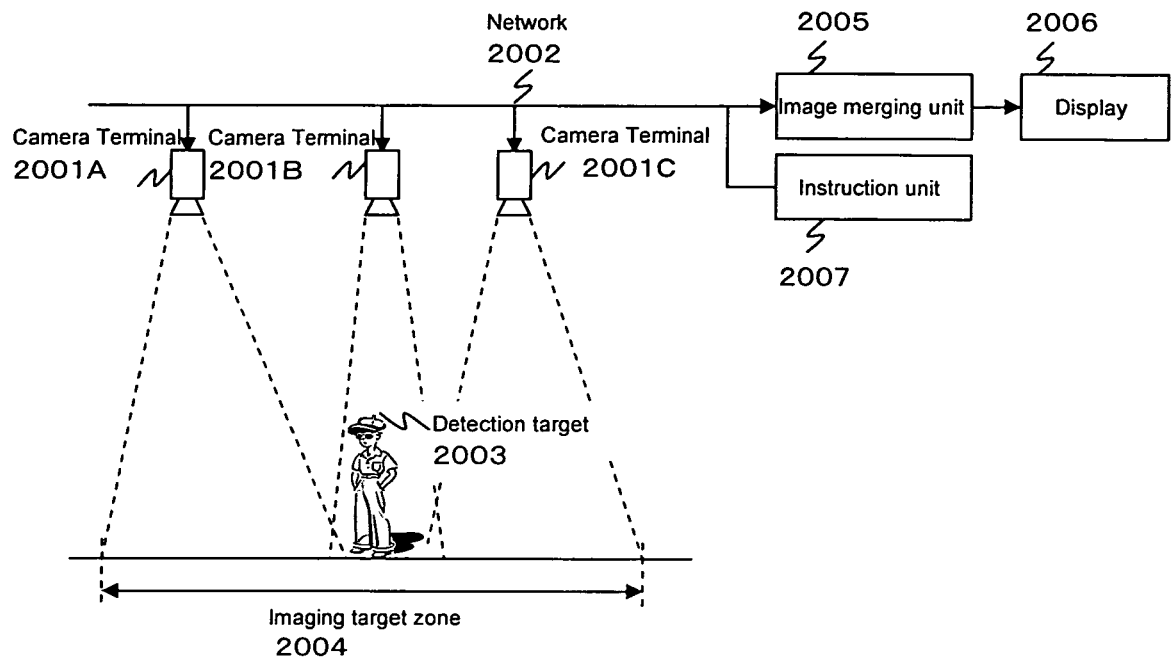
FIG. 51 is a block diagram showing the structure of an imaging zone adjusting apparatus in Embodiment 7 of the present invention.

In FIG. 51, camera terminals 2001A to 2001C comprise the camera terminals in Embodiments 1 to 5 and operate based on the flowcharts shown in FIGS. 45 to 49. A network 2002 is a network transferring information among the camera terminals 2001A to 2001C. A detection target 2003 is an object to be detected by the camera terminals 2001A to 2001C and present within an imaging target zone 2004. These elements are the same as those in FIG. 50. With this structure, the camera terminals 2001A to 2001C automatically obtain an image of a cycle $T_{CYCLE}$ imaging zone having the detection target 2003 at the center and containing the entire detection target 2003 and detect the imaging target zone 2004 with no blind spots when the detection target 2003 is present in the imaging target zone 2004. In FIG. 51, the following units are added to the imaging zone adjusting apparatus of the present invention shown in FIG. 50. An image merging unit 2005 is a processor to merge images obtained by the camera terminals 2001A to 2001C in an imaging cycle $T_{CYCLE}$ into a spatially continued single image. A display 2006 is an LCD and the like to display the image merged by the image merging unit 2005. An instruction unit 2007 is a keyboard and the like to specify the position or field angles of a cycle $T_{CYCLE}$ imaging zone or the cycle $T_{CYCLE}$ camera panning or tilting angle to the camera terminals 2001A to 2001C.

Figure 52:
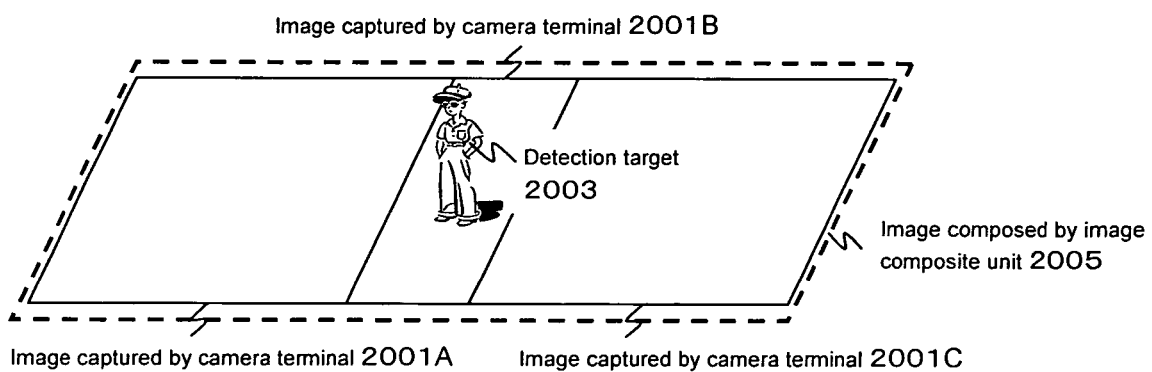
FIG. 52 is a drawing showing an exemplary image displayed by the display unit of the imaging zone adjusting apparatus in Embodiment 7 of the present invention.

The operation is as follows. The image merging unit 2005 receives images captured by the camera terminals 2001A to 2001C and information including the positions of the cycle $T_{CYCLE}$ imaging zones sent from the camera terminals 2001A to 2001C via the network 2002. The image merging mart 2005 merges the images captured by the camera terminals into an image in which the images are arranged in the order of their spatial positions as shown in FIG. 52 based on the information including the positions of the cycle $T_{CYCLE}$ imaging zones of the camera terminals. The merged image is displayed on the display 2006 and the image information is presented to the user. Images obtained by the camera terminals 2001A to 2001C and the positions on the world coordinates system of the pixels constituting the images, used for merging by the image merging unit 2005, can be calculated by Math 8 and the image merging unit 2005 can merge images into an image in which the various view points are arranged in the order of their spatial positions using a conventional projection conversion technique.

Those who observe the merged image displayed on the display 2006 makes input to the instruction unit 2007 on the position or field angles of a zone on the merged image that he/she wants. For the input, a pointing device and the like is used to specify the position or field angles of the zone. Receiving the position or field angles of the individually specified zone, the instruction unit 2007 identifies the camera terminal having the zone within its current cycle $T_{CYCLE}$ imaging zone. This identification can be done using information including the position of the cycle $T_{CYCLE}$ imaging zone sent from the camera terminals 2001A to 2001C. The instruction unit 2007 instructs the camera terminal having within its cycle $T_{CYCLE}$ imaging zone the individually specified zone and identified to have the individually specified position or field angles as the position or field angles of the cycle $T_{CYCLE}$ imaging zone of the camera terminal via the network 2002. The camera terminal to which the position or field angles of the cycle $T_{CYCLE}$ imaging zone are specified adjusts the position or field angles of the cycle $T_{CYCLE}$ imaging zone of that camera terminal for the specified position or field angles of the cycle $T_{CYCLE}$ imaging zone.

With the above operation, users can receive image information of the imaging target zone 2004 with no blind spots and various view points and in the order of their spatial positions. Further, by specifying the position or field angles of the zone specified based on the image information, an image at a particular zone position or field angle can be obtained. For example, if manual input is made to the instruction unit 2007 to make the field angles of a zone smaller, an image of the zone with higher field angles or resolutions and imaging frequency F is displayed on the display 2006. The effect is beneficial for surveillance of buildings having an extensive imaging target zone.

Embodiment 8

Embodiment 8 of the present invention is described hereafter. In the embodiment, the imaging zone adjusting apparatus of the present invention described in Embodiments 1 to 5 is additionally described with reference to several modified embodiments.

In the imaging zone adjusting apparatus of the present invention described in Embodiments 1 to 5, the camera terminal shown in FIG. 27, 32, 34, 38, or 42 has variable parameters including the position or field angles of the cycle $T_{CYCLE}$ imaging zone, cycle $T_{CYCLE}$ camera panning or tilting angle, position or field angles of the time T imaging zone, panning or tilting angle, or panning or tilting speed. The same effect as described in Embodiments 1 to 5 can be obtained when some, not all, of the parameters are variable. Further, the same effect as described in Embodiments 1 to 5 can be obtained even if camera terminals of which all parameters are not variable are present among multiple camera terminals. This is because, even if camera terminals of which all parameters are not variable and the position and field angles of the cycle $T_{CYCLE}$ imaging zone are not adjustable are present, camera terminals of which parameters are variable and the position and field angles of the cycle $T_{CYCLE}$ imaging zone are adjustable operate as described in Embodiments 1 to 5, having the cycle $T_{CYCLE}$ imaging zone as an adjacent cycle $T_{CYCLE}$ imaging zone of those camera terminals. Therefore, the same effect as described in Embodiments 1 to 5 can be obtained.

In the imaging zone adjusting apparatus of the present invention described in Embodiments 1 to 5, the camera terminal shown in FIG. 27, 32, 34, 38, or 42 has the position or field angles of the cycle $T_{CYCLE}$ imaging zone, cycle $T_{CYCLE}$ camera panning or tilting angle, position or field angles of the time T imaging zone, panning or tilting angle, or panning or tilting speed adjusted by the orientation controller 214 using a mechanical control mechanism such as a stepping motor. However, it does not necessarily requires a mechanical control mechanism such as a stepping motor as long as the position or field angles of the cycle $T_{CYCLE}$ imaging zone, cycle $T_{CYCLE}$ camera panning or tilting angle, position or field angles of the time T imaging zone, panning or tilting angle, or panning or tilting speed is adjusted.

Figure 53:
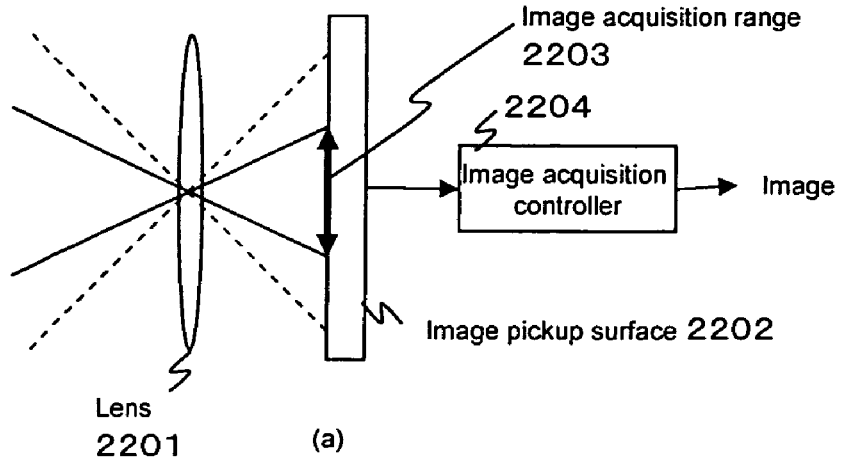
FIG. 53 is a drawing explaining partial scanning.
Figure 53:
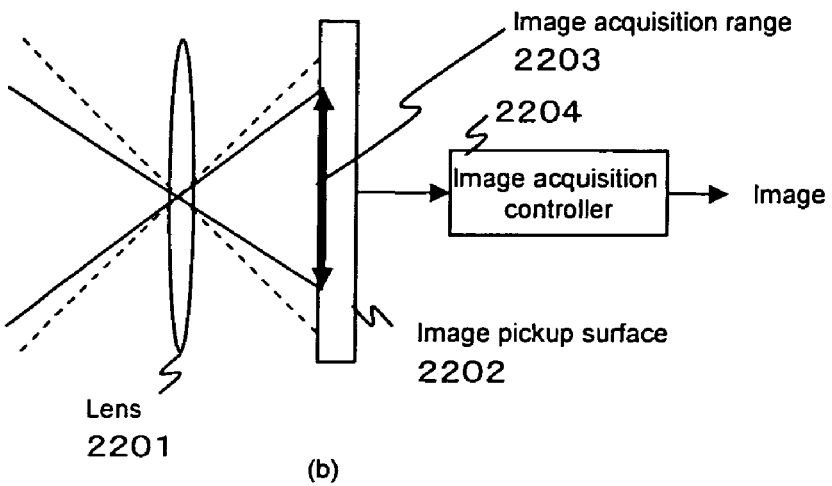
Figure 53:
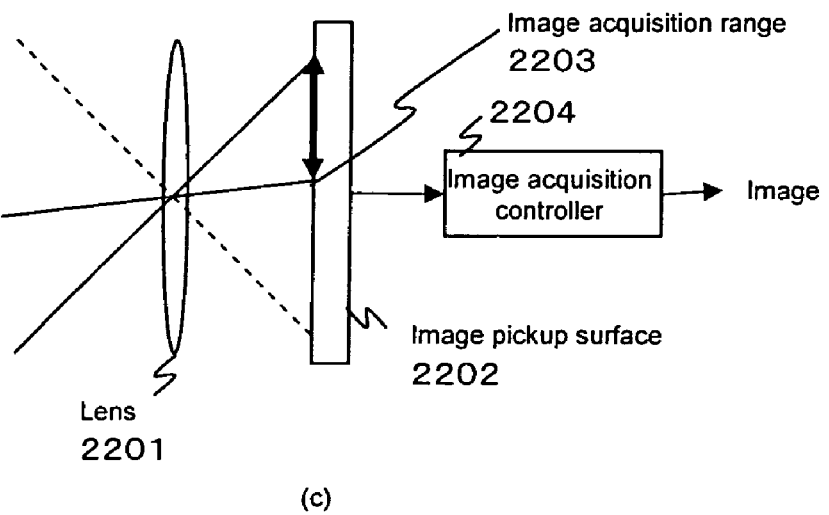

For example, there is a camera of which the panning, tilting, and field angles are electronically controlled using a technique called a partial scanning shown in FIG. 53. In FIGS. 53(a), (b), and (c), the number 2201 indicates a lens forming an image, the number 2202 is an image pickup surface such as a CCD capturing an image formed by the lens 2201, the number 2203 is an image acquisition controller acquiring an image only within an image acquisition range indicated by the number 2204 of the image captured by the image pickup surface 2202. When the image pickup surface 2202 is a CCD, the image acquisition controller 2203 controls the addresses of pixels to read the CCD, thereby electronically reading only the image within the image acquisition range 2204. Further, by changing the address control, the image acquisition range 2204 can be changed. The technique called partial scanning electronically controls the panning, tilting, and field angles of a camera by changing the image acquisition range 2204 as shown in FIGS. 53(a), (b), and (c).

Figure 54:
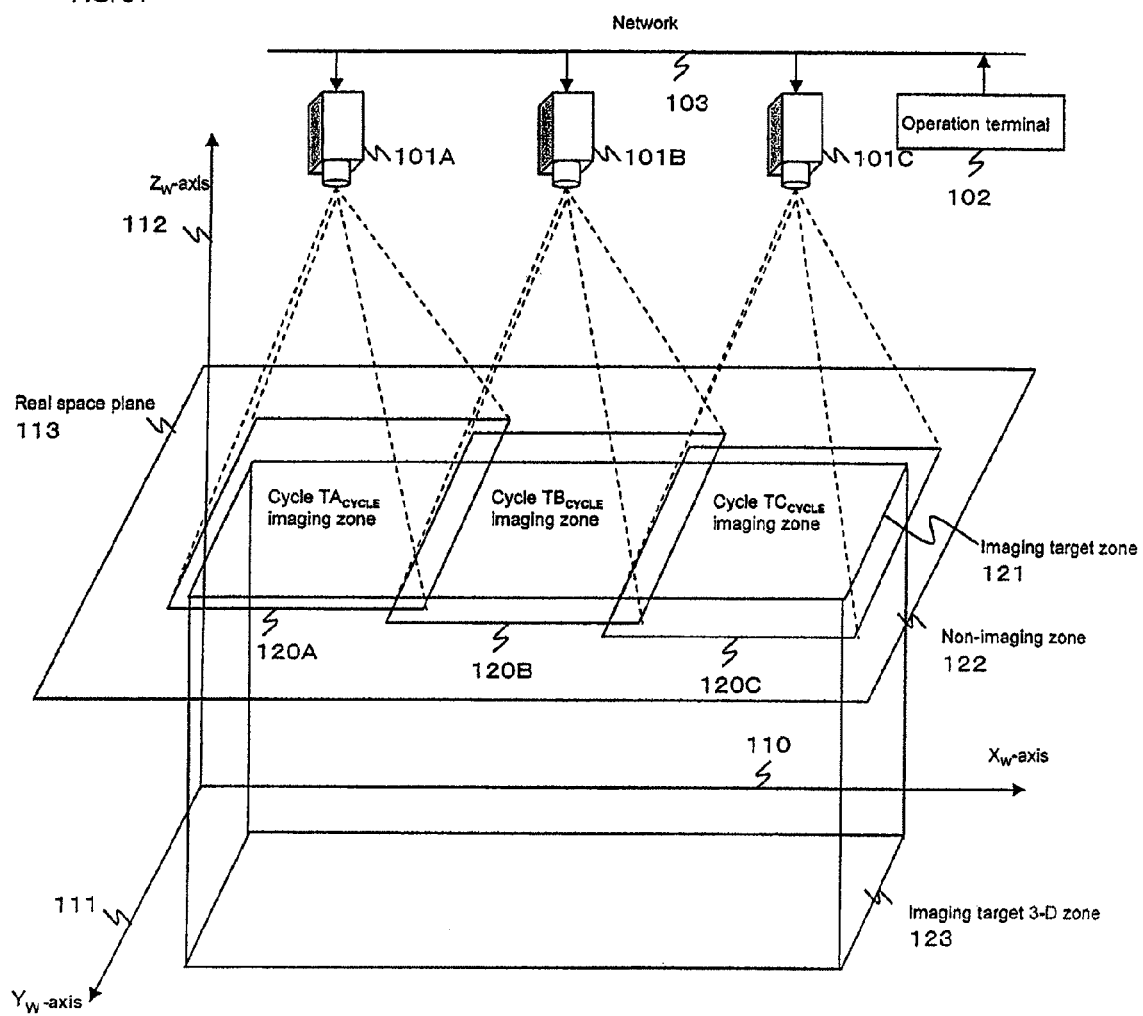
FIG. 54 is a drawing showing an exemplary image displayed by the display unit of the imaging zone adjusting apparatus in a modified embodiment of the present invention.

Further, in the imaging zone adjusting apparatus of the present invention described in Embodiments 1 to 5, the real space plane 113 has $Z_W=0$ as shown in FIGS. 26 and 40. Needless to say, the same effect can be obtained as described in Embodiments 1 to 5 when the real space plane 113 has $Z_W=C$ as shown in FIG. 54 (the components in FIG. 54 are the same as those in FIG. 26). Further, the cycle $T_{CYCLE}$ imaging zones imaged by the camera terminals are enlarged as they move to 0 on the $Z_W$-axis 112. Therefore, a three-dimensional imaging target zone can be imaged with no blind spots as is a three-dimensional imaging target zone 213 in FIG. 54.

Further, in the imaging zone adjusting apparatus of the present invention described in Embodiments 1 to 5, the effect as described in Embodiments 1 to 5 is obtained by adjusting the position or field angles of the cycle $T_{CYCLE}$ imaging zones imaged by the camera terminals. As described (for the imaging process of a cycle $T_{CYCLE}$ imaging zone), the cycle $T_{CYCLE}$ imaging zone is imaged by moving the position of a time T imaging zone at panning and tilting speeds $V_P$ and $V_T$. When the panning and tilting speeds $V_P$ and $V_T$ in the imaging process of a cycle $T_{CYCLE}$ imaging zone is 0, the cycle $T_{CYCLE}$ imaging zone coincides with the time T imaging zone. Needless to say, the imaging zone adjusting apparatus of the present invention described in Embodiments 1 to 5 yields the effect described in Embodiments 1 to 5 by adjusting the position or field angles of the time T imaging zones imaged by the camera terminals.

Further, the camera 201 of Embodiments 1 to 5 described above is a conventional camera. Needless to say, the same effect can be obtained even if the camera 201 is a camera detecting visible light or non-visible light such as infrared and ultraviolet. Needless to say, the same effect can be obtained for a conventional sensor having an imaging zone of which the position is changeable such as micro-motion, pressures, temperature, barometric pressure, acoustic (microphones) sensors. Needless to say, the same effect can be obtained in a combined use of a conventional camera and the sensors.

Figure 55:
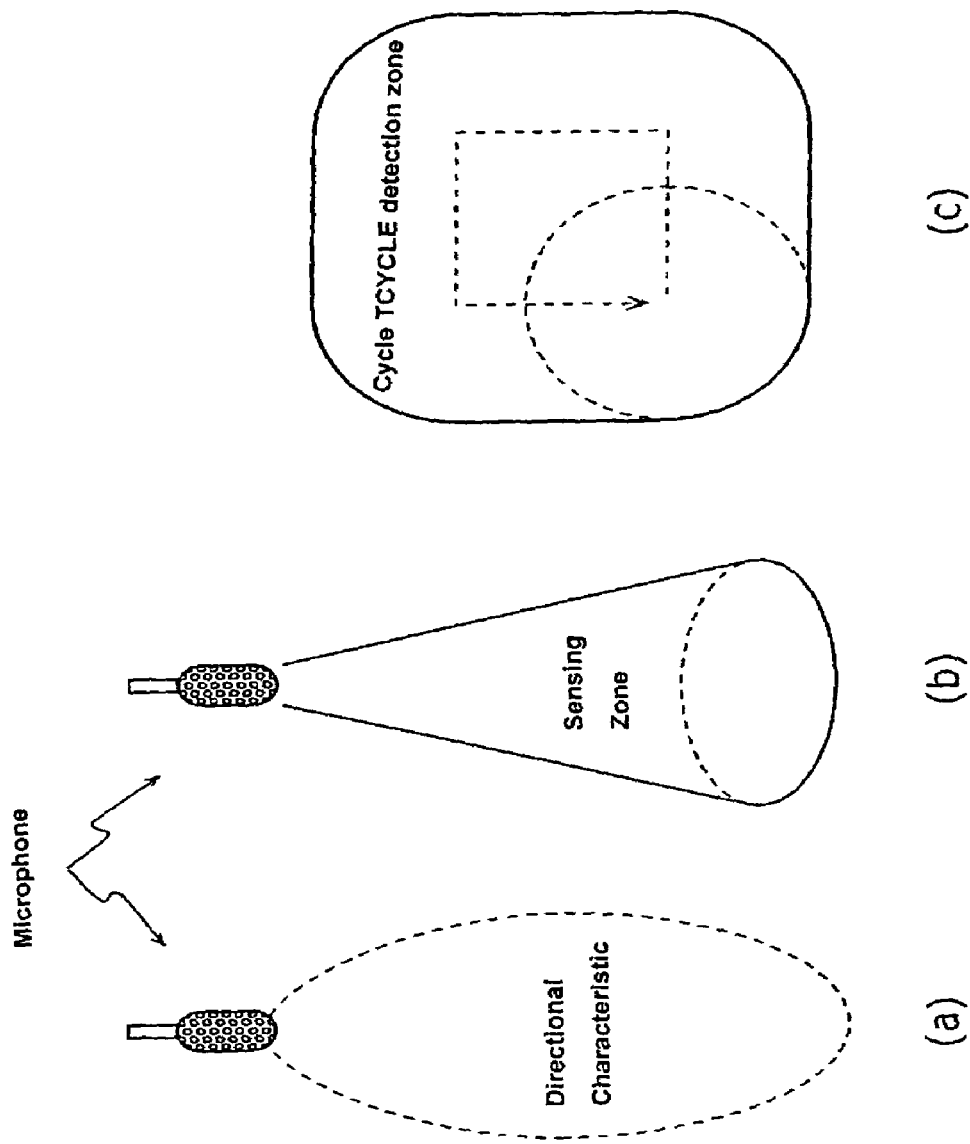
FIG. 55 is a drawing explaining an embodiment where the present invention is applied to microphones.

For example, as for a directional microphone as shown in FIG. 55(a), a sensing zone can be defined as a direction (zone) in which sound is detected at a specific sensitivity or higher as shown in FIG. 55(b). Therefore, the orientation of the microphone is controlled in the similar manner to the panning and tilting of a camera in the embodiments described above for scanning in a specific cycle. Thus, the cycle $T_{CYCLE}$ detection zone (in other words, "a hypothetical detection zone") corresponding to the cycle $T_{CYCLE}$ imaging zone for a camera terminal can be defined as shown in FIG. 55(c). Hence, the present invention can be applied not only to cameras but also to various sensors. As shown in FIGS. 55(b) and (c), when the sensing zone corresponding to the time T imaging zone and the cycle $T_{CYCLE}$ detection zone corresponding to the cycle $T_{CYCLE}$ imaging zone are, for example, circular, not rectangular, the aspect ratio can be defined as the ratio of major axis to minor axis of a circle (1 for a complete round) or the ratio of measure in the $X_W$-axis direction to measure in the $Y_W$-axis of a figure.

Figure 56:
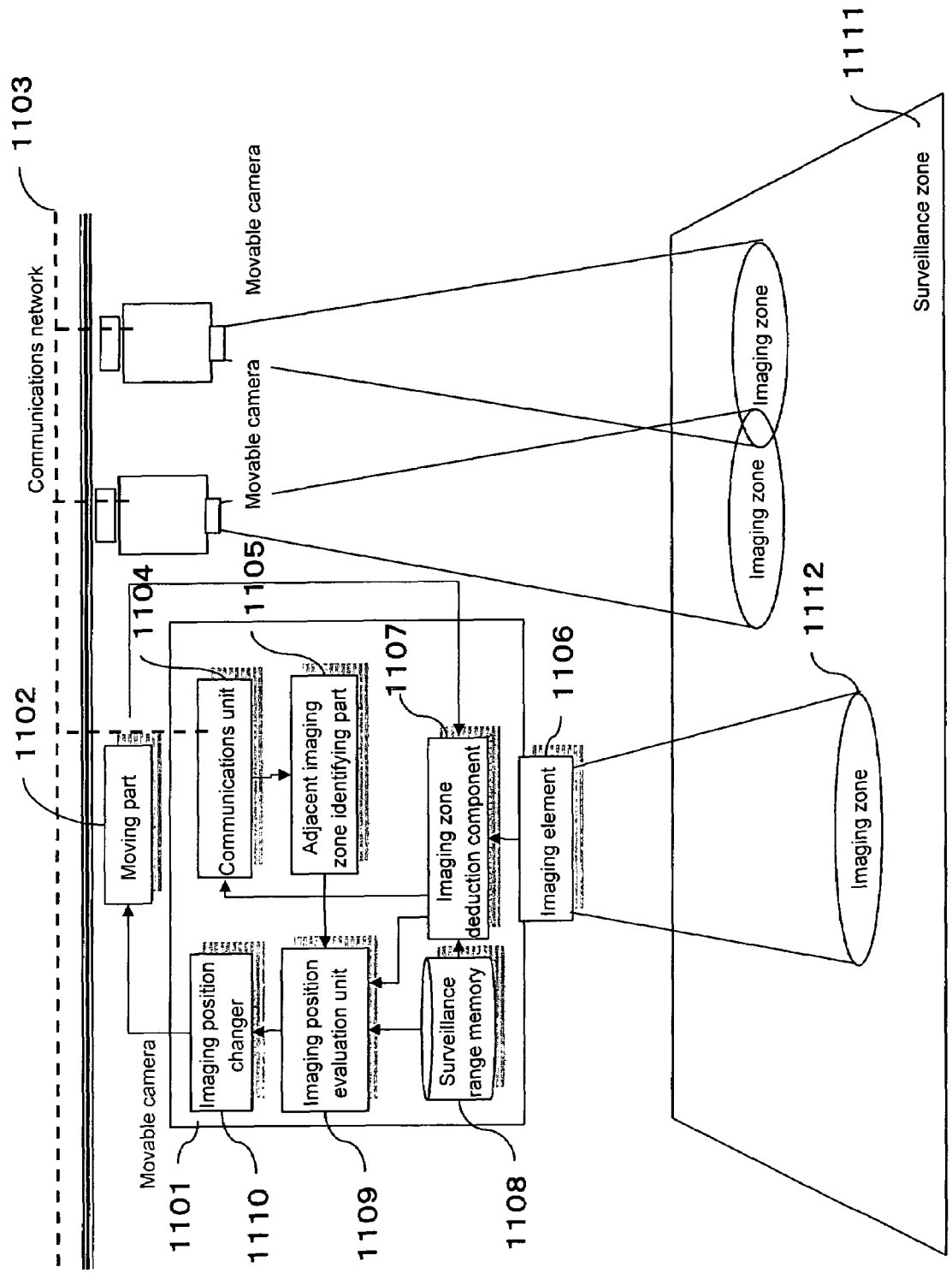
FIG. 56 is a block diagram showing the structure of a surveillance system composed of movable cameras.

Further, the cameras in the embodiments described above are fixed cameras; however, they may also be movable cameras. FIG. 56 is a block diagram showing the structure of a surveillance system in which the imaging zone adjusting apparatus according to the present invention is applied to a surveillance system comprising movable cameras. The surveillance system comprises multiple movable cameras 1101 connected to a communications network 1103, characterized by the fact that the multiple movable cameras 1101 voluntarily and cooperatively move in addition to panning and tilting so that a surveillance zone 1111 is completely surveyed. The movable cameras 1101 are a camera apparatus supported and moved by a moving unit 1102. The moving unit 1102 is a mechanism to change the imaging position of the movable camera 1101. The communications network 1103 is a transmission path connecting the multiple movable cameras 1101. A communications unit 1104 is a communication interface for the movable cameras 1101 to exchange information with the other cameras via the communications network 1103. An adjacent imaging zone identifying unit 1105 is a processor to deduce which movable camera has an adjacent imaging zone based on information from the other cameras informed to the communications unit 1104.

An imaging element 1106 is a CCD camera and the like which captures images in the surveillance zone. An imaging zone deduction component 1107 is a processor to deduce the imaging zone of the movable camera 1101 from the characteristics of the imaging element 1106 and the position of the movable unit 1102.

Surveillance range memory 1108 is memory in which to store the range of a zone to be surveyed by the movable camera 1101. An imaging position evaluation unit 1109 is a processor to evaluate the overlapping zone where the imaging zone of the movable camera 1101 and an adjacent imaging zone overlap or the distances to the boundaries of the surveillance zone. An imaging position changer 1110 is a controller to control the moving unit 1102 and change the imaging position of the movable camera 1101. A surveillance zone 1111 is a zone to be surveyed by the movable cameras 1101. An imaging zone 1112 is a zone imaged by a movable camera 1101.

With the surveillance system described above, the movable camera 1101 exchanges information regarding the imaging zones deduced based on the position of one's own imaging zone and the characteristics of the imaging element 1106 with the neighboring movable cameras and change the panning, tilting, and imaging position in cooperation with the neighboring movable cameras so that the magnitude of the overlapping zone with the adjacent imaging zone and the distances to the boundaries of the surveillance zone converge on specific states, whereby the movable cameras 1101 can move to imaging positions where the multiple movable cameras 1101 concurrently image the surveillance zone with no blind spots.

Figure 57:
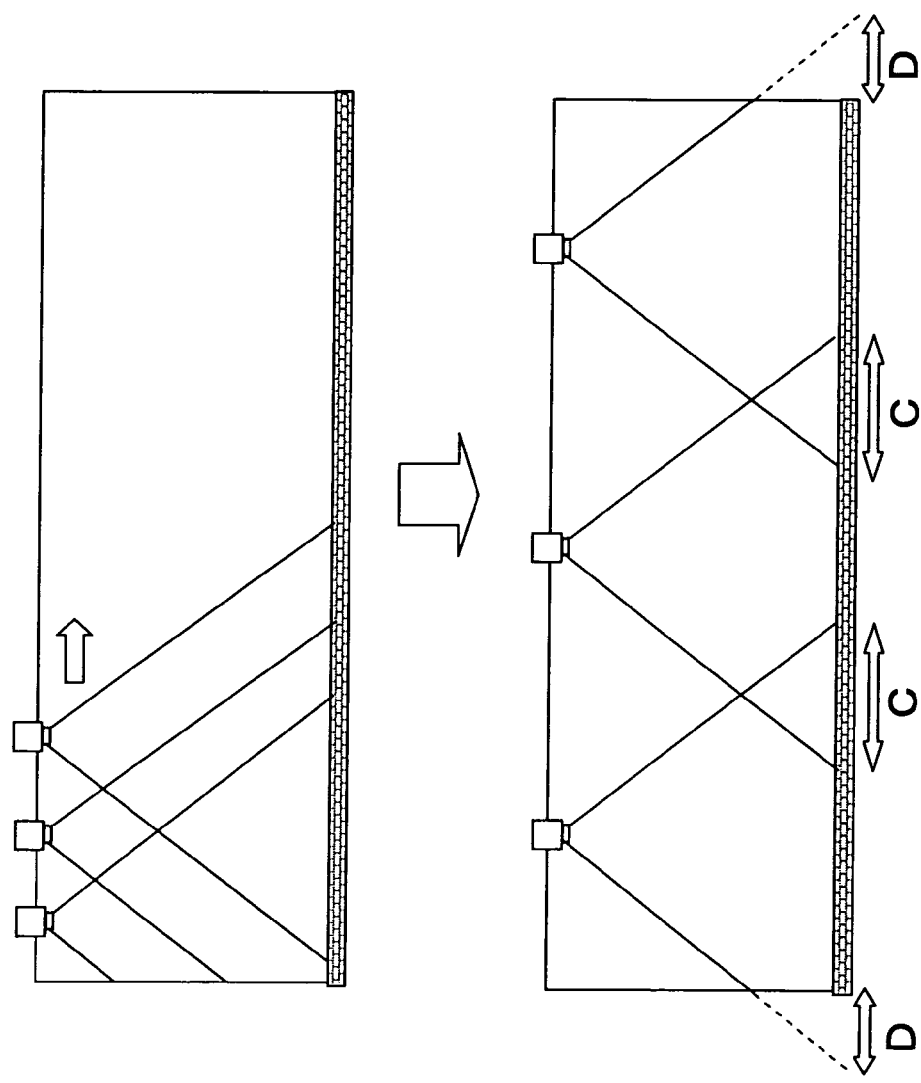
FIG. 57 is a drawing showing the operation of movable cameras in a surveillance system.
Figure 58:
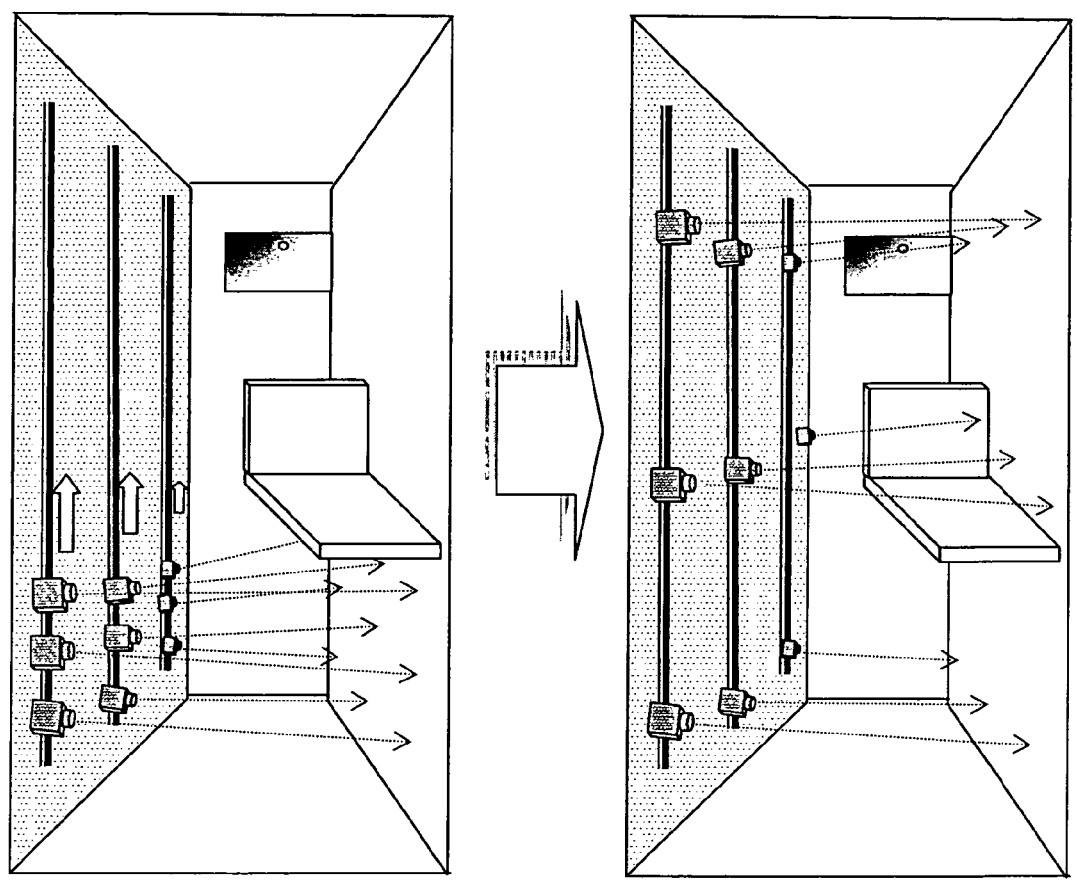
FIG. 58 is a drawing showing how movable cameras move on rail tracks provided in a surveillance area.

FIG. 57 illustrates the operation of the movable cameras 1101 in the surveillance system. In the figure, the movable cameras 1101 that comprise movable in the horizontal (one-dimensional) direction for simplified explanation are provided on the ceiling of a room at a fixed height to survey the floor. As shown in the top figure, the movable cameras 1101 provided at proper positions on the ceiling change their imaging positions so that the width C of the overlapping zone of the imaging zones or the distance D to the boundaries of the surveillance zone converges on a specific value. Then, as shown in the bottom figure, the movable cameras 1101 can move to positions where the multiple movable cameras concurrently image the entire surveillance zone. Further, the movable cameras 1101 can be installed at one place all together where the installation is difficult such as a high ceiling. Then, the movable cameras move to positions where the multiple movable cameras concurrently image the entire surveillance zone with no blind spots. Therefore, the workload for deciding where movable cameras are installed or for installing them can be reduced. In an embodiment, the system can be constituted by installing in the surveillance zone rails on which the movable cameras move as shown in FIG. 58.

The camera terminal and imaging zone adjusting apparatus according to the present invention is described with reference to embodiments and modified embodiments. However, the present invention is not restricted to the embodiments and modified embodiments. For example, the present invention also includes embodiments in which the components of the embodiments and modified embodiments are used in any combination.

The components in the Claims correspond to the components of the embodiments in the Specification as follows. The embodiment of the camera terminal refers to camera terminals 101A to 101C; an embodiment of the camera refers to a camera 201; an embodiment of the adjusting unit refers to an adjusting unit A 202, a cycle field angle adjusting unit A 204, a cycle field angle adjusting unit B 205, an adjusting unit B 206, a cycle field angle adjusting unit C 207, and an adjusting unit C 208; an embodiment of the communication unit refers to communications unit 2003; an embodiment of the merging unit refers to image merging unit 2005; an embodiment of the display unit is a display 2006; and an embodiment of the sensor refers to a sensor such as the microphone shown in FIG. 55.

INDUSTRIAL APPLICABILITY

The imaging zone adjusting apparatus according to the present invention is useful as an apparatus to adjust the imaging zone of an imaging apparatus such as a camera, for example, as a surveillance apparatus or an imaging system comprising multiple cameras, particularly as an imaging system required to efficiently cover a specific imaging target zone with no blind spots.

The invention claimed is:

1. A camera terminal constituting an imaging zone adjusting apparatus that adjusts an imaging zone using multiple camera terminals, comprising:
   a camera configured to image a hypothetical imaging zone that is a hypothetical imaging zone including a sum of imaging zones obtained by changing a rotation angle of said camera or a position of said camera within a specific zone in a specific period of time;
   an adjusting unit configured to adjust the position of the hypothetical imaging zone by controlling said camera; and
   a communication unit configured to send and receive hypothetical imaging zone information indicating the hypothetical imaging zone,
   wherein said adjusting unit is configured to adjust the position of the hypothetical imaging zone to which the camera terminal belongs based on the hypothetical imaging zone to which the camera terminal belongs provided with said adjusting unit and hypothetical imaging zones of the other camera terminals indicated by the hypothetical imaging zone information received by said communication unit so that a combined zone of the hypothetical imaging zones of said multiple camera terminals completely covers a specific imaging target zone, and
   said adjusting unit is configured to adjust the position of the hypothetical imaging zone to which the camera terminal belongs so that the overlapping zone quantity that is the quantity of a zone where the hypothetical imaging zone to which the camera terminal belongs and a hypothetical imaging zone adjacent to said hypothetical imaging zone overlap converges on a target quantity that is a fixed quantity larger than 0.

2. The camera terminal according to claim 1,
   wherein said adjusting unit is configured to repeat a step of selecting a hypothetical imaging zone adjacent to the hypothetical imaging zone to which the camera terminal belongs among the hypothetical zones of said multiple camera terminals, a step of calculating the overlapping zone difference quantity that is the difference between the overlapping zone quantity of the selected hypothetical imaging zone and hypothetical imaging zone to which the camera terminal belongs and said target quantity, and a step of calculating the position of the hypothetical imaging zone to which the camera terminal belongs that leads said overlapping zone difference quantity to 0, whereby the position of the hypothetical imaging zone to which the camera terminal belongs is adjusted for the position obtained by said repeated steps.

3. The camera terminal according to claim 1,
   wherein said camera comprises a unit configured to change the imaging cycle in which said hypothetical imaging zone is repeatedly imaged, and
   said adjusting unit is further configured to adjust the position and imaging cycle of the hypothetical imaging zone to which the camera terminal belongs so that the imaging cycle of the hypothetical imaging zone to which the camera terminal belongs and the imaging cycles of a hypothetical imaging zone adjacent to said hypothetical imaging zone are nearly equal.

4. The camera terminal according to claim 1,
   wherein said camera comprises a unit configured to change the imaging cycle in which said hypothetical imaging zone is repeatedly imaged, and said adjusting unit is further configured to adjust the position and imaging cycle of the hypothetical imaging zone to which the camera terminal belongs so that the imaging cycle of the hypothetical imaging zone to which the camera terminal belongs becomes smaller.

5. The camera terminal according to claim 1,
wherein said imaging zone adjusting apparatus further includes:
a merging unit configured to obtain images captured by the cameras of said multiple camera terminals and merge them into a spatially continued image; and
a display unit configured to display the merged image.

6. The camera terminal according to claim 1,
wherein said adjusting unit is farther configured to adjust the position and aspect ratio of the hypothetical imaging zone to which the camera terminal belongs so that the aspect ratio of the hypothetical imaging zone to which the camera terminal belongs becomes a specific target quantity.

7. An imaging zone adjusting apparatus that adjusts an imaging zone using multiple camera terminals, said apparatus comprising multiple camera terminals according to claim 1.

8. The camera terminal according to claim 2,
wherein said overlapping zone difference quantity is a quantity that is minimized when the overlapping zone quantity and said target quantity are equal.

9. The camera terminal according to claim 6,
wherein said aspect ratio target quantity is an aspect ratio determined by the position of the imaging zone and the installation points of the camera.

10. A sensor terminal constituting a detection zone adjusting apparatus that adjusts a detection zone using multiple sensor terminals, the sensor terminal, comprising:
a sensor that detects physical quantities within a hypothetical detection zone that is a hypothetical detection zone including a sum of imaging zones obtained by changing a rotation angle of a camera or a position of a camera within a specific zone in a specific period of time;
an adjusting unit configured to adjust the position of said hypothetical detection zone by controlling said sensor; and
a communication unit configured to send/receive hypothetical detection zone information indicating said hypothetical detection zone,
wherein said adjusting unit is configured to adjust the position of the hypothetical detection zone to which the sensor terminal belongs based on the hypothetical detection zone to which the sensor terminal belongs provided with said adjusting unit and the hypothetical detection zones of the other sensor terminals indicated by the hypothetical detection zone information received by said communication unit so that a combined zone of the hypothetical detection zones of said multiple sensor terminals completely covers a specific detection target zone, and
said adjusting unit is configured to adjust the position of the hypothetical detection zone to which the sensor terminal belongs so that the overlapping zone quantity that is the quantity of a zone where the hypothetical detection zone to which the sensor terminal belongs and a hypothetical detection zone adjacent to said hypothetical detection zone overlap converges on a target quantity that is a fixed quantity larger than 0.

11. An imaging zone adjusting method in a camera terminal constituting an imaging zone adjusting apparatus that adjusts an imaging zone using multiple camera terminals, the camera terminal including a camera that images a hypothetical imaging zone that is a hypothetical imaging zone including a sum of imaging zones obtained by changing a rotation angle of said camera or a position of said camera within a specific zone in a specific period of time, and a communication unit configured to send and receive hypothetical imaging zone information indicating the hypothetical imaging zone, the imaging zone adjusting method, comprising:
adjusting the position of the hypothetical imaging zone to which the camera terminal belongs based on the hypothetical imaging zone to which the camera terminal belongs and the hypothetical imaging zones of the other camera terminals indicated by the hypothetical imaging zone information received by the communication unit so that a combined zone of the hypothetical imaging zones of the multiple camera terminals completely covers a specific imaging target zone; and
adjusting the position of the hypothetical imaging zone to which the camera terminal belongs so that the overlapping zone quantity that is the quantity of a zone where the hypothetical imaging zone to which the camera terminal belongs and a hypothetical imaging zone adjacent to said hypothetical imaging zone overlap converges on a target quantity that is a fixed quantity larger than 0.

12. A program stored on a computer-readable medium for a camera terminal constituting an imaging zone adjusting apparatus that adjusts an imaging zone using multiple camera terminals, the program causing a computer to execute the adjusting step included in the imaging zone adjusting method according to claim 11.

* * * * *